United States Patent [19]

Kavouras et al.

[11] 4,347,618
[45] Aug. 31, 1982

[54] APPARATUS FOR PROCESSING WEATHER RADAR INFORMATION

[75] Inventors: Stephen P. Kavouras, 9450 Cedar Ave. South, Bloomington, Minn. 55424; Paul C. Post, Eagan, Minn.; Roderick A. Wells, St. Louis Park, Minn.; Stephen L. Rutkowski, Savage, Minn.

[73] Assignee: Stephen P. Kavouras, Bloomington, Minn.

[21] Appl. No.: 164,881

[22] Filed: Jun. 30, 1980

[51] Int. Cl.³ .......................... H04B 17/00; G01S 7/04
[52] U.S. Cl. ............................................ 375/37; 455/9; 343/5 SC; 343/5 W; 343/6 A; 358/140; 364/420; 364/514
[58] Field of Search .............................. 375/37; 455/9; 343/5 SC, 6 TV, 5 W, 6 A; 358/81, 82, 140; 364/420, 514, 557, 558

[56] References Cited

U.S. PATENT DOCUMENTS

| | | | |
|---|---|---|---|
| 3,201,787 | 8/1965 | Grewe et al. | 343/6 A |
| 3,713,146 | 1/1973 | Carroll et al. | 343/6 A |
| 4,099,179 | 7/1978 | Hofstein | 358/140 |
| 4,214,269 | 7/1980 | Parker et al. | 358/140 |

OTHER PUBLICATIONS

National Oceanic & Atmospheric Administration National Weather Service, U.S. Department of Commerce, "Introduction to Weather Radar", Aug. 1979; p. 1–70.

Primary Examiner—John W. Caldwell, Sr.
Assistant Examiner—Donnie L. Crosland
Attorney, Agent, or Firm—Orrin M. Haugen; Thomas J. Nikolai

[57] ABSTRACT

A system for providing remote locations with processed data relating to weather conditions or the like. A transmitter adapted to receive complex, real-time radar data, including azimuth, range and elevation from the National Weather Bureau (NWB) radar network is used to process the data into a four-range radar image and to append geographic overlay information for transmission over voice grade phone lines to remote receivers. In the receivers, the data from the phone lines is converted by a demodulator into digital data and stored into predetermined memory locations corresponding to the four-range categories from which the radar data had originally been acquired. Once stored, any one of the ranges can be individually and instantaneously selected for display in a six-color format representing six predetermined precipitation intensity levels established by the NWB.

14 Claims, 79 Drawing Figures

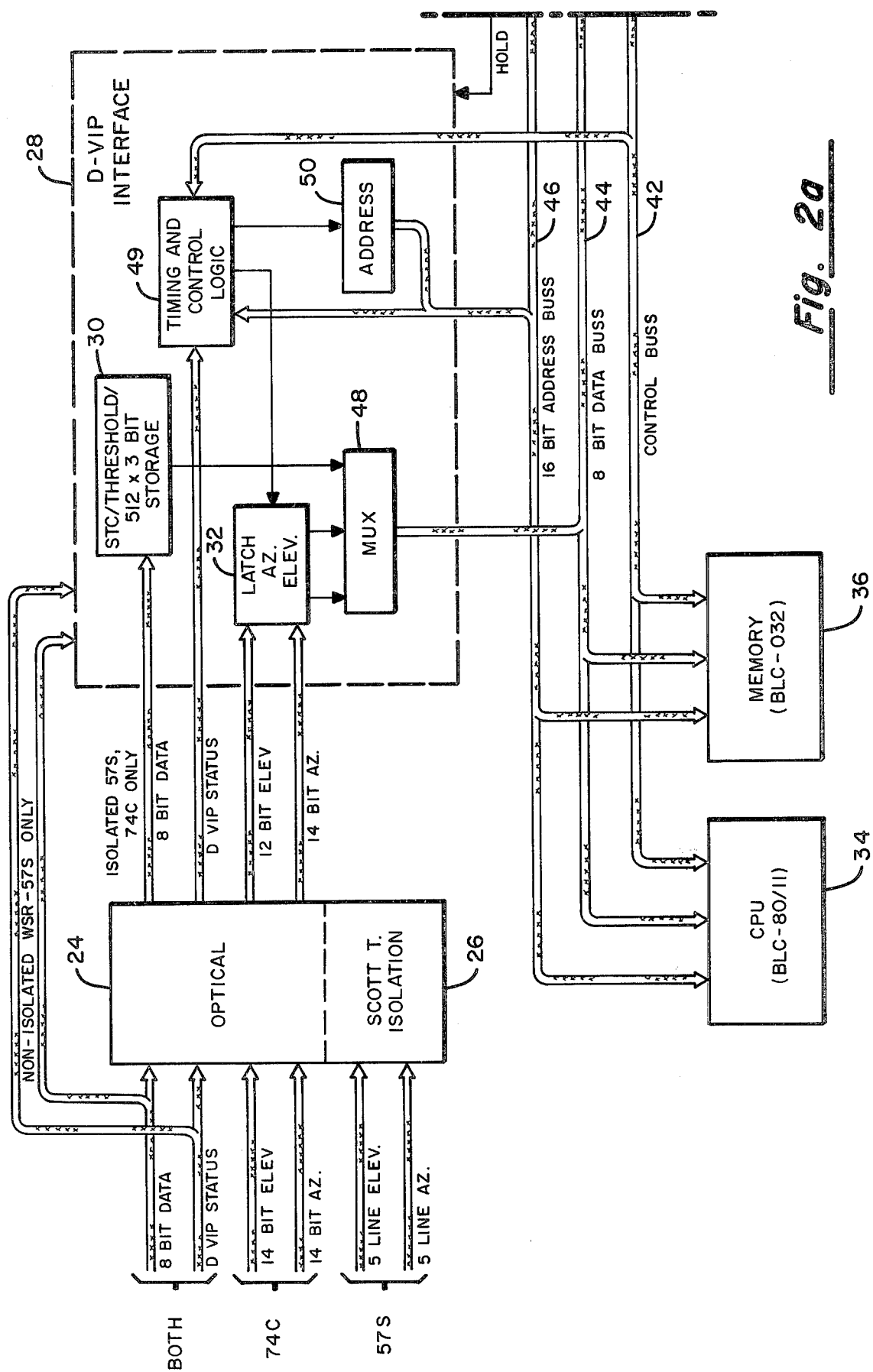

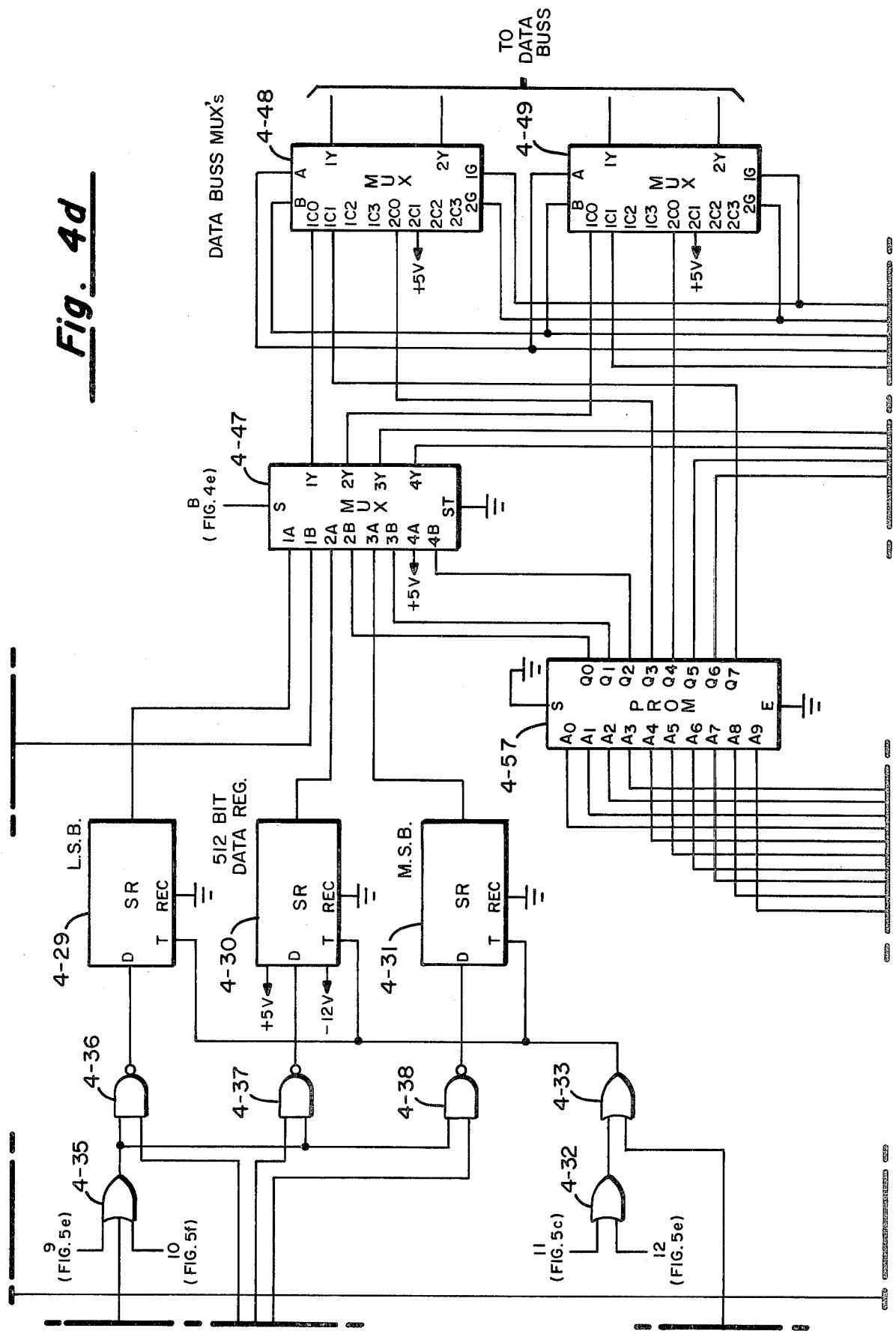

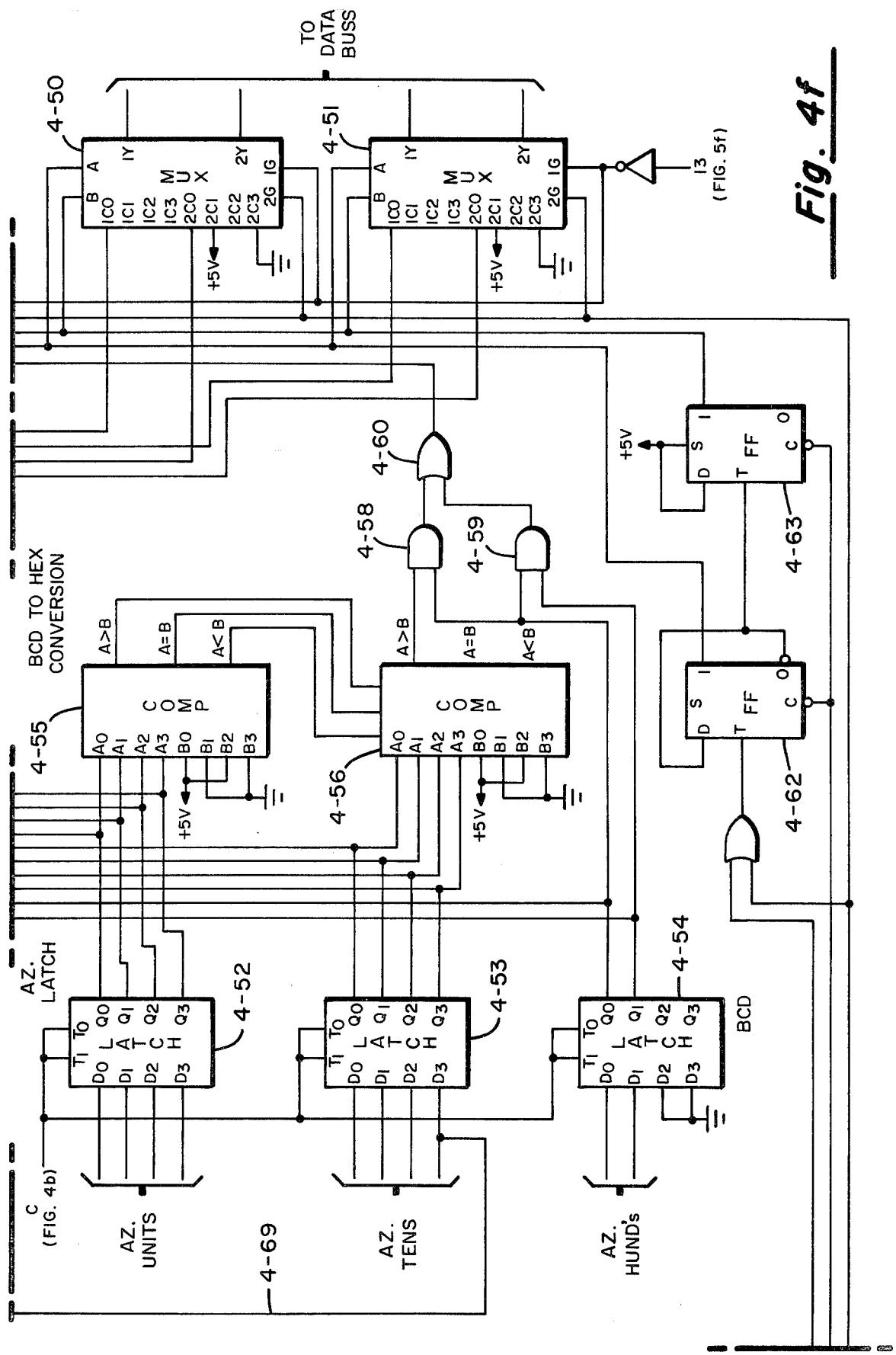

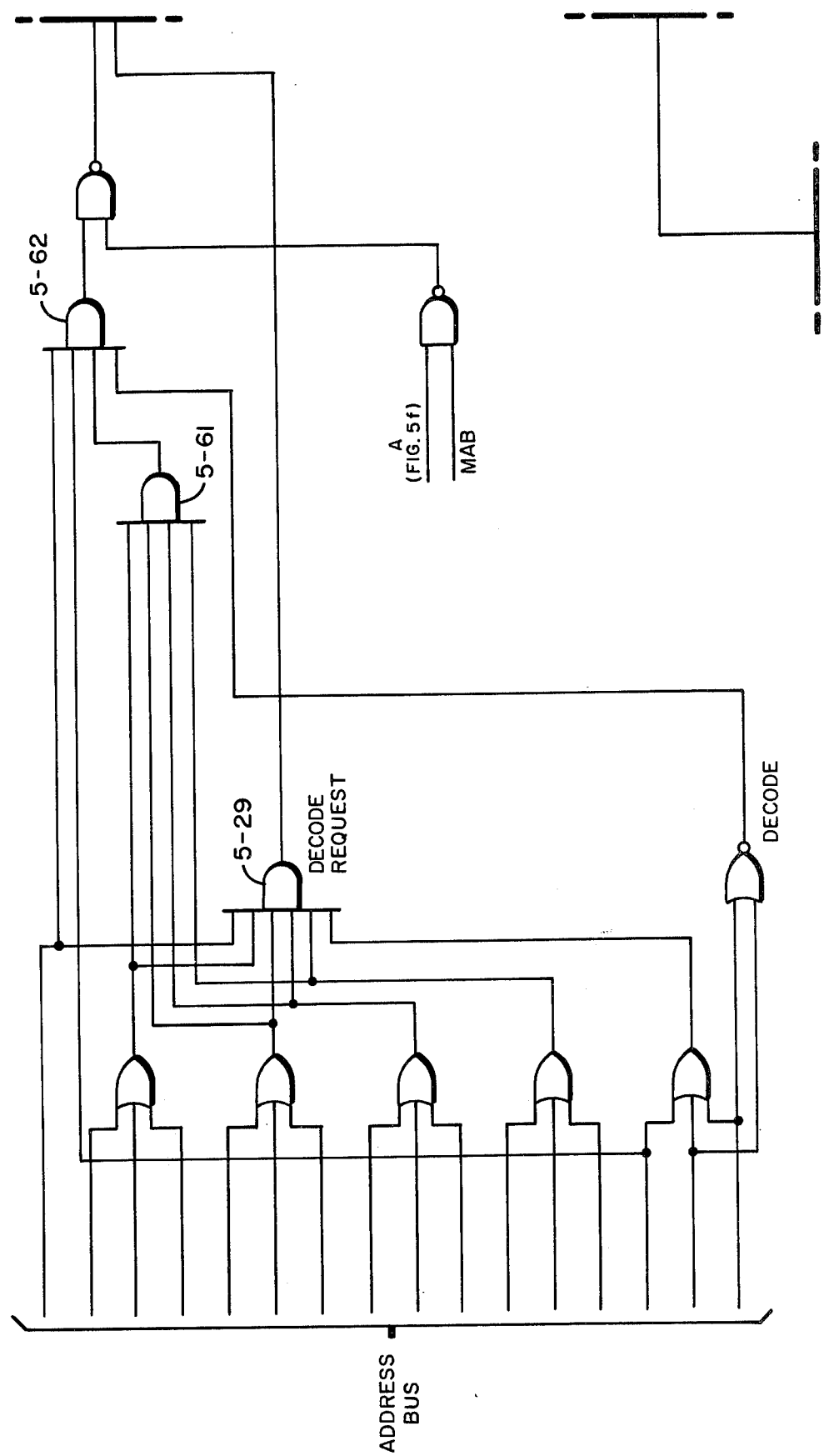

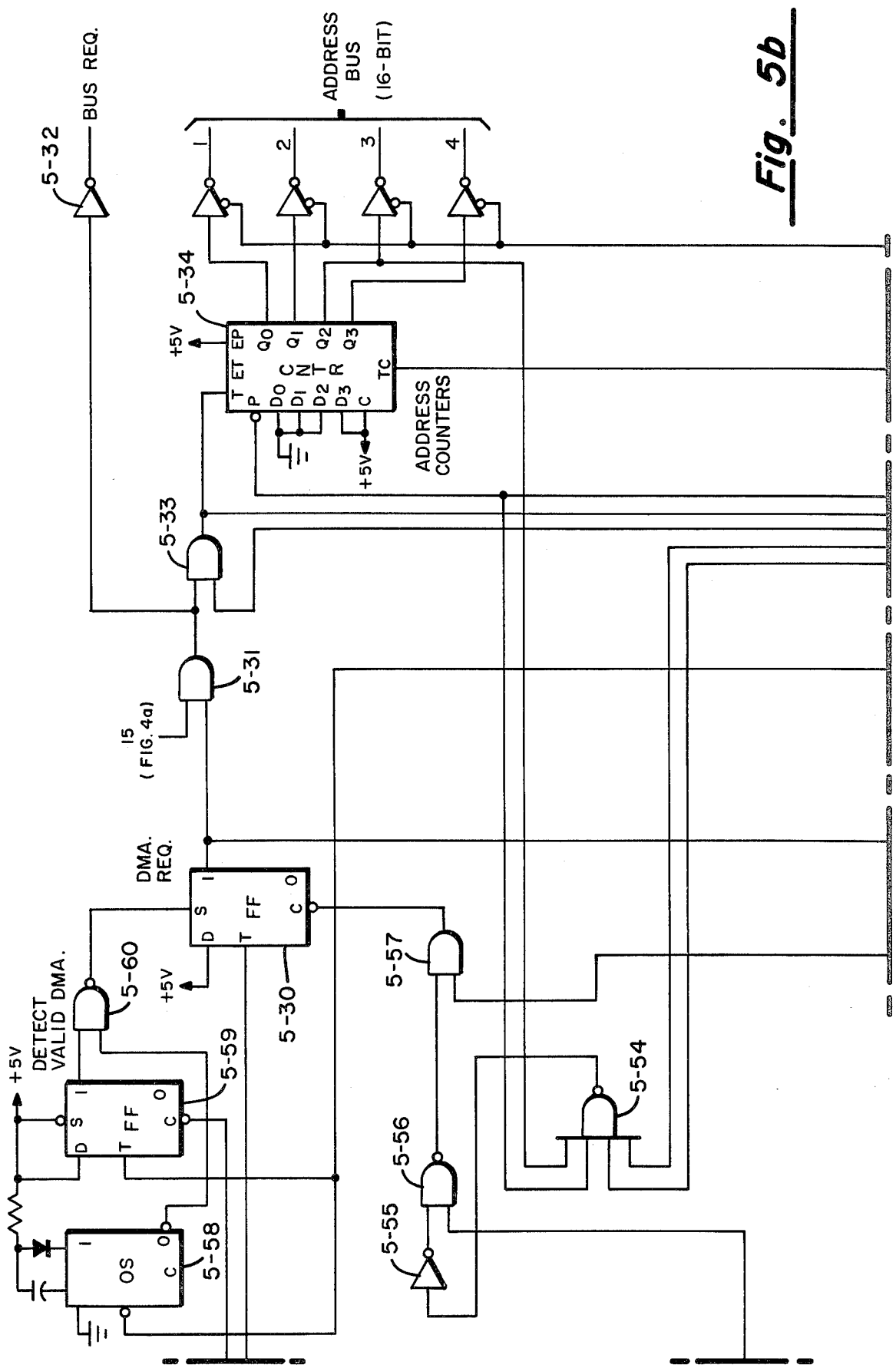

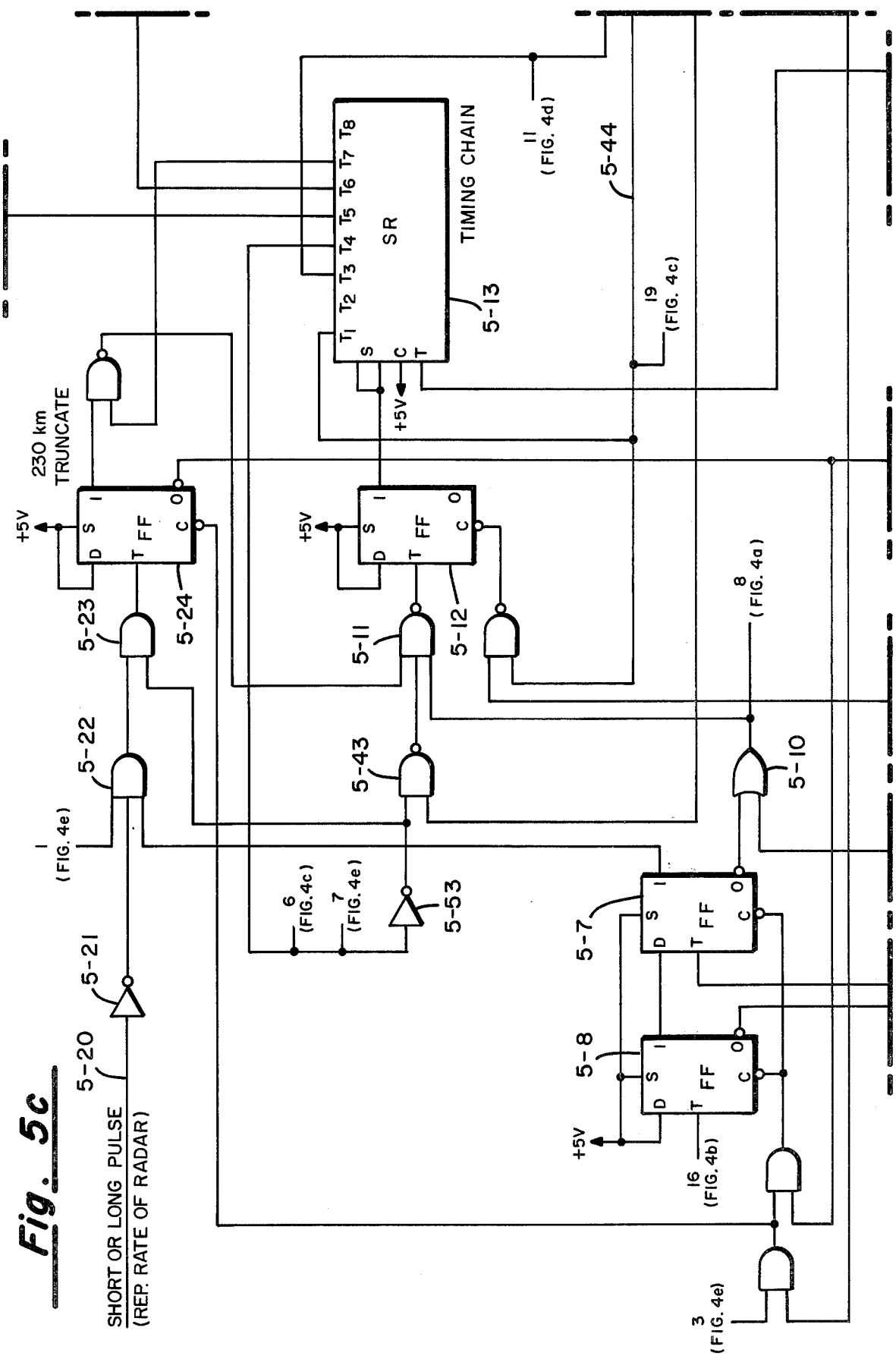

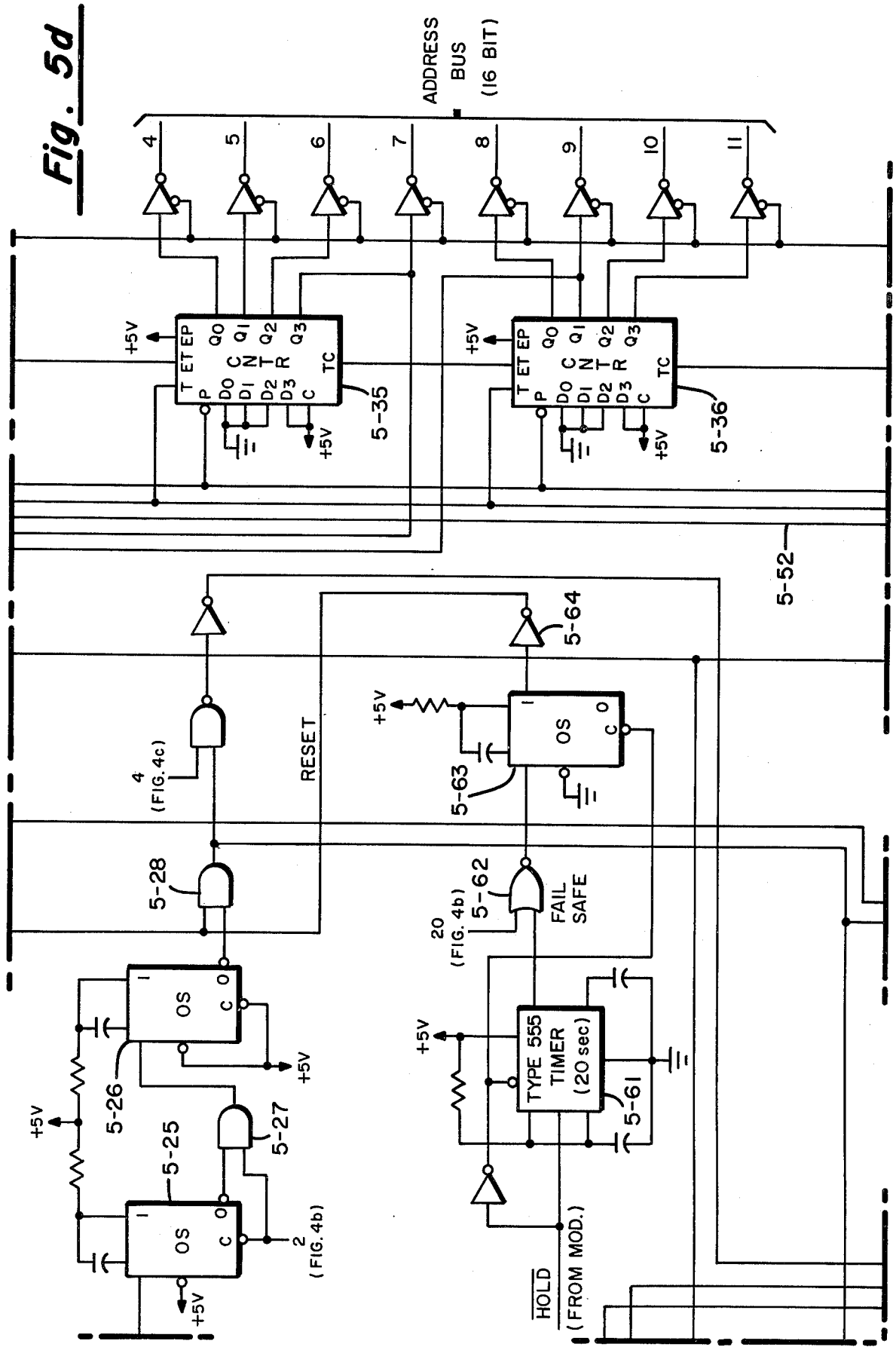

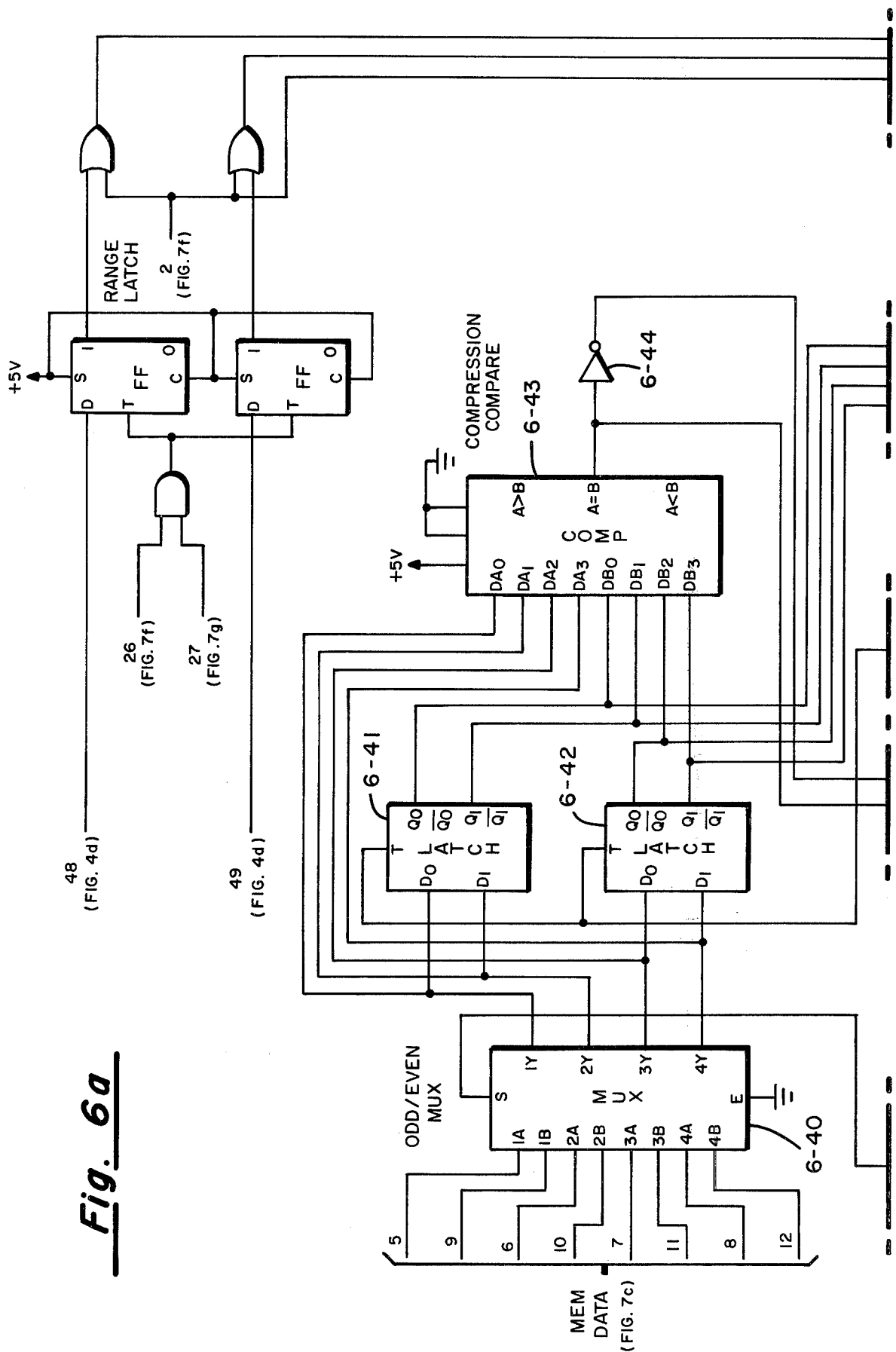

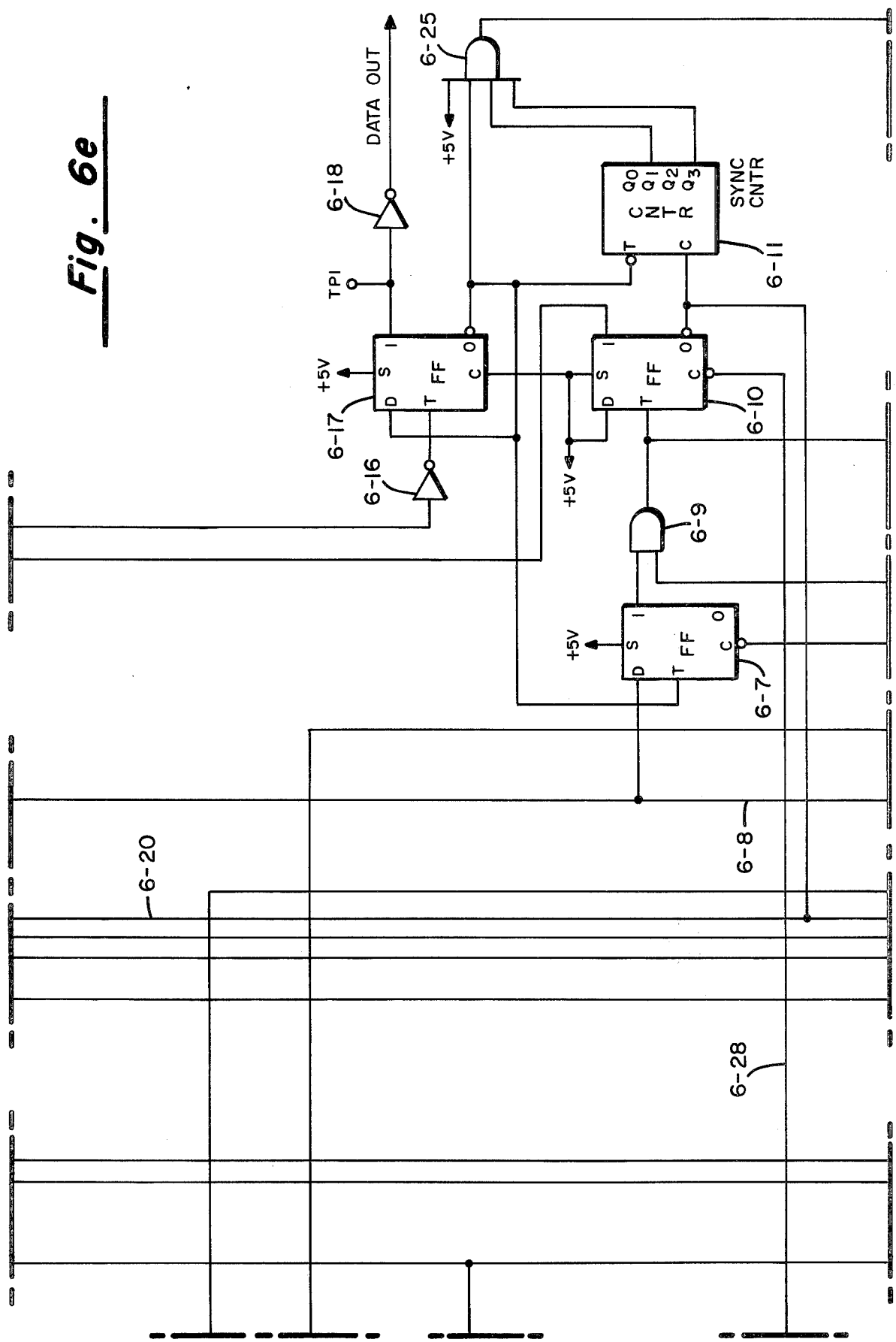

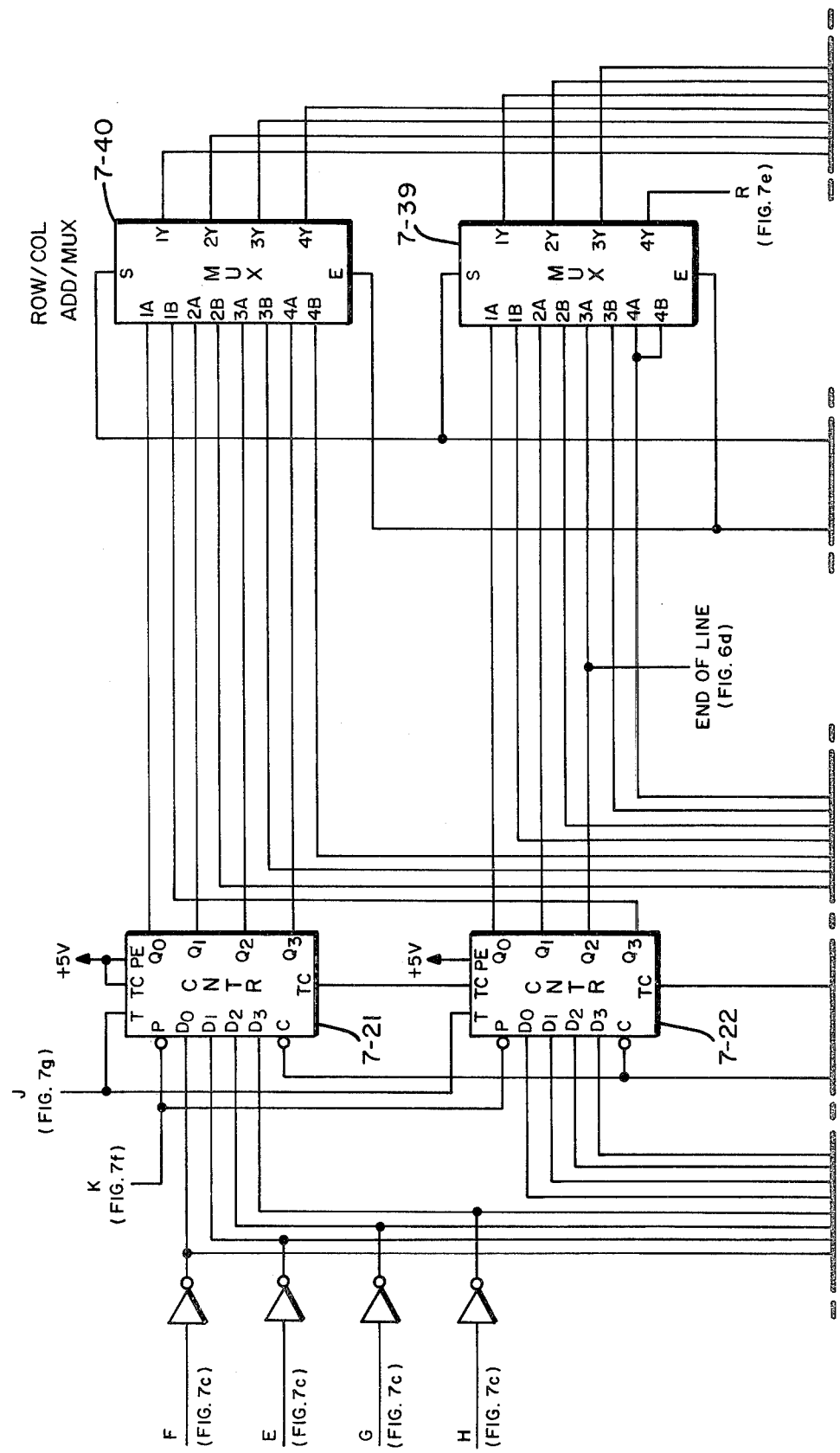

Fig. 9

| Fig. 9a | Fig. 9b |
| Fig. 9c | Fig. 9d |

Fig. 13

| Fig. 13a | Fig. 13b |
| Fig. 13c | Fig. 13d |
| Fig. 13e | Fig. 13f |

Fig. 14

| Fig. 14a | Fig. 14b | Fig. 14c | Fig. 14d |

Fig. 15

| Fig. 15a | Fig. 15b | Fig. 15c |
| Fig. 15d | Fig. 15e | Fig. 15f |

Fig. 16

| Fig. 16a | |
| Fig. 16b | Fig. 16c |
| Fig. 16d | Fig. 16e |

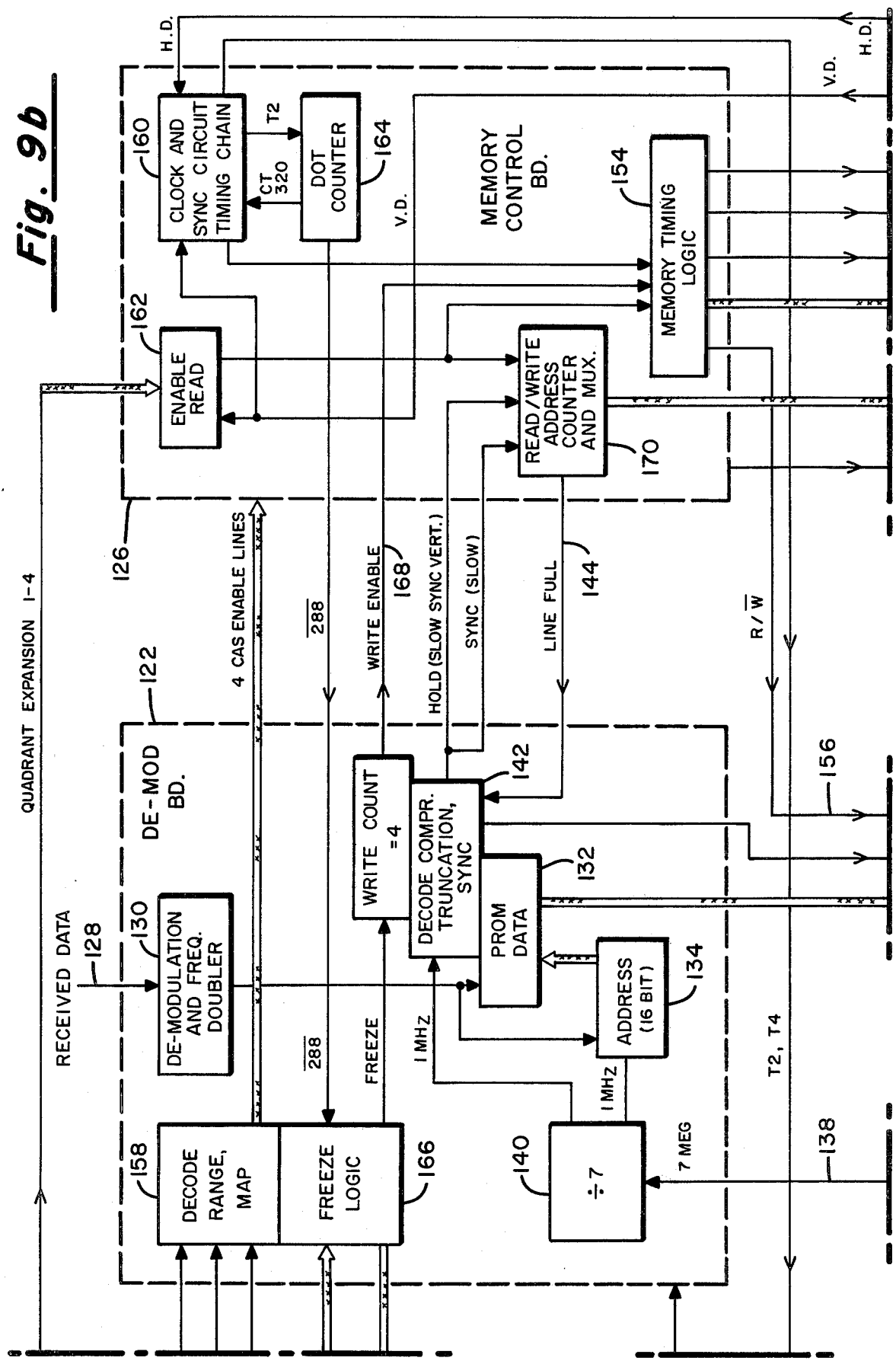

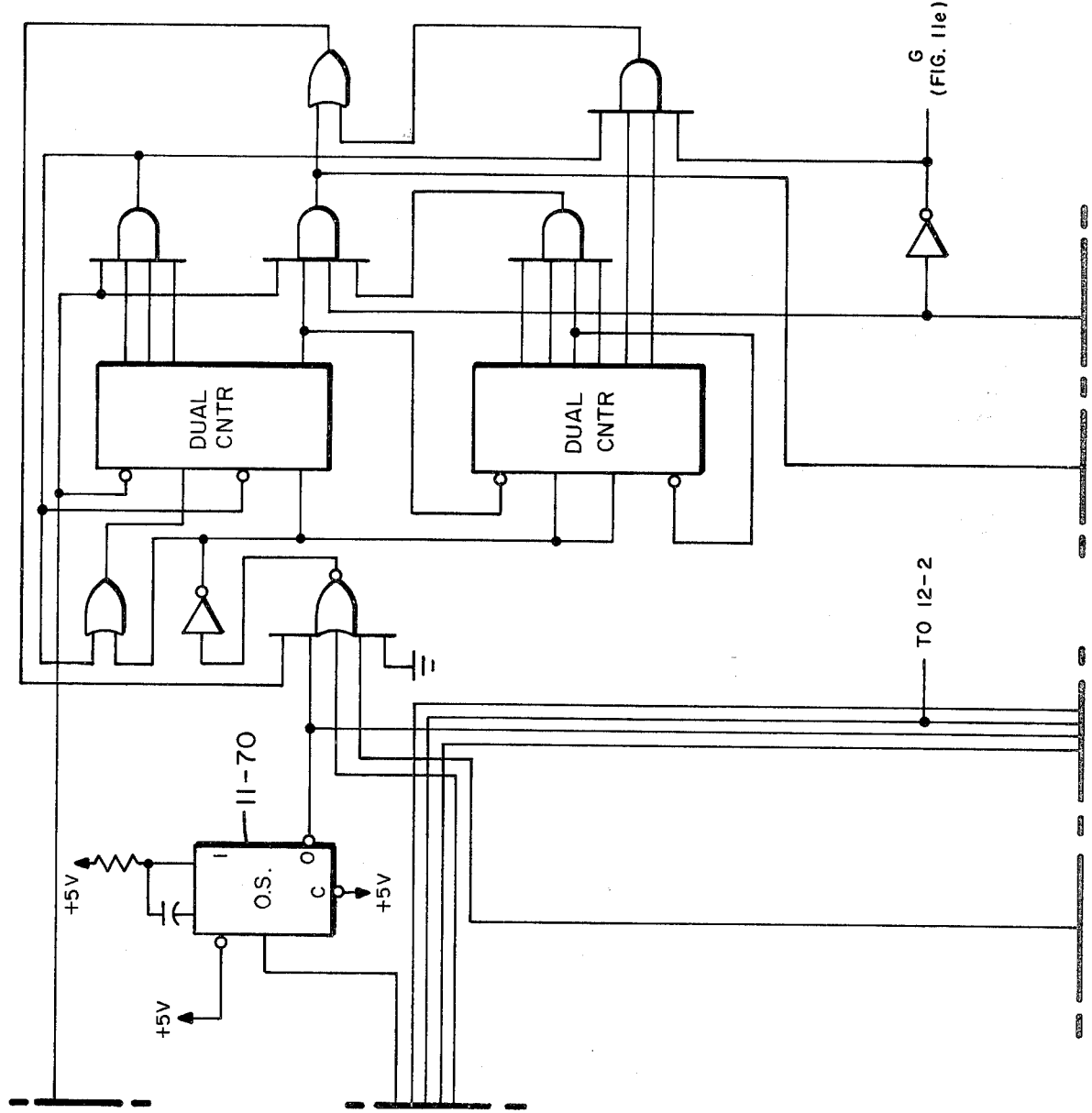

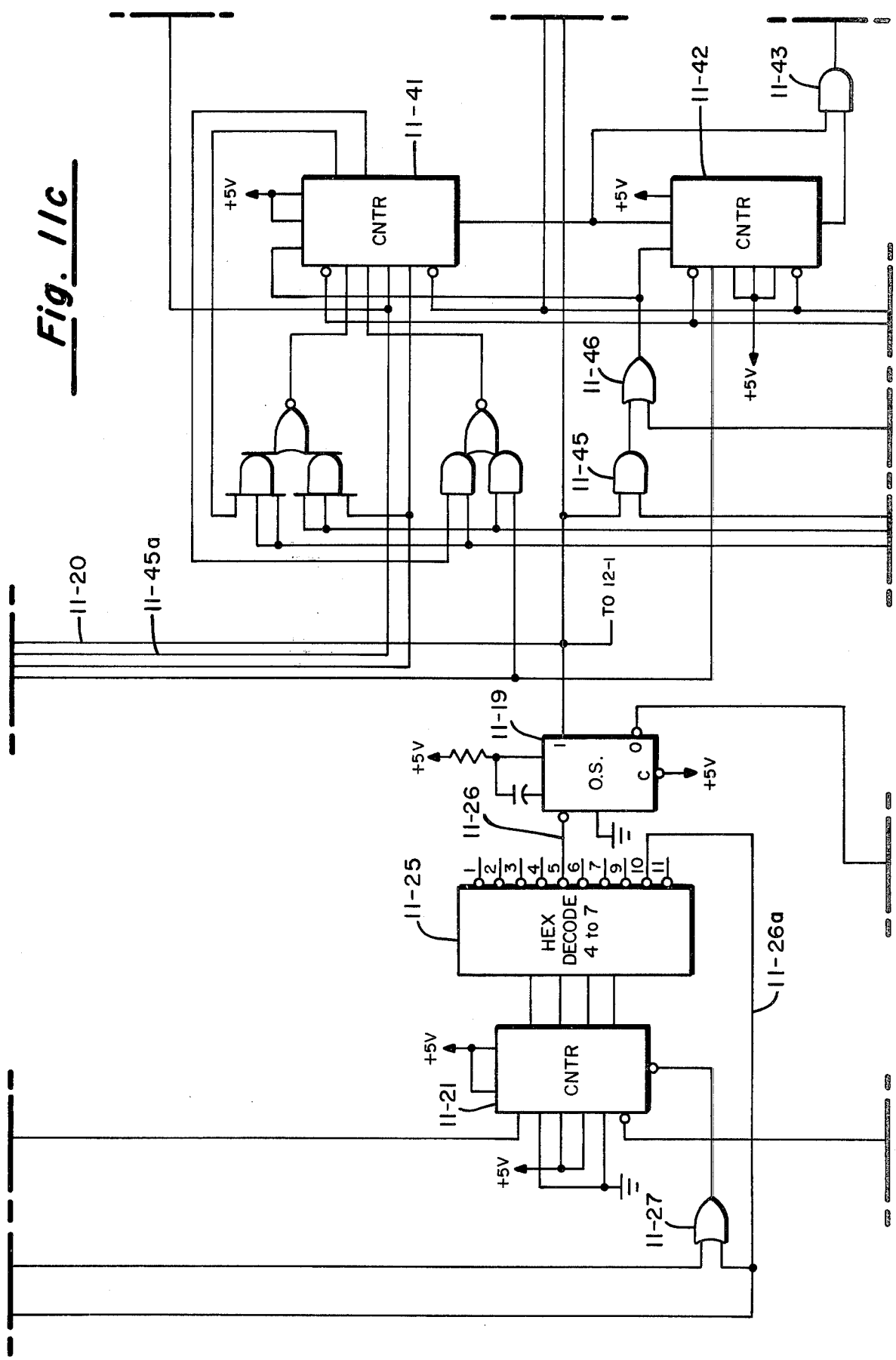

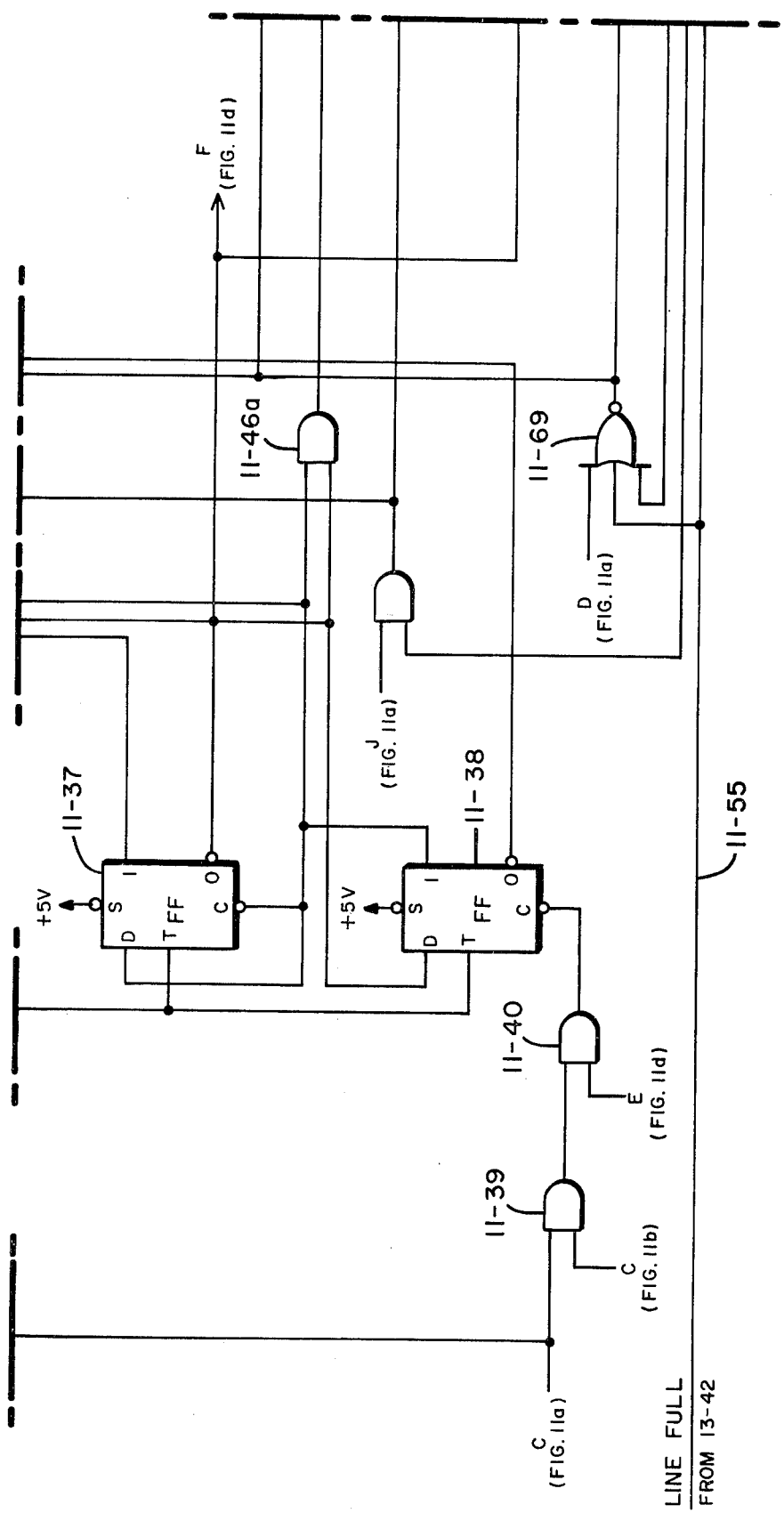

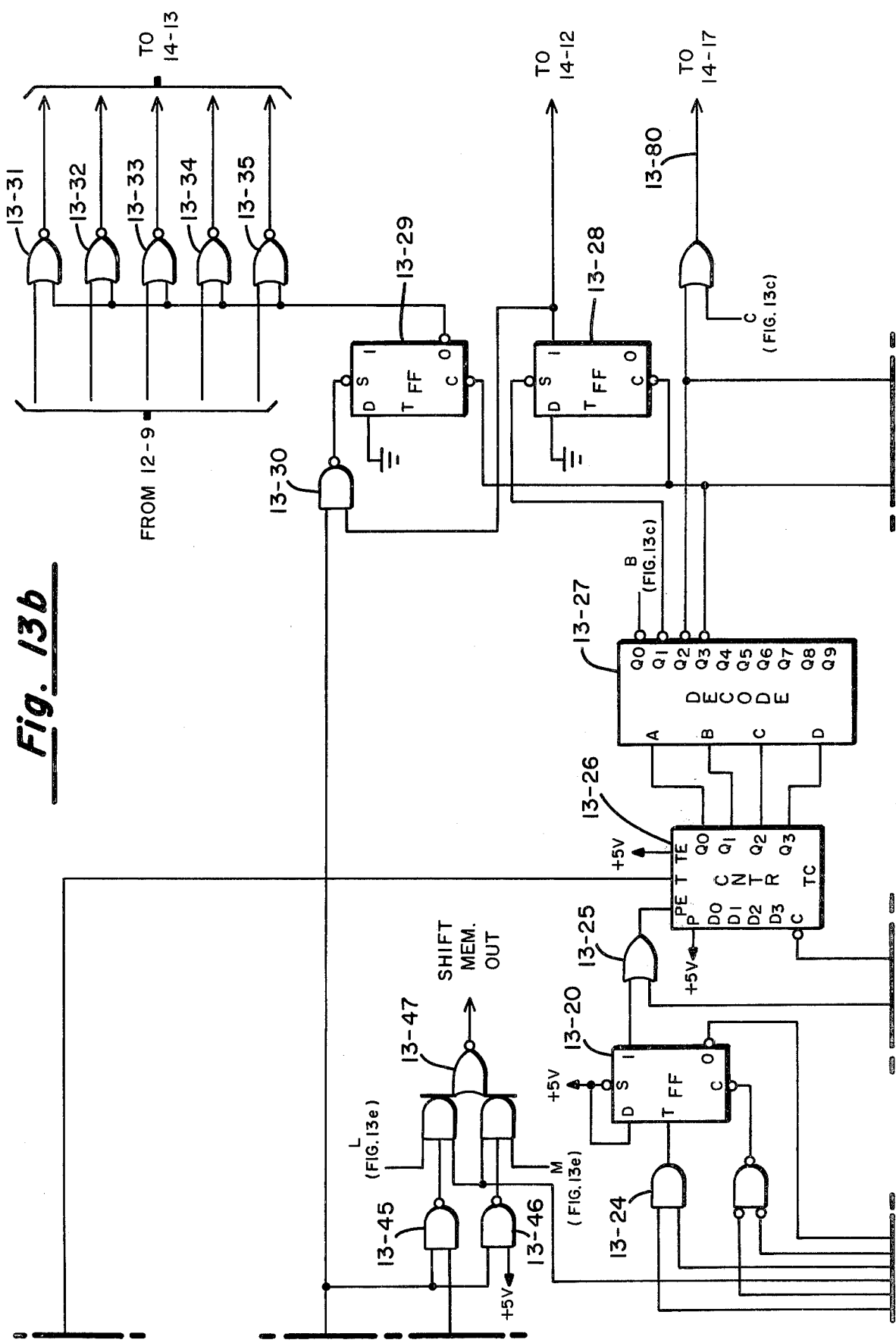

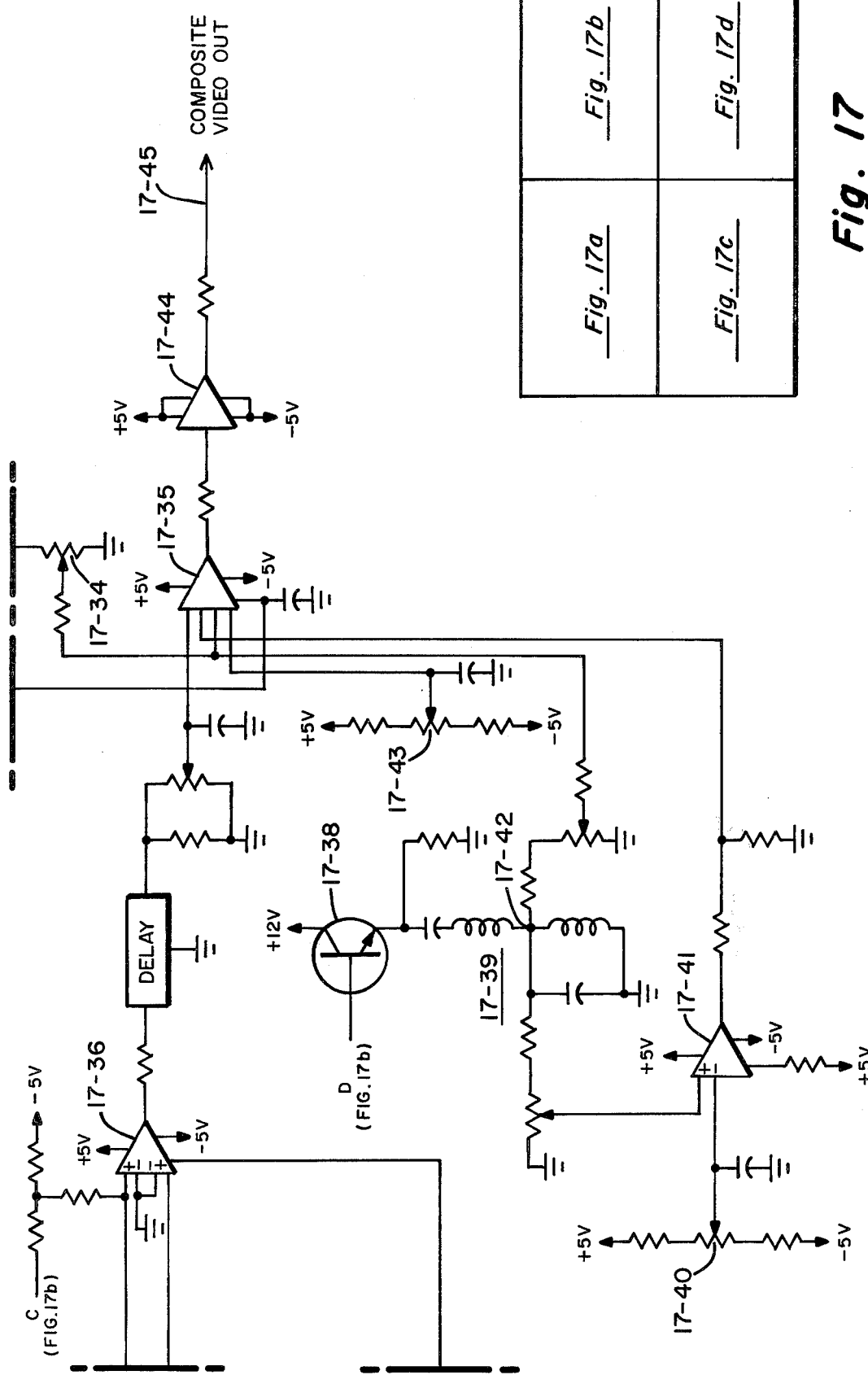

APPARATUS FOR PROCESSING WEATHER RADAR INFORMATION

BACKGROUND OF THE INVENTION

I. Field of the Invention

This invention relates generally to digital telecommunication systems and more specifically to a system for transmitting radar data and related alphanumeric and graphic information from one or more radar installations to a plurality of remote receiver locations via voice grade phone lines, thereby allowing weather information being sensed by the National Weather Bureau (NWB) radars, to be made available at TV stations, airline operations facilities or other sites where up-to-the-minute, real-time information on weather conditions existing at any number of geographic locations may be needed.

II. Discussion of the Prior Art

The National Weather Service maintains a network of radar installations in the United States which provide complete overlapping coverage of the portion of the United States which lie east of the Rocky Mountains. At the time of this writing, this network is comprised of 51 WSR-57S radars and 5 WSR-74S radars which operate 24 hours a day, 365 days a year. These radar installations make hourly observations around the clock and, based upon the observations, teletyped messages relating to observed precipitation are disseminated to subscribers. In addition to the foregoing network, the National Weather Service also operates a secondary or Local Warning Radar network which is comprised of approximately 60 WSR-74C radars which are brought into play when severe weather threatens.

In addition to providing teletype communication to subscribers of previously formatted weather information obtained from the radar equipment, the National Weather Service also has installed the Weather Bureau Radar Remote (WBRR) equipment on 37 sites, this equipment being designed to provide annotated plan position indicator (PPI) display at locations remote from the radar sites. A camera is made to scan at a slow rate so that the generated information bits defining the picture can be transmitted over telephone lines, thus avoiding the expense of coaxial cable or a microwave transmission link. Using this system, it is possible to dial a transmitting site via a phone connection and obtain a transmission of the picture information from any of the radar locations which are suitably equipped with equipment to accommodate this function. Not only is the WBRR complex used by the National Weather Service, but it also is utilized by private meteorologists, airlines, television stations and other Government agencies. In implementing this system, a PPI display is slaved off of the usual radar receiver and this slave display utilizes a high persistency phosphor for prolonged image retention. A facsimile type scanner monitors the slave and develops picture information which may be transmitted over the phone lines to the receiving site where the image is replicated on a paper medium and may include alphanumeric and graphic information.

Further information relating to the WBRR system may be obtained from a publication entitled "Introduction to Weather Radar" published in August 1979 by the U.S. Department of Commerce, National Oceanic and Atmospheric Administration. In addition to describing that system, this publication further provides useful background information relating to the NWS Digital Video Integrator and Processor more commonly referred to by the acronym D-VIP. The D-VIP is a device which automatically processes the output of the radar's receiver to produce up to six levels of intensity data corresponding to preselected categories of estimated rainfall rates measured in inches per hour and ranging from 0 precipitation to an extreme intensity wherein the precipitation is greater than 7.1 inches per hour. These levels may be displayed individually or simultaneously on a radar scope. The D-VIP operates substantially continuously and may be used to display a contoured picture of a weather cell in a single sweep of the radar antenna.

The system of the present invention is a marked improvement over the prior art WBRR equipment. Basically, the present invention comprises a transmitter unit located usually proximate to the NWS weather radar console and a plurality of dispersed receiver units which are preferably coupled to the transmitter by way of either dedicated or dial-up telephone lines. Contained within the transmitter module is a digital computer programmed to transmit over the telephone lines, a four-range radar image along with corresponding map overlays to any of the plural remote receivers interrogating the transmitter at the radar site. The computer is adapted to process the radar video and azimuth information into a multi-range format and must convert, on a real-time basis, the polar coordinate data produced by the video and azimuth inputs into a rectangular format compatible with the conventional raster scan used on most television display screens. In addition, the computer is capable of storing the high speed data into its memory while simultaneously overseeing the transmission of data over the phone lines to the calling receiver module. That is to say, the computer also acts as a communications processor, performing the task of sending the converted digital data via a modulator section contained in the transmitter module to the phone line interface.

The data transmitted over the phone line is in a multi-range format made possible by the concurrent interaction between the transmitter's computer and the communications processor. The transmitter module of the system of the present invention is further designed to sample the D-VIP data and to transmit the various precip levels to the receiver site.

The system's receiver modules each comprise a receive-only, multi-function, color, graphics terminal which is capable of interrogating a transmitter by way of a "dial-up" operation and to process received data so that it may be presented on a conventional raster scan display or transmitted via commercial TV networks. Included within the receiver are four memory banks for temporarily storing radar information relating to the four ranges, whereby the individual and instantaneous display, in a six-color format representing the predetermined precipitation intensity levels obtained by the transmitter from the NWS D-VIP equipment can be displayed.

The receiver module further includes suitable controls and circuitry whereby any quadrant of the screen presentation at any range can be expanded to fill the entire screen. Push button controls allow for instantaneous display of the four ranges. The data displayed further includes pertinent geographic features (map information) encoded into the data at the transmitting site and sent over the phone lines to the receiver module. Further control switches permit an operator to display any one or more levels of precipitation in differin colors or in a blinking fashion for ease of identification of critical conditions. Several additional features are also incorporated for enhancing to flexibility of the system and these additional features are set out fully herein.

Hence, the present invention constitutes a significantimprovement over known prior art arrangements for receiving radar information from a radar receiver, formatting the information for economical transmission to remote receiver sites via low band-width, voice grade telephone lines where the data may be reconstructed and reconstituted for further use or transmission via conventional television station apparatus.

OBJECTS

It is accordingly the principal object of the present invention to provide a new and improved system for processing and transmitting weather information from a National Weather Service radar installation to any one of a plurality of remotely located receiver sites over dedicated or dial-up telephone lines.

Another object of the invention is to provide a transmitter module capable of receiving weather radar information from National Weather Bureau equipment and for processing that information to facilitate its transmission over conventional telephone lines to any one of a plurality of geographically dispersed sites for visual presentation via television receiver apparatus.

A still further object of the invention is to provide, in a weather information transmission system, a transmitter having a microprocessor computer and requisite memory capability therein for formatting and classifying received radar information and for storing such information so that upon demand from a receiving site, the stored information may be transmitted over conventional telephone links to the receiving site.

A yet further object of the invention is to provide a weather radar transmission system having a plurality of receivers disposed at geographically dispersed sites, each of the receivers including means for receiving transmitted messages and for converting the received messages into a form whereby a television presentation of the transmitted weather information can be achieved.

Yet still another object of the invention is to provide a system for use in conjunction with the National Weather Service Weather Surveillance Radar which facilitates the transmission and display of radar information via television station equipment, the present invention comprising the link between the National Weather Service equipment and the television station transmitters.

A yet further object of the invention is to provide a user access to and display of National Weather Service radar images by providing means at the radar site to process the output from the radar equipment into a signal suitable for economical phone line transmission and in a format that allows use of "off-the-shelf" standard television monitors for relaying the information to one or more remote sites for reconstruction and display.

Related to the immediately foregoing object, it is a further object of the invention to provide in a transmitter module means for converting radar data in polar coordinates to a format compatible with the raster scanning process used in conventional television transmitting and receiving gear.

A yet further object of the invention is to provide a microprocessor based transmitter for receiving and processing radar video and azimuth information and partitioning it into a multi-range format suitable for transmission over telephone lines to a receiving station, the format conversion including a polar to rectangular conversion for raster scan compatibility.

Another object of the invention is to provide a receiver module allowing operator intervention to select a variety of features whereby the overall flexibility of the system in displaying weather radar information on television monitoring equipment is enhanced.

Yet still a further object of the invention is to provide in a system of the type heretofore described a means whereby the operator at a receiving site may cause the receiver electronics to successively store radar data from plural remote transmitters for later sequential read-out to thereby illustrate the travel of a weather system.

Related to the immediately foregoing object is a further object of providing in a weather radar transmitting and receiving system a capability in the receiver whereby time-lapse presentations of changes in weather patterns is facilitated.

These and other objects and advantages of the invention will become apparent to those skilled in the art from the following detailed description of the preferred embodiment when considered in conjunction with the accompanying drawings.

DESCRIPTION OF THE DRAWINGS

FIGS. 2a and 2b, when arranged as shown in FIG. 2, comprise a general block diagram of the transmitter module used in the system of FIG. 1;

FIGS. 4a through 4f, when arranged as shown in FIG. 4, depict a portion of the detailed logic circuitry for implementing the D-VIP board;

FIGS. 6a through 6g, when arranged as shown in FIG. 6, show a portion of the logic for implementing the modulator portion of the transmitter;

FIGS. 7a through 7g, when arranged as shown in FIG. 7, depict the remaining logic circuits implementing the Modulator board;

FIG. 9 shows the manner of arranging FIGS. 9a through 9d in forming a composite electrical diagram;

FIGS. 9a through 9d, when arranged as shown in FIG. 9, is a general block diagram of the receiver module of the system of FIG. 1;

FIG. 11 shows the manner of arranging FIGS. 11a through 11f in forming a composite electrical diagram;

FIGS. 11a through 11f, when arranged as shown in FIG. 11 illustrate the detailed logic circuits for implementing a portion of the Demodulator board;

FIG. 13 shows the manner of arranging FIGS. 13a through 13f in forming a composite electrical diagram;

FIGS. 13a through 13f, when arranged as shown in FIG. 13, set forth the logic for implementing the Memory Control board of the receiver module;

FIG. 14 shows the manner of arranging FIGS. 14a through 14d in forming a composite electrical diagram;

FIG. 15 shows the manner of arranging FIGS. 15a through 15f in forming a composite electrical diagram;

FIG. 16 shows the manner of arranging FIGS. 16a through 16e forming a composite electrical diagram;

FIG. 17 shows the manner of arranging FIGS. 17a through 17d in forming a composite electrical diagram;

FIGS. 17a through 17d, when arranged as shown in FIG. 17, illustrate the remaining logic circuitry for implementing the Video board module of the receiver.

DESCRIPTION OF THE PREFERRED EMBODIMENT

Figure 1:
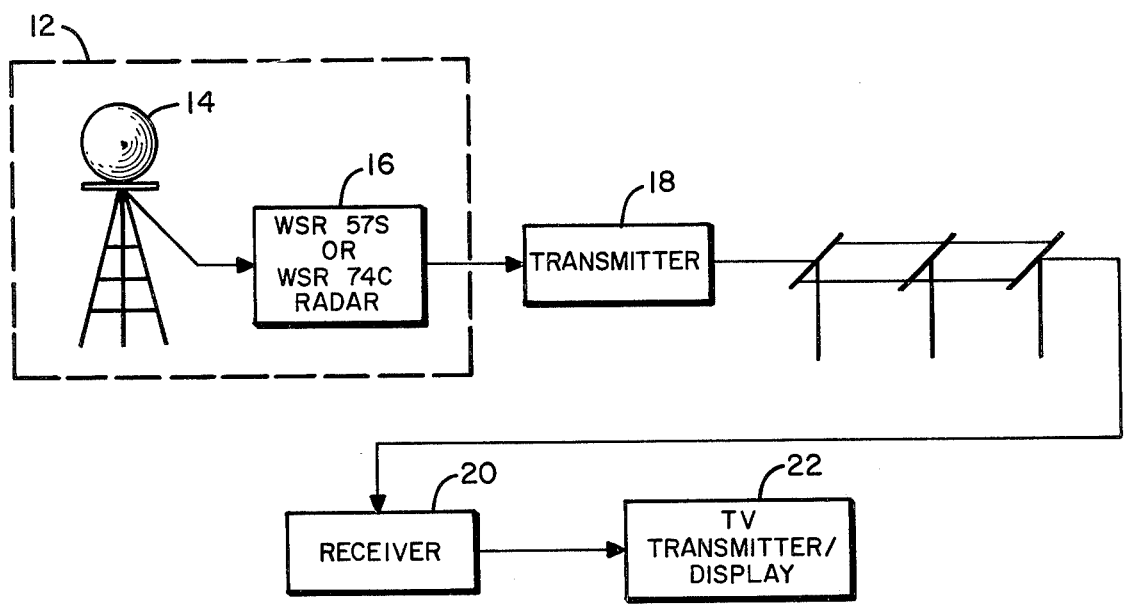
FIG. 1 is a general block diagram of the complete weather radar system.

In FIG. 1 there is shown a general block diagram of a system in which the present invention finds application. The National Weather Service, a branch of the National Oceanic and Atmospheric Administration, operates and maintains two large weather radar networks which provide complete overlapping coverage of that portion of the United States lying east of the Rocky Mountains. The so-called "Primary" or "S-Band Network" at the present time is comprised of 51 WSR-57S radars and five WSR-75S radars which operate 24 hours a day, 365 days a year and provide hourly observations of weather conditions within a predetermined radius of the radar installation. The Primary Network monitors observed precipitation levels and yields information concerning the direction and velocity of precipitation cells. In addition, the National Weather Service also operates a Secondary or Local Warning Radar Network which includes approximately sixty WSR-74C radars which are placed in use when severe weather threatens. In addition, the Secondary Network provides a back-up function in case a nearby radar site in the Primary Network should fail.

As illustrated in FIG. 1, the NWS equipment at a given site is shown enclosed by dashed line box 12 and includes a radar transmitting/receiving antenna 14 and its associated transmitter/receiver 16. The system of the present invention is specifically designed to accept the digital information from the Weather Service radar's Digital Video Image Processor, termed the D-VIP, as well as information relating to elevation and azimuth of the radar antenna and to provide the necessary isolation, thresholding, compensation and processing whereby the information will be formatted for transmission to a receiving site by way of conventional phone links. The transmitter module is identified by numeral 18 in FIG. 1 while the receiver at the remote site is identified by numeral 20. Disposed in the receiver 20 is a storage means whereby radar information may be categorized into ranges and the intensity level of the precipitation in the various ranges recorded. The receiver 20 further includes an integral TV sync generator which can be made to automatically lock onto that of the external composite sync and subcarrier to allow further transmission and display of the weather information over commercial TV facilities represented by the block labeled 22 in FIG. 1.

As will be set forth in considerably greater detail hereinbelow, the transmitter module 18 and receiver module 20 include circuit arrangements for allowing a wide variety of different functions to be accomplished. The foregoing description is provided principally for establishing the environment in which the present invention finds utilization.

TRANSMITTER MODULE

With the foregoing in mind, consideration will next be given to the construction and operation of the transmitter module 18 which is depicted with more particularity in the block diagram of FIGS. 2a and 2b. As is indicated in FIG. 2a, the output from the NWS radar is first applied to the block labeled ISOLATION and which is identified by numeral 24. The output from the D-VIP (not shown) which comprises a part of the NWS equipment is applied to the module 24 which serves to isolate the transmitter of the present invention from the NWS equipment to prevent loading and possible malfunction of that equipment.

As has already been mentioned, there are two main types of radar equipment utilized by the NWS, namely the WSR-57S and WSR-74C. In the case of the WSR-57S radar, its D-VIP provides only 8-bit data representing the video information on the precip levels. Separately provided is the information relating to antenna azimuth and elevation. Thus, in the case of the WSR-57S, raw synchro information is provided through the isolator 24 in the form of 90 volt, 60 cycle analog waveforms. With the WSR-74C radars, however, the D-VIP employed provides 14-bits of digital elevation and 14-bits of digital azimuth information in addition to the 8-bits of video. Thus, when the transmitter of the present invention is to be used with a WSR-57S radar, a synchro-to-digital converter is required and the isolation is achieved via a Scott-T transformer network 26.

D-VIP INTERFACE BOARD

The digital pulses from the isolation network 24 and the synchro converter network 26 are applied in parallel to the D-VIP Interface board 28. Contained on this board is a logic arrangement referred to as "STC/Threshold/Store," that logic being represented by the block labeled 30. The general function of the logic 30 is to provide compensation for the video data at various ranges. As those skilled in the art will recognize, as a radar beam passes through the atmosphere, the returns from more distant targets are naturally weaker than returns obtained from more proximate targets. The module 30 includes circuitry for providing compensation called "Sensitivity Time Correction" or STC for short. As will be more fully explained when the detailed logic circuits implementing the device 30 are explained, the STC function is implemented through the use of a read-only memory which is adapted to be addressed by a range counter. The range counter, not shown in FIG. 2a, is adapted to be advanced by the data strobe signals coming from the NWS D-VIP equipment. Each pulse that the radar transmits as its antenna rotates establishes a "radial" and for each such radial, there will be 450 data strobes representing 450 discrete kilometer increments of range. Each of the Data Ready pulses from the D-VIP advances a counter in the D-VIP Interface 28 such that the count therein at all times represents a range for a given radial. The output of the range counter is applied to the ROM comprising the STC 30 and the ROM stores preset compensating values which are added to the video data associated for that range. Thus, the required Sensitivity Time Correction which the National Weather Service has found to be necessary may be achieved in a relatively simple but highly effective manner.

Before explaining the "Threshold" function performed by the module 30 on the D-VIP Interface board 28, it is necessary to understand the scheme developed by the NWS for establishing levels of precipitation. Set forth in Table I below is a correlation between six output levels from the radar's logarithmic receiver and corresponding preselected categories of estimated rainfall rates. For example, when it is raining and the accumulation is less than 0.2 inches per hour, the radar return echo is considered to be weak and the associated intensity level is given a numerical rating equal to 1. On the other hand, when the rainfall rate is in the range of from 2.2 to 4.5 inches per hour, very strong return echoes are observed and the D-VIP associated with the NWS radar equipment produces a level 4 output.

TABLE I

| D-VIP Level | Echo Intensity | Rainfall Rate Stratiform | (In./Hr.) Convective |
|---|---|---|---|
| 1 | Light | –0.1 | –0.2 |
| 2 | Moderate | 0.1–0.5 | 1.1–2.2 |
| 3 | Heavy | 0.5–1.0 | 1.1–2.2 |
| 4 | Very Heavy | | 2.2–4.5 |
| 5 | Intense | | 4.5–7.1 |
| 6 | Extreme | | –7.1 |

With the foregoing in mind, for any given combination of the 8-bit data output from the D-VIP equipment there is represented either no echos or one of the six possible levels set forth in Table I. A Threshold ROM in the logic network 30 indicates whether a received level is level 0 (no echo) or one of the six precipitation intensity levels established by the NWS. The conversion from the 8-bit intensity level to one of the rainfall rates (0-6) is accomplished by a RAM addressed by the bits. The process of polar to rectangular conversion is too slow to be able to function in a real-time video display rate. Hence, buffering is utilized to accommodate a high data input rate with a lower rate of transfer to the processor. Specifically, the logic module 30 on the D-VIP Interface board 28 includes a 512×3-bit shift register. Signals from the D-VIP serve to clock the data into the shift register at the video rate and the shift register allows the same data to be clocked out at a slower rate compatible with the processor yet to be described.

Also included on the D-VIP Interface board 28 is a latch network identified by numeral 32. In that it is impractical and unnecessary for the transmitter of the present invention to read in every possible radial from the NWS radar, it has been found expedient to select a degree of resolution compatible with the resolution achieved in the receiver circuitry 20 (FIG. 1) which, as will be further described, comprises a 256 column ×256 row raster scan representation. It was found that by choosing a resolution from the radar receiver 16 of approximately ½° satisfactory results would be obtained without the need for accepting, converting, processing and displaying radials more frequently than every ½°. The Azimuth/Elevation Latch 32, then, functions to examine the incoming information from the radar antenna position indicating circuits and to capture the data only for those radials that are a multiple of 0.5°. Stated otherwise, rather than accepting video information for every transmitted pulse off of the radar, means are provided for keying off of the Synchro Converter 26 such that during a complete revolution of the antenna, 720 (360×2) radials will be accepted and processed.

The elevation value is a measure of the degree of tip which the antenna is pointed and this information is transmitted along with the radar return data so that the system hardware will know the average elevation during a complete revolution.

MICROPROCESSOR

As was mentioned in the introductory portion of this specification, the transmitter module includes a microprocessor for performing predetermined computations on the data obtained from the D-VIP Interface module. It includes a Central Processing Unit (CPU) module 34, an associated Random Access Memory 36, a so-called conversion PROM 38 and a MAP PROM 40. The memory modules 36, 38 and 40 communicate with the CPU 34 and with the D-VIP Interface module 28 by way of a bus architecture which includes a Control Bus 42, a Data Bus 44 and an Address Bus 46. In implementing this system, the CPU and its associated memories may be the well-known Intel 8080 Microprocessor which is commercially available from the Intel Corporation of Santa Clara, Calif. Furthermore, those unfamiliar with the construction and mode of operation of that microprocessor system are referred to that company's product data sheets which fully sets forth its organizational structure, instruction repertoire and other desirable user information.

Referring again to the D-VIP Interface board 28, it also includes a Multiplexer 48 which provides a means for switching the received and compensated video data and the azimuth and elevation data, allowing it to be applied to the Data Bus 44. This Data Bus is used by the Microprocessor 34 in communicating with its RAM memory 36 and either of its PROM memories 38 and 40.

The MAP PROM 40 is pre-programmed to store geographic information in the form of an overlay or map. As will be further developed, each picture transmitted by the transmitter 18 (FIG. 1) has accompanying it an overlay or map with pertinent geographic locations. By transmitting map information along with the video data to be displayed, the need to provide corresponding hardware in each of a plurality of receiver units is obviated. In various prior art arrangements wherein map overlays are generated at the receiving location rather than having been transmitted along with the precip pictures, there is a distinct possibility that through error an operator will select a wrong map for display. Then too, in the system of the present invention a network concept is involved wherein plural receivers distributed throughout the United States may dial up and have access to any one or more of the plural transmitters located at the National Weather Service radar locations. It can be seen, that it would not be feasible to have each receiving site equipped with possibly hundreds of memory boards for storing map overlays.

In the system of the present invention the data from the Multiplexer 48 may be entered directly into the Memory 36 without the need for CPU intervention. That is to say, it is not a requirement that the CPU periodically enable an input port. In the transmitter of the present system, arrangements are made to do a Direct Memory Access operation or DMA. When in the DMA mode, the data flows directly from the Multiplexer 48 of the D-VIP Interface 28 into the RAM 36. As those familiar with the Intel 8080 system will know, in order to do a DMA operation, the sending device, in this case the Multiplexer 48, must first present a "request" to the processor 34 in that the processor itself is running the program and is transmitting to and receiving information from the RAM 36 as well as the PROM's 38 and 40. When the CPU 34 honors that request, it completes its current instruction and then issues a "grant" to the D-VIP Interface 28, the effect of which is to allow the Interface 28 to capture the buses 42, 44 and 46.

In that the CPU 34 ceases to be involved in DMA operations once the Interface module 28 has captured the bus, it is necessary for the memory addresses where the data is to be stored to be generated in the D-VIP Interface rather than by the CPU 34. This is the function of the Address Generator 50 of FIG. 2a. The Address Register 50 may take the form of a counter. Starting at a given address, each of the 450 strobe pulses corresponding to the 1 kilometer range increments for each radial is accumulated and serves as an address where the video data pertaining to that particular range may be stored in the Memory 36. Following the entry of the video data itself, the system transmits, still in the DMA mode, the azimuth information and elevation information associated with that particular radial.

Once the data has been stored in the Memory 36, there are a number of operations which must be performed in the transmitter. First of all, the Conversion PROM 38 comes into play. Recalling that the data that is taken into the Memory 36 was being read in for every $\frac{1}{2}°$, radial-by-radial, and in a polar coordinate format, it is necessary to convert that data to a Cartesian coordinate format compatible with conventional TV raster scanning. The conversion PROM 38 stores certain conversion factors that are required to transform the data from a polar format to rectangular coordinates. When it is recognized that the radar data in rho-theta format is entering the system at an extremely high rate, i.e., 450 samples per radial and 720 radials per revolution, it would tax the processor's capability if the processor were required to perform all of the mathematical computations necessary to effect the polar-to-rectangular coordinate transformation. To obviate this problem, the necessary information for effecting the transformation is prestored in the look-up PROM 38. The PROM need only store the various constants for one quadrant and by certain manipulations, the CPU 34 is able to perform the transformation for any other quadrant. The conversion PROM 38 is made to store at a plurality of addressable locations, the X and Y values corresponding to all possible rho-theta values which may originate at the radar. To originally compute the operands to be stored in the PROM 38, a degree value is picked and the X,Y value that best satisfies the equation:

$$\theta = \arctan Y/X$$

is determined. Next, those X,Y values are used in the equation:

$$r = \sqrt{X^2 + Y^2}$$

to determine r. The resulting values of r and the corresponding X,Y values are stored at sequential addresses in 91 separate tables in the PROM 38, the tables being first by the $\theta$ values. Then, when a new radial arrives from the radar and is read into the RAM 36 in the rho-theta format, the theta or degree azimuth value is subsequently used to address the table and then, by stepping through the table until the range value is found, the corresponding Cartesian coordinates for that location can be read out from the PROM 38 into the RAM 36 and, in doing so, the frames comprising the four possible ranges are constructed on a line-by-line basis in the RAM 36, replacing the original rho-theta data.

In operation, then, as the data for each radial is read out of memory, a reference is made to the Conversion PROM 38 and a determination is made what a given value should be for a rectangular coordinate and once this transformation is made, the data is returned in its rectangular coordinate form to the memory location where the polar data was originally obtained. Once a complete picture comprised of 720 radials has been read in and the data comprising the picture has been converted to rectangular coordinate form, it is then available for transmission via the Modulator board 52 to the Communications Interface board 54. Because the system is designed to allow the flow of digital data from the transmitter to the receiver via telephone lines and because phone lines tend to have a narrow bandwidth, it is necessary to control the rate of transmission of the video information. The CPU 34 therefore serves an additional feature of acting as a buffer for slowing down the transmission rate so that it can be handled with a minimum of distortion by the phone lines.

Having described in general terms the functional performance of the D-VIP Interface board 28 and its relationship to the CPU, attention will next be directed to the Modulator board 52.

MODULATOR

After the processor has constructed the picture in its Memory 36 in a rectangular coordinate format and that picture is available for transmission, the last thing that the Processor 34 does is to read the map data from the MAP PROM 40, combine it with the radar data, i.e., the video information contained on the Memory board 36 and then transmits that data, via the 8-bit data bus 44, to the Modulator board 52. The data enters a 32K×8-bit RAM 54 which serves to temporarily store the picture, thus freeing the Processor 34 and its Memory 36 for the task of developing a subsequent picture for the next series of 720 radials. The data stored in the RAM 54 will, of course, be in a rectangular coordinate format, that conversion having taken place as the data was being compiled in the Memory 36.

Figure 3:
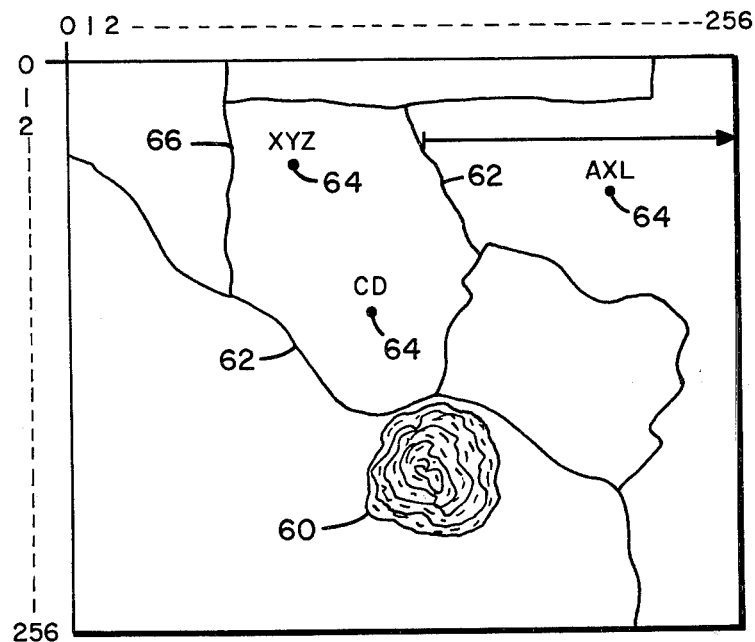
FIG. 3 illustrates a typical display having map information superimposed.

Under the control of a "Send" command transmitted over the Control Bus 42, the Timing and Control logic 56 controls the actual stepping out of the data from the Modulator board 52. Before being applied to the phone lines, however, a compression and truncation operation is performed on the data to be transmitted. In this regard, the output from the RAM 54 is applied to the Compression and Truncation Detector circuits represented by block 58. To better understand the need for compression and truncation, let it be assumed that the data stored in the RAM 54, if presented to a CRT display, would create the image depicted in FIG. 3. In FIG. 3, the screen is effectively divided into 256 rows and 256 columns. In usual fashion, a cathode ray beam is made to scan across a row from left to right and after a count of 256 has been generated indicating an end of line, the sweep snaps back to column 0 of the next row, this scanning proceeding until the row and column counters each reach 256 when fly-back occurs to the origin.

Located centrally in FIG. 3 and identified by the numeral 60 is a radar image representing ground clutter proximate the radar transmitting site. Identified by numeral 62 are various geographical boundaries such as state or county lines, rivers, etc. Also typically displayed on the scope are city designators as at 64. On a clear day and with little or no precipitation in the atmosphere, the majority of the signals to be transmitted will be 0's representing a background (no precip) level. Occasionally, however, the scanning beam will cross a geographic boundary or intersect with a city designator, thereby causing a level 7 signal to be developed. When the radar is picking up ground clutter, a still different level signal will be generated and must be transmitted. Referring to the picture element at any one of the 256×256 coordinate locations as a "pixel", it may be any one of a plurality of color levels. However, in the presentation of FIG. 3 it can be seen that there is a great deal of redundancy because most of what is to be transmitted is background or 0 level information. For this reason, it is expedient to compress that information so that it becomes unnecessary to transmit each individual picture element where there is no change between adjacent picture elements. The Compression and Control logic 56 and 58 begins reading the data out of the RAM 54 and where it detects two identical pixels in a row, compression is advisable. If it reads out another adjacent address and continues to get the same pixel level as the preceding two, the compression logic merely counts the number of sequential identical bits in a string. Referring again to FIG. 3, it might, for example, count 25 successive 0 levels before crossing the boundary line 66. When it reaches the map boundary line 66 the compression counting stops due to the detection of a different character. The Modulation logic 68 then sends out a 0 level code, followed by a compression count of 25 and then would send out the code representative of a map boundary.

Digressing for a moment, in the system of the present invention there are no Start/Stop characters in the communications string. Instead, communications are on a continuous basis. There are 8 different counts to define the precip levels 0 through 7 where level 0 is background, levels 1 through 6 are the precipitation levels corresponding to Table I, and level 7 corresponds to a map boundary or city code type graphic. Associated with each of these 8 levels is a discrete tone ranging in frequency from approximately 1400 Hz to 2200 Hz. These different tones or frequencies can be detected by the demodulator system employed in the receiver 20 so as to define those levels. The advantage of sending 8 different tones rather than conventional mark and space signals in most modems is that it allows significantly higher transmission rates.

The data format transmitted out of the modulator 52 is shown below.

| XXX | X | XX XXX |
|---|---|---|
| LEVEL | MAP | COMPRESSION |

As indicated, only three bits of information can be transmitted at a time. The first three bits in a series define the precip levels 0 through 6, the next bit position indicates if the map is on or off and the next group of 5-bits comprises the compression code indicating how many of these identical levels are in a sequence. With 5 compression bits, it is possible to indicate a maximum of 32 sequential characters. In the receiver 20, then, there is provided a latch and a counter. The received video level information is stored in the latch and the transmitted compression count is entered into the counter. Then, as the counter is decremented, the level information is made available to the video display. This operation will be explained in considerably greater detail when the construction and mode of operation of the receiver module is set forth.

In addition to transmitting level information, map information and the compression code, the modulator also must transmit synchronization codes (sync) to signify the start of a line. A distinction is made between the start of a line and the start of the first line in that a given tone is held for approximately 3 seconds when identifying a first line. This type of synchronization may be compared to conventional television operation. That is, the synchronizing pulses that synchronize the horizontal scanning are called "horizontal sync pulses". Then, there is a pulse that is generated when the bottom of the screen is reached so as to cause the beam to fly-back up to the top and that is called the "vertical sync pulse". In the system of the present invention, the line sync tones are comparable to the TV horizontal sync pulses and the long hold tone that persists for 3 seconds constitutes the vertical framing pulse.

At this point, it is well to remember that the present system is capable of sending pictures existing in 4 different ranges, 0-60, 0-120, 0-180, and 0-240 nautical miles from the radar site. The receiver stores all four ranges simultaneously. The transmitter, however, will, at any given time, store only two ranges, i.e., the one being sent, stored in memory 54, and the range being constructed stored in Memory 36. The ranges are constructed and sent sequentially by the transmitter. For example, range 0-60 is stored in Memory 54 and is being sent, while range 0-120 is being constructed and stored in Memory 36. Upon completion of sending range 0-60, range 0-120 is then transferred from Memory 36 to 54 and while range 0-120 is being sent, range 0-180 is being constructed and stored in Memory 36. This process proceeds for each successive range and is continuous.

When a new picture in the 0-60 mile range arrives at the receiver from the transmitter, it is desired that this information be stored in the same address block previously reserved for the earlier 0-60 nautical mile range picture. Similarly, the same holds true for the remaining 3 ranges. For the data to get stored in the proper range bin or the proper storage area, a code is required to inform the receiver what range it is then receiving. When an operator at a receiver site first dials-up one of the plurality of transmitters 18, the transmitter may be in the process of transmitting a 0-60 nautical mile range picture. The frequency of the next 3 second tone will signify to the receiver that the data to follow will be for the picture in the 0-120 range. Each of the discrete range has associated with it a tone of a different frequency so that the receiver is continually advised as to which range bin the next batch of picture data should be stored into.

In the same fashion that it is wasteful of time to attempt to transmit each of the pixels in a given line if successive pixels are identical (the problem to which the compression technique is applied), it is also wasteful of time to continue to transmit successive groupings of 0 levels if it is known that the remaining data on a given line are all 0's or background levels. If at any point along a given line it is realized that the remainder of the constitutes all 0's, a line synchronizing pulse may be interjected immediately thereby cutting short or "truncating" the transmission process. For example, with reference to FIG. 3, when scanning row 2 after crossing the boundary line 62 the remainder of the line is all background and by injecting the line sync pulse immediately following the crossing of the map boundary 62, the sweep is brought back to the beginning of line 3 immediately and no time is lost transmitting the 0 pattern. To ensure that the display is properly generated at the receiver, it includes circuitry for sensing line sync pulses and when it is determined that the row counter has not reached 256 at the time that the line sync pulse is received, it automatically enters a high speed mode to fill the rest of that line with 0's and to prepare itself for the receipt of the next line of information.

Figure 2:
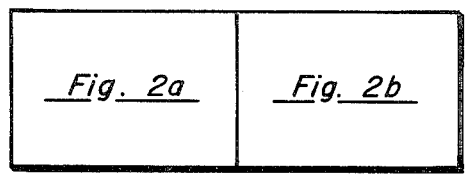
FIG. 2 illustrates the manner of arranging FIGS. 2a and 2b to form a composite block diagram.
Figure 2B:
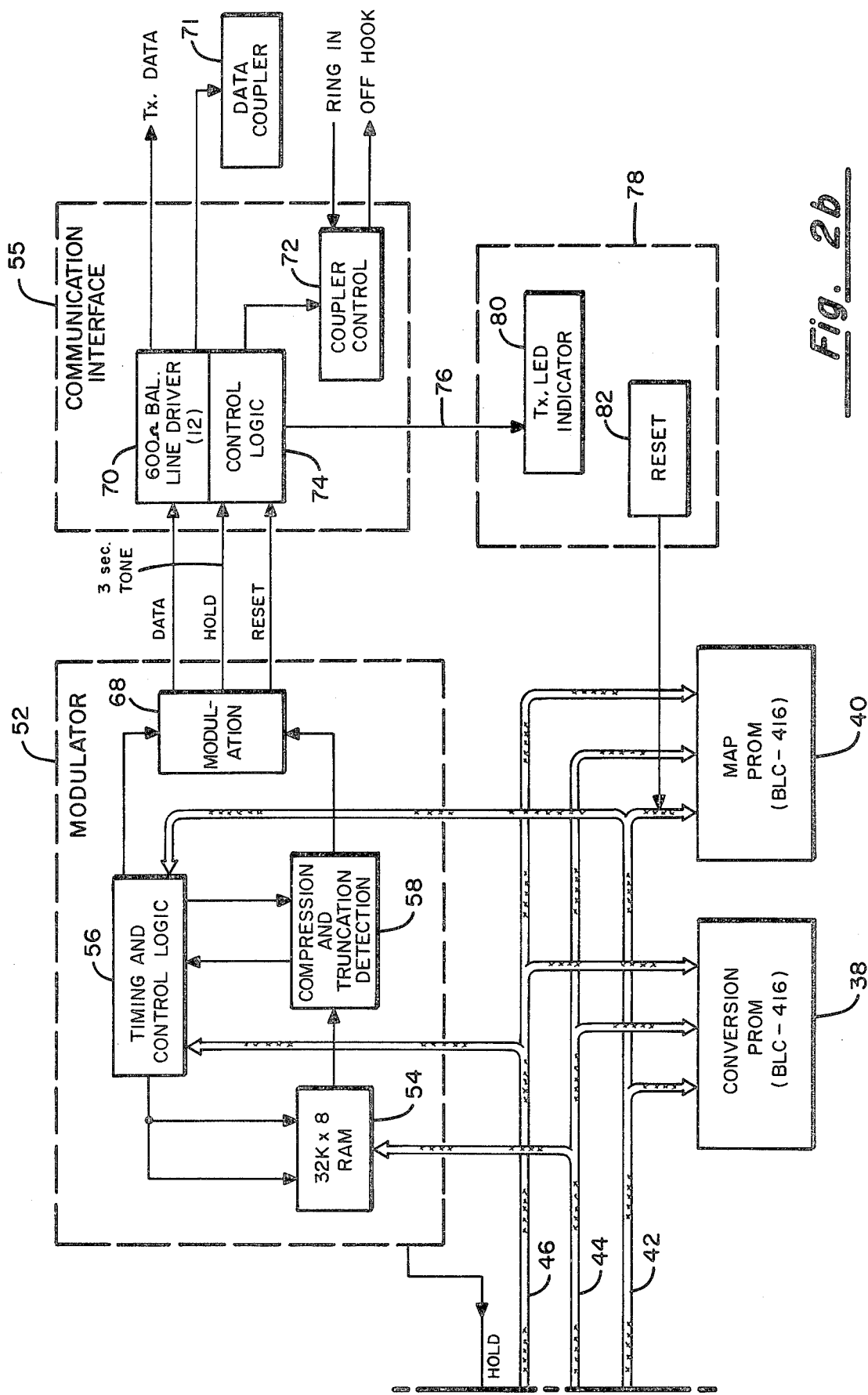

Referring again to the Modulator board 52 on FIG. 2b, the Modulation circuit 68 receives the data and compression count from the circuit 58 and it generates the discrete tones representing the data to be transmitted. To avoid phase discontinuities in the trnasmitted waveform, the Modulation circuit 68 comprises a presettable counter which is adapted to be incremented at a predetermined rate. An initial count is injected into the counter and it is incremented until an overflow condition occurs and the overflow signal represents the desired tone. The number of times that the latch is set and reset determines the frequency of the tone output. That frequency is determined by the initial value of the count preset into the counter. The higher the count introduced, the higher the frequency in that a shorter time is required for the counter to be incremented to its overflow condition.

COMMUNICATIONS INTERFACE

The output from the modulation circuit then feeds into the Communications Interface block 54 in FIG. 2b. This board is designed to tie onto the phone lines and a number of different phone lines may be driven by the Modulation circuit 68 via the Communications Interface 54. Included on the interface are balanced line drivers 70 which comprises a transformer which precludes a DC connection between the transmitter and the phone company's equipment. In addition, and as will be described more fully hereinbelow, the Communications Interface 54 handles the exchange of control signals for the data couplers used in dial-up interconnect systems. Where dedicated lines are provided, the output modulation tone is amplified and brought into a 600 ohm balance transformer whereas in dial-up applications, a data coupler is tied between the 600 ohm transformer and the phone line. Thus, the Communications Interface 54 provides isolation and protection for the phone company's equipment and is also capable of detecting when a user dials up a line. The line labeled "ring-in" to the Coupler Control 72 signals the transmitter that a user desires to communicate and when the transmitter is ready to answer the call, the coupler control 72 sends back an "off-hook" signal that establishes the necessary DC loop connection in the phone line. The local telephone office equipment then recognizes that the line was activated and an end-to-end connection is established.

The data coupler keeps the phone line connected allowing transmission to continue until the "off-hook" signal is dropped. This takes place after the four full pictures, one for each of the range intervals, have been sent. The "hold" signal from the Modulator 52 provides the vertical synchronization which has already been discussed above. That signal is fed to the Communications Interface 54 so that the number of such tones may be counted whereby the number of pictures transmitted can be determined.

Also located on the Communications Interface board 54 is a control logic block 74 having an output line 76 coupled to a display panel 78 having a LED indicator 80 which is illuminated when the Modulation Network 68 is transmitting through the Communications Interface 54 to the telephone lines. By observing the LED indicator, a user may quickly determine whether the system is transmitting properly or whether it is locked up for any reason.

Also located on the panel 78 is a Reset button 82 which when operated causes a signal to be applied to the Control Bus 42 to reset the processor. This feature becomes important whenever a transient impulse from the power line or the like causes the system to get out-of-step, so to speak.

Again, with respect to the general block diagram of FIGS. 2a and 2b, and by way of summary, video data as well as azimuth and elevation information from a NWS radar are brought in through the Isolation board 24 and the Synchro Converter 26 to the D-VIP Interface board 28. Circuitry on the D-VIP Interface board provides the required sensitivity time correction (STC) and the development of the precipitation thresholds or levels. This information as well as the information relating to azimuth and elevation is transmitted via the Multiplexer 48 under control of the Timing and Control logic 49 to the Random Access Memory module 36 associated with the Microprocessor's CPU 34. As mentioned, the memory transfers are effected in a DMA operation with the addresses being generated by the Address Counter 50 so as to relieve the CPU 34 of the time consuming task of controlling the gating in of data. The bus structured microprocessor then performs two important functions. First of all, the rho-theta polar coordinate data from the Multiplexer 48 is converted to rectangular coordinates through the interaction of the conversion algorithm stored in the PROM 38. In addition, the MAP PROM 40 provides, upon selection, additional data for defining geographical boundaries, landmarks, city designators, etc. This composite "picture" is developed and stored in the Memory 36 and subsequently transferred over the Data Bus 44 to the Modulator board 52. The data is stored in a RAM 54 and is fed to a Modulation circuit 68 via the Compression and Truncation network 58. This circuit is capable of examining the data bytes presented to it indicative of the various possible levels defining the precipitation intensity and map information and when it is determined that successive bytes are identical, a count is developed as to the number of identical bytes in a series string. Rather than successively transmitting the bytes themselves, only a single byte along with the count indicative of the number of times that byte is to be repeated, is provided to the Modulation network 68. In the case of truncation, the circuit 58 senses whether the remaining portion of a given line of pixels are all at a 0 level and, if so, a Line Sync pulse is generated immediately, thereby cutting short or truncating the transmission process.

The Modulation circuit 68 functions to convert the information bytes presented to it into discrete tones indicative of levels 0–7, 0 being background, 1–6 being precipitation levels established by NWS criteria, and level 7 comprising a map byte. The various tones are presented to the Communications Interface 54 which is the apparatus employed to permit transmission of the various tones over either a dedicated line or over conventional dial-up lines of the telephone company to one or more receiver locations.

Now that the overall organization and operation of the transmitter has been described in general terms with the aid of the block diagram of FIGS. 2a and 2b, consideration will now be given to the details of the implementation of the various logic modules employed on the boards comprising the transmitter.

Figure 4:
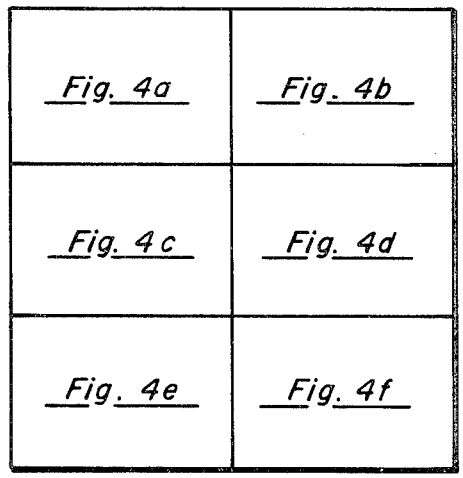
FIG. 4 shows the manner of arranging FIGS. 2a and 2b in forming a composite electrical schematic diagram.
Figure 5:
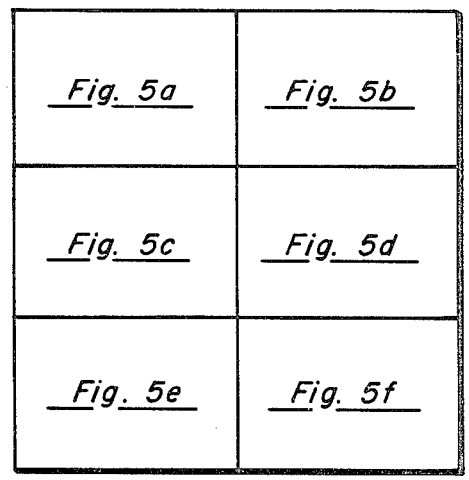
FIGS. 5a through 5f, when arranged as shown in FIG. 5, illustrate by means of a detailed logic diagram other circuits implementing the D-VIP Interface board.

D-VIP INTERFACE BOARD - FIGS. 4 and 5

Reference is now made to FIGS. 4a through 4f which define the detailed logic implementing the D-VIP interface board 28. The 8-bits of data from the NWS radar D-VIP are applied by way of Schmidt trigger inverters 4-1 through 4-8 to the Level 1 Compare circuits including comparators 4-9 and 4-10. The other inputs to these two comparators come from the Level 1 switch assembly 4-11 which preferably is an 8-position switch of the type available in a dual in-line package configuration. Associated with this switch is an integrated circuit resistor array 4-12 which includes the pull-up resistors for applying predetermined voltage levels to the comparator inputs, depending upon the open or closed condition of the various switches on device 4-11.

As was indicated, the switches on device 4-11 are used to establish a Level 1 reference value. In that there may be a quantity of high frequency noise received from the radars and superimposed on this noise is the so-called MDS or minimum discernible signal, by proper setting of the individual switches, it is possible to establish a predetermined reference level for the Comparators 4-9 and 4-10. Because of the arrangement employed, when a first digital number is applied to a first set of lines to the comparators 4-9 and 4-10 from the switches 4-11 and the received data signals are applied to the second set of inputs to these Comparators, if the incoming signals exceed the threshold (A greater than B), comparator 4-10 will produce an output to set the Level Detect flip-flop 4-13 to indicate that a real precip signal, rather than noise, has been received.

The incoming data from the Schmidt trigger inverters 4-1 through 4-8 also feeds into a set of integrated circuit adders 4-14 and 4-15. The second set of inputs to the adders come from the STC PROM's 4-16 and 4-17. Stored in these last-mentioned PROM devices are factors which provide the Sensitivity Time Correction. That is to say, compensation must be provided for the attenuation occurring as the distance of the target from the radar transmitter increases. As will be shown, the addresses applied to the PROM devices 4-16 and 4-17 will be correlated to the particular range at which the radar return indicates the presence of a target rather than noise. More specifically, the counter devices 4-18, 4-19 and 4-20 accumulate data strobes and effectively indicate by their contents where one is on a particular scan or radial. Before continuing with the description of the manner in which the STC factor is appended to the video data, an explanation will be set forth as to how the range information is developed and the manner in which the Range Counters 4-18 through 4-20 are incremented.

Figure 5E:
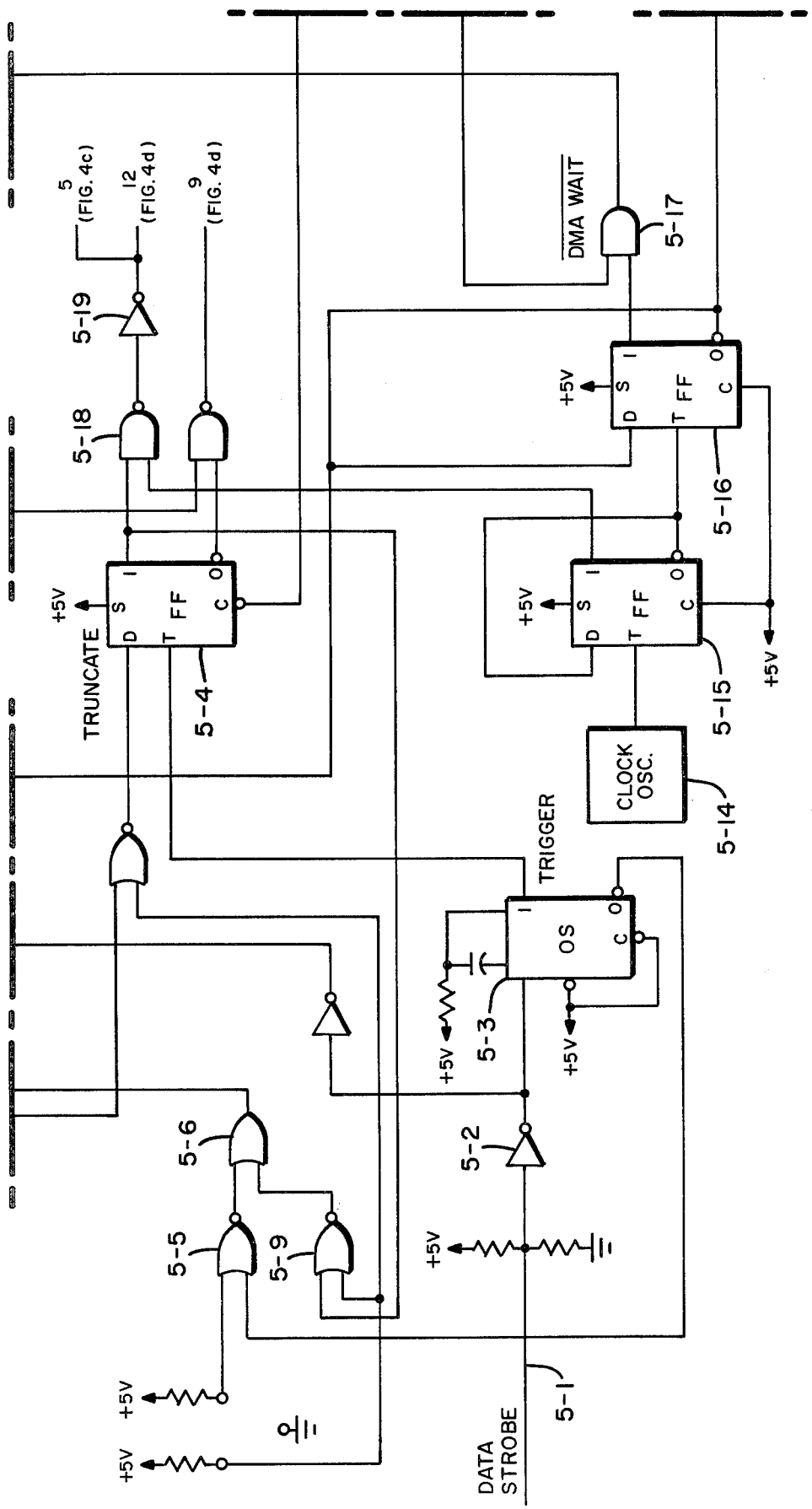
Figure 5F:
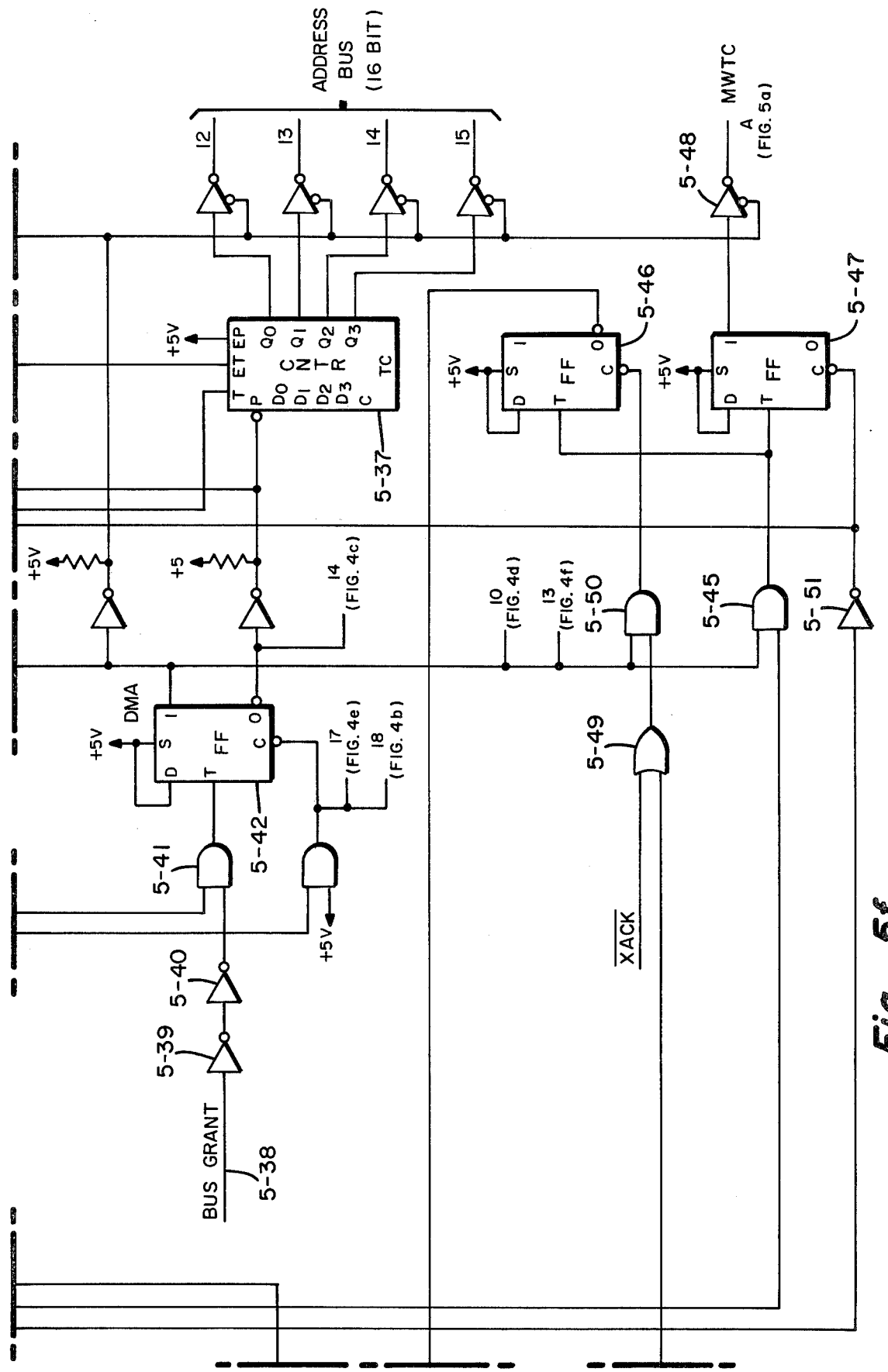

Referring to FIG. 5e, the Data Strobes from the radar are applied to the terminal 5-1 which is connected as an input to a Schmidt trigger inverter 5-2. One such Data Strobe is provided for each kilometer of range and is obtained from the WSR radars. The output from Schmidt trigger 5-2 is applied as a trigger input to a one-shot circuit 5-3. This is a re-triggerable one-shot and it will remain in a set condition so long as Data Strobe signals occur at or above a predetermined rate. However, if the rate at which data strobe signals are received drops below that predetermined rate, the one-shot 5-3 times out and thereby indicates the end of the radial. As such, the output from the one-shot 5-3 simulates the radar trigger corresponding to the onset of the next subsequent radial.

The output from the Trigger one-shot 5-3 is applied as a toggle input to a so-called Truncate flip-flop 5-4. Before one can understand the function of this Truncate flip-flop, it is necessary to understand that there is a basic difference between a WSR-74C radar and the WSR-57S radar and that the system of the present invention is designed to operate with each. In the WSR-57S radar, a data strobe is produced for every kilometer of range. In other words, there is a data strobe for every one of the 450 possible kilometer markers on a given radial. On the WSR-74C, however, the data strobes are not generated until the radar pulse has propagated out 20 kilometers. In this way, ground clutter proximate the radar transmitting site is eliminated from the display. When the system is arranged to operate in the 74C mode, the data strobes for the first 20 kilometers of range are truncated while clock pulses are generated to shift the count in the range counter up to that value.

Figure 4A:
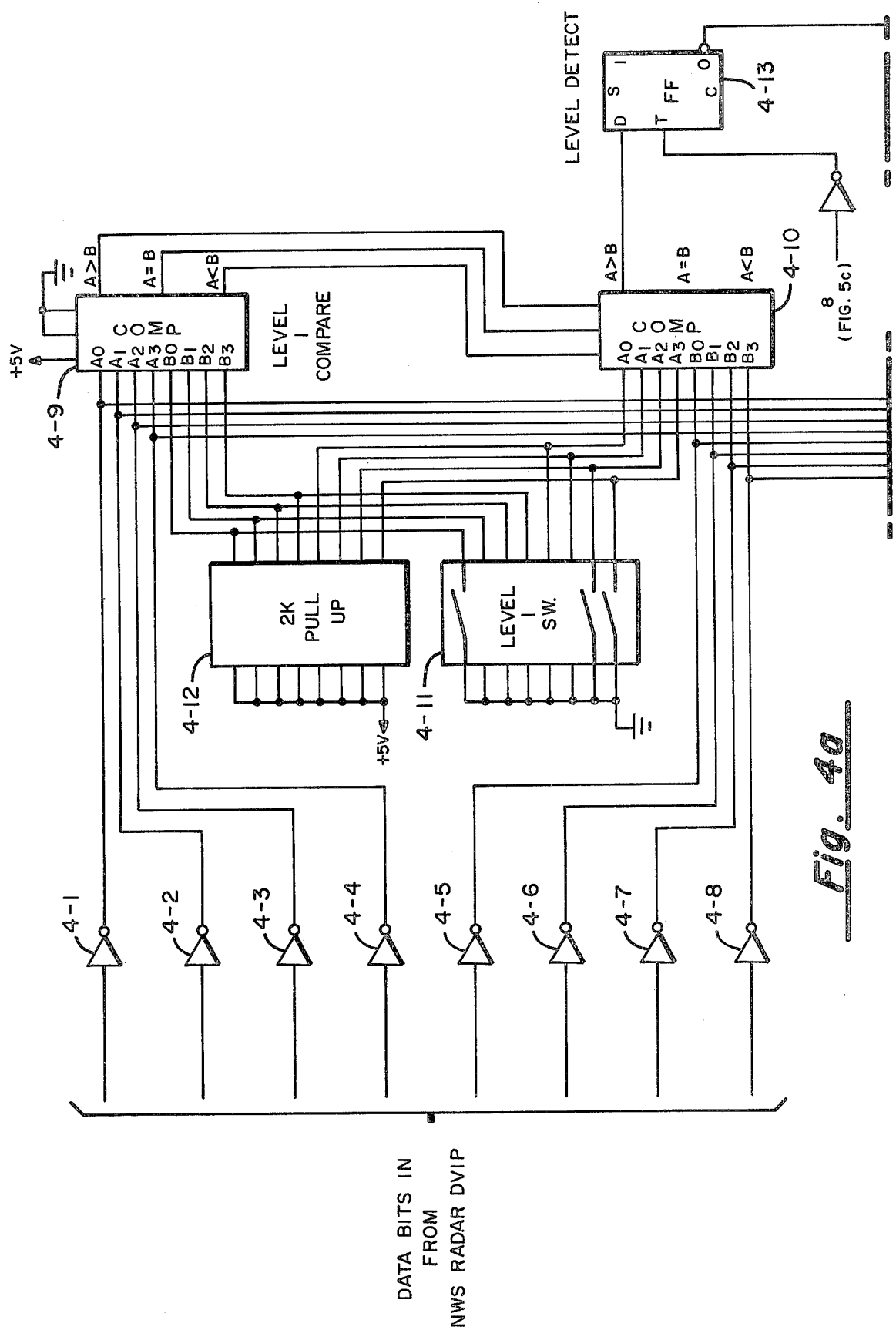
Figure 4B:
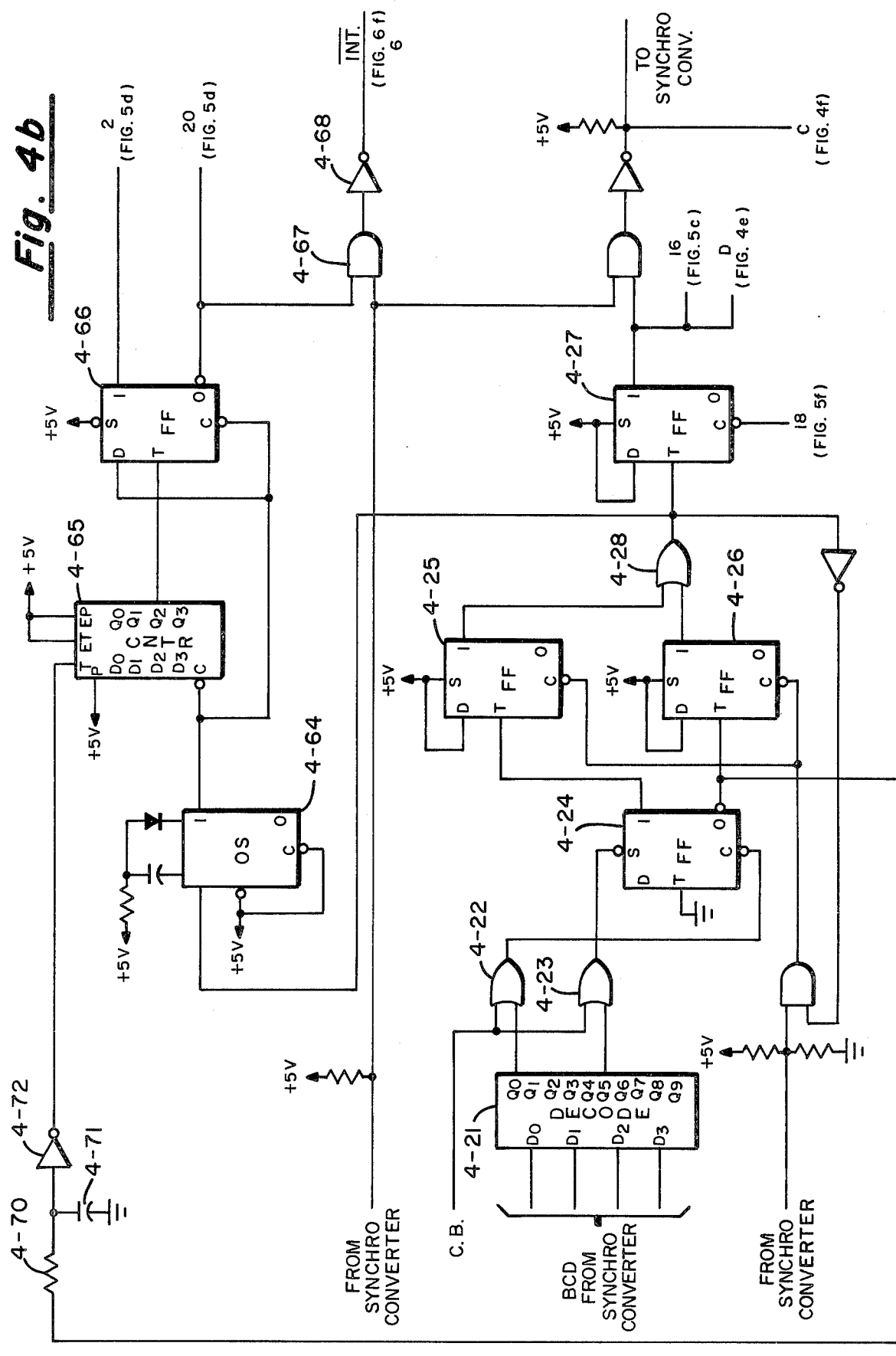
Figure 4C:
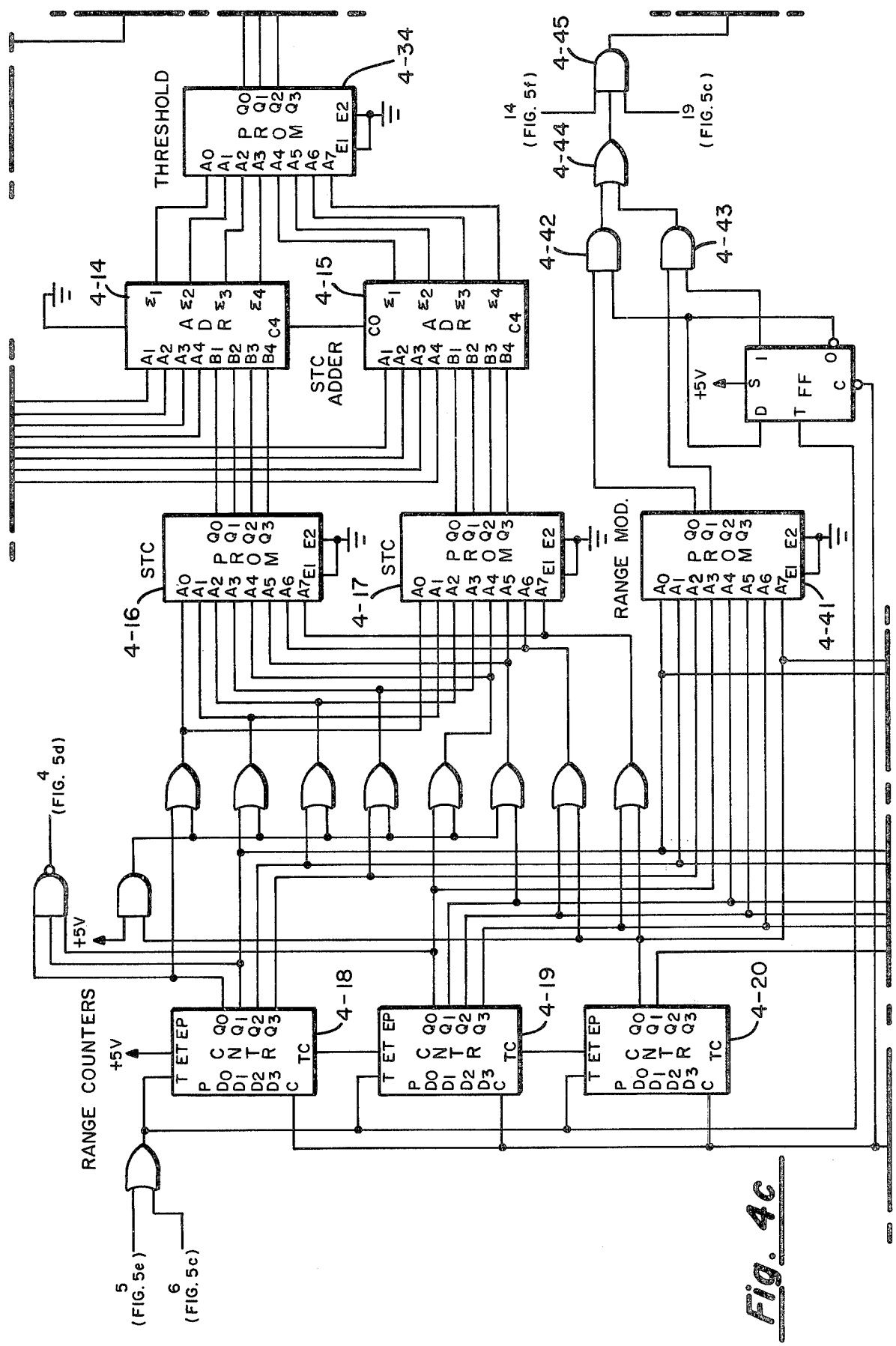
Figure 4E:
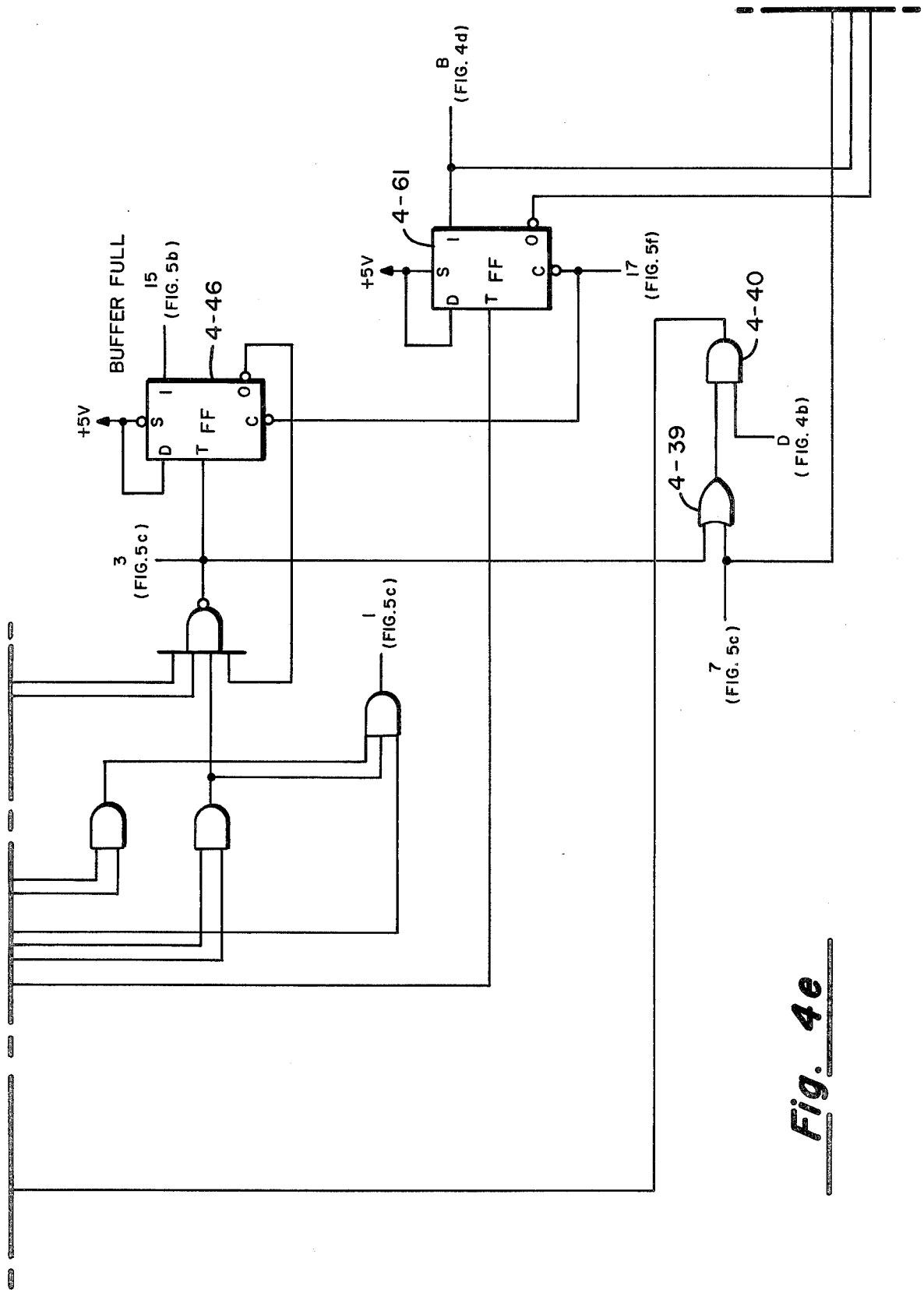

Because satisfactory resolution in the radar presentation occurs when only 720 radials per resolution are sampled, it is unnecessary in the system of the present invention to receive and process additional radials which with the radars employed generally occur every 1/10th of a degree. Stated otherwise, instead of sampling every 1/10th of a degree, it is found sufficient to instead perform sampling at $\frac{1}{2}°$ intervals. The manner in which this is accomplished is as follows. Referring to FIG. 4b, the output from the Synchro Converter in the NWS radar equipment is a binary coded decimal 4-bit byte and is applied to the decoder 4-21. This decoder accepts data in 1/10th degree increments and by utilizing the $Q_0$ and $Q_5$ outputs therefrom as inputs to OR gates 4-22 and 4-23, the ½° flip-flop 4-24 will be switched from one state to another at 0° and at each ½° point following. The true and complement outputs from the ½° flip-flop 4-24 are applied, respectively, to the toggle inputs of a further pair of flip-flops 4-25 and 4-26. These latter two flip-flops detect the edges of the outputs from the ½° flip-flop 4-24 and, as a result, the flip-flop 4-27 is set and reset at each 0 or 0.5 degree point via the output from the OR gate 4-28.

It will be recalled that when operating in the WSR-57S mode, as soon as a simulated radar trigger signal is detected at the output of trigger one-shot 5-3, a signal is applied to a first input of gate 5-5 and propagates through that gate and OR circuit 5-6 to the toggle input of a flip-flop 5-7 termed the "Input Radial" flip-flop. The data input of the flip-flop 5-7 comes from the "1" side of a further toggle flip-flop 5-8 which is switched at the ½° points via the output from the flip-flop 4-27. The output from the flip-flop 5-7 then indicates that a trigger has been received and that a ½° point has been detected and, thus, a proper radial is involved.

Considering now the case of the WSR-74C mode, the processing cannot be initiated upon the receipt of a first trigger but, instead, the first twenty 1 kilometer data strobes must be simulated. Specifically, the output from the trigger one-shot 5-3 sets the Truncate flip-flop 5-4 which simulates the receiving of the first twenty 1 kilometer pulses. The Range Counters 4-18, 4-19 and 4-20 are incremented as are the data registers 4-30, 4-31 and 4-32 such that when the Truncate flip-flop 5-4 clears, OR gate 5-9 is enabled and a signal passes through OR circuit 5-6 to set the Input Radial flip-flop 5-7 as was done in the case of the WSR-57S mode.

When the Input Radial flip-flop is set, its 0 output passes through OR gate 5-10 and enables each data strobe coming from the output of the Schmidt trigger 5-2 to pass through OR 5-10 to a first input of NAND gate 5-11. This gate serves as a low-going OR function and passes a signal to set the flip-flop 5-12. The output of this last-mentioned flip-flop is applied as an enable to a shift register type timing chain 5-13 allowing a single pulse to propagate therethrough and produce further enable signals at the times indicated by the taps labeled T1 through T8. The outputs from the timing chain are the signals actually used to clock the Range Counter comprised of circuits 4-18 through 4-20 in FIG. 4c. Timing chain outputs also serve to clock the various address counters, data shift registers and other circuits yet to be described. It is to be noted, however, that the timing chain can only be started when a valid data strobe and a valid radial, i.e., a ½° radial, is passed by the Selector network comprised of the gates 5-5, 5-6 and 5-9. The rate at which pulses are stepped through the timing chain 5-13 is controlled by its T input. It can be seen that this signal comprises a 3.5 MHz clock signal originating at the clock oscillator 5-14 whose output is frequency divided by the flip-flops 5-15 and 5-16 and applied as a first input to a AND gate 5-17. So long as the Data Bus is not engaged in a DMA operation, gate 5-17 will be enabled to apply the requisite stepping pulses to the shift register timing chain 5-13.

As the pulse propagates down the chain, the first event to take place occurs at time $T_3$. This output is applied to OR gate 4-32 and the other input to this gate comes from the Truncate flip-flop 5-4 via NAND circuit 5-18 and Schmidt trigger 5-19. Either one of the aforementioned signals is sufficient to pass through gate 4-32 and a further OR gate 4-33 to clock the data register which is comprised of three serial shift registers 4-29, 4-30 and 4-31. With no limitation intended, the Data Registers may comprise 512-bit MOS memory devices. The data itself which is to be stored comes from the STC adders 4-14 and 4-15 via the threshold PROM 4-34.

It will be recalled that the digitized raw video data from the radar D-VIP entered the system by way of the Schmidt trigger inverters 4-1 through 4-8 which serve to square up the impulses. The data comes in as a low active signal and it is inverted to become high active data. The data is first applied to the comparators 4-9 and 4-10 and they compare the level of the radar return being processed as represented by the incoming data bits to the "Level 1" threshold established by the DIP switches 4-11. An incoming signal must exceed the Level 1 value to represent detection of a precipitation pattern. Upon detection of precipitation at any one of the five remaining intensity levels, the Level Detect flip-flop 4-13 is set. It can be seen that if the flip-flop never becomes set, a pattern of all 0's will be clocked into the data registers 4-29 through 4-31 via the OR circuit 4-53.

The incoming data is also applied to a first set of inputs to the adders 4-14 and 4-15 along with the output from the STC PROM's 4-16 and 4-17. The last-mentioned PROM devices are addressed by the range counters 4-18 through 4-20 and as they are incremented by each one-kilometer strobe pulse, a different word is read out from the PROM's 4-16 and 4-17 into the adders. It can be seen, then, that if certain compensation values are stored in the PROM's, the combined output from the adders comprises the data which has been compensated for radial distance from the radar transmitter/receiver. Appearing at the output from the adders 4-14 and 4-15, then, is the STC corrected data and that binary pattern is then applied as an address to the threshold PROM 4-34. This threshold PROM takes the return level, represented by an 8-bit byte, and converts it into one of the six precipitation levels set forth in Table I above. Coming out of the threshold PROM 4-34 is a 3-bit byte which, depending upon the permutation of the digital signals thereon, can represent any one of the decimal numbers 1 through 6. It is this threshold value that is entered into the data register comprised of shift registers 4-29 through 4-31. The AND gates 4-36 through 4-38 invert the data to a low active signal compatible with the Bus's architecture employed. It is to be further noted that the enable signal applied to the gates 4-36 through 4-38 comes from the output of OR gate 4-35 whose input comes from the Level Detect flip-flop 4-13. Hence, if the Level Detect flip-flop had never become set, the gates 4-36 through 4-38 would remain disabled and 0's would, in effect, be put into the Data Registers 4-29 through 4-31. The Level Detect flip-flop 4-13, of course, only becomes set if a received data entry exhibits a threshold greater than Level 1 which threshold is set into the system by the switch array 4-11.

Referring again to FIG. 5c, and especially to the timing chain comprised of the shift register 5-13, the next event takes place at time T4 when the timing chain outputs a signal to OR gate 4-39 whose output is able to propagate through AND circuit 4-40 to the clock inputs of the Range Counter comprised of integrated circuit counters 4-18 through 4-20. Summarizing momentarily, it can be seen that following the latching of the first byte of data into the data registers 4-29 through 4-31, the Range Counter is incremented and the system is then ready for receipt of the next byte of input from the NWS radar D-VIP.

Once an entire radial has been entered, it is necessary to clock the data into the Memory 36 of the Microprocessor. The timing chain 5-13 is repetitively recycled until 450 strobe pulses have been received from the radar and the corresponding bytes of level information have been transferred from the threshold PROM 4-34 into the Data Registers 4-29 through 4-31.

It is well to mention at this point that the radars with which the present invention finds use incorporates what is termed a "short pulse mode" where the magnetron of the radar transmitter is pulsed at an increased rate. The purpose of this capability is to increase the resolution or detail of the picture to be painted. It is apparent that if the radar with which the present invention is being used is in its short-pulse mode, the system must operate at a decreased range. While the long-pulse mode permits a range of 450 kilometers, the short-pulse range is only 230 kilometers, there being less time between successive pulses to receive the return echo. A signal from the radar D-VIP coming in on line 5-20 determines whether the system is operating in the long-pulse or short-pulse mode. A pulse indicative of the short pulse mode will pass through the Schmidt trigger inverter 5-21 and the gates 5-22 and 5-23 to set the 230 km Truncate flip-flop 5-24. Once set, it allows the timing chain to continue to run until the contents of the Range Counter equal 450. This ensures that the shift registers comprising the data register 5-29 through 5-31 will be filled.

For the processor to average properly and to build up the four distinct ranges between 0 and 240 nautical miles, it is a requirement that there be 512 bytes for each radial, whereas the radar normally permits 450 when in the long-pulse mode or 230 when in the short-pulse mode. To accomplish this, the processor performs an averaging function and selected bytes are entered twice. The particular bytes that are entered two times are stored in the Range Modifying PROM 4-41 which is adapted to be addressed by the output from the Range Counter stages. Hence, when an appropriate range is indicated by the Range Counter, the PROM 4-41 will either output a 1 when it is desired to enter a level value into the data registers more than once or to output a 0 when that particular level is to be entered into the data register only once. A further point to notice is that address bit 0 of the Range Modifying PROM 4-41 is connected to the stage 1 output from the Range Counter 4-18. Hence, it can be seen that the address to the PROM 4-41 is incremented at half the rate that the Range Counter itself is being incremented. The PROM 4-41 outputs two bits for each address and they are examined by the gates 4-42, 4-43 and 4-44. Provided the system is in an input mode, the AND gate 4-45 will be partially enabled and at the next time, $T_1$, of the timing chain 513, the gate 4-45 will pass a pulse through the OR gate 4-33 to again toggle the data register 4-29 through 4-31 to enter the threshold value presented to it from the PROM 4-34 a second time. Because of the action of the range modification register and associated logic interconnections with the data register, upon completion of a given radial, exactly 512 bytes of data will have been entered into the shift registers 4-29 through 4-31.

The data in these registers remains there until one of two things takes place. First, the processor may request that the data be transferred into the processor's memory or, alternatively, if for any reason the processor does not request this data within a 50 millisecond time interval, the data relating to the radial that is stored in the Data Register will be dumped and the system will proceed to enter in data relating to the next subsequent radial. The 50 millisecond time-out function is achieved with the logic circuits including one-shots 5-25 and 5-26. These two one-shots are detecting activity on the timing chain 5-13 and so long as $T_6$ pulses are obtained more frequently than every 50 milliseconds, one-shot 5-25 will remain active and the one-shot 5-26 will not be triggered to its metastable state. However, if a period of 50 milliseconds elapses between occurrence of $T_6$ timing pulses, the one-shot 5-25 will time out and a pulse will propagate through AND gate 5-27 to trigger the one-shot 5-26. This last-mentioned one-shot generates a reset pulse.

Gate 5-28 acts as an OR circuit and receives either the reset pulse from the one-shot 5-26 or a master reset from a push button switch on the front panel 78 (FIG. 2b) and the output from gate 5-28 is distributed so as to reset all of the logic on the D-VIP interface board to an initial state.

In normal operation, the data stored in the shift registers 5-29 through 5-31 will be transferred to the Microprocessor's Memory (Block 36 in FIG. 2b). This is accomplished by placing a particular address, FFF7 (hexadecimal) on the lines labeled ADDRESS BUS on FIG. 5d. AND gate 5-29 comprises a decoder which produces an output when the FFF7 pattern is applied to its input. This output is applied to the DMA Request flip-flop 5-30 and the setting of this flip-flop, in effect, indicates that the Processor has requested the D-VIP Interface board to perform a DMA input operation on the 512 bytes of radar data then contained in the shift registers 4-29 through 4-31.

As indicated earlier, DMA stands for Direct Memory Access. This operation permits data to be transferred into the computer's memory without direct intervention by the computer, once the data transfer mode is established.

Once a DMA request is generated, two further conditions must prevail. First of all, the data register 4-29 through 4-31 must be full, i.e., contain the 512 bytes of data indicating the precip levels at various ranges along a given radial, and, secondly, the D-VIP Interface must gain control of the Data Bus 44 in FIG. 2. To establish that the buffer is full, AND gate 5-31 is provided and it receives as a first input the fact that a DMA request has been made. The second input to gate 5-31 comes from the Buffer Full flip-flop 4-46 in FIG. 4e. When gate 5-31 is satisfied, it outputs a signal which propagates through inverter 5-32 to create the BUS REQUEST command, indicating that the D-VIP Interface board is requesting control of the Bus from the Processor. Before control can be transferred, the Processor must issue a BUS GRANT.

The output from gate 5-31 also enables the gate 5-33 to effect the loading of a starting address into the Address Counters 5-34, 5-35, 5-36 and 5-37. For example, the manner in which the memory for the Microprocessor is partitioned may dictate that the starting address, i.e., the address where the first byte of data is to be loaded, may be at address 8080. This value, then, is somewhat arbitrary but comprises a fixed value for any given system. The first 512 bytes of data from the storage registers 4-29 through 4-31 are then loaded into the Memory at this starting address and upon each such transfer, the address counter is advanced by 1 so that successive bytes are stored in adjacent memory locations. The BUS GRANT signal from the processor comes into the D-VIP Interface board on line 5-38 and passes through a Schmidt trigger 5-39 and a series inverter 5-40 to apply a high signal to a first input of AND gate 5-41. In that a DMA request had been developed at the output of the flip-flop 5-30, AND gate 5-41 will be fully enabled and a pulse will be emitted therefrom for toggling the DMA flip-flop 5-42. Once flip-flop 5-42 sets, it indicates that the D-VIP Interface board has control of the bus and the DMA operation of transferring the contents of the data registers 5-29 through 5-31 to the Memory 36 (FIG. 2a) can take place.

The manner in which the circuitry operates to accomplish this function will now be explained. The output from the DMA flip-flop 5-42 is applied as a first input to gate 5-43 and its output propagates through gate 5-11 to toggle the Control flip-flop 5-12 and initiate the timing chain 5-13. Again, a pass is made through the timing chain for each data byte to be tranferred to the Microprocessor's memory. To write the data into the memory, a $T_1$ timing signal from the timing chain is transferred via conductor 5-44 to an input to gate 5-45. With the DMA flip-flop 5-42 set, gate 5-45 will produce a signal to toggle the control flip-flop 5-46 and 5-47. The output from flip-flop 5-47 is tristated in driver circuit 5-48 to produce the MWTC or "Memory Write To Command" which, in effect, tells the memory that a valid address is stored on the bus and that a write operation can proceed. The Memory board 36 then takes the data off the Data Bus and the address for the data off of the Address Bus and begins the write cycle. In that this operation takes a certain amount of time, it is necessary to obtain an indication from the Memory that it has latched the data and address and that is the function of the flip-flop 5-46. By following the O output of that flip-flop, it can be seen that it connects as an input to the $\overline{\text{DMA WAIT}}$ 5-17 to thereby disable it. The other input for this gate is the 3.5 MHz clock signal out of the two stage frequency divider driven by the clock oscillator 5-14. The gate 5-17, then, disables the transmission of clock pulses to the shift register 5-13 so that it remains static until the flip-flop 5-46 is once more cleared. To clear the flip-flop 5-46, the Memory board must provide a signal indicating completion of its DMA cycle. The signal coming from the memory to the D-VIP Interface board is the so-called "Transfer Acknowledge" ($\overline{\text{XACK}}$) which is applied as a first input to OR circuit 5-49. It propagates through that gate and the gate 5-50 which is enabled at this time by the fact that the DMA flip-flop 5-42 is set, such that the flip-flop 5-46 is cleared. The clearing of this last-mentioned flip-flop removes the $\overline{\text{DMA Wait}}$ signal from gate 5-17 and permits the shift register to again be advanced by the 3.5 MHz clock signals now passing through gate 5-17.

The next operation triggered by an output from the timing chain 5-13 causes the address counter 5-34 through 5-37 to be incremented. At time, $T_3$, of the timing chain 5-13, inverter 5-51 outputs a signal on line 5-52 which is applied as an input to gate 5-33 whose output steps the Address Counters 5-34 through 5-37.

Following the advancement of the Address Counters, at time $T_4$, the timing chain 5-13 outputs a signal which passes through an inverter 5-53 so that a signal is applied to the gate 5-43. It will be recalled that it was the output from this last-mentioned gate that initiated the foregoing processes when the DMA flip-flop 5-42 was set. So long as it, in fact, remains set, gate 5-43 will remain enabled and each $T_4$ timing pulse will propagate through it to restart the timing chain. The timing chain will n continually step through repeating the operation's initiated by the $T_1$ and $T_3$ pulses until such time as the DMA Request flip-flop 5-42 is again cleared.

At each $T_3$ time, the Address Counter is incremented, all as has been previously described. It is a further requirement that the shift registers 4-29 through 4-31 comprising the data register also be stepped so that the next byte of data can be read out and presented onto the Data Bus. Just how this is accomplished with the logic circuitry will now be set out.

It is to be remembered from the earlier dicussion of the advancing of the Address Counters, that this took place at time $T_3$. The data is handled in much the same fashion. Specifically, 3-bit data bytes are stepped out, one at a time, from the 512×3 memory comprised of shift registers 4-29 through 4-31. The output lines from these shift registers are applied to a multiplexer 4-47 which is able to select the Level data from the Data Register or the azimuth inputs, the latter aspect of which will be covered in greater detail later on in this specification. The output from the multiplexer 4-47 enter into a further set of multiplexers, namely dual 4-input multiplexers 4-48, 4-49, 4-50 and 4-51. The output lines emanating from these last-mentioned multiplexers comprise the processor's Data Bus and are identified by numeral 44 in FIGS. 2a and 2b. Under control of the timing chain, then, the process continues whereby the data stored in the shift registers 4-29 through 4-31 are fed out, through the multiplexers 4-47 and 4-48 through 4-51 to be entered into the Memory 36 via the DMA operation.

As earlier mentioned, the first data word is stored at the arbitrary starting address 8080. As each new word is entered therein, the address is incremented so that each successive grouping of 512-bit bytes will be stored at adjacent memory locations.

Following transfer of the threshold level information from the Data Registers 4-29 through 4-51 to the Memory, it is necessary to next input the azimuth information so that the processor knows which direction that particular radial was in as the sampling took place. Azimuth information comes from the Synchro Converter of the National Weather Service radar in a binary coded decimal (BCD) format. The Microprocessor employed in the system of the preferred embodiment, however, operates in a hexadecimal format so that it is necessary to perform a conversion. At the time that the video data was being inputted from the NWS radar D-VIP via Schmidt triggers 4-1 through 4-8, the azimuth value was latched into the latches 4-52, 4-53 and 4-54. The BCD units digit is entered into latch 4-52 while the BCD ten's and hundred's digits are respectively loaded into latches 4-53 and 4-54. The tenth's digit for the azimuth is obtained from the $\frac{1}{2}°$ flip-flop 4-24, all as previously explained. To avoid the unnecessary load on the processor, the conversion from BCD to hexadecimal is done in discrete integrated circuit chips. In this regard, first and second comparators 4-55 and 4-56 and a PROM 4-57 are utilized. In that the azimuth value is latched into circuits 4-52 through 4-54 at the beginning of each radial and it takes about 2-½ milliseconds to input the 450 data strobes defining range values in kilometers, more than enough time is available to effect the desired conversion. To obtain the lower 8-bits of azimuth in hexadecimal code, the BCD decimal digits from the azimuth latches 4-52 through 4-54 are simply applied as an address to the PROM 4-57. Stored in this PROM is the direct conversion factor from BCD to hexadecimal. Because the PROM 4-57 comprised only 8-bits and because 9-bits are needed to define azimuth, the comparator 4-55 determines when the 8-bit capacity is exceeded. Specifically, comparator 4-55 detects when the azimuth reaches 256 (decimal). When this happens, it causes the comparator 4-56 to output a "1" to the AND-/OR logic 4-58, 4-59 and 4-60. Summarizing, the PROM 4-57 and the comparators 4-55 and 4-56 along with the logic gates 4-58 through 4-60 perform the requisite BCD to hexadecimal conversion. The output of this conversion circuitry goes to the alternate inputs of the aforementioned Data Bus multiplexer 4-47 through 4-51.

The switching of the mulitplexers from the Level signal transmitting mode to the azimuth transmitting mode is controlled by further control logic which functions such that when a count of 512 is reached by the Range Counters 4-18 through 4-20, signifying the transmission of the last data byte, the multiplexers 4-48 through 4-51 are switched over to transmit the lower byte of the azimuth value for that particular radial. The hexadecimal representation of the azimuth value requres that the value be transmitted in two distinct bytes in that the data bus is limited to an 8-bit byte. The flip-flop 4-61 controls the switching of the Data Bus mul- tipelexers. This flip-flop will be set when the contents of the Range Counter reach a count of 512 which action clears the flip-flops 4-62 and 4-63 whose outputs are, in turn, coupled to the select inputs of the multiplexer chips.

Once a complete radial has been transmitted, signals picked off of the Address Counters 5-34, 5-35 and 5-36 and fed back to the AND gate 5-54 which decodes the fact that the DMA cycle has been completed. The output from gate 5-54 is applied as an input to inverter 5-55 whose output is OR'ed with a timing pulse T5 in the gate 5-56. Following the output of this gate, it is applied to a further gate 5-57 whose other input is the Master Reset from the push button on the front panel. The output of gate 5-57 serves to reset the DMA Request flip-flop 5-30 which, in turn, will reset the DMA flip-flop 5-42. The net result, then, is that the D-VIP interface board is prepared for the receipt of a subsequent radial. It is at this point that the processor is advised that it again may have access to its memory. It then begins to process the radial which is currently stored in the memory. The foregoing process is repeated until the level and azimuth data for 720 radials have been stored in the Microprocessor's memory. The 720 radials, of course, corresponds to a $\frac{1}{2}°$ resolution.

Circuitry is provided for ensuring that all operations are performed on a timely basis. In this regard, a one-shot circuit 5-58 and an associated flip-flop 5-59 is provided. These circuits detect the performance of a valid DMA operation. So long as the DMA flip-flop 5-42 gets set once every 25 milliseconds (corresponding to the time between successive radials) the one-shot 5-58 will be repetitively triggered and will not time out. When the one-shot circuit does ultimately time out, it should correspond to the receipt of 720 radials by the microprocessor's memory.

The gates 5-61 and 5-62 receive as their inputs the values on the Address Bus and when a hexadecimal FFF3 is detected, gate 5-62 will be satisfied. The FFF3 pattern is applied to the Address Bus by the processor at the time that it begins to status the modulator to determine whether it is busy. If the one-shot 5-58 times out to set the flip-flop 5-59, then the FFF3 condition should prevail. If that code pattern is not present at the timing out of the one-shot 5-58, it indicates that the Processor's memory did not receive the full 720 radials. Assuming that the 720 radials were not received, the Processor sends a reset to the D-VIP Interface board causing the entire operation to start over.

Another fault condition which must be taken care of is the possibility that the radar's antenna stops rotating. Of course, if the antenna is not rotating, then the system should be apprised of this so that it will not undertake to transmit meaningless 0 signals. Referring to FIG. 4b, a one-shot circuit 4-64 is connected to receive trigger pulses from the output of the OR circuit 4-28 which is part of the $\frac{1}{2}°$ circuit. Obviously, if the antenna is not rotating, there will be no 0 or 0.5 degree outputs from gate 4-28. Should the antenna stop, there will be no outputs from the decoder 4-21 and the flip-flops 4-24 and 4-26 will not be switching back and forth. This results in the absence of toggling pulses at the output of OR gate 4-28, allowing the one-shot to time out. Stated otherwise, unless pulses are produced at the output of gate 4-28 at the $\frac{1}{2}°$ rate, the one-shot 4-64 will time out, causing its output to go low and clearing the counter 4-65 as well as the flip-flop 4-66. When flip-flop 4-66 clears, it generates an interrupt via gate 4-67 and inverter 4-68. This interrupt goes to the processor and when detected, it sends a "lock-up" code to the modulator 52 (FIG. 2b) causing the modulator to put a specific frequency on the phone line indicative of the fact that the antenna is not turning. Thus, the receiver will know that information is not being obtained at the transmitter from the NWS radar.

When the antenna is restarted, the circuitry contained in the transmitter of the present invention is able to sense when the antenna is again up-to-speed. Specifically, as the antenna rotates and the azimuth information comes in from the synchros to the azimuth latches 4-52 through 4-54, at the 80° mark the input to stage $D_3$ of the latch 4-53 will go low and the signal will pass by way of a conductor 4-69 and a filter circuit comprised of resistor 4-70 and a capacitor 4-71 to the input of inverter 4-72. The resulting high output signal is applied as a toggle to the counter 4-65. In that the flip-flop 4-66 has its toggle input connected to stage $Q_2$ of the counter 4-65, the counter must accumulate four pulses from the output of inverter 4-72 before the flip-flop 4-66 can be toggled. As the azimuth is in a binary coded decimal (BCD) format the 80° mark will occur only at 080°, 180°, 280° or just marks three times per antenna revolution. Therefore counting four 80° marks ensures the antenna has made at least one complete revolution without hesitating. Once four 80° pulses have been detected at counter 4-65, the flip-flop 4-66 is set and the interrupt from the output of the inverter 4-68 is removed. The disappearance of that interrupt permits the system to again function in its usual manner.

The transmitter of the present invention includes further circuitry functioning as a failsafe protection in the event of a lock-up of the radar, the processor or perhaps even other circuitry on the D-VIP Interface board 28. Identified by numeral 5-61 is an integrated ciruit Type-555 timer. It receives as its input the "hold" tone from the Modulator, which tone occurs between each of the range frames transmitted. Thus, when the modulatoer goes into its "hold" condition, it initiates the running of the timer 5-61 which is preset to approximately 20 seconds. If the timer times out and the antenna is rotating as indicated by the signal obtained at the clear output of flip-flop 4-66 (which is applied as a second input to the gate 5-62), the one-shot circuit 5-63 will be triggered to produce a reset signal at the output of inverter 5-64. This reset signal, like the master reset from the push button switch on the transmitter's front panel, goes to the gate 5-57 and serves to reset most of the circuits on the D-VIP Interface board, again initializing the circuits for subsequent activity.

Summarizing the operation of the D-VIP Interface which has now been explained in detail, as long as the radar antenna is rotating the D-VIP Interface board will repetitively take in the 720 radials while the processor does a radial-by-radial transformation of polar coordinate data to rectangular coordinate data and stores it in a 256×256 format compatible with the receiver.

Next, the Processor adds the maps stored in the MAP PROM 40 (FIG. 2b). Once that is done for the range in process, i.e., 60 or 120 or 180 to 240 nautical mile presentation, the Processor will be statusing the Modulator and waiting for the Modulator to complete the transmission of the current picture which is in process. Next, once the Processor detects that the Modulator is not busy, it will transfer the image from the Processor's Random Access Memory 36 into a 32K×8-bit buffer on the Modulator board. Once that transmission has been completed, the CPU of the Microprocessor will send a command to the Modulator directing it to send that data from the buffer to the appropriate receiver via the telephone lines and will immediately begin constructing the next "picture" in the manner previously described. Thus, while the CPU is constructing the next batch of data for transmission, the Modulator is in the process of sending the current data. This process continues on a repetitive basis.

This substantially completes the description of the D-VIP Interface board 28 and the specific details of its logic implementation. Consideration will now be given to the Modulator board 52 and in this regard, the detailed logic depicted by FIGS. 6 and 7 will be explained.

Figure 6:
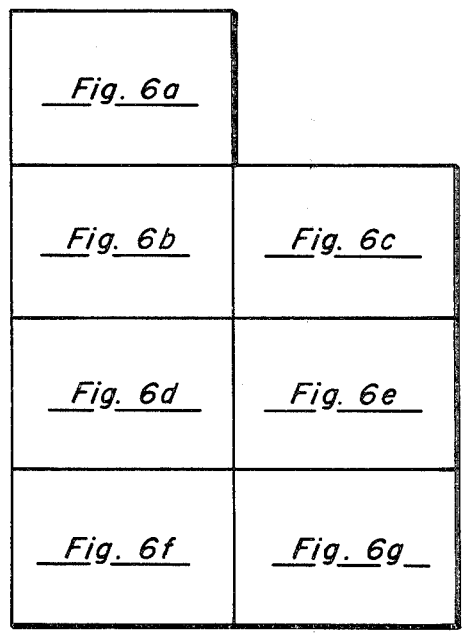
FIG. 6 shows the manner of arranging FIGS. 6a through 6g in forming a composite electrical schematic diagram.
Figure 7:
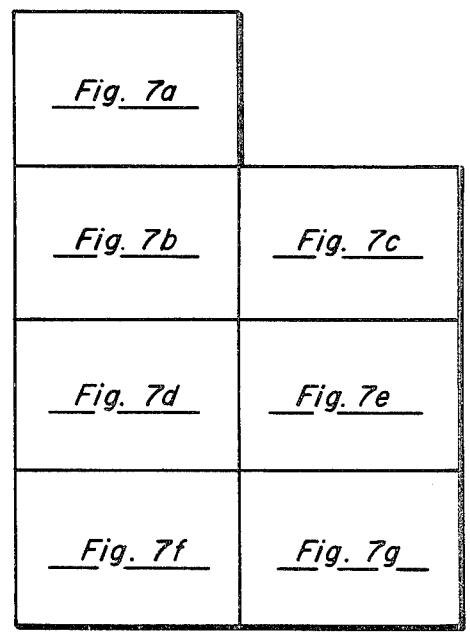
FIG. 7 shows the manner of arranging FIGS. 7a through 7g in forming a composite electrical schematic diagram.

MODULATOR BOARD-FIGS. 6 and 7

The Modulator board has three principle functions:
(1) To receive the information stored in the Microprocessor's RAM;
(2) To perform data compression and truncation on the received data; and
(3) To transmit the compressed and truncated data to a calling receiver site via the telephone linkage.

Figure 6B:
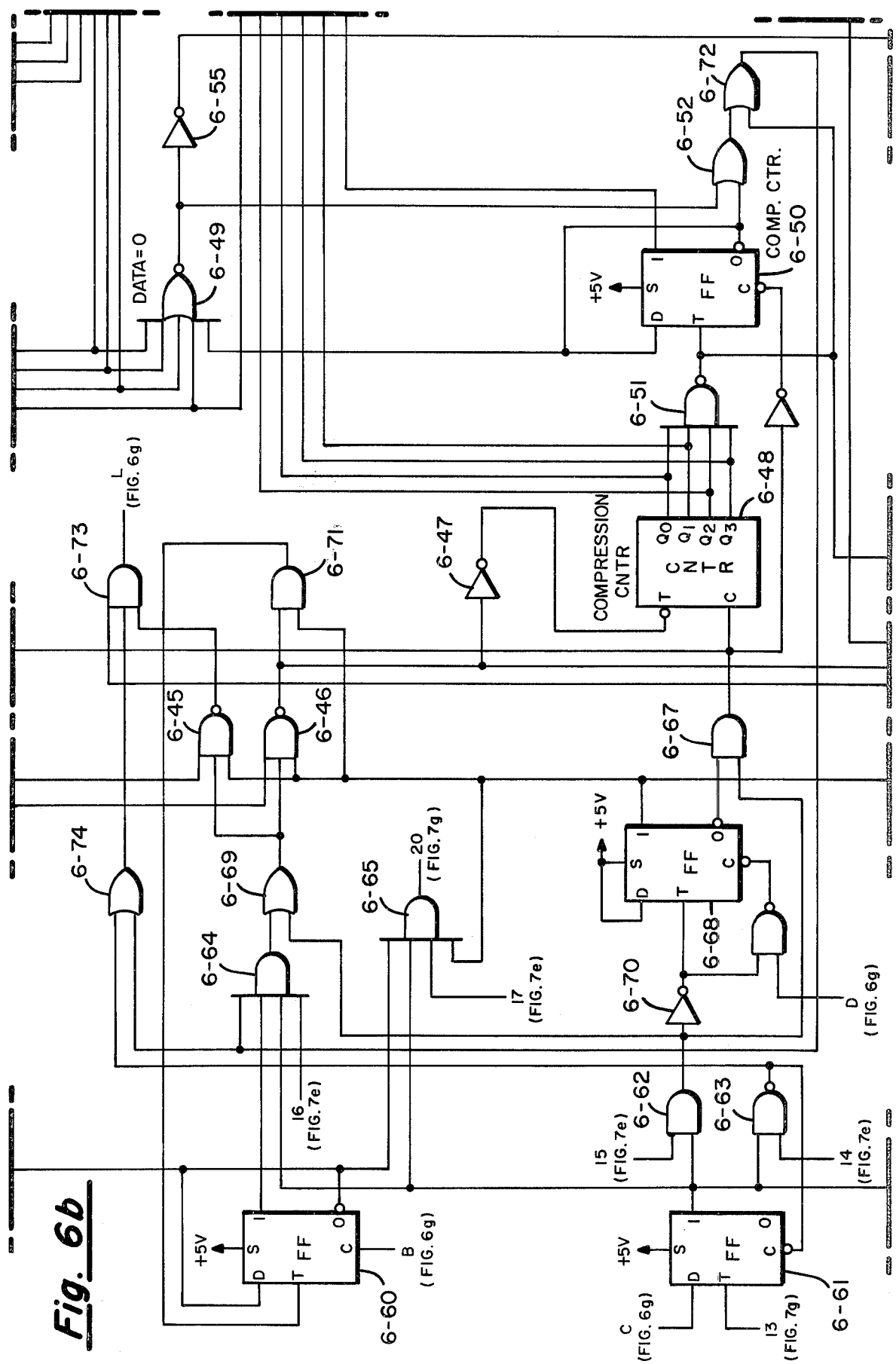
Figure 6C:
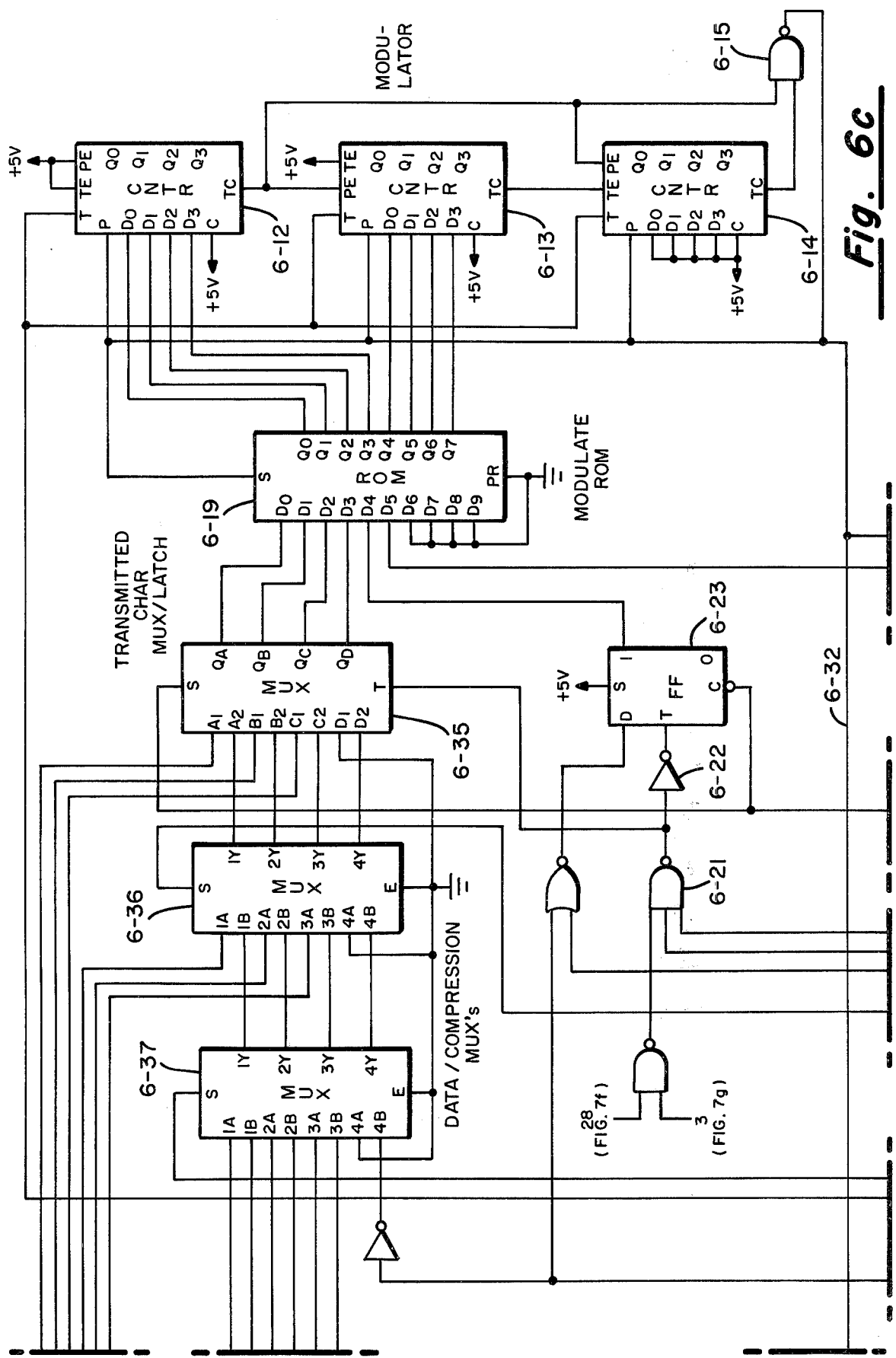
Figure 6D:
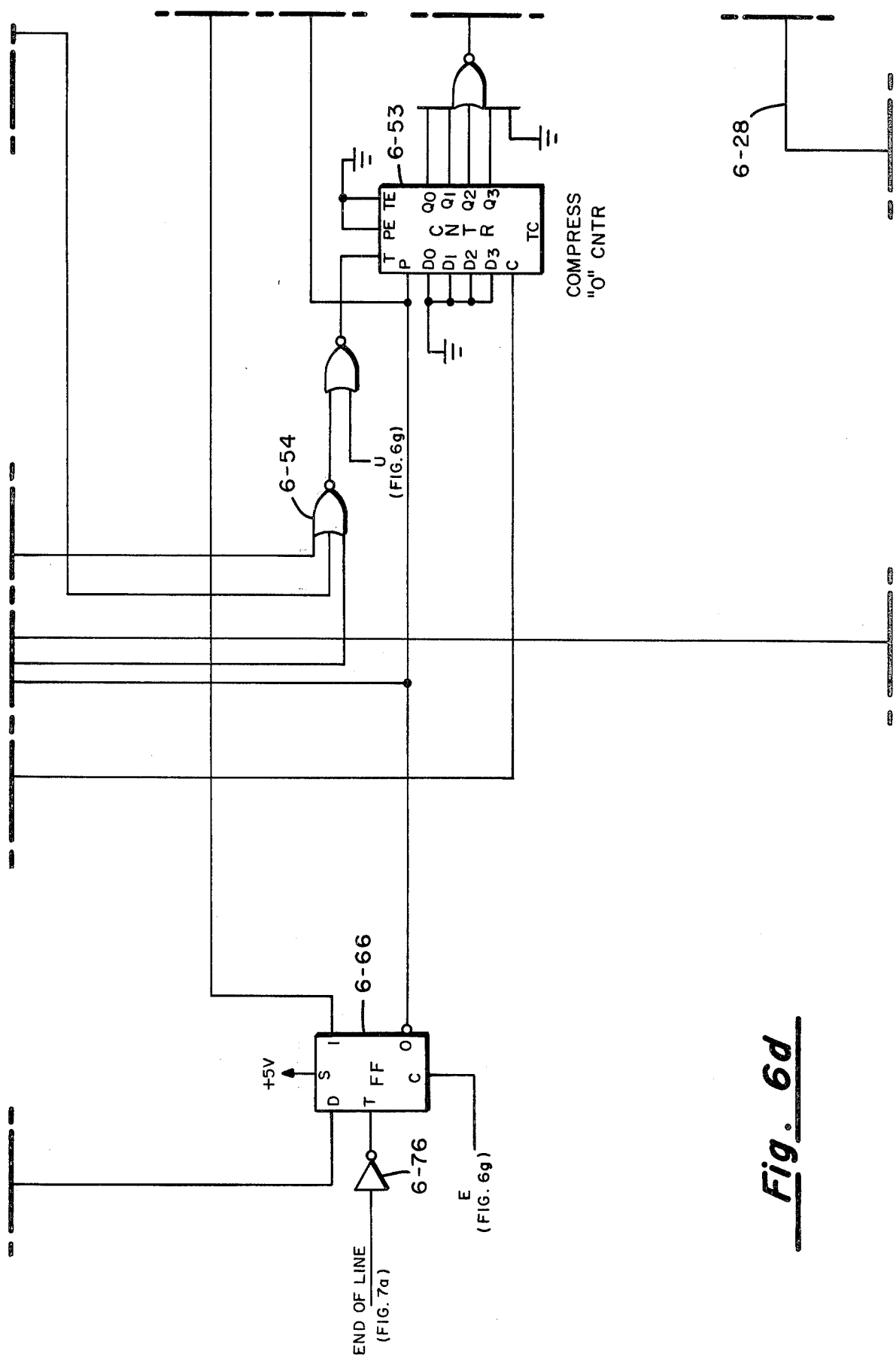
Figure 6F:
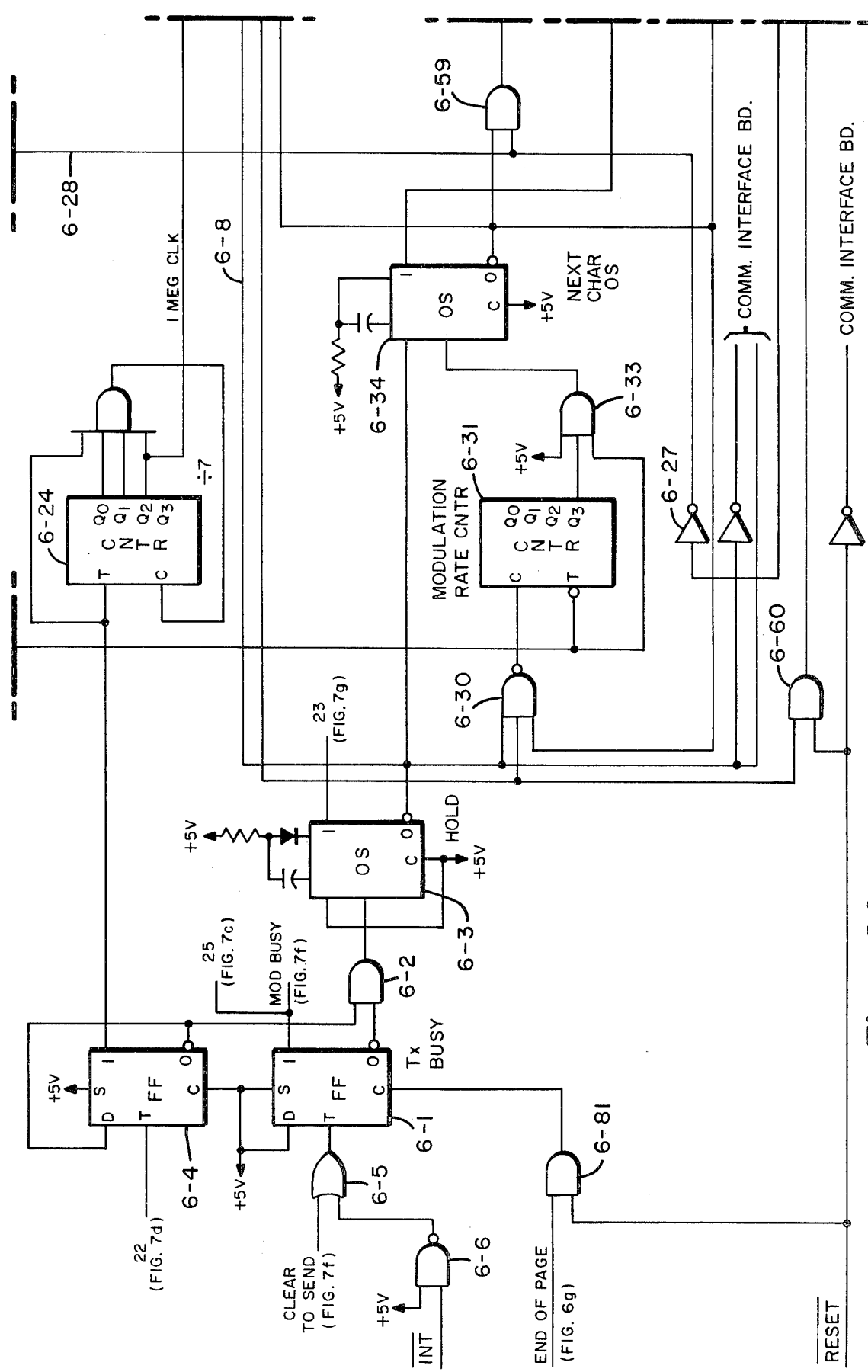
Figure 6G:
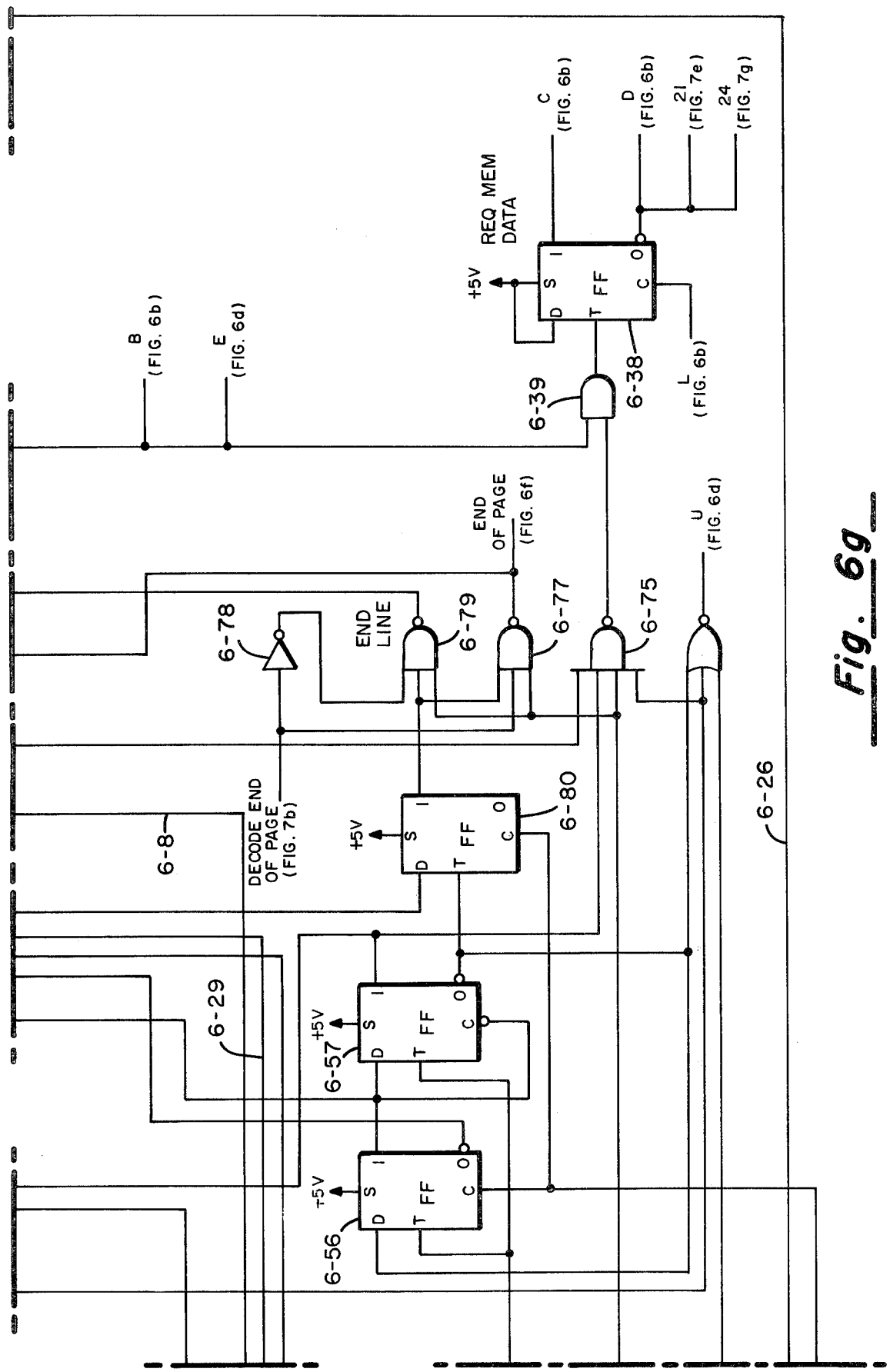

Before the Modulator can receive the data from the Microprocessor's memory, it must not be in the process of sending data. Referring to FIG. 6f, a so-called Transmitter Busy (TX Busy) flip-flop 6-1 is provided and, as will be further explained, this flip-flop will set whenever the Modulation circuit 68 is sending data out over the phone lines. When the transmitter is on "hold", the TX Busy flip-flop 6-1 clears and thereby enables the AND gate 6-2 to pass clock pulses through it to the trigger terminal of the Hold one-shot circuit 6-3. The clock pulses originate at the clock oscillator which may be operating at the 14.31818 MHz rate common to the TV standards and are applied to the toggle input of a divide-by-two flip-flop 6-4 such that the clock pulses passing through the gate 6-2 when it is enabled are at a frequency of 7.15909 MHz. So long as the gate remains enabled by virtue of the fact that the busy flip-flop is not set, these clock pulses will maintain the Hold one-shot in its set condition. In order for the Processor to determine the condition of the TX Busy flip-flop 6-1, it sends out a Status Request to the Modulator board. That Status Request arrives over the Address Bus 46 in FIG. 2 which corresponds to the 16 input lines identified by numerals 7-2 and 7-3. All of the commands have the format FFFX in the hexadecimal number system. The gates 7-4 through 7-7 decode the FFF pattern, i.e., the upper 12-bits of the 16-bit address being all 1's, and the remaining 4-bits of the command are applied by the line 7-3 to a Command Decoder 7-8. By decoding these 4-bits, it is possible to have 16 individual commands emanating from the Command Decoder 7-8. In the preferred embodiment of the present invention, however, only 8 of these 16 possible commands are utilized. When checking status, the Processor presents the command FFF3 to the decoder 7-8 and when that code pattern is so applied the $Q_3$ output thereof will go high and the Modulator board is then effectively being asked by the Processor, "Are you busy?".

The Modulator board then responds by indicating to the Processor the condition of the TX Busy flip-flop 6-1 by placing an appropriate signal on the Data Bus which is indicated generally by the numeral 7-9. The manner in which this is accomplished will now be explained. The Data Bus lines 7-9 emanate from a so-called Data/-Status multiplexer comprised of intergrated circuit chips 7-10 and 7-11. As the name suggests, the multiplexer can selectively apply either data representing signals or status representing signals on the Processor's data bus 7-9, depending upon the binary state of the select signal applied to these multiplexers. When the Status Request line coming from the Command Decoder 7-8 is high, status type information will be presented to the bus. Thus, when the TX Busy flip-flop 6-1 is set, the output from its "1" side is applied as an input to the multiplexer chip 7-10 and, assuming that the "Status Request" command had been received from the Processor, the Modulator board would respond by signifying the busy or not busy state of the modulator back to the Processor.

Assuming that the Modulator is not in its sending mode and therefore the TX Busy flip-flop is cleared, when this fact is signaled over the Data Bus 7-9 to the Microprocessor, it must function to transfer the data from its Random Access Memory 36 to the 32 K×8 RAM 54 on the Modulator board (FIG. 2). To effect this data transfer, the Processor must advise the Modulator board that it has, in fact, placed data on the Data Bus so that it can be sampled and stored away in the Modulator's RAM. The signal that the Microprocessor presents to the Modulator Control logic is the "Write" command which, in the system herein described, is a FFF0 pattern. When this pattern is applied to the Command Decoder 7-8, it outputs a signal to the gate 7-12 termed the "Write gate" and signifies to the Modulator Control logic that there is valid data present on the Data Bus. The Modulator then responds by latching the data into the latches 7-13 through 7-16. The data itself arrives at the input to these latches from the Data Bus 7-9, it being understood that the flags A through H on the lines 7-9 are connected to the corresponding flags at the inputs of the inverters which are indicated generally by numeral 7-17.

Once the data byte is held in the latches following decoding of the Write command and the toggling of the Memory Input Data latches by the output from the Control flip-flop 7-18, it is available for Writing into the Memory itself.

Identified by numeral 7-20 is the 32 K × 8 bit dynamic Random Access Memory corresponding to the RAM 54 in FIG. 2.

At this point it is well to mention that a given picture actually consists of 65 K × 4 bits. Instead of transferring each byte individually, 4-bit bytes are individually transferred, two at a time, over the 8-bit Data Bus. In this fashion, it is possible to transfer two picture elements or pixels at the same time. They are stored in Memory as an 8-bit byte instead of a 4-bit byte. It is apparent also that when the Processor issues a Write command it must also present an address to the Memory so that the data will be stored at a predetermined address. The memory addresses are developed in the Memory Address Register comprised of the interconnected counter stages 7-21 through 7-24. For convenience, data is entered into the Modulator RAM starting at address 0 and proceeding to address 7FFF. When the first byte of data is received, the Memory Address Registers 7-21 through 7-24 are cleared and the first byte is therefore written into memory address 0.

Those skilled in the art will further recognize that additional timing requirements are needed to perform the Write operation. Typically, row address strobes and column address strobes (RAS & CAS) must be generated at appropriate times and that is the function of the Memory Controller chip 7-25. This controller chip is timed by the output of the memory control timing chain 7-26 which comprises a shift register that is adapted to be stepped at a 14 MHz rate by the output from the clock oscillator 7-1, the latter being coupled to the timing chain 7-26 by an inverter 7-27. The Reference Clock input for the Memory Controller 7-25 is somewhat slower than the toggling rate of the Memory Control timing chain 7-26. Specifically, it will be noted that the output from the clock oscillator 7-1 is applied to a counter whose stage 0 and stage 3 outuputs are decoded by gate 7-29. The counter 7-28 then functions to divide the oscillator output rate by a factor of 9 and the resulting output is applied to a flip-flop 7-30 which is a divide by two circuit. Hence, the frequency of the clock signals appearing at the junction 7-31 is the overall oscillator rate divided by 18 or approximately 0.8 MHz. It is apparent, then, that the Memory Control timing chain 7-26 produces a greater number of so-called "T-times" for each master clock cycle. Specifically, in the arrangement employed herein, a complete pass may be made through the timing chain 7-26 for each half cycle of the master clock signal appearing at junction 7-31. This is necessitated by the fact that dynamic RAM's are employed as the storage element and they must be periodically refreshed to prevent loss of the data stored therein. The technique employed herein allows ½ cycle of the master clock for memory references, i.e., read or write operations, and the other ½ cycle for performing the refresh operation.

To control the alternate read/write reference and refresh cycles, a flip-flop 7-32 is provided which is driven by the complementary output from a further toggle flip-flop 7-33 driven by the master clock. The flip-flop 7-32 has its "1" output coupled as a first input to gate 7-34 and its second input comes from the Write gate 7-12. Hence, when in a Write mode, and when the flip-flop 7-32 is set, a pulse is applied to the Memory Controller 7-25 to place it in the reference mode. The clear side of flip-flop 7-32 is coupled to the refresh terminal of the Memory Control chip 7-25 such that these two operations occur on an alternating basis.

To ensure that each memory cell in the memory is refreshed, a Refresh Counter comprised of chips 7-35 and 7-36 is provided. The clock pulses appearing at the junction 7-31 are applied to the toggle terminals of each of these counter chips such that they are advanced for each refresh cycle which is ½ the master clock rate. When the Memory Controller chip 7-25 outputs a refresh enable signal, it is applied by way of conductor 7-37 to an input of inverter 7-38 which goes to the output disable (OD) inputs of the Refresh Counter. Being tristable counters, the outputs from the Row/Column Address multiplexers 7-39 and 7-40 are effectively disabled while the Refresh Counter is stepped.

The multiplexers 7-39 and 7-40 are the means utilized for supplying row and column addresses to the memory 7-20. Because there are only 7 address lines to the memory chip, there is a need for both a row address and a column address. When the select signal applied to the multiplexer chips 7-39 and 7-40 are in a first state, the lower 7-bits, i.e., the bits from the memory registers 7-23 and 7-24, are applied to the Memory inputs, whereas when the select signal on the multiplexer is in its opposite state, the upper 7-bits from Memory Address Registers 7-21 and 7-22 are applied to the Memory. The lower 7-bits comprise the row address while the upper 7-bits comprise the column address. The select signal comes from the Memory Controller chip 7-25 by way of a conductor 7-41.

It can be seen, then, when the FFF0 command (the Write command) is received by the decoder 7-8, a Memory Write cycle is initiated such that the byte stored in the Memory Input Data latches 7-13 through 7-16 can be stored into the dynamic RAM under control of signals obtained from the Memory Controller chip 7-25 which, in turn, is driven by the master timing chain 7-26. During the Write operation, the Memory Address Register 7-21 through 7-24 is incremented. Specifically, when the output "$Q_G$" from the Memory Control timing chain 7-26 goes high, it will pass through gate 7-42, that gate having been enabled by the output from the flip-flop 7-32 which is in its set condition during a Write operation. The output from gate 7-42 propagates through the further gate 7-43 and 7-44 and via the OR circuit 7-45 to the toggle input of the address register stages 7-21 and 7-22. In a similar fashion, the output from the OR gate 7-46 is applied to the toggle input of the Memory Address Register chips 7-23 and 7-24. The incrementing of the address counter, then, sets up the address for the next byte which the Processor is to output upon receipt of another FFF0 Write command being detected upon the Address Bus 7-2.

This process continues until the Processor indicates that a complete message has been transferred from its Random Access Memory 36 into the RAM 7-20 on the Modulator board. When the Processor has completed its data transfer from its RAM to the Modulator board, it transmits a "Clear-to-Send" command, indicating that the assembled message can now be sent from the Modulator board out over the phone lines to the receiving site. The Clear-to-Send command comprises the hexadecimal code FFF1. This command, when received by the decoder 7-8, causes a signal to emanate from state $Q_1$ thereof and to be applied over the lines 7-47 to the flip-flop 7-48, which flip-flop is set during a Write operation. The Clear-to-Send signal then clears this flip-flop and precludes any further incrementation of the Memory Address Registers. Thus, no further Write operations can take place.

It is well to mention at this point that whenever the system is operating, the Address Bus is servicing either the D-VIP Interface board or the Modulator board. Accordingly, means must be provided for advising the CPU's memory that a particular address being presented does not pertain to the Processor's RAM 36, but instead belongs either to the D-VIP board 28 or the Modulator board 52 (FIG. 2). Anytime a command is detected at the output of the decoder 7-8 is it applied via the open collector inverters 7-49 through 7-53 and their wired OR outputs to produce a signal out from the further inverter 7-54 which, in turn, is coupled to the input of a tristate inverter 7-55 via OR gate 7-56. The output from tristate inverter 7-55 comprises the so-called "Transfer Acknowledge" ($\overline{XACK}$). This signal is the means whereby the Modulator board advises the processor that the data presented to it has been sampled. Were it nor for the $\overline{XACK}$ signal, the Processor would remain in an idle state awaiting further activity. It will be recalled that when a Write into memory was taking place, a $\overline{XACK}$ signal was also required. In the present situation, the Processor is writing or moving data to either the D-VIP board or to the Modulator board. In this instance also, the Processor requires this $\overline{XACK}$ signal to let it know that a transfer has been completed. Anytime a FFFX pattern is applied to the Memory Address Bus 7-2, the logic circuits 7-4 though 7-7 decode this pattern and a signal passes through the gate 7-57 to produce the command "Memory Inhibit" ($\overline{ME\text{-}MINH}$) at the output of inverter 7-58. This signal is applied via the Control Bus and functions to inhibit the Processor's memory 36. Thus, the addresses, FFF and above, relate to the Modulator board or the D-VIP board rather than the Processor's memory. Normally, if the processor were writing into its memory, the memory would provide the $\overline{XACK}$ signal. Here, however, the Modulator board must provide that response to the Processor.

Figure 7B:
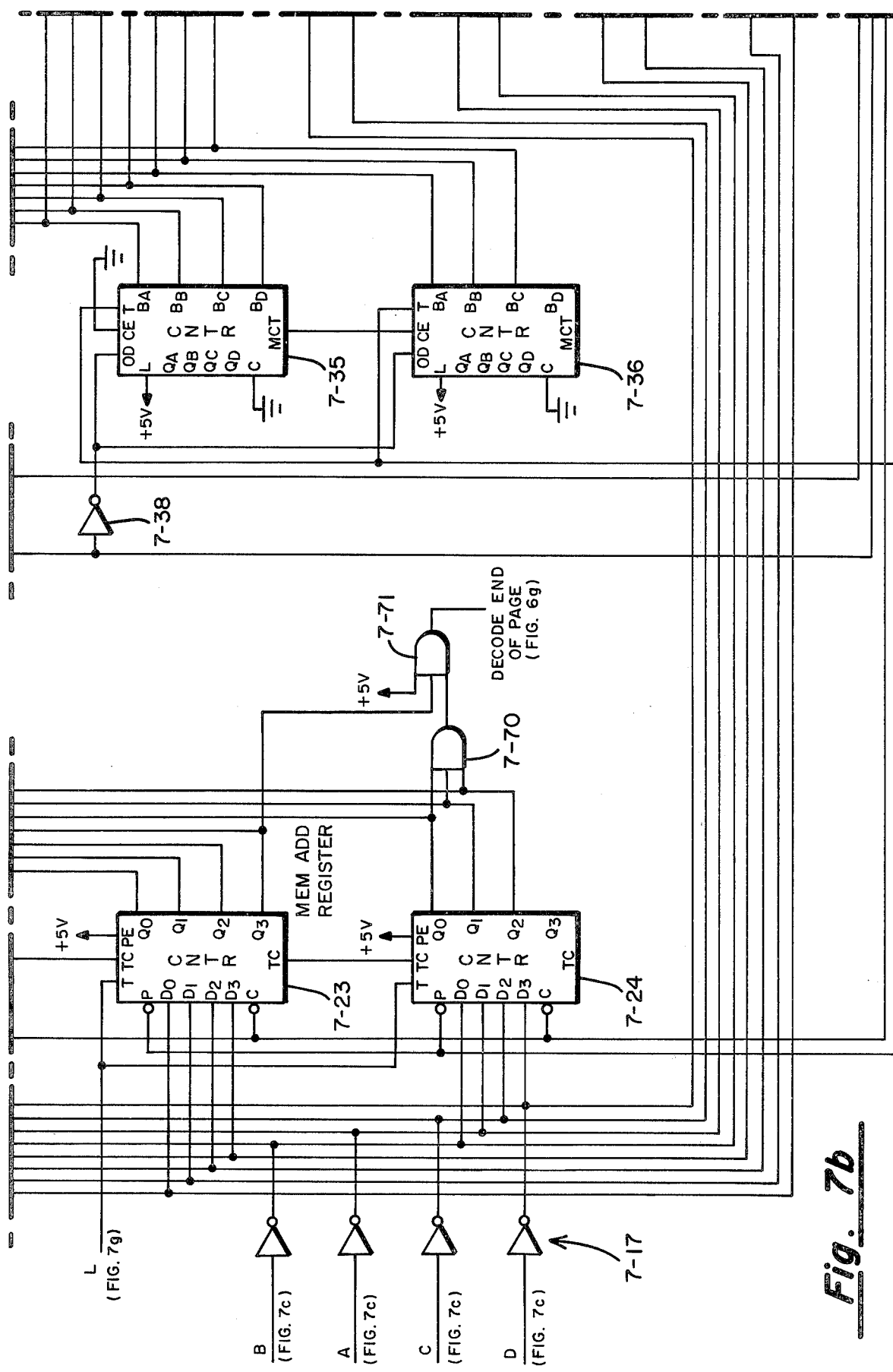
Figure 7C:
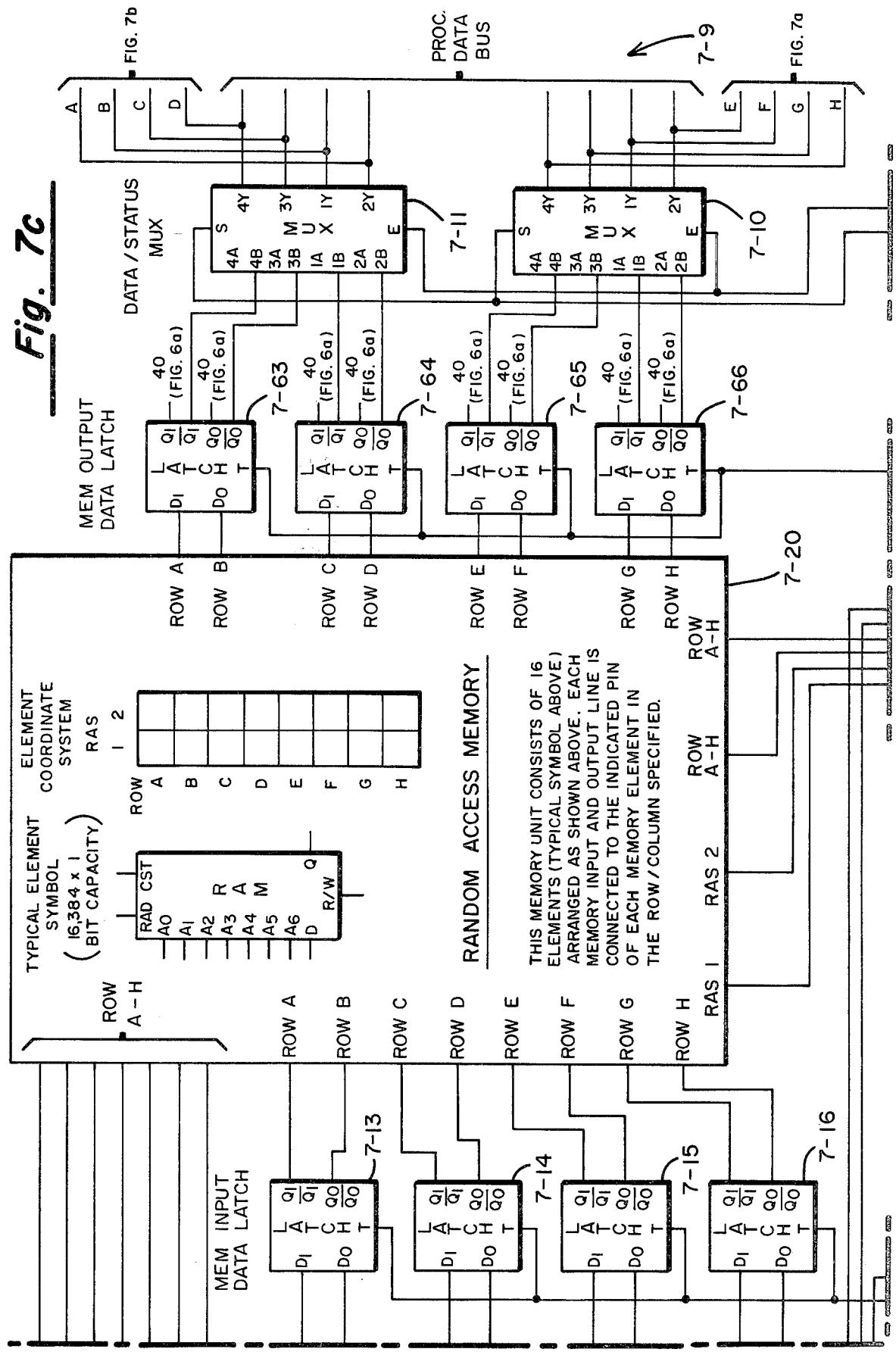
Figure 7D:
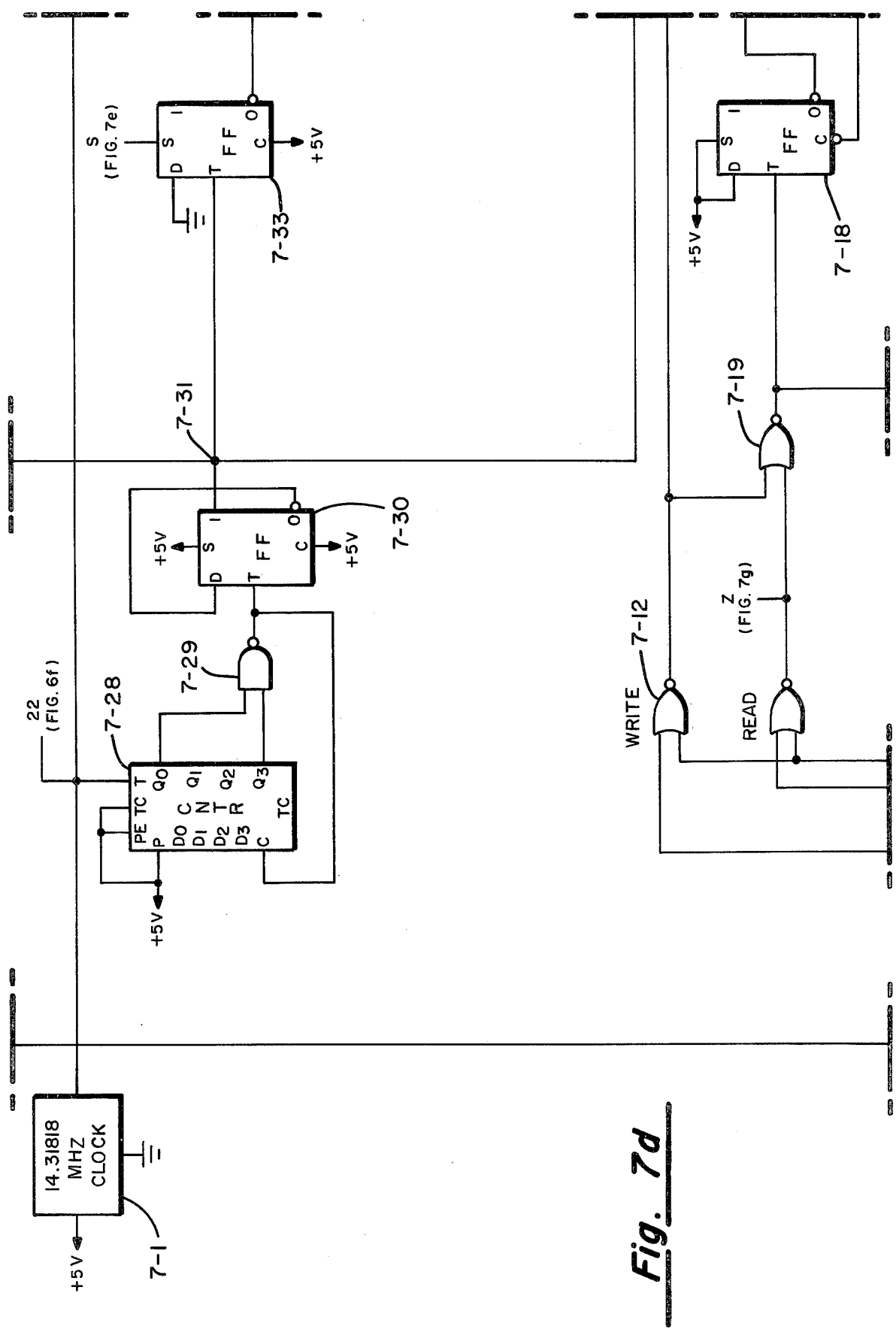
Figure 7E:
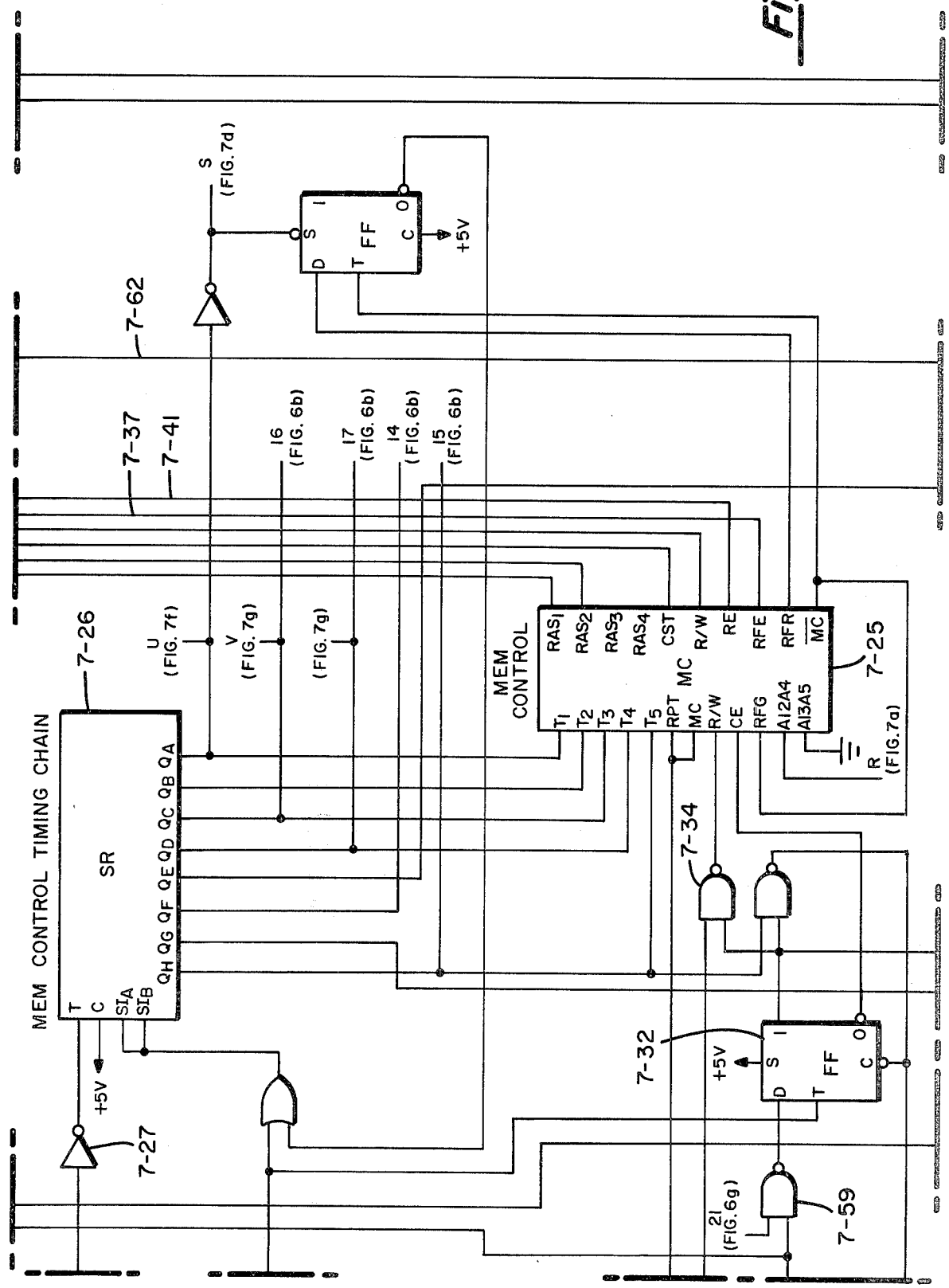
Figure 7F:
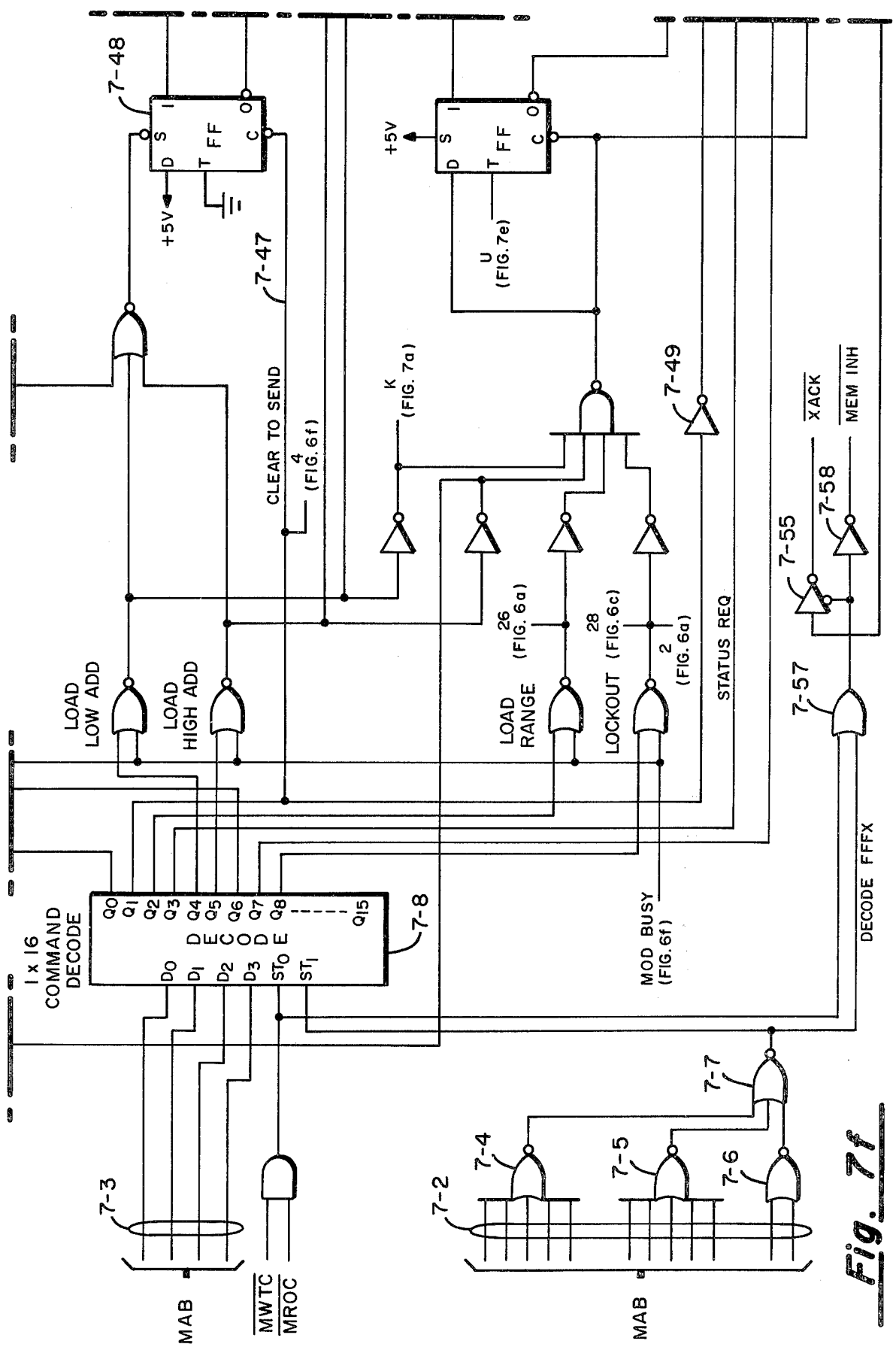
Figure 7G:
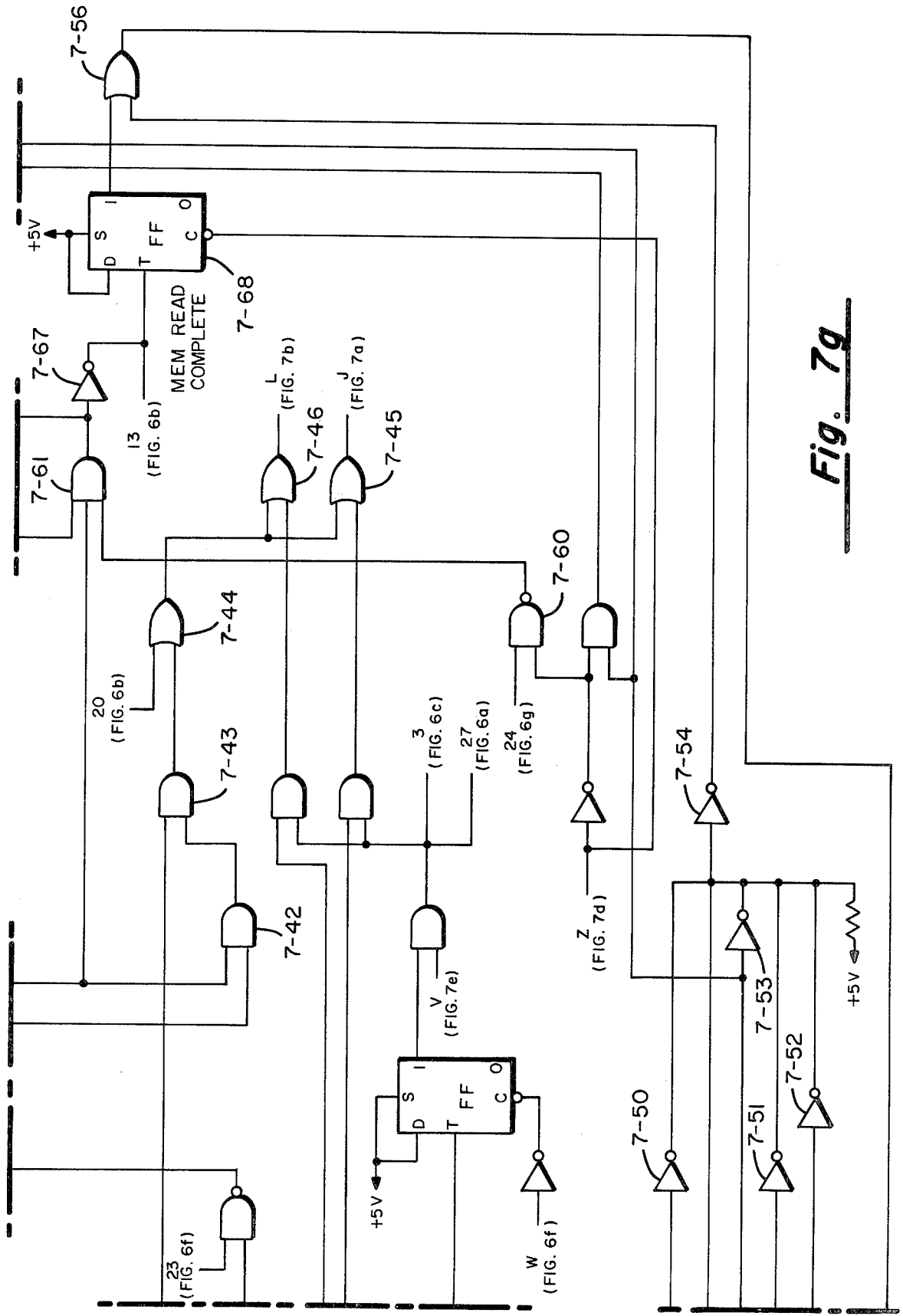

As is indicated, the "Clear-to-Send" signal from the decoder 7-8 is also applied as an input to gate 6-5 whose output is connected to the toggle input of the Transmit Busy flip-flop 6-1. The other input to OR circuit 6-5 comes from the gate 6-6 which receives interrupt signals from the Processor. It will be recalled when the details of the D-VIP interface board were being described, in the case of an interrupt occasioned by the stopping of the radar's antenna, no information could be sent out to a receiving site. That, of course, was controlled by the condition of the Transmit Busy flip-flop 6-1. If the antenna is rotating and a "Clear-to-Send" command is generated, then the Transmit Busy flip-flop 6-1 is again set to indicate that the transmitter is busy. The setting of the flip-flop 6-1 removes the enable signal from gate 6-2 and no further clock pulses may pass therethrough to hold the one-shot circuit 6-3 from timing out. As a result, the one-shot 6-3 begins its period of instability providing at least a three second interval between adjacent frames so that the remote receiver to which the information is to be transmitted has time to get into synchronization with the transmitter. Thus, as soon as the one-shot circuit 6-3 times out, the process of sending the data from the Modulator board's memory begins. Referring again to FIG. 7f, mention should be made of certain other commands produced at the output of the decoder 7-8, e.g., "Read", "Load Low Address", "Load High Address" commands. These three commands are not specifically used in the process of the transmitter sending data to the receiver. They are used principally for test purposes. Stated otherwise, it allows the Modulator's memory to be tested by the Microprocessor. For example, the Processor may load a specific address for the Modulator's memory and read an/or write data at that location. In the normal operating processes, however, the Processor does not read the contents of the Modulator's memory, but only writes into it.

The logic used to control the reading of data from the Memory 7-20 is quite similar to that used in executing the Write command. The Processor sets up the logic on the Modulator board to perform a memory cycle and if it is a "read", the data is read out from the memory 7-20 and ultimately through the multiplexers 7-10 and 7-11 to the data bus 7-9. Instead of sending each individual byte, that is, 256 of them in a given scan or row, if there are a number of pixels in a row that are the same, a single byte defining that pixel is transmitted along with a compression count identifying the number of times that byte is to be reproduced in the received picture. This operation is the "compression" step which was explained generally when the overall general block diagram of FIG. 2 was considered. Most of the logic for implementing the compression step is set forth in FIGS. 6a and 6b. It examines sequential bytes read out from Memory and determines whether equality exists between each successive byte and when equality prevails, a Compression Counter is incremented. More specifically, once the processor sends the "Clear-to-Send" command, which is FFF1, the resulting signal at gate 6-5 sets the "Transmitter Busy" flip-flop 6-1 and allows the "Hold" one-shot 6-3 to time out. At this point, it is desired that the system send out a sync signal. It will be noted that the output from the Hold one-shot 6-3 is applied to the data terminal of a flip-flop 6-7 via conductor 6-8, thereby putting an enable on that flip-flop. This flip-flop is used to synchronize the logic to the clock in that a synchronous form of modulation is utilized in the system. To avoid frequency shifts at half-cycle points, the circuitry of the present control logic awaits a pulse edge from the clock or from the data stream. While sending Hold pulses, when a transition in the data stream is detected, flip-flop 6-7 enables the gate 6-9 which, in turn, sets the Sync flip-flop 6-10. When this Sync flip-flop sets, a signal whose frequency indicates that it is a sync signal is sent to the receiver. The signal from the flip-flop 6-10 also goes to the Sync Counter 6-11. Because a longer burst of sync signals are sent than the rest of the transmitted bytes, it ensures that a 14 half-cycle recognizable signal is obtained. In that the rate of modulation is controlled by counting the number of half cycles of each burst sent, the counter 6-11 permits the logic to identify the particular tone involved.

As was explained earlier, the system of the present invention employs nine separate and distinct tones for conveying the background, the six precip levels defined by the National Weather Service, and sync tone, respectively. The bandwidth chosen for the transmitted tones is from 1200 Hz to 199 Hz, these levels being well within the capabilities of commercial voice grade telephone transmission lines.

The Modulator itself comprises the counter 6-12, 6-13 and 6-14, and AND gae 6-15, the inverter 6-16, the flip-flop 6-17 and the further inverter 6-18. The way modulation is achieved is that the counters 6-12 through 6-14 are preloaded with a predetermined value and then the counter is allowed to count up until it is full, i.e., storing hexadecimal FF. When this value is reached, AND gate 6-15 is satisfied and the flip-flop 6-17 is toggled. Thus, the value initially entered into the Modulation Counters 6-12 through 6-14 determines the output frequencies. A different value is preloaded for each character that it is desired to send. A value which is preloaded into the counters comes from the Modulate ROM 6-19. That ROM is addressed by each character and by a sync so that for any given address applied to it, there is stored in the ROM the value that is to be put into the Modulation Counter to arrive at the desired selected frequency. Just how this is achieved will now be explained.

When the Sync flip-flop 6-10 is set, its complement output is applied by a conductor 6-20 to gate 6-21 whose output is coupled through an inverter 6-22 to the toggle terminal of a flip-flop 6-23. When this last-mentioned flip-flop is set the address for the sync tone is applied to the ROM 6-19 and the output from the ROM is the "predetermined value" that must be entered into the modulation counter 6-12 through 6-14 to cause it to repetitively count up and switch the flip-flop 6-17 at the rate indicative of a sync tone, which in the system of the present invention is 1200 Hz. The signal for incrementing the Modulator counter 6-12 through 6-14 is a 1 megacycle clock. Specifically, the 14.31818 Mhz oscillator has its output frequency difided by two at flip-flop 6-4 and then again by seven at the counter 6-24. Hence the signal applied to the toggle input of the Modulator Counter is the orginal 14 MHz oscillator output effectively difided by 14.

The sync frequency remains on the data output line from inverter 6-18 until the Sync flip-flop 6-10 is cleared. This occurs after the completion of 14 half-cycles or 7 full cycles of that tone. When this occurs, the output from the Sync counter 6-11 is decoded by the gate 6-25 and its output is coupled by a conductor 6-26 to an inverter 6-27 whose output is coupled by conductor 6-28 to the clear input of the Sync flip-flop 6-10.

The output from the clear side of the Sync flip-flop 6-10 is applied via conductor 6-29 to a first input of gate 6-30. If the system is not in "hold" the one-shot circuit 6-3 is cleared and the Modulation Rate counter 6-31 can assume control and may be used to count the number of half-cycles of each data character being transmitted. Only 8 half-cycles of each tone are sent. This counter, then, counts the transitions in the data stream. As such, it is actually counting half-cycles of data. The output from the gate 6-15 is applied by way of the conductor 6-32 to the toggle input of the Modulation Rate counter 6-31. The gate 6-33 at its output checks when the count value reaches eight and the output from this last-mentioned gate indicates when the Next Character is to be transmitted. Specifically, the output from gate 6-33 is applied to the Next Character one-shot 6-34 and that circuit produces a pulse for each change of characters. In other words, when one character is completed and the system is to begin to modulate the Next Character, one-shot circuit 6-34 will produce a pulse.

It will be apparent to those skilled in the art that it is also necessary to control the address applied to the Modulator ROM 6-19 and that it is, in effect, that address that defines what the output tone frequency will be. The address entered into the modulator ROM 6-19 comes from a latchable multiplexer chip 6-35. This integrated circuit device selects and stores the character that is currently being transmitted. Its output addresses the ROM 6-19 to produce the specified frequency. The first set of inputs to the latch 6-35 are applied to the terminals $A_2$, $B_2$, $C_2$ and $D_2$ comprise the output of the so-called Data/Compression multiplexers which are identified by numeral 6-36 and 6-37.

Backing up for a moment, when the modulator first went into sync, a further flip-flop termed the Request Memory Data flip-flop 6-38 had been set via the output from gate 6-39. In that a first input to gate 6-39 comes from the output of gate 6-9 it can be seen that at the same time that the Sync flip-flop 6-10 had been set the gate 6-38 had also been set. The function of the Request Memory Data flip-flop is to request the control logic associated with the modulator's memory 7-20 to read a byte of data out from that memory. The output from the 0 side of the Request Memory Data flip-flop 6-38 is applied as a first input to gate 7-59 whose output goes to the control flip-flop 7-32 used to control the Memory Control chip 7-25. Specifically, the output from gate 7-59 initiates a "memory-read" operation. Again, the Memory Controller chip 7-25 will control the actual memory read cycle, all as has already been described.

The output from the Request Memory Data flip-flop 6-38 is also applied as an input to a further gate 7-60 whose output goes to a still further gate 7-61 which is the means employed for detecting when a memory-read operation has been completed. Following the output from this last-mentioned gate, it is applied by way of a conductor 7-62 to a set of Memory Output Data latches 7-63, 7-64, 7-65 and 7-66. The remaining inputs to the gate 7-61 are high when the memory read cycle is completed and the data is latched. Furthermore, the output from gate 7-61 is inverted at 7-67 and applied as a toggle input to the Memory Read Complete flip-flop 7-68. This last flip-flop, then, becomes set when the memory-read cycle has ended and the data from the memory has been captured in the Memory Output Data latches. As indicated by the numbered flags on the output from the latches 7-63 through 7-66, it indicates that a connection is made from the latches to the Odd/Even multiplexer 6-40.

It will be recalled that when the data was originally written into the Modulator's memory 7-20, it was an 8-bit byte, but that the data is actually a 4-bit byte. The multiplexer 6-40, then, selects between the odd and the even bytes. It first takes a first data byte out of the Memory Output Data latches and routes it into the 4-bit latch comprised of circuits 7-41 and 7-42.

As indicated above, the 8-bit byte of data that is read from the Memory actually comprises two 4-bit bytes for transmission purposes. The lower 4-bits are referred to as the even byte and the upper 4-bits as the odd byte. The Memory control timing chain 7-26 is used to control the Compression logic as well as to generate the memory Read and Write pulses. It will further be recalled that there is a first pass through the Memory timing chain for each half cycle of the master clock. Reads or Writes and Refresh are performed on alternate half-cycles of the master clock. That is, Read/Write are performed only during high active master clock times while Refresh is performed during the low active master clock phase.

At the time that the Sync flip-flop 6-10 was set by the output from AND gate 6-9, this same signal was applied to the clear terminal of the "Odd/Even" flip-flop 6-60, producing a high on the complement output. This, in turn, is applied to the select terminal, "S", of the Odd-/Even Multiplexer 6-40, thereby selecting the Even byte of the Memory data. As the flip-flop 6-60 is subsequently toggled, it will select the Odd byte, then the Even, then the Odd, etc.

The Request Memory Data flip-flop 6-38 had previously been set at the same time that the Sync flip-flop 6-10 had been set. The true output of flip-flop 6-38 is applied to the data, "D", input of a further flip-flop 6-61. When the subsequent memory Read is completed, a clock pulse is generated at time, T6, of the memory timing chain via the gate 7-61 and is applied through inverter 7-67 to the toggle input of the flip-flop 6-61. This, then, sets that flip-flop causing a "high" at its true output. This high signal enables the AND gates 6-62 and 6-63 as well as the AND gates 6-64 and 6-65. Furthermore, this high signal from the flip-flop 6-61 is applied to the "D" input of the End of Line flip-flop 6-66.

The T8 pulse off of the memory timing chain is applied to gate 6-62. The output from this gate is applied to the further AND gate 6-67. As flip-flop 6-68 is still in its cleared condition, the gate 6-67 is enabled, and the resulting output will clear the Compression Counter 6-50 and 6-48. It will also result in the latching of the first 4-bit byte of data into the Data Latches 7-41 and 7-42. The output from gate 6-62 also propagates through OR circuti 6-69 to the so-called "Compressibility Decision" gates 6-45 and 6-46. However, there will be no affect at this time since the flip-flop 6-68 has not, as yet, been set to provide the requisite enable for these two gates.

Now, on the trailing edge of the T8 timing pulse, i.e., when it returns to its "0" level at the input to gate 6-62, the edge will set the flip-flop 6-68 via the output from inverter 6-70. The setting of the flip-flop 6-68 enables further compression processing in that it removes the clear from the Compress "0's" counter 6-53 and prevents the clearing of the Compression Counter 6-48 and 6-50 by removing the enable to the AND gate 6-67. This, at the same time, prevents latching subsequent bytes of data into the latches 7-41 and 7-42. The flip-flop 6-68 also applied an enable to gate 6-71 causing its output to go high. That high signal is, in turn, applied to the Odd/Even flip-flop 6-60, causing it to toggle to its set state and thereby selecting the Odd byte at the Odd-/Even Multiplexer 6-40.

During the next pass through the Memory timing chain, i.e., during the refresh half-cycle of the master clock, the timing pulse T3 is generated and is applied to gate 6-64. As long as the Compression Counter is not full, as detected by the OR circuit 6-72, AND gate 6-64 will be enabled and the T3 timing pulse will propagate through it and through OR gate 6-69 to NAND gates 6-45 and 6-46. If the Odd byte is the same as the Even byte as detected by the comparator 6-43, then gate 6-46 will be enabled. If the successive bytes fail to compare, then it will be gate 6-45 which is enabled. Assuming that a compare does occur, gate 6-46 is enabled and the T3 pulse propagates through it to increment the Compression Counter 6-48. The output from gate 6-46 also propagates through the gate 6-71 which further toggles the Odd/Even flip-flop 6-60 to its "Even" state.

Subsequently, T5 from the Memory timing chain 7-26 will be felt at the input of gate 6-65. If the Odd/Even flip-flop 6-60 is in its "Even" state, then the gate 6-65 will be enabled and the timing pulse T5 will pass through it so as to be applied to the gate 7-44 of the Memory Control section to increment the Memory Address Counter 7-21 through 7-24.

Next, the output T6 of the Memory timing chain will be applied to the NAND gate 6-63 and it will propagate through it to clear the flip-flop 6-61, further disabling the compression processing. It is to be noted here that the Request Memory Data flip-flop 6-38 and the flip-flop 6-68 will remain set. Because flip-flop 6-38 is still set at the next half-cycle of the master clock, another memory Read is performed. Upon completion of this operation, the flip-flop 6-61 is again set.

When the flip-flop 6-61 is set for the second and subsequent memory Read operations after the initial setting of the Request Memory Data flip-flop 6-38, the compression process is the same as described above, with one exception. It will be remembered that the flip-flop 6-68 remained set after the first compression sequence. Because of this, when the Memory timing chain produced the T8 control pulse, it was conducted through gate 6-62, it does not clear the Compression Counter nor does it latch the data into the latches 7-41 and 7-42 in that the set condition of the flip-flop 6-68 disables gate 6-67. The T8 timing pulse will, instead, propagate through gate 6-62, through OR gate 6-69 to the Compression Decision NAND gate 6-45 and 6-46 so as to perform the compression process previously described.

The process of executing memory Reads and the resulting compression processing continues until the Request Memory Data flip-flop 6-38 is cleared. When this happens, the flip-flop 6-68 is also cleared via the output from NAND gate 6-15.

The AND gate 6-73 serves as a low active OR function and will provide a clear pulse to the Memory Data Request flip-flop 6-38 upon the occurrence of one of three conditions. The first is a data byte miscompare as detected by the gate 6-45. The second condition is the filling of the Compression Counter as detected by OR gates 6-74 and 6-72. It is to be remembered at this point that when compressing a non-zero character, i.e., a character other than background, the maximum compression count permitted is $32_{10}$ or 1F hexadecimal. When compressing a "0" (background) character, it is possible to compress the entire line. Therefore, when compressing 0's, the Compression Counter Full does not apply and is disabled by the output from the 0 Detect gate 6-49 through gate 6-52 and onto the gate 6-72. The third condition under which the Request Memory Data flip-flop 6-38 is cleared is the End of Line, which will be discussed later hereinbelow.

When the compression sequence is terminated by a byte miscompare, the data and accumulated compression count must be transmitted before the Read and compressing of memory data can continue.

Following this, the control logic yet to be described changes the state of the signal at the select input of the multiplexer 6-40 causing the next 4-bit byte to be routed to a first set of inputs to the Compression Comparator circuit 6-43. Noting that the output from the latches 7-41 and 7-42 are also connected as inputs to this comparator, it can be seen that the comparator functions to compare successive 4-bit bytes of data, one to the other. If the two bytes are equal, the Comparator 6-43 outputs an A=B or "compression compared" and a signal is developed at the output of the inverter 6-44 which is the complement of its input signal. Both the signal and its complement are routed, one going to a gate 6-45 and the other going to a gate 6-46 which circuits function to decide whether the characters are the same or not. If the characters are the same, gate 6-46 is enabled whereas if they are different, gate 6-45 is enabled. The output from gate 6-46 is inverted at 6-47 and applied to the toggle input of the Compression counter 6-48. Thus, if equality is detected, the Compression counter will be incremented. Conversely, if the successive characters are not identical, the Compression counter is not incremented and further, the reading operation is terminated and the address counter is not incremented. Equality detection, however, results in the Compression counter being advanced, the Memory Address Counter being incremented such that read cycles continue so long as adjacent characters stored in the Memory continue to be identical.

If the character being read is a level other than 0, i.e., background, the maximum number that may be compressed is 32. However, if the character under consideration is a 0 level, then a whole line may be compressed. This operation is controlled by the gate 6-49 which is capable of detecting a 0 or a non-zero character in the latch 7-41 and 7-42. When the gate 6-49 detects "Data=0", the next sync signal may be sent immediately and because of the circuitry provided in the receiver, it will automatically fill the line being scanned with 0's before proceeding to the scanning of the following line.

The process of reading Memory, comparing the characters and incrementing the Compression counter continues until a non-compare results or the Compression counter is filled with a count of IF (decimal 32). When it is desired to have a maximum compression count of 32, and a 4-bit counter 6-48 is employed, it is necessary to further include an additional flip-flop as at 6-50 as a part of the overall Compression counter. This last-mentioned flip-flop provides the fifth bit needed to register a count 32. When the four outputs from the counter 6-48 are simultaneously high, gate 6-51 is enabled, permitting the next A=B pulse from the Comparator 6-43 to reset the Compression counter 6:48 to all 0's and to clear the flip-flop 6-50 so that these circuits may begin to again function in the manner described. In the 4-bit bytes are 0's, the gate 6-49 will output a signal to the OR circuit 6-52 whose other input is the uppermost bit of the Compression counter flip-flop 6-50. When compressing 0's, the counter 6-53 comes into play as will now be described.

The Modulator circuitry has no way of determining when it begins comparing 0's just how many may be in a sequence. Rather than providing storage means for a plurality of "0" characters, the number of occurrences of such characters are accumulated in an up/down counter which is incremented each time the Compression counter 6-48 and 6-50 is filled. Specifically, the output from gate 6-51 is applied to a first input of gate 6-54 each time the Compression counter is filled. The second input to gate 6-54 comes from the output gate 6-46 which indicates that 0's are still being compared and the third input to gate 6-54 from the output of inverter 6-55 signifies that the data is still, in fact, a 0. Each time a 0 level is transmitted out of the Modulator, the Compress "0" counter 6-53 is decremented via gate 6-54. In this fashion, then, it is unnecessary to store "0" patterns for transmission, but instead, only a count of the number of 0's in a sequence is developed and then that count is decremented upon each transmission.

It has been shown how data is read and stored in the Data Latches 7-63 through 7-66, how like characters are counted and stored in the Compression counter 6-48 and 6-50 and if they are 0's, how the Compress "0" counter 6-53 is incremented. Next to be explained is the manner in which this data is actually sent.

The Channel Select signals which come into the Data/Compression multiplexers 6-36 and 6-37 are developed at the outputs of the control flip-flops 6-56 and 6-57, respectively. These two flip-flops together form a "count-to-three" operation in that there are three characters to be sent in a sequence. Specifically, a data character is transmitted along with two compression characters. One of the compression characters comprises the lowest order digit of the compression count and the other comprises its higher order digit.

At the outset, the control flip-flop 6-56 and 6-57 are both cleared such that the multiplexers 6-37 and 6-36 select the Data character from the output of the latches 7-41 and 7-42. Thus, the memory data addresses the Modulate ROM 6-19 which causes a count to be preloaded into the Modulation Rate Counter 6-12 through 6-14 which is then advanced by clock pulses until an overflow pulse occurs. Once 8 half-cycles are counted, the Next Character one-shot 6-34 is triggered and its output propagates through gate 6-59 to toggle the Select Control flip-flop 6-56 and 6-57. Because of the manner in which these two flip-flops are interconnected, one with the other, they can accumulate a value of 3 before being cleared back to 0. When the flip-flops 6-56 and 6-57 are made to store a count of 2, the control inputs to the Data/Compression multiplexers 6-36 and 6-37 are such that the lower compression byte is selected. That is, the outputs from the Compression Counter 6-48 are able to pass through the multiplexer 6-37 to ultimately address the Modulate ROM 6-19 for loading the Modulator Counters 6-12 through 6-14 with a number which will create a tone indicative of the lower byte of the compression count. Once again, the Modulation Rate Counter 6-31 will count up to 8 half-cycles and will produce another pulse through gate 6-33 to trigger the next character one-shot 6-34. This action controls the state of the input to the Data/Compression multiplexer chip 6-37 so that it now selects the upper byte from the Compression Counter 6-48 and 6-50. It can be seen then that the count-to-three arrangement of flip-flop 6-56 and 6-57 starts out at 0 and allows the data character to pass through the Data/Compression multiplexers. Upon the completion of this transfer, a signal is applied to the Next Character one-shot 6-34 causing it to output a signal advancing the Count-to-Three circuits to register a 1. This produces a high on the conductor leading to the select input of multiplexer chip 6-36 such that the lowermost byte of the compression count is passed to the Modulate ROM 6-19. This, in turn, again causes the Next Character one-shot 6-34 to fire, advancing the Count-to-Three circuits to advance and store a 2. This causes a high control signal on the conductor connected to the select input of the Data/Compression multiplexer 6-37 so as to apply the uppermost byte of the compression count to the Modulator ROM 6-19. At the same time, gate 6-75 is enabled. The output from this gate propagates through AND gate 6-39 to again set the Request Memory Control flip-flop 6-38. Therefore, while the uppermost compression byte is being sent by the Modulator, the Memory Control and Compression logic is accumulating the next data and compression count so that it will be immediately available for transmission upon the completion of the transmission of the current group. This process will continue until the "End of Line" is detected.

In that there are 256 4-bit bytes per line, and as 8-bit bytes are read from Memory, then every 128 increments of the Memory Address Counter 7-21 through 7-24 represents a line. This is accomplished by inverting the count 64 bit out of the counter 7-22 via inverter 6-76 and applying the resulting signal to the End of Line flip-flop 6-66. This happens because the flip-flops 6-66 must have a positive edge to set and because of the inverter 6-76, count 64 must go active and then inactive in the Address Counter 7-22. This, of course, occurs every 128 increments of the Address Counter. The flip-flop 6-66 therefore sets as the End of a Line. By the same reasoning, the Memory Address Counter will eventually reach a count representing 256 lines or a full page. The AND gates 7-70 and 7-71 decode that count and produce the End of Page signal at the output of the gate 7-71.

The End of Page signal is applied to gate 6-77 and through inverter 6-78 to NAND gate 6-79. Because of the inverter 6-78, the End of Page signal will only enable one of these two gates. If active, that is, high at the output of gate 7-71, it will enable NAND gate 6-77 which is the so-called "End of Page" gate. If "End of Page" is inactive at the output of AND gate 7-71, it will enable the NAND gate 6-79, the so-called "End of Line" gate.

the true output from the End of Line flip-flop 6-66 is applied to the "D" input of flip-flop 6-80. This intermediate step to processing of End of Line is needed because when the End of Line is detected by the flip-flop 6-66 there is one accumulated group of data and compression which still has to be transmitted. Therefore, when the uppermost byte of the last compression count is applied to the Modulator ROM 6-19 for transmission and the flip-flop 6-57 clears, flip-flop 6-80 will set, providing the common enable to the End of Page gate 6-77 and the End of Line gate 6-79. When transmission of the last compression count has been completed and the Next Character one-shot 34 fires, its output pulse will propagate through the End of Line gate 6-79 or the End of Page gate 6-77.

If the End of Line gate 6-79 is enabled, its output is applied to the flip-flop 6-7 to clear it and prevent further syncs. The output from the End of Page gate 6-77 is also applied to a further gate 6-81. This gate serves as a low active OR function whose other input is the Master Reset coming from a push-button on the front panel. The output of gate 6-81 will clear the Transmitter Busy flip-flop 6-1, putting the transmitter in a "hold" condition to away further activity by the Processor, all as has previously been described.

This completes the explanation of the detailed logic used for implementing the transmitter 18 of the system of FIG. 1. Attention will next be given to the receiver module 20. In this connection, the same approach will be used. That is, first a general organization of the receiver will be provided with the aid of the front panel drawing of FIG. 8 and the general block diagram of FIGS. 9a through 9d. Following that, the detailed logic used in the implementation of the receiver module will be explained.

RECEIVER MODULE

Before proceeding with a detailed description of the electronic circuits implementing the receiver, it is deemed helpful for an overall understanding to have a general understanding of the functional or performance characteristics of the receiver. In this regard, consideration will be given to the drawing of FIG. 8 which shows the front panel of the receiver module with its various push-button switches, dials, etc. The incoming data from the telephone lines is in the form of discrete tones, the frequency of each being indicative of the sync signals, the precip intensity levels, and compression codes where the same intensity level is to be repeated a predetermined number of times. The circuits within the receive module then function to demodulate this data, segregate it into four possible range categories and to create the necessary composite video signals whereby the received data may be displayed on a TV monitor.

Figure 8:
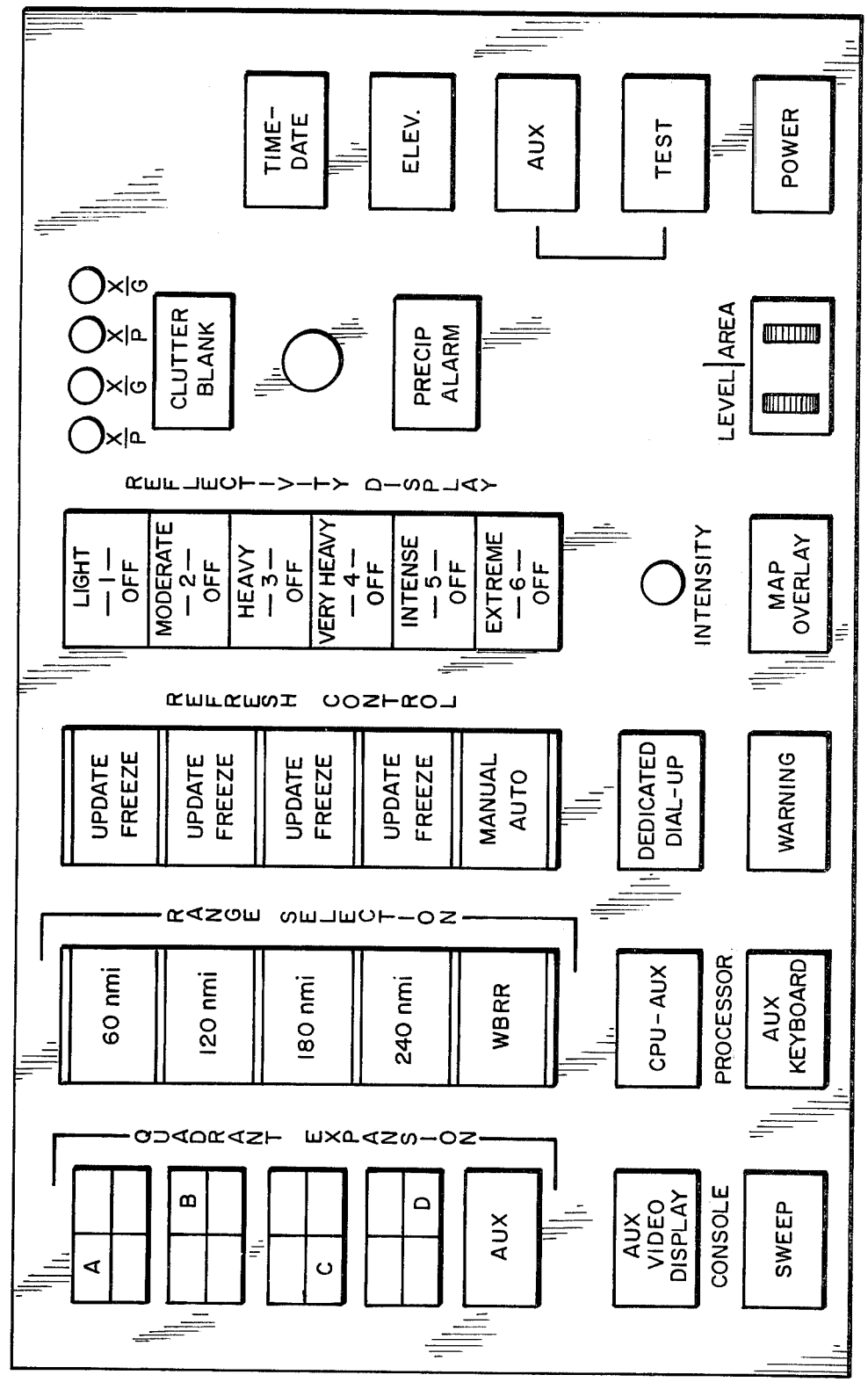
FIG. 8 is a drawing illustrating the front panel of the receiver module of the system of FIG. 1 and the various push-button switches and indicators contained thereon.

Shown in the lower right hand corner of the receiver's front panel in FIG. 8 is a push-button switch labeled "TEST". When depressed and released, this Test switch will alternately generate a color bar test pattern for video adjustments. When depressed and held, the switch performs a bulb test by illuminating the entire front panel.

Centrally located on the front panel is a dual function push-button switch labeled "DEDICATED/DIAL-UP". This switch selects source telephone data for the receiver from either a dedicated phone line or from a dial-up phone line, these two phone lines having input jacks located on the rear panel (not shown) of the receiver module.

Disposed immediately below the "DEDICATED/DIAL-UP" push-button is an indicator labeled "WARNING". This indicator becomes illuminated when the receiver detects invalid data on the phone lines. When lit, the memory contained within the receiver is inhibited from reading and storing data and, accordingly, the invalid data cannot be used to up-date the data therefore entered into the memory.

A series of four dual function push-button switches labeled "UP-DATE/FREEZE" allow the operator to control and indicate whether a memory's contents will be preserved for future display or, alternatively, will be allowed to be up-dated with current data arriving from the transmitter. Each of the four UP-DATE/FREEZE switches relates to the "Range Selection" switch to its immediate left. Depressing an UP-DATE/FREEZE switch will alternately inhibit writing into a corresponding memory associated with the selected range, but access will be allowed for read-out or display purposes. This status will be indicated by illumination of the FREEZE indicator lamp which back-lights the selected push-button. Although a particular range memory may be in the FREEZE mode, the UP-DATE light associated with this same push-button may continue to blink if the receiver is attempting to enter data into the frozen memory bank. When the UP-DATE indicator lamp is on, memory can be accessed for writing as well as reading and when blinking, an up-dae (write operation) is in progress. It should be further noted that when the phone line "WARNING" lamp is on, all memories are automatically frozen with the last valid data. The "warning" function only comes into play when the receiver is detecting invalid data on the phone lines.

Shown at the upper left of the front panel of FIG. 8 are a series of four switches labeled "QUADRANT EXPANSION". In this regard, it is to be understood that the video display screen may be considered as comprised of four quadrants labeled "A", "B", "C" and "D". The operator, by selectively depressing one of these four switches, can cause the video information theretofore confined to a particular quadrant to be expanded so as to fill the entire screen. This, of course, provides the viewer with a larger picture (4 to 1 zoom) of an area of interest. By depressing the same switch a second time, the display will return to its normal unexpanded form. Quadrants can be displayed in sequence without first returning the display to normal by simply depressing the next desired Quadrant Switch. The illuminated switch indicates that the particular quadrants has been expanded.

The incoming data, once it is demodulated, is routed to four separate banks of memory corresponding to radar data observed in four separate ranges, i.e., 0 to 60 nautical miles, 0 to 120 nautical miles, 0 to 180 nautical miles, and 0 to 240 nautical miles. Once so stored, an operator may, by operating one of the buttons in the "Range Selection" group in FIG. 8, cause an instantaneous display on the television monitor of any of four sequentially stored ranges. When used in conjunction with the manual (non-automatic) mode of up-date control, the range switches can selectively dictate which memory is to be up-dated.

The push-button labeled "WBRR" allows the user to access and display WBRR radar data transmissions by the National Weather Service.

The push-button switch labeled "MAP OVERLAY" allows the operator to selectively display or inhibit geographic overlay information which is transmitted with the precip data from the remote transmitter. Thus, the operator can determine whether to display the transmitted map information, map information generated at the receiving site from auxiliary equipment, or to eliminate the geographic overlays completely.

Located immediately above the MAP OVERLAY push-button is an INTENSITY control potentiometer which may be used to vary the intensity of a map from a black to white.

The push-button labeled "MANUAL/AUTO" in the Refresh Control group of switches dictates whether the receiver's memory is automatically up-dated with the applicable range, or is selectively loaded with a range of the operator's choice. By using the Manual mode, the operator can load the receiver's four memories with four transmitted radar frames of his choice. An example would be one range from four different radars spaced across the country or from four identical ranges from one radar which are stored several minutes apart whereby a time-lapse technique the progress of a weather front can be followed as it moves across a predetermined area.

The push-button switch labeled "AUX" on the right hand portion of the front panel of FIG. 8 allows the memories to be automatically and slowly cycled in a predetermined sequence. The lamps associated with the four range switches will indicate which of the memories is being displayed at any given time.

The receiver of the present invention further includes an alarm circuit to provide a visual or audible indication that precipitation at a given intensity level is being detected. The intensity level at which the alarm will activate is set by means of a thumb-wheel marked "Level". The sensitivity may be selected by setting the thumb-wheel switch labeled "Area". When the push-button labeled "PRECIP ALARM" is depressed, the alarm circuit is enabled. Then, when the precipitation reaches the selected intensity level and covers the selected area, an alarm will issue. The alarm can be disabled by again depressing the PRECIP ALARM switch.

A series of six switches identified as the "Reflectivity Display" group is provided for each of the six D-VIP intensity levels. Through the use of these switches, the respective color levels on the video display may be presented, inhibited, or made to blink. Each of the Level switches in the Reflectivity Display group are normally in the "on" position. When depressed, the usual white indicator lamp goes out and a red lamp illuminates while the respective color for that level is masked from the video display. By once again depressing the switch, the red lamp is extinguished, and the white lamp is made to blink, as is the respective color level on the video display.

RECEIVER-GENERAL ORGANIZATION

Figure 9A:
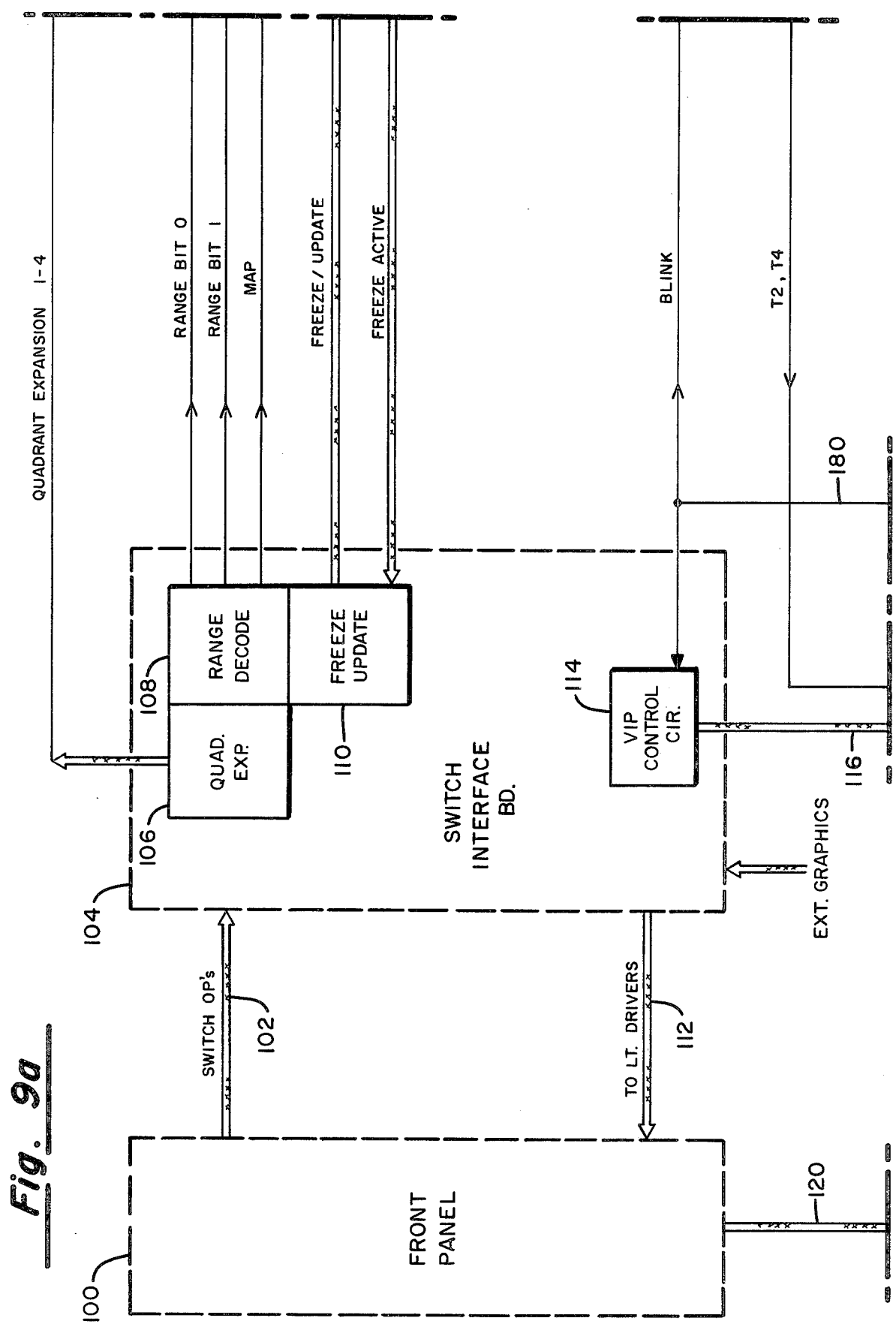
Figure 9C:
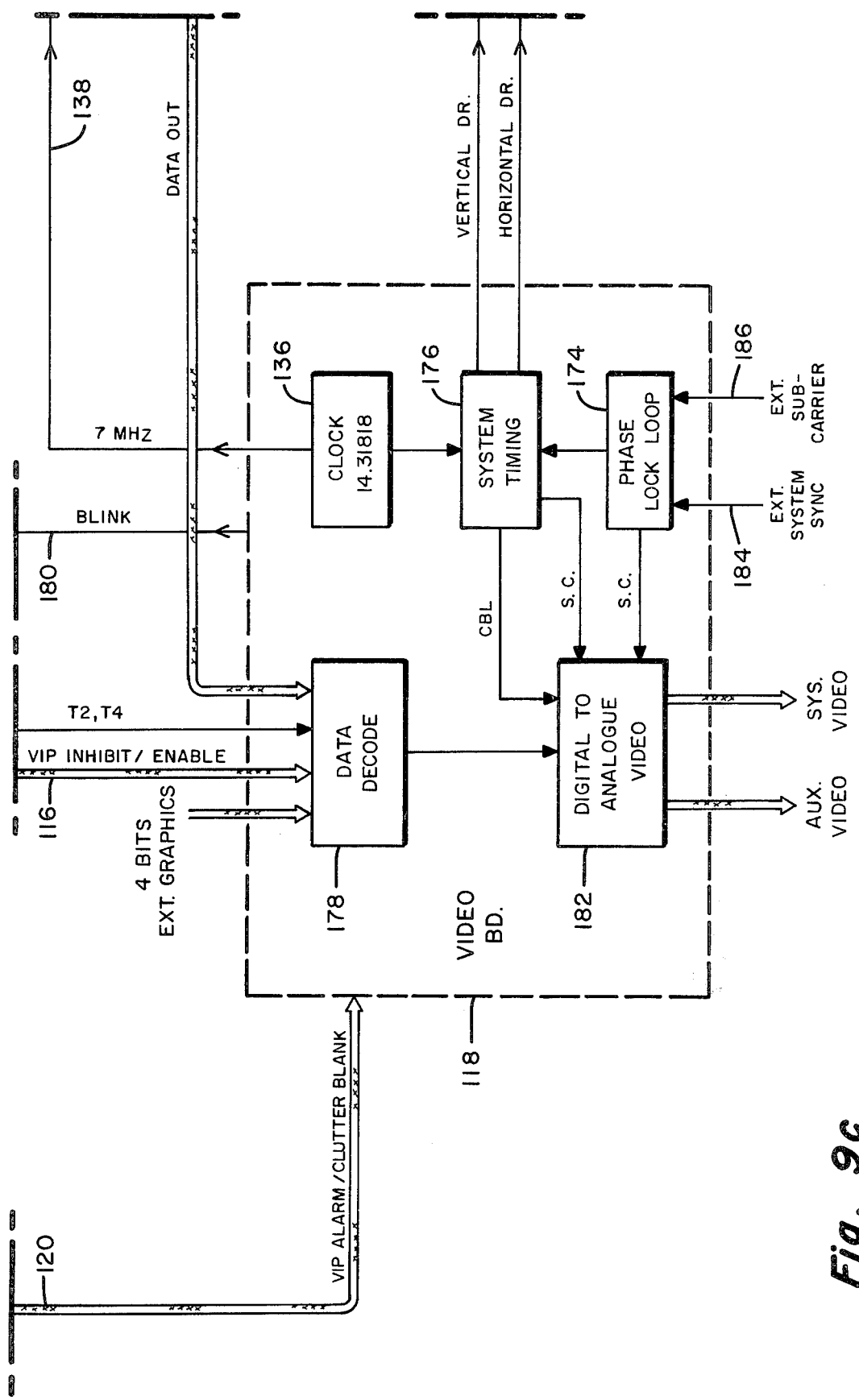
Figure 9D:
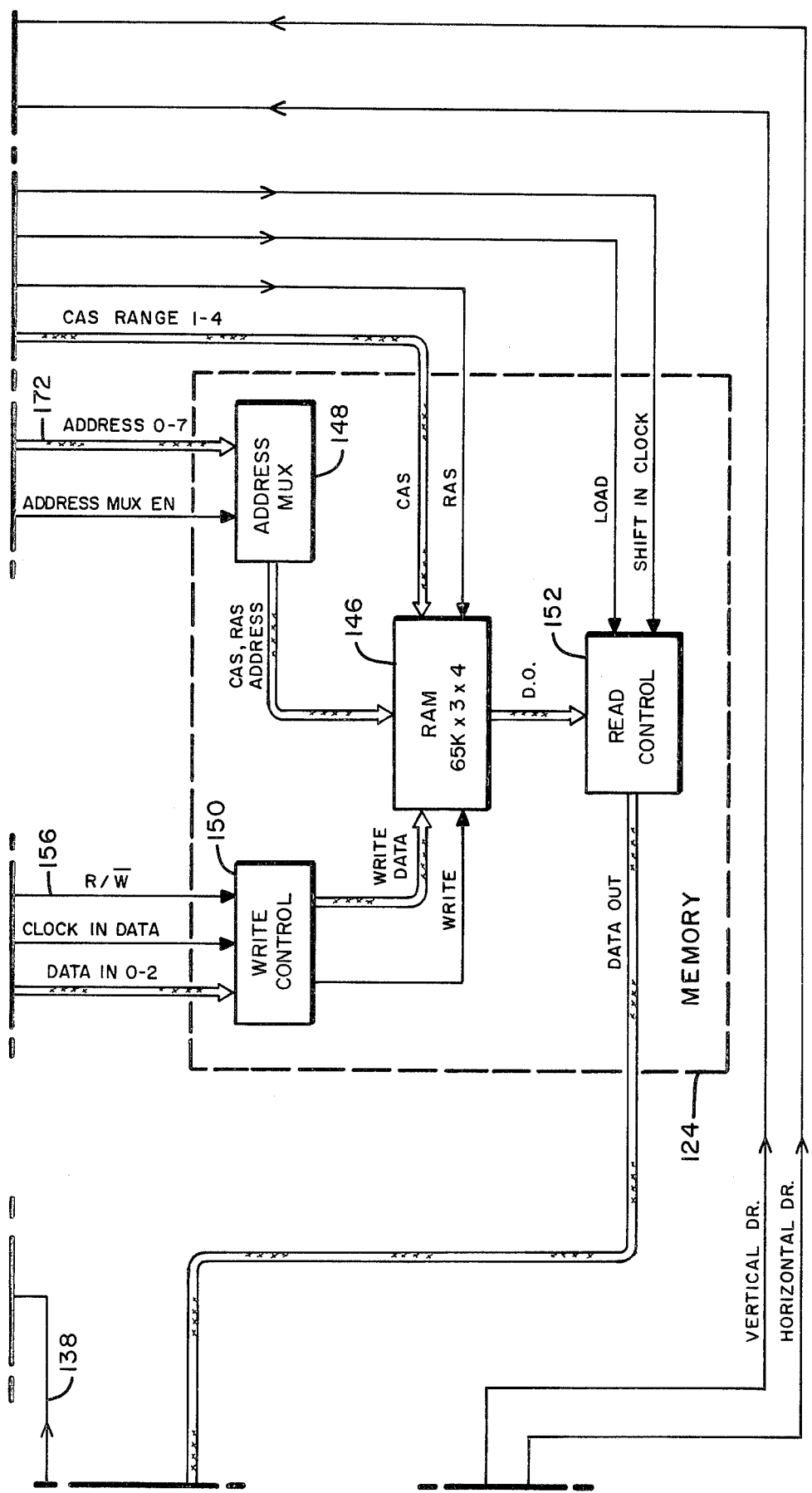

Next, with reference to the block diagram of FIG. 9c through 9d, the front panel with its associated push-button switches, indicators and other controls is identified by numeral 100. It provides hard wired connections via the lines in the cable 102 to a printed circuit board referred to as the Switch Interface Board 104. The Switch Interface Board contains various logic circuit groupings for controlling quadrant expansion, range decoding, freeze/up-date control as well as other functions. These functions are identified in FIG. 9 by numerals 106, 108 and 110 respectively. In addition, the Switch Interface Board provides outputs over lines in the cable 112 back to the front panel indicators to cause them to be illuminated or extinguished, depending upon the overall operation of the receiver module and the functions being activated. In that certain of the push-buttons on the front panel 100 directly affect the video presentation of the weather radar data, a futher group of logic circuits, indicated as the VIP control circuit 114, provides an output over the cable 116 to a further printed circuit board contained in the receiver which is referred to as the Video board. The Video board is identified in the block diagram by numeral 118 in FIG. 9c. It may also be noted that certain lines are brought out directly from the front panel via cable 120 to the Video board. The lines in this cable relate to the generation of the VIP alarm and to the clutter blanking feature.

The Switch Interface board 104 transmits control signals to and receives corresponding signals from the so-called Demod board 122. The Demod board 122 contains that logic used to receive the incoming tone signals indicative of sync, precip data and compression codes and demodulates those tones to create digital data patterns which are transferred from the Demod board 122 and stored in a random access memory contained on a Memory board 124, the reading and writing of data from that Memory board being under control of the Memory Control Board 126. Subsequently, when the digital information is read out from the memory, it is applied as the primary input to the Video board 118.

Referring again to the Demodulator board 122, the received serial data in the form of frequency modulated signal trains (Sync, Data, Compression, Compression, Data, Compression, Compression, etc.) arrive serially over line 128 and is operated upon by a group of logic circuits referred to as Demodulation and Frequency Doubler (block 130). As will be explained in greater detail, the frequency double causes discrete pulses to be generated at each zero-crossing of the received tone or frequency. In doing so, it creates a "window" for the conversion process. A circuit means is provided for counting up the number of regularly occurring clock pulses received during the "window" interval and that count, then, is a measure of the received frequency. By changing the width of the doubler output, it is possible to change the window size, thus allowing for calibration. In this regard, prior art techniques commonly utilize a frequency discriminator network which functions to convert the received frequency to an analog voltage. In the approach used in the design of the receiver of the present invention, no such frequency discriminator circuits are required.

The counters which accumulate the clock pulses during the interval defined by the window have their outputs connected as address inputs to a programmable read-only memory or PROM 132. Stored at addressable locations within the PROM is a binary number indicative of a given precip level as well as a number indicative of the composite compression count. Referring to Table II below, it can be seen that when the Demod addresses (Demodulator Counter outputs) fall into various ranges that the PROM data read out will be indicative of the various intensity levels and compression count values.

TABLE II

| Demod. Address | PROM DATA | | | |
|---|---|---|---|---|
| | Lower Byte | Def. | Upper Byte | Def. |
| 000–100 | $0_{16}$ | $V_0$ | $7_{16}$ | Comp 0 |
| 101–115 | 1 | $V_1$ | 6 | 1 |
| 116–12A | 2 | $V_2$ | 5 | 2 |
| 12B–13F | 3 | $V_3$ | 4 | 3 |
| 140–154 | 4 | $V_4$ | 3 | 4 |
| 155–169 | 5 | $V_5$ | 2 | 5 |
| 16A–17F | 6 | $V_6$ | 1 | 6 |
| 180–194 | 7 | — | 0 | 7 |
| 195–3FF | F | Sync | F | Sync |

By referring to the table, then, it can be seen that if an incoming tone is such that the counters of the demodulator produce a count of 147 (hexadecimal) during a window interval, when this address number is applied to the PROM, the hexadecimal number 3 will be read out from the PROM indicative of "Very Strong" echo intensity, i.e., precip level (Table I). It is to be noted also that the composite (total) compression count requires 5-bits, to define any one of thirty-two values. This composite count is sent in two bytes of 3-bits each, called "lower" and "upper" compression bytes. The sixth bit, unused for compression, comprises the least significant bit of the lower compression byte, is used to represent map data. A logical "1" out of the ROM for this bit specifies "no map" and a "0" out specifies "map".

The address generating circuits on the Demod board are identified by numeral 134 and, as indicated, include a bank of counters which are enabled at a fourth zero-crossing after a sync tone of the frequency doubled received data tone out of the logic 130 so as to accumulate 1 MHz clock pulses derived from the system clock 136 contained on the Video board 118 the system clock being the standard 14.31818 MHz frequency common to television systems. This frequency is halved by a frequency divider on the Video board 118 itself and the resulting 7 MHz clock pulses emanating therefrom on line 138 are again frequency divided by a factor of 7 by the logic 140 on the Demod board 122 to yield the 1 MHz clock pulses which are tallied during the period that the address counters 134 are enabled. The address counters are disabled at the eighth zero-crossing after a sync tone of the frequency doubled received tone signal.

Because of the characteristics of the phone line transmission used between the transmitter and the receiver, it is possible that the incoming singals from the phone lines may have discontinuities or instantaneous phase shifts and the like. Because of this, it has been found expedient to perform averaging on the received signals before the ultimate decision is made as to what the received character is to be interpreted as. The transmitter, itself, sends four full cycles of each tone except sync tone, which is eight full cycles. The frequency doubler in logic 130 acts on these tones to create a total of 8 half-cycles. As the received signals switch from one tone to another, transitions are encountered.

Due to that fact, the counters of the address generator 134 begin counting each half-cycle during a received sync tone. As previously indicated, sync is the lowest frequency employed in the system. When the sync tone terminates, the Demodulator logic 122 will begin counting half-cycles of a precip level tone. At the termination of the sync tone and the beginning of the precip level tone, a frequency transition occurs indicative of the fact that the receiver is no longer receiving the sync tone. When that transition is detected (the first half-cycle of a non-sync tone), the circuitry ignores the first three half-cycles and will only act upon the fourth, fifth, sixth and seventh half-cycles. The eighth half-cycle is ignored. As such, an "averaging" effectively takes place, thereby upgrading the reliability of the ultimate conversion of frequency modulated tones to binary data patterns. The exact manner in which this is accomplished will be fully explained later when the detailed logic for implementing the Demod board 122 is set forth.

Because of the way in which the sync signal is handled, it is known that the first non-sync tone received comprises data. It will furthehr be recalled that the sequence of signal transmission from the transmitter is (1) data, (2) compression, (3) compression, and that that sequence is repeated over and over. Following the data, then, the receiver can expect to receive two compression count bytes which are stored in counters in the block labeled 142 in FIG. 9b. Once the Decompression Count is stored, these same counters are advanced at a fixed rate by the 1 MHz pulses from the divide-by-seven circuit 140. Each time the count is advanced, the PROM 132 has its contents read out to the Memory board 124 until such time as the Decompression Counters produce a "carry-out" overflow signal, indicating that the data byte has been entered into the memory as many time as the compression code originally entered into the Decompression Counters 142 had indicated.

The circuit labeled 142 also signifies the so-called "truncation" feature. That is an additional method used in the system of the present invention to speed up the writing of data. As will be recalled, in the D-VIP level 0 is reserved for the "background" which will be the color of the television screen when no other precip level or map information is being displayed on it. Hence, when there is little precip activity, for the most part, the screen will reflect extensive series of level 0 pixels. During normal operation, each new line of data is preceded by a line synchronizing pulse. The Demod board 122 is transferring data to the Memory board 124 and is waiting for the appropriate time when a write operation is permissible. If it gets a second line synchronizing signal before a so-called "Line Full" signal is received from the Memory Control board 126, indicating that the preceding line had not reached it rightmost excursion, a latch is set that directs the Truncation circits in block 142 to begin the truncation function. When truncation begins, the data latches holding the previously received level code is cleared to zero (indicative of background) and a series of write cycles are executed until a "Line Full" arrives on conductor 144 from the Memory Control board 126 signifying that column 256 of that particular line has been reached.

The heart of the Memory based 124 is a dynamic random access memory (RAM) 146 which, in the preferred embodiment, comprises a 65 K×3×4 memory capable of storing four frames of video information, each frame containing 256 columns horizontally, 256 lines vertically, each column comprising 3-bits of information. The four frames correspond to the four separate ranges, i.e., 60 nautical miles, 120 nautical miles, 180 nautical miles and 240 nautical miles, while the 3-bit bytes allow control over the red, green, and blue guns on the color monitor so that six different colors indicative of different precip levels as well as the black and white for the geographical maps can be accommodated. The Memory board 124 further includes those logic circuits commonly utilized with random access memories for effecting writing and reading. Specifically, an Address Multiplexer 148, responsive to address inputs from the Memory Control Board 126, selectively applies either column address or row address information to the RAMS.

The Write Control circuits 150 control the writing of the data from the Conversion PROM 132 on the Demod board 122 into the 65 K memory.

The Read Control circuits 152, under control of signals coming from the Memory Control board, are used to selectively read out data from the Memory and transfer to the Video board 118.

A further understanding of the overall functioning of the Memory board 124 will be gained from the following discussion of the circuits used in implementing the Memory Control board 126. First of all, in that it has been found expedient to employ dynamic RAM chips, it is a requirement that they be clocked properly, i.e., they must be continuously clocked in order to retain their data. In most digital computing systems where dynamic RAM's are employed as the storage element, if the memory information is not being used, each location must be periodically cycled to thereby refresh the data. In the receiver module of the present invention, the Memory 146 is automatically refreshed during the display of a given picture because to provide such a display it is necessary to scan the memory at a relatively high rate which results in the needed refresh operation.

The data to be written into the memory comes from the PROM 132 on the Demod board 122. To avoid memory up-dating during a period when memory data is being displayed on the video monitor, writing is confined to the portion of the cycle corresponding to the horizontal blanking period. That is, when the sweep is shut off and re-trace is taking place for the next line to be displayed, a flip-flop termed the "Write Enable" flip-flop (not shown), comprising a part of the memory timing logic 154 on the Memory Control board is set, thereby enabling the write operation to take place. That flip-flop is again cleared when the write cycle is complete, again to avoid alteration of memory contents during the read-out cycle. The Write Enable flip-flop output is applied to the Write Control circuits 150 by way of a conductor 156 emanating from the Memory Timing logic 154.

It may also be noted that the Memory Control board 126 is also supplied with signals originating at the Switch Interface board 104 whereby it is possible to control which of the four possible ranges is to be displayed. By manipulating the range switches on the front panel, the action is transferred through the Demod board 122 via the "Decode Range Map" logic 158 to the Memory Control 126 to specify which block of memory, i.e., which range, it should be addressing for up-date, display and refresh purposes.

The Memory Control board 126 is capable of being phase locked to an external sync source to provide the necessary synchronization between the TV studio equipment with which the present system may be used. This external synchronization is achieved by the Clock and Sync timing chain 160 on the Memory Control board which receives horizontal drive (HD) and vertical drive (VD) outputs from the Video board 118. Because of this feature, when a studio operator switches from one media source to another, there will be no discontinuity in the picture being presented. A switch-over may take place during the vertical blanking interval whereby no visible distortion of the picture takes place. The HD pulse coming into the Memory Control board forces a clearing of the Column Counter whereby the tracing of a picture will start over with the first column of a line. The VD signal forces the system to clear its Line Counter whereby the new display will begin at the top of the screen at the left-most position of the first line.

The decoding of the Quadrant Expansion switches which occurs on the Switch Interface board in logic 106 presents a signal to the Read Enable logic 162 on the Memory Control board. This allows the data relating to a particular one of the four screen quadrants to be selectively enlarged so as to fill the entire screen.

The Clock and Sync Circuit timing chain 160 also provides timing pulses to the Dot Counter 164 which keeps track of the particular column as the sweep progresses across the display. The Dot Counter, itself, keeps track of the location of the trace as it progresses from left to right. After a count of 256 is reached, it is known that no more information is available from the memory for that line, so data out of memory is not read and memory could be considered blanked. Hence, by the time that the count reaches 288, it is certain that read cycles from memory are not needed until the next line. Because memory data is blanked, a write cycle can take place without causing any flicker on the screen. The $\overline{288}$ signal coming from the Dot Counter 164 and applied to the Freeze logic 166 on the Demod board 122 allows the Demod board to effect an up-date during that blanked data interval. However, if any one of the FREEZE/UP-DATE switches on the front panel associated with a selected range has been activated, the Freeze logic 166 precludes the generation of a Write Enable signal on the line 168 and precludes the Memory Timing logic 154 from producing the required Write Enable signal on line 156.

With continued reference to the connections between the Demod board 122 and the Memory Control board 126, it is to be noted that two further control lines exist. One is labeled "HOLD" and the other is labeled "SYNC". Each line of data coming in on line 128 includes line sync information. These synchronizing pulses, developed out of the circuit 142 on the Demod board, are applied to the Read/Write Address Counter and Multiplexer logic 170. The Read Address Counters are arranged to continuously effect a reading or memory along with the scanning and refreshing of the display screen. The Write Address Counters of the logic group 170 are incremented by the data as it comes from to it and thereby convert it to the system composite video signal. Typically, the external graphics may be a CRT-type keyboard entry device or may be a specifically designed module permitting a customer to generate maps and other graphic symbols independent of the maps transmitted with the radar data. By providing the 4-bits of external graphics into the Data Decoder 178, up to 16 different colors may be selected for the line graphics. In the standard configuration, the information coming from the external graphics unit has priority over that coming from the RAM 146, and therefore it will overlay any data from 146 coinciding with a given scan location.

The lines 184 and 186 respectively carry the external system sync and external sub-carrier signal which are two signals that are required to synchronize the receiver of the present invention to the equipment used in the TV station. For example, the TV station may provide a composite sync signal, including both horizontal and vertical sync pulses and an external sub-carrier which may, typically, be the two volt peak-to-peak 3.58 megacycle sine wave which is so common in TV broadcast schemes.

This completes a general discussion of the overall organization of the receiver module. Next to be considered will be the detailed logic implementation of the various modules heretofore only explained in general terms.

Figure 10:
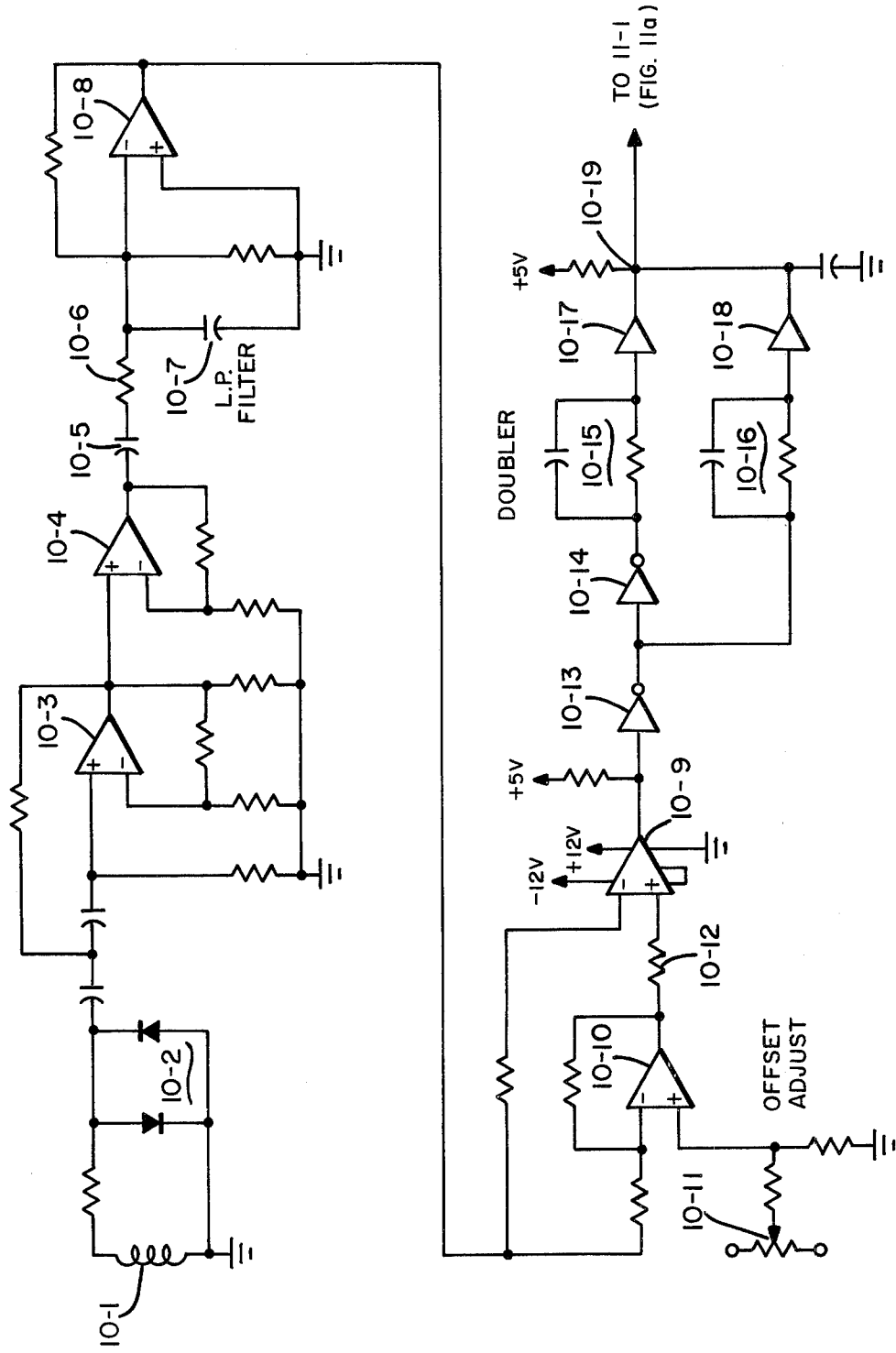
FIG. 10 is a circuit schematic showing the frequency doubler used in the demodulator portion of the receiver Demod board.
Figure 11A:
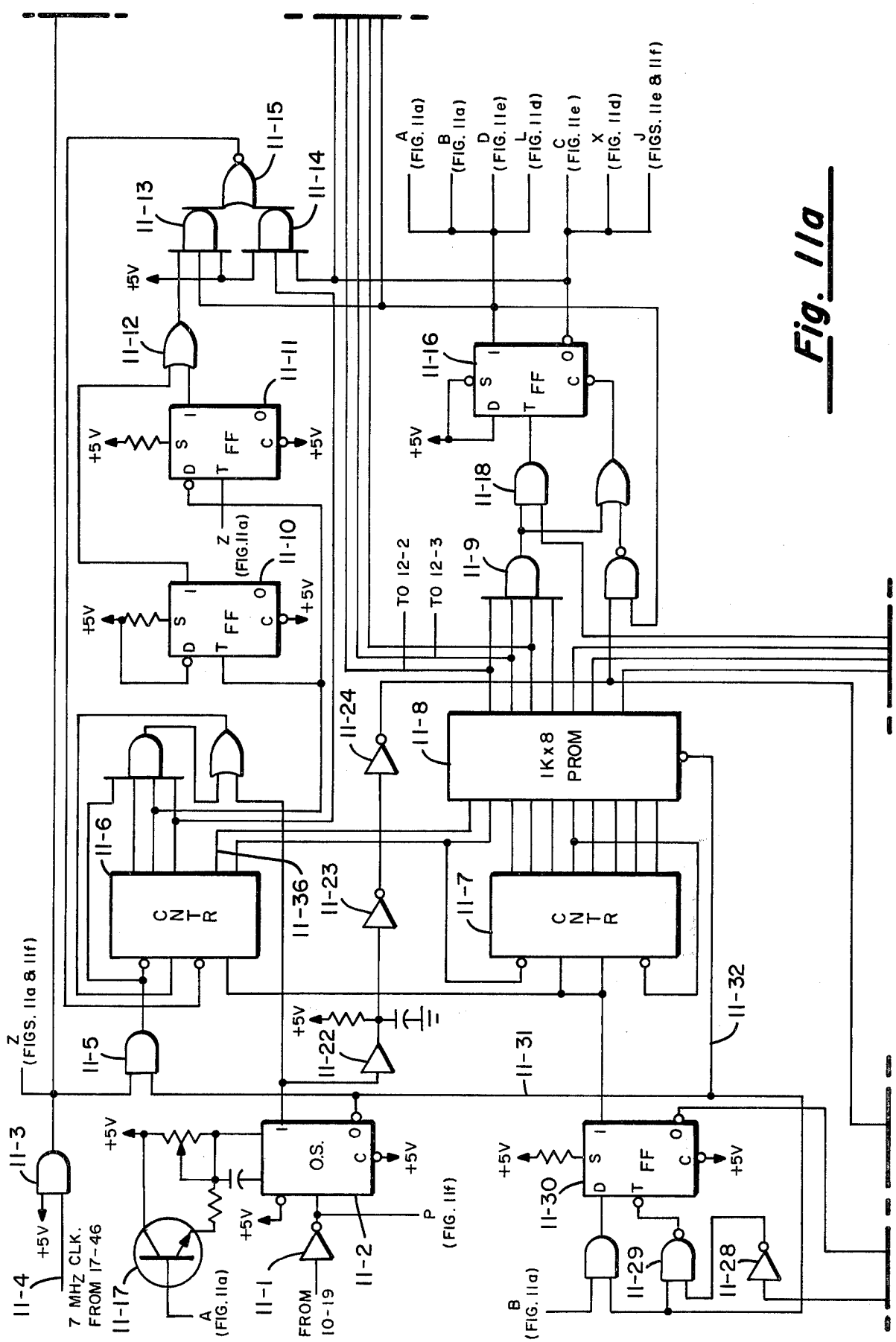
Figure 11D:
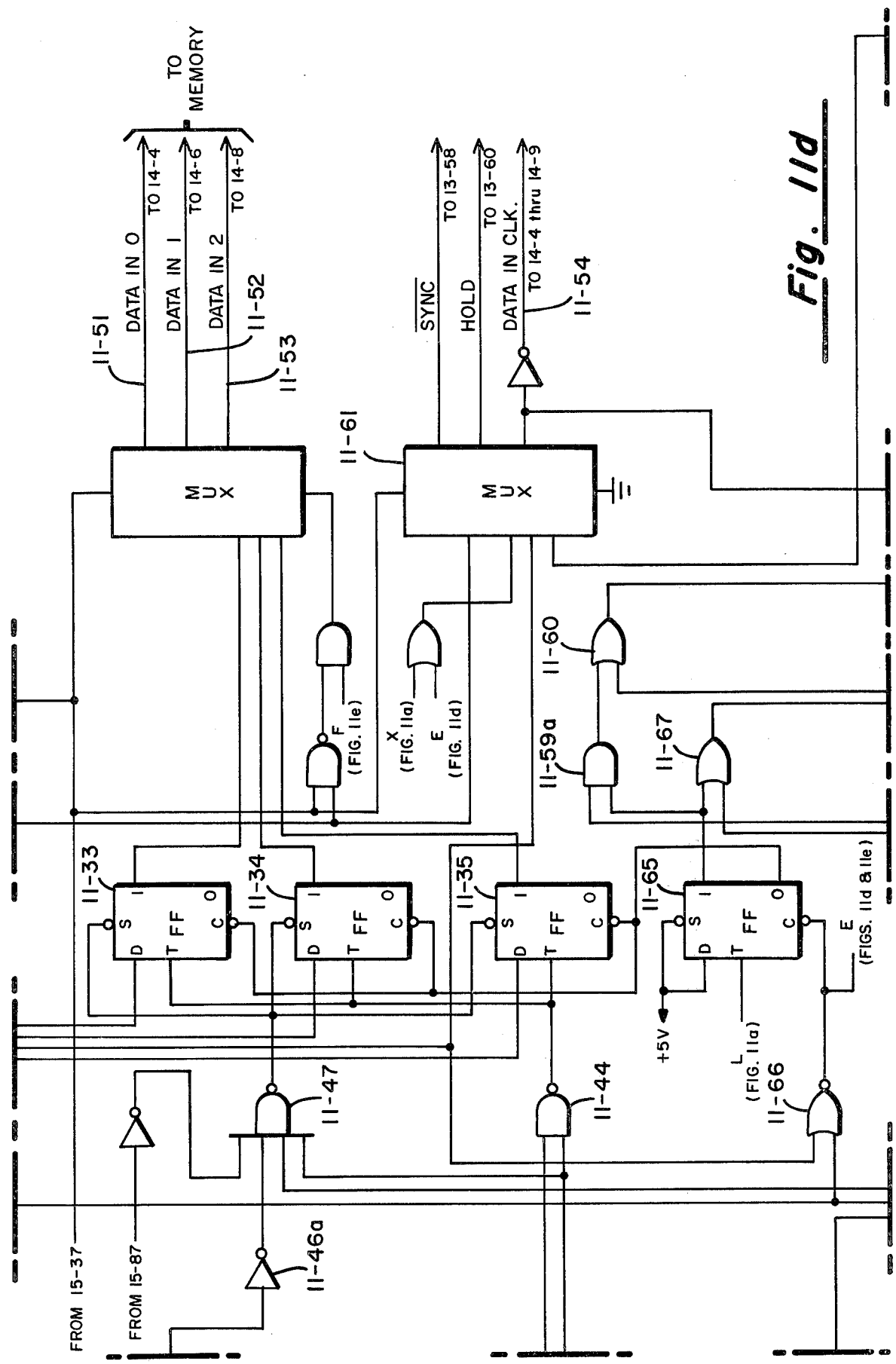
Figure 11F:
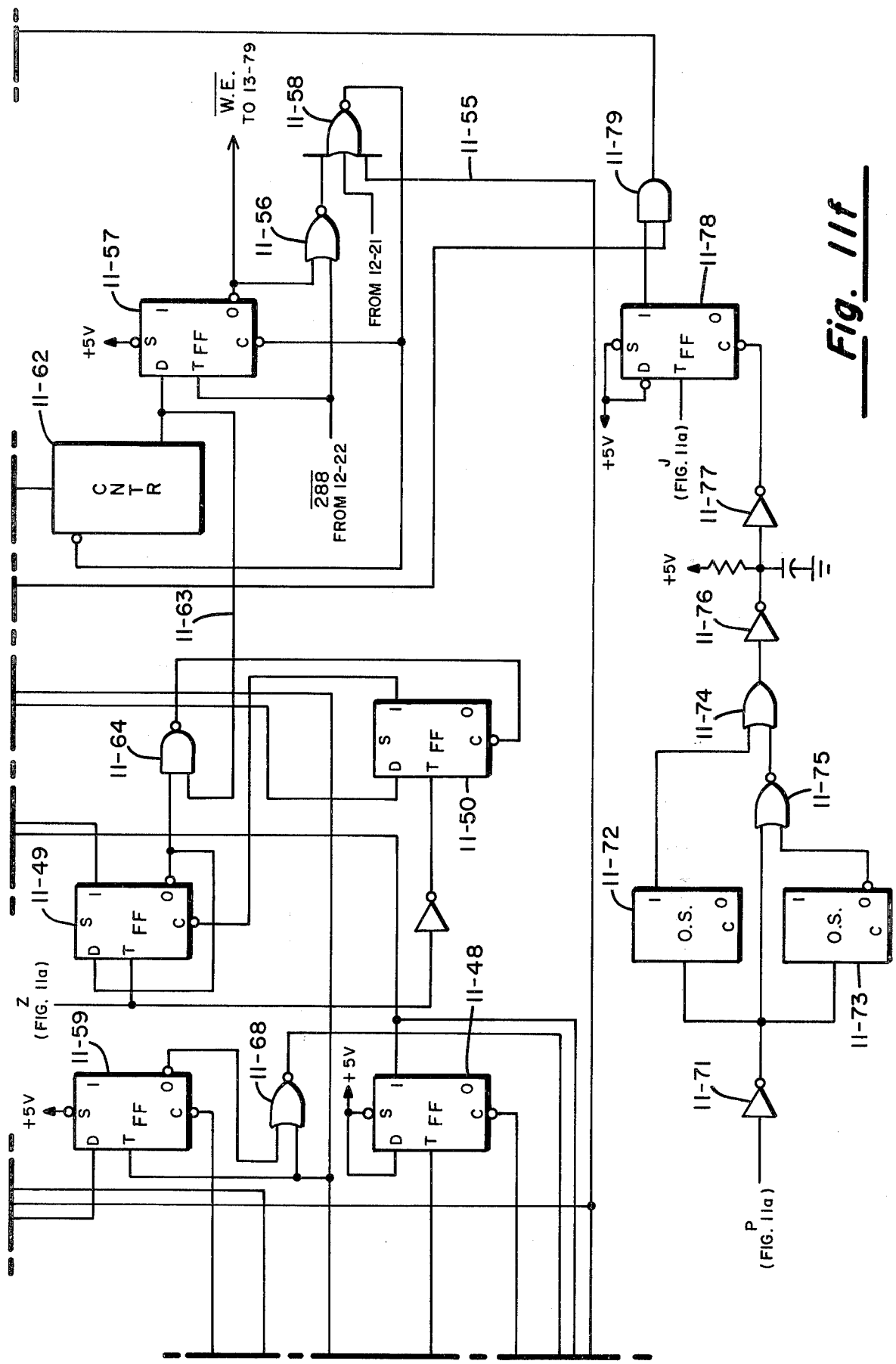
Figure 12:
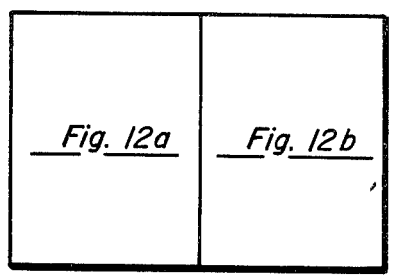
FIG. 12 shows the manner of arranging FIGS. 12a and 12b in forming a composite electrical diagram.

DEMODULATOR BOARD-FIGS. 10, 11 and 12

FIG. 10 illustrates the analog circuits employed to receive, filter, shape and frequency double the tones coming from the transmitter via either the dedicated lines or the dial-up telephone lines. Indicated by numeral 10-1 is the secondary winding of a 600 ohm impedance matching transformer. The diode limiter circuit 10-2 is to obviate circuit damage which might conceivably result from high voltage transients.

Next, the received signal enters a high pass filter including operational amplifiers 10-3 and 10-4 which have their component values adjusted so as to attenuate any 60 cycle noise components which may be impressed on the telephone lines. The output from operational amplifier 10-3 is applied as an input to the amplifier 10-4, the latter being the first stage actually providing substantial amplification or gain. Typically, the amplifier 10-4 may provide a gain of 450. In that incoming signal itself may be anywhere from 20 to 50 millivolts peak-to-peak, after passing through the zero-gain filter stage 10-3, the signals emanating from the operational amplifier 10-4 may be in the range of from 9 to 23 volts peak-to-peak.

The output from the amplifier stage 10-4 is coupled through a DC blocking capacitor 10-5 to a low pass filter network including the resistor 10-6 and a further capacitor 10-7 and is applied to the inverting input of a further operational amplifier 10-8. The component values of the low pass filter are such that it filters out the high frequency noise, i.e., signals of a frequency above 3,000 Hz.

Amplifier 10-8 functions as a limiter or high gain device which clips the waveform at the supply voltage to the integrated circuit, i.e., plus and minus 12 volts. Hence, the output from the integrated circuit 10-8 is a square wave with fast rise and fall times and because of the limiting is immune to amplitude variations over a specified range.

The output from stage 10-8 is split up, one section going to the inverting input of a comparator 10-9 and the other going through an inverting voltage follower stage 10-10. The non-inverting input to this voltage follower 10-10 is derived from a potentiometer 10-11 which may be set to adjust the DC offset. The output from the operational amplifier 10-10 is coupled through a resistor 10-12 to the non-inverting input of the comparator 10-9. This circuit arrangement functions to remove any DC offset which may be present in the waveform so that when it is applied to the following circuit, i.e., the frequency doubler, the half-cycles will be centered on a zero baseline and the zero-crossing points will be properly spaced. The output from the comparator 10-9 is a square wave compatible with TTL digital logic. The inverters 10-13 and 10-14 provide a push-pull type of output. That is, when the output from inverter 10-13 is going high, the output from inverter 10-14 is going low and vice versa. The RC networks 10-15 and 10-16 provides the frequency doubling feature. The output from the drivers 10-17 and 10-18 provide pulses that are approximately 3 microseconds wide with the rate being dependent upon the frequency of the incoming tone.

The output signal appearing at the junction 10-19 is, then, a pulse waveform with an excursion occurring at each zero-crossing of the applied signal from the telephone lines. As is indicated by the flag at that output junction, it is connected to the input of a Schmitt trigger circuit 11-1 of FIG. 11a and the output of that Schmitt trigger is connected to the trigger input of a one-shot circuit 11-2. It is this one-shot that defines the window in which the frequency measurement of the incoming tone is made. This window extends from the beginning of a first square wave pulse defining the incoming tone to the time that this one-shot is again fired by a second such pulse. Applied to a first input of an AND gate 11-3 by way of a conductor 11-4 is a 7 MHz clock signal derived from the Video board. The line 11-4 corresponds to conductor 138 in the block diagram of FIG. 9c. The gate 11-3 acts as a buffer in that its other input is tied to a fixed positive reference voltage. The output from gate 11-3 is, in turn, applied as a first input to a further gate 11-5 whose output is applied to a divide-by-seven circuit in the form of a counter 11-6. That is to say, the low order 4-bit counter at 11-6 receives the 7 MHz clock and effectively converts it to a 1 MHz signal which is applied to the lower or second counter group, the device 11-6 being a dual counter integrated circuit chip.

The lower half of the counter 11-6 as well as the outputs from a further dual counter 11-7 comprise the Address Counters 134 of FIG. 9b. As can be seen in FIG. 11a, the outputs from the counters 11-6 and 11-7 are applied to the addressing inputs of a programmable read-only memory (PROM) 11-8. The Address Counters 11-6 and 11-7, then, perform a frequency-to-binary conversion, developing the necessary address signals for reading out the contents of the PROM 11-8. The particular address is determined by the incoming tone, in that these counters are incremented by the 1 MHz clock signals occurring during the window defined by the one-shot 11-2.

The lowest frequency that the receiver can expect to receive is the Sync tone which may typically be approximately 1200 Hz. This Sync signal is decoded at the gate 11-9 which is connected to predetermined outputs of the PROM 11-8. The output from AND gate 11-9 is the Demodulator. Those read and write addresses are multiplexed to the Address Bus 172.

As those skilled in the art are aware, a TV screen is normally wider than it is high. The actual ratio is four to three. The radar image that is to be displayed on the TV screen by the equipment of the present invention comprises a circular image with a one-to-one aspect ratio. Rather than merely clocking this data so that the 256$^{th}$ column would be aligned with the right edge of the screen of the 256$^{th}$ line would be aligned with the bottom of the screen, circuits are provided for clocking the data at a faster rate in the horizontal direction than in the vertical direction so as to shrink the display horizontally to conform to the one-to-one ratio. The clock circuitry that performs that function is also on the Memory Control board 126, all as will be more fully explained when consideration is given to the detailed logic for implementing that board.

Referring next to the Video board 118, the Phase Lock Loop 174 and the System Timing 176 comprises a Sync Generator for generating the horizontal and vertical synchronizing pulses. That Sync Generator is capable of being phase locked to a master sync generator which forms a part of the TV studio equipment with which the receiver module of the present invention is designed to be compatible, or operating off an internally provided clock source 136. The Sync Generator comprised of the Phase Lock Loop 174 and the System Timing 176 provides interlaced sync signals. Rather than merely outputting 256 horizontal sync pulses followed by a single vertical sync pulse and then another 256 horizontal sync pulses, etc., the vertical sync pulses are shifted a half-line on alternate cycles. Hence, the video display is made to exhibit greater resolution or less granularity than it would otherwise do if interlaced sync was not employed.

Once the RAM 146 has been loaded with precip level data in the four ranges, during "read" operations that data is applied to the Data Decode logic 178 on the Video board 118. The circuits on the Video board take that digital information and convert it into a "composite video" waveform used for driving a video monitor or studio switch. The heart of the Video board is a 14.31818 MHz clock which is a standard frequency used in the television industry. From that frequency, one can derive all of the other horizontal and vertical line synchronizing pulses etc. The 14.31818 MHz signals are used directly to synchronize color information. By frequency dividing the 14.31818 MHz frequency by four, the common 3.58 MHz color sub-carrier frequency is derived.

The Video board 118 includes a plurality of latches whereby the data coming from the Memory board can be held during subsequent processing. Disposed on the Video board are a number of jumpers (not shown) whereby various color selections etc. may be custom selected by the operator. The Decoder module 178 on the Video board takes the 3-bits of information delivered to it and converts it to the RGB color signal. At different receiver sites, the different levels of precipitation will be defined by the same digital data patterns. However, if an operator at one site wants, for example, level 1 to be a light blue color, he may selectively jumper certain terminals on the Video board to cause the desired light blue to result when level 1 digital information is decoded. Similarly, of course, through the use of these same jumpers other colors may be selected as indicative of other precip levels.

As was earlier noted, the cable 120 coupled between the front panel switches and the Video board provide for the interaction whereby the operator may set with thumb-wheels the area or number of pixels of a given level that must occur before the alarm will be sounded. For example, the operator may specify that level 4 precipitation (very heavy) must be detected at 25 discrete locations and if that occurs, an audible signal will be issued. The "clutter blank", of course, is included to accommodate so-called ground clutter. Those skilled in the art know that objects on the ground proximate to any radar transmitter along with a phenomena called side lobe radiation, cause echos to be returned to the radar receiver and these echos may not be weather related. The circuits contained within the receiver allow the operator to blank out this ground clutter and to insert the normal background color which has been selected. The size of the area to be blanked and painted with the background color is adjustable both horizontally and vertically whereby a variable size rectangle may be placed anywhere on the screen to mask the ground clutter. The clutter blanking feature precludes an alarm from being sounded when it is clutter rather than precipitation that satisfied the alarm criteria.

The cable 116 coming from the Switch Interface board 104 to the Video board are the VIP Inhibit/Enable lines and the Blink line 180. The "blink" signal originates at the Video board and is applied as an input to the Switch Interface board and via the VIP Control circuit 114. It causes a selected one of any of the six separate precipitation levels to flicker on the screen and thereby become more visually prominent. In that it is desired that the blinking take place synchronously, it is derived from the vertical blanking period. This will be described in greater detail later on.

With respect to the VIP Inhibit/Enable, the user may selectively shut off any of the various levels of precipitation he may choose via the front panel. In other words, an operator can inhibit any of the precip levels from being displayed. As such, during a weather presentation on a television broadcast, the operator may "focus in on" any desired precip level and may cause it to stand out by the blink feature.

As mentioned above, the Phase Lock Loop 174 permits the system of the present invention to "gen lock" to the TV studio sync. By phase locking to the studio sub-carrier signal, the receiver of the present system will produce outputs which will be in phase with the TV studio equipment. Various adjustments, yet to be described, and contained on the Video board, permit control over such things as sync level, burst level, chromanance, luminance, horizontal and vertical positioning, etc. These signal emanating from the Digital-to-Analog Video logic 182 are made available at a plug-in jack on the back panel of the receiver.

The Digital-to-Analog Video block 182 comprises a color encoder for converting the 3-bit digital information (RGB) to an analog video waveform. This device is embodied in two commercially available integrated circuit chips specifically designed to perform the indicated task, but as described in detail later, considerable external circuitry is necessary to provide the user with the aforementioned adjustment control of the various parts of the video signal like sync, burst, etc., necessary to match the signal to existing signal from various studio equipment such as video tape recorders and cameras.

The Video board 118 is also arranged so that alternate inputs from external graphics generators can be applied monitored until a Sync pattern is detected. Following a dial-up, until a Sync signal is received, the memory cannot be up-dated in that the receiver cannot determine immediately at what point it broke into the transmitting cycle. The decoding of Sync tones, as distinguished from precip level data tones, is carried out somewhat differently in the Demodulator. With the exclusion of Sync tones, the counters 11-6 and 11-7 are allowed, during four half-cycles or four frequency doubled pulses to sample incoming tones. Four full cycles of incoming tones or eight half-cycles are received. The counters are allowed to count up through the fourth to the seventh double pulse that is received from the analog circuitry of FIG. 10. However, with Sync tones, sampling occurs between every half-cycle. To use the same Conversion PROM 11-8 for both sync and for regular data, the counters 11-6 and 11-7 must be advanced at four times the normal frequency. This frequency quadrupling is performed by the one-shot circuits 11-10 and 11-11 whose output terminals are coupled through an OR gate 11-12 to a multiplexer circuit comprised of AND circuits 11-13 and 11-14 feeding the NOR gate 11-15. The output from 11-15 is coupled back by a conductor to the toggle input of the lower half of the counter chip 11-6. It can be seen, then, that there are two separate ways in which the PROM Address Counter may be toggled. The first way is via gate 11-13 and 11-15. It is to be noted that the one-shot 11-10 is fired on the leading edge and the other one-shot 11-11 is fired on the trailing edge which effectively quadruples the frequency. That passes through AND gate 11-13, provided the Line Sync flip-flop 11-16 has been set which, of course, happens when the sync pattern is detected at the output of gate 11-9. When no sync pattern has been detected, the Line Sync flip-flop 11-16 remains cleared such that it is AND gate 11-14 which is enabled to pass the 1 MHz clock derived from the counter 11-6 and that is fed through NOR gate 11-15 back to the toggle input of the address counter 11-6. Hence, that counter will be advanced either at a 4 MHz rate when sync tone is detected or at a 1 MHz rate when data other than sync are being detected.

It is essential for proper operation of the demodulator that the transition from a sync tone to a non-sync tone be detected. Because of the format of the transmission, following the termination of a sync tone the receiver recognizes the next incoming tone to be data followed by the first compression byte, the second compression byte, further data, etc.

Referring again to Table II at Page 71a above, it can be seen that sync is handled by PROM 11-8 in essentially the same fashion as data, as far as address formats and decoding is concerned. The output from the set side of the Line Sync flip-flop 11-16 is coupled to the base electrode of a transistor switch 11-17 and when this flip-flop sets, that output goes high to change the bias on the transistor so as to alter the RC timing for the one-shot circuit 11-2. Using this arrangement, the "window" is made approximately four times larger. It has been found that at the transition between the last half-cycle of the sync character and the first half-cycle of a data character becomes foreshortened, i.e., a higher tone, due to envelope delay distortion introduced by the transmission line. That is to say, the higher frequency tones tend to propagate through the phone line at a faster rate than lower frequency tones and, as a result, distortion of the last half-cycle of the sync signals takes place. It was found that this distortion was sometimes severe enough to cause an out-of-sync condition whereby the averaging operation was instituted prematurely. The transistor 11-17 is employed to shorten the RC time costant and thereby widen the window so that a more drastic change is needed before the incoming signal will no longer be considered as a sync tone. It can be seen, then, by controlling the conduction of the transistor 11-17 by the output of the Line Sync flip-flop 11-16 proper coordination is maintained even in the presence of delay distortion in the transmission link. It should be recalled that when one-shot 11-2 is firing, the address counters 11-6 and 11-7 cannot be advanced. Since the count frequency for sync has been quadrupled, in order to arrive at a similar address for the PROM 11-8, every half-cycle comprises a sample.

The AND gate 11-9 will decode a sync pattern coming out from the PROM 11-8 because of the manner in which the data is prestored in the PROM. That is, an all-one's pattern (F hexadecimal) at the input to gate 11-9 occurs only when the sync tone is decoded. The output from this gate 11-9 is applied as a first input to AND gate 11-18 and the other input to this last-mentioned gate comes from the "Sample Time" one-shot 11-19 via conductor 11-20.

When the system is operating in a "dial-up" mode and a connection is first established via the telephone lines to a remote transmitter, the precise point in the transmitting cycle when the hook-up is established is unknown. That is to say, the data tones arriving may be for any one of four possible ranges and may be a sync tone, a data tone or a compression count. Initially, the one-shot 11-2 is being triggered by the output from the frequency doubler of FIG. 10 and these pulses are advancing a counter 11-20 via the buffer 11-22 and the inverters 11-23 and 11-24 which are coupled between the output of the one-shot and the count terminal of the counter 11-21. Hence, the last-mentioned counter will be randomly counting up in that there is nothing to inhibit it. At this point, it is assumed that the first line sync tone has not been received. The count developed within the counter 11-21 is decoded in a hexadecimal four-to-nine decoder 11-25 to eventually provide a decoded count as it is being toggled every half-cycle by the received frequencies. The four-to-nine decoder 11-25 will provide an output on line 11-26 at a count of four and that output fires the Sample Time one-shot 11-19. When that happens, it provides an input to the gate 11-18 such that if a sync tone had been decoded by that time, the Sync flip-flop 11-16 will be set. When the Sync flip-flop sets, its complement output goes low and releases the counter 11-21 to provide the necessary reference point whereby the counts entered into the counter 11-21 will be controlled and the sequence of outputs from the decoder 11-25 will also be referenced.

The Sync flip-flop 11-16 also controls the parallel loading of a count into the counter 11-21. Thus, when the complement output of the Sync flip-flop 11-16 goes low, a starting point count established by the hard wire connections to the input of the counter 11-21 will be parallel loaded and the count will be advanced from that initial value. So long as the Sync flip-flop remains set, it continuously applies a low signal to the parallel load enable and precludes that counter 11-21 from advancing. As such, the hex decoder 11-25 is prevented from issuing a pulse on line 11-26 and triggering the Sample Time one-shot 11-19 during the sync interval.

While decoding a sync tone, the system examines every half-cycle of the incoming waveform and as soon as the first non-sync frequency is detected a transition will occur in the waveform at this point and that event triggers further operation whereby the incoming data is "averaged". Rather than looking at the frequencies near their transition point, sampling occurs following the receipt of a few initial cycles and is terminated prior to the end of such cycles. While a sync tone is being received, stage 7 of the decoder 11-25 will be low active. As soon as the first non-sync frequency is received, the output from the one-shot 11-2 toggles the counter 11-21, but since the parallel load terminal is still low at this time, the count within counter 11-21 does not advance. After the sync tone disappears and the 8 frequency double pulses indicative of the data begin, the hex decoder 11-25 will be cycled. Upon receipt of the second count, the decoder 11-25 outputs a signal on line 11-26a which passes through OR gate 11-27 to clear the counter 11-21. With all zero's applied to the decoder 11-25, its output pin number 1 will be low active. The conductor 11-26 also applies an input to an inverter 11-28 whose output is applied as a first input to a NAND gate 11-29. The output of this gate connects to the trigger terminal of a one-shot 11-30. The output from the one-shot provides the "clear" input for the Address Counters 11-6 and 11-7. Thus, the Address Counters used to address the PROM are cleared to zero after the sync tone goes away.

Following the receipt of three non-sync frequency doubled pulses, the counter 11-21 will be advanced sequentially four times by half-cycles of the given tone and it is during this time that averaging takes place. During the time that counter 11-21 is being advanced and its output decoded, the counters 11-6 and 11-7 are free-running such that a composite address is developed in them which is applied to the PROM 11-8. Then, the very next frequency doubled pulse, i.e., pulse number 8 in the sequence, will cause the decoder 11-25 to output a signal on line 11-26 to fire the Sample Time one-shot 11-19. This same event causes the one-shot circuit 11-2 to output a low signal which, when applied by way of conductors 11-31 and 11-32 enables the PROM outputs from a tristate position to true data. The firing of the "Sample Time" one-shot 11-19 is the event which causes the data word read out from the PROM to be latched into the Data flip-flops 11-33, 11-34 and 11-35. It can be seen, then, that it is the counter 11-21 and the hex decoder 11-25 which control the ability of the Address Counters 11-6 and 11-7 to advance and to address the PROM. Once addressed, the contents from that address are read out and latched in the flip-flops 11-33 through 11-35.

With respect to the counter 11-6, its output on conductor 11-36 changes at a 250 KHz rate which is a frequency permitting the counting scheme employed for addressing the PROM to be used. That is, the lower bit of the address applied to the PROM defines a rate for toggling in the length of the interval for the four half-cycles over which the averaging takes place. For sync tones, averaging occurs every half-cycle and once data signals begin, averaging occurs over the four half-cycles.

The flip-flops 11-37 and 11-38 are provided to control the time at which PROM outputs are latched into the Data flip-flops and indicate whether the word so latched is data or one of the two possible compression code bytes.

The output from the Sync flip-flop 11-16 is applied as an input to AND gate 11-39, holding it disabled so long as the Sync flip-flop is set. With AND gate 11-39 disabled, the further AND gate 11-40 will also be disabled holding the flip-flops 11-37 and 11-38 in their cleared state. These flip-flops are toggled by the output from the Sample Time one-shot 11-19 when the signal on conductor 11-26 goes low at the end of the averaging cycle. Thus, the one-shot only fires once for each data byte received. More specifically, it will fire at the end of the seventh half-cycle and just prior to the eighth half-cycle received. In that the Sample Time one-shot 11-19 toggles the Control flip-flops 11-37 and 11-38, they can be made to count up from zero to two and allows the Data Latch flip-flops 11-33 through 11-35 to capture the data from the PROM's or to latch a count into the Decompression Counters 11-41 and 11-42. By following the logic through, it will be noted that true data is contained in the PROM 11-8 for the data code defining one of the six intensity levels while inverted compression data is contained in the PROM for the decompression codes. By parallel loading the "inverted" compression count into the counters 11-41 and 11-42 and then by incrementing them, the carry outputs from counters 11-41 and 11-42 can be used to indicate that the compression count has been fully decoded. For example, if a compression count of zero had been read from the PROM, an FF pattern would be entered into the Decompression Counters 11-41 and 11-42. By merely toggling these counters a single time, the carry outputs therefrom applied to AND gate 11-43 would immediately go high and no further decompressing would take place, meaning only one consecutive character of a given type existed in this case. Alternatively, if some other value had been read from the PROM, a plurality of cycles would have to take place before the AND condition of the gate 11-43 is satisfied. The number of cycles is, of course, representative of the number of times that an identical data byte representing a given precip level will be stored into the receiver's memory.

Because the pattern "data, compression, compression" had been sent in that order following a sync tone, the first sample time will latch data into flip-flops 11-33 through 11-35. The second sample time will check the map bit and latch the lower 2-bits of the compression count into latch 11-41. The third sample time will latch the remaining 3-bits of the compression count into ciruits 11-41 and 11-42. How this is accomplished will now be explained.

As was indicated earlier, flip-flops 11-37 and 11-38 function as a "count from zero to two circuit," and both are cleared following sync. The complement output of flip-flop 11-38 is applied as a first input to AND gate 11-44 and will provide an enable as long as 11-38 is cleared. When the first sample time occurs, its leading edge, i.e., its low-to-high transition, is applied to the remaining input of 11-44, producing a like high going transition. It is the edge applied to the toggle input of flip-flops 11-33 through 11-35 that latches the data from ROM 11-8 applied to the respective data inputs into the flip-flops. When the sample time one-shot times out, its trailing edge (low-to-high transition), on the complementary output of the one-shot toggles flip-flop 11-38 to a set state, producing a count of one in the zero-to-two counter 11-37 and 11-38. This count is decoded by AND gate 11-46(a) and applied to gate 11-47 as a first enable. The remaining three enables to this gate are: (1) the front panel "MAP Disable" switch from 15-87 via an unnumbered inverter - this signal will disable gate 11-47 if the "MAP Disable" switch is active; (2) the MAP data bit from ROM 11-8 via inverter 11-46; and (3) "Sample Time". Therefore, the leading edge of the second sample will enable gate 11-47 if MAP data is present and if "MAP" is not disabled by the front panel switch. If all conditions are met, AND 11-47 is enabled causing its active low output to force set the data flip-flops 11-33 through 11-35 to contain a binary 111 (decimal 7) or MAP character.

In addition, the leading edge of the second sample time output will propagate through gate 11-44 (which is enabled by flip-flop 11-38 being set), through OR function 11-46 to strobe the counter 11-41. The load to the counter 11-41 is enabled by flip-flop 11-38 being set so the first compression byte is parallel loaded from ROM 11-8 into the counter. At the trailing edge of the second sample time, the zero-to-two counter is advanced from one to two. The third sample time pulses leading edge will then propagate through gate 11-45 and 11-46 to load the second compression count from the ROM 11-8 into counter 11-41 and 11-42. Its trailing edge will advance the zero-to-two counter from two back to zero, setting the logic for the next sequence.

Summarizing momentarily, it has been shown how the incoming tones are converted into an averaging process to binary address signals and how these address signals cause predetermined binary words stored in the PROM to be read out in the sequence: "data, compression, compression" following the conclusion of a sync tone. It has further been shown how the data pattern is stored temporarily in Data Latches and how the inverse or complement of the compression code is entered into the Decompression Counters. As was indicated in the general block diagram of FIG. 9, the data words indicative of precip levels stored in the latches 11-33 through 11-35 on the Demod board ultimately are stored in the dynamic RAM chips contained on the Memory board. The manner in which the data is transferred from the Demodulator to the Memory will now be explained.

The flip-flop 11-48 is referred to as the "Decompression" flip-flop and is arranged to be toggled on the leading edge of a high pulse when the complement output from the flip-flop 11-37 goes high. When this happens, it means that all three of the data, compression, compression sequence have been received and processed. Thus, when the complement output of flip-flop 11-37 goes high, it permits start-up of the Timing Synchronization flip-flops 11-49 and 11-50 which are arranged to be alternately clocked by the 7 MHz clock signals at the output from the buffer 11-3. The outputs from the flip-flops 11-49 and 11-50, as they are allowed to toggle back and forth, generate the memory shift pulses for the data being transferred to the Memory board. The data itself appears on the lines 11-51 through 11-53 while the "Data-In" clock signals for effecting the desired transfer appear on line 11-54. There are two ways in which the Data-In clock pulses on line 11-54 are generated. In one mode, the data word is transferred a number of times determined by the contents of the Decompression Counters 11-41 and 11-42. The other mode is truncation and with truncation, the data word is transferred until a counter on the Memory Control board responds with the "Line-Full" signal indicating that a count of 256 had been reached which is the end of that line. The "Line-Full" signal comes to the Demodulator board by way of the line 11-55 and, as will be seen, serves to stop the clocking sequence.

As will be explained in greater detail when the Memory Control board logic is discussed hereinbelow, when a writing operation is taking place, various address counters on the Memory Control board, controlled by the horizontal pulses from the Video board, are timed in such a way that a count is developed only when there is no more displayable video data going out to the screen. When the Memory is not engaged in displaying visible data on the screen, it may be used to store away data coming from the Demodulator board. A control signal called $\overline{288}$ developed on the Memory Control board indicates to the Demodulator board that the Memory is no longer being used for reading out data to the Video board and is now available to receive data from the Demodulator board. The 288 control signal is applied as a first input to NOR gate 11-56 whose second input is connected to the complement output of the Write Enable flip-flop 11-57. The output from NOR gate 11-56 connects as a first input to a further NOR gate 11-58. A second input to this last-mentioned gate comes from the Freeze logic yet to be described as a Disable Write signal. The third input is the Line-Full signal on line 11-55. Without a 288 signal, the Write Enable flip-flop 11-57 cannot be set and nothing can be written into memory.

With reference again to the Decompression Counter circuits 11-41 and 11-42, even though the decompression count may be zero, these counters are still loaded with that zero value and are made to go through the sequence just as if they were acting to decompress a data word. This is because there is no compression count of zero. (A zero compression count would mean no data at all). Instead, a compression count of zero means only one data character of that value. Since the counters were initially loaded with the complement of zero (hexadecimal FF), upon receipt of the first toggle pulse, the true output from the flip-flop 11-49 will cause AND gate 11-59(*a*) to output a signal through OR-gate 11-60, causing the circuit 11-61 to generate one Data-In clock signal on line 11-54. This same pulse will also advance the Decompression Counters 11-41 and 11-42 and when each produces its carry out signal, AND gate 11-43 produces a signal for setting the Decompression Done flip-flop 11-59. The setting of the flip-flop 11-59, in turn, clears the Decompression flip-flop 11-48. When that happens, it precludes the flip-flops 11-49 and 11-50 from sending out any further clock data pulses on the line 11-54.

At the same time that the Data-In clock pulses leave the Demodulator board and enter the Memory, the same pulses are applied to a further counter 11-62 whose output may be used to set the Write Enable flip-flop 11-57 to thereby send Write Enable pulses to the Memory Control board for allowing the actual write operation to take place. Thus, the Data-In clock signals function to shift the 4-bits into the three 16K×4 shift registers on the Memory board. It can be seen, then, that the 16K RAM's will be loaded with 12-bits simultaneously, four bytes of 3-bits each. The counter 11-62 develops the "Count=4" function represented in the general block diagram of FIG. 9. When the counter 11-62 develops a high signal, it is transferred on conductor 11-63 to disable the Clock Synchronization flip-flops 11-49 and 11-50. Specifically, the output from the gate 11-64 goes low when the Count=4 device 11-62 outputs a high signal and that low signal maintains the flip-flops 11-49 and 11-50 in a cleared condition. When the outut from the Write Enable flip-flop 11-57 goes high, it signifies to the Memory Control board that a write operation should take place. Further, by means of the gated 11-56 and 11-58, the setting of the Write Enable flip-flop 11-57 causes a signal to be produced for again clearing the Count=4 counter 11-62, thereby readying that counter for a subsequent cycle.

The system of the present invention further includes a feature whereby invalid data is precluded from updating the memory. Furthermore, an indicator on the front panel is illuminated when invalid data is detected. Specifically, the incoming tones from the frequency doubler occurring at the output of inverter 11-1 are applied as an input to a further inverter 11-71 whose output is used to fire two one-shot circuits 11-72 and 11-73. The one-shot circuit 11-72 has its parameters set such that if an incoming frequency is too low, it will time out and produce an input to OR gate 11-74. Similarly, the timing parameters of the one-shot circuit 11-73 are used to determine whether the incoming frequency is too high and in that event, the gate 11-75 is enabled to again pass a signal through OR gate 11-74. Thus, if either of these conditions prevail, a pulse is delivered through the inverters 11-76 and 11-77 to clear a flip-flop 11-78, which flip-flop is set by the low active output of the sync flip-flop 11-6. The output from the flip-flop 11-78 is AND'ed together with clock input data from 11-60 at AND gate 11-79 which outputs a signal which is coupled to the MUX 11-61 which then functions to preclude the generation of the data-in clock. The output from the flip-flop 11-78 is further applied to a indicator to a "WARNING" indicator lamp on the front panel to advise the operator that invalid data is arriving over the phone lines.

The flip-flop 11-65 is referred to as the Truncation flip-flop and is set whenever the Sync Decoder gate 11-9 detects the F pattern out of the PROM 11-8 before the Line Full has been generated. It is at that time that the Sync flip-flop 11-16 is set and its true output is applied to the toggle input of the Truncation flip-flop 11-65. The Truncation flip-flop is cleared by a low output from NOR gate 11-66. This output occurs when the Line-Full signal on conductor 11-55 is inactive at the time that another sync is received. This initiates the truncation sequence.

When the truncation sequence is initiated, flip-flop 11-65 sets and allows the Clock Data flip-flops 11-49 and 11-50 to set. Specifically, the flip-flop 11-50 can be set by the output from OR gate 11-67 when either the Truncation flip-flop 11-65 sets or when the Decompression flip-flop 11-48 sets. If either one of these last-mentioned flip-flops is set, it allows the data clock synchronization sequence to occur such that memory may be written into. The first thing to happen is that the shift register is toggled up to four causing a write pulse to be generated. The sync signals are held off during the writing operation and that procedure is repeated however many times is required to have the Decompression Counters 11-41 and 11-42 to overflow and thereby set the Decompression Done flip-flop 11-59 or until a Line-Full signal is obtained from the Memory Control board.

If it is assumed that just one data byte is to be transmitted and there is not decompression or truncation involved, the flip-flops 11-41 and 11-42 still provide a decompression count of zero and the circuitry described above will proceed as if decompression were to take place. That is, the Decompression flip-flop 11-48 is set by the clearing of the control flip-flop 11-37 indicative that the usual sequence, data, compression, compression, has been completed. This allows the Decompression flip-flop 11-48 to set such that the clock data to Memory flip-flops 11-49 and 11-50 are allowed to cycle one time only. In that the decompression count entered into the counters 11-41 and 11-42 places them in a all ones condition, the first toggle pulse creates the required overflow for setting the Decompression Done flip-flop 11-59 and its output is fed through NOR gates 11-68 and 11-69 to clear the Decompression flip-flop 11-48. As a result, under control of the Count=4 counter 11-62, four shift pulses are sent to the memory and the memory is advised by the presence of a "Write Enable" signal that the data can be stored away.

A still further factor involved in the transmission of data from the Demodulator board relates to the so-called "Hold" sequence. A "Hold" occurs if a sync signal has not been received after a certain period of time. Specifically, in between frames defining the data from the four discrete ranges, there is an approximate three or four second delay during which a range code signal, which is different from the sync tone, is sent. Referring to FIG. 11*b*, the one-shot 11-70 is arranged to be repetitively triggered by the output from the Line Sync flip-flop 11-16. If no Line Sync pulse occurs within a predetermined time period, the one-shot circuit 11-70 will time out in that the time constant, determined by the RC control parameters of this one-shot, are calculated to provide a period which is commensurate with the longest time interval which can occur in between Line Sync pulses. Typically, the one-shot 11-70 will time out if approximately 1.5 seconds elapse following the receipt of a Line Sync pulse from the flip-flop 11-16. It is during the "Hold" time that precip level information relating to one of the four ranges is transmitted to the range latches.

Figure 12A:
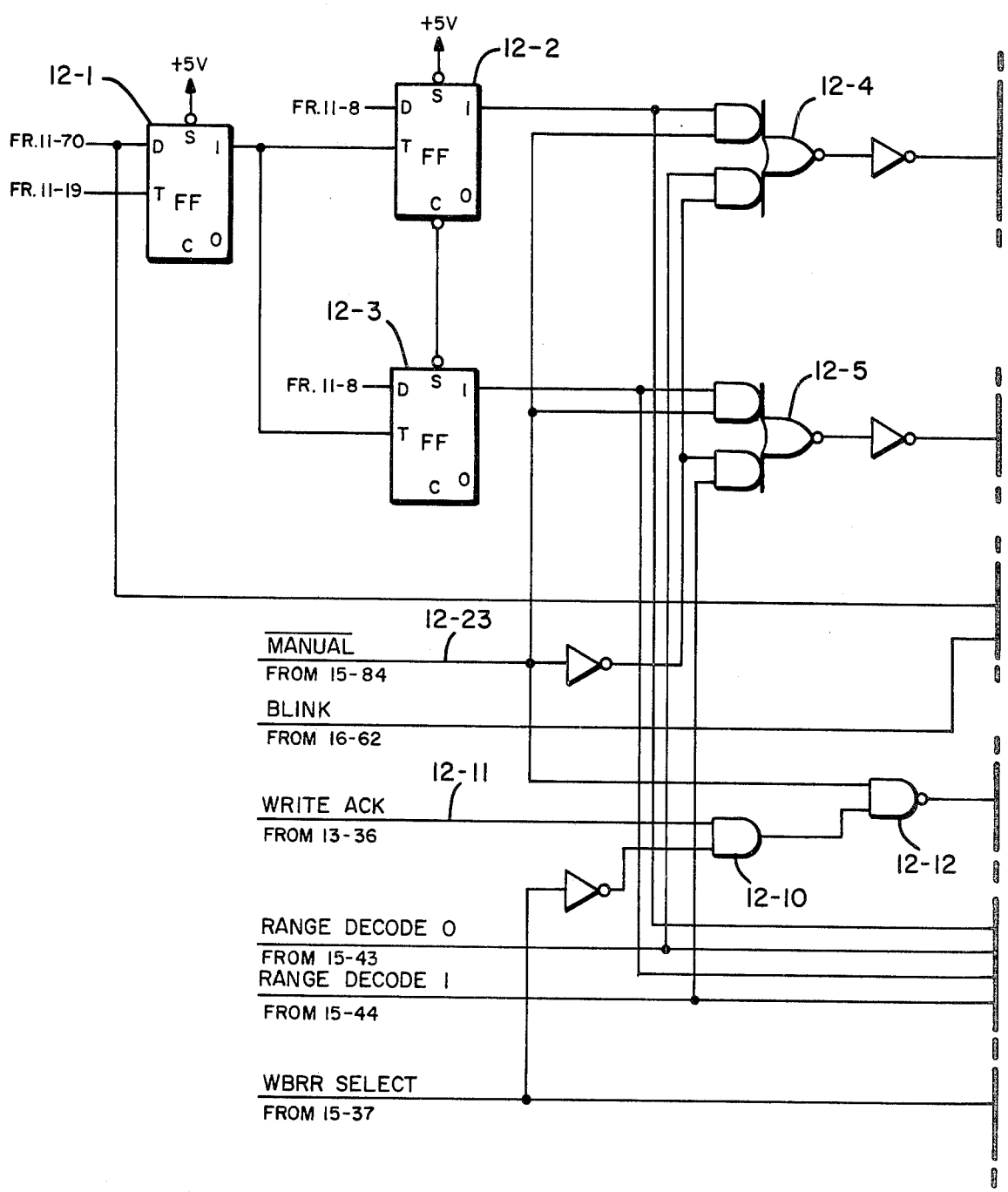
FIGS. 12a and 12b, when arranged as shown in FIG. 12, illustrate by means of a logic diagram the implementation of further features of the Demod board.

Referring to FIG. 12*a*, when the "Hold" signal from the oneshot 11-70 is applied to the D-input of the Hold flip-flop 12-1 and the Sample Time one-shot 11-19 fires, the flip-flop 12-1 will set and that, in turn, toggles the Range Latch flip-flops 12-2 and 12-3 whose direct set inputs, i.e., D-inputs, come from the output of the Conversion PROM 11-8. If an intensity level of 0 through 3 is received by the Demodulator board, that particular frequency will be decoded by the PROM 11-8 and binary numbers corresponding to 0, 1, 2 and 3 will result. This, then, is the range code which is generated following each page of data which is being received. This range code then allows the receiver electronics to know which range bin is being up-dated upon the establishment of the dial-up connection between the transmitter and receiver.

The output from the Range Latch flip-flops 12-2 and 12-3 are applied to a multiplexer comprised of NOR gates 12-4 and 12-5 along with their associated AND inputs selectively apply signals to the decoder chips 12-6 and 12-7 which, via their output connections, select which light on the front panel will blink. The details of operation of these circuits will be explained more fully hereinbelow.

The multiplexer 12-8 and its associated decoder 12-9 also receive inputs from the Range Latch flip-flops 12-2 and 12-3 along with inputs coming from the Switch Interface panel and their output lines provide the Column Address Strobes (CAS) to the Memory Control board. More specifically, the multiplexer 12-8 will select two range bits coming from the Switch Interface board. These two bits, depending upon their permutations, can be used to specify any one of the four possible ranges and by decoding them, control can be exercised over the memory so that intensity level data associated with any one of the four ranges can be separately compartmentalized into one of four banks of memory. It is the Write Acknowledge control signal from the Memory Controller board which is used to switch the multiplexer 12-8, the Write Acknowledge being applied to AND gate 12-10 by way of a conductor 12-11 and the output of the gate 12-10 being applied as a first input to NAND gate 12-12 along with a further signal from the Switch Interface panel indicative of the fact that the system is not being operated in a "manual" mode. It will be recalled that when a Write Acknowledge is present, it means that a write operation is in progress. When active, it switches the multipexer 12-8 over to receive the address contained in the Range Latch flip-flops 12-2 and 12-3. When Write Acknowledge is inactive, the multiplexer 12-8 is in a condition which allows the range selection to be done by the manual pushbuttons. This occurs ony during read cycles.

MEMORY CONTROL - FIG. 13

Referring again to the genral block diagram of FIG. 9, the interaction of the Memory Control board with the Memory will be explained. In that the system of the present invention is arranged to accommodate radar data from four different ranges, the Memory is also partitioned into four separate banks wherein radar data relating to the different ranges can be compartmentalized. The manner in which the four banks of Memory are selected is with so-called "Column Addresss Strobes" (CAS). All data output lines of the four banks of Memory are tied together by means of tristate devices. The same is true for the Memory inputs. It is only the particular Memory chip which receives a CAS which is capable of releasing its data. Memory control is arranged so that all chips in the Memory are strobed at once. Specifically, each of the 48 RAM chips on the Memory Board are simultaneously strobed and, by that means, they remain refreshed. By selecively gating the CAS to the individual banks, i.e., 1, 2, 3 or 4, the data inputs and data outputs are made available to any one particular bank.

FIGS. 13a through 13f illustrate the detailed logic for implementing the Memory Control board. It is this circuitry that provides the synchronization to the rest of the receiver system and, for the most part, the functioning of the Memory Control circuits are slaved from the horizontal drive, HD, and vertical drive, VD, provided by the Video board, all as will be more fully described. The horizontal drive provies the required line pulses while vertical drive produces the deflection from bottom to top.

A 27.165 MHz clock 13-1 generates the timing on the Memory Control board. The output from this clock is applied through a chain of gates including AND gates 13-2 and 13-3 and NAND gates 13-4 and 13-5 to the toggle input of a four stage counter chip 13-6. The output from the counter 13-6 is applied as an input to a decoder chip 13-7. The combination of the counter 13-6 and the decoder 13-7 may be considered as a timing chain which is ultimately controlled by the HD signal from the Video board. More specifically, it is only after a HD pulse is emitted from the inverter 13-8, indicating the start of a line, that the timing chain is initiated. The output from the inverter 13-8 sets the Line Enable flip-flop 13-9 which is used to initate the counter 13-6.

Because it is required that Memory be read out at a particular rate it is necessary to have associated address circuitry which functions to keep track of the Memory locations as the display progresses both horizontally and vertically. The timing chain decoder 13-7 provides four distinct timing pulses labeled T1 through T4 on the lines 13-10 through 13-13 and are distributed to the other boards in the receiver to thereby provide synchronization for the varous functions.

The flip-flops 13-14 and 13-15 are referred to as "Dejitter" flip-flops and are used in the following manner. Because the HD pulses for initiating the reading of another line are asynchronous as far as the 27.165 MHz clock used to achieve a one-to-one aspect ratio is concerned, the flip-flops 13-14 and 13-15 serve to reduce the link-to-line offset or apparent jitter which would otherwise appear on the screen. Flip-flop 13-14 is provided with an in-phase clock signal at its toggle input terminal from the buffer circuit 13-2, Flip-flop 13-15 is fed an inverted version which is 180° out-of-phase with the clock signal by way of the inverter circuit 13-9. When the Line Enable flip-flop 13-9 sets by having received a HD pulse, its true output goes to the "D" or enable input of both flip-flops 13-14 and 13-15. The first one of these enabled flip-flops to receive a toggle, whether it be the in-phase clock or the 180° out-of-phase clock, will set and thereby hold the other one in a cleared condition. When one of the two flip-flops sets, it will gate its clock which is the closest to being in phase with the HD which occurred for that line, through to control the timing for that line. This serves to reduce the possible jitter from line to line to such a short interval (18 nanoseconds) so that it is undetectable when viewed on a CRT monitor.

To step horizontally across the display screen, use is made of the clock counter comprised of the interconnected counter chips 13-16, 13-17 and 13-18. As these counters are advanced, they keep track of the position of the trace as it progresses horizontally across the screen. By decoding the outputs from the last-mentioned counters, the previously mentioned $\overline{288}$ control signal is obtained and this is the signal which is sent to the Demodulator board for indicating that the system is no longer reading from Memory and the displayable video area has been exceeded. Hence, writing operations may take place upon detection of the presence of the $\overline{288}$ signal at the output of gate 13-19.

Identified by numeral 13-20 is the so-called Read Cycle flip-flop. This circuit becomes set when in an area of video timing where read operations are apropriate. Before the flip-flop 13-20 will be set, certain conditions have to be met. First of all, approximately 15 horizontal drive pulses must have been received before the read area begins. The line counting function is accomplished by means of the counter chips 13-21 and 13-22 which are arranged to be toggled by HD signals emanating from the Line Enable flip-flop 13-9 via conductor 13-23. In esence, the Read Cycle flip-flop 13-20 is set by the HD pulses themselves via AND gate 13-24 which has a first input connected directly to the 1" side of the flip-flop 13-9. When the Read Cycle flip-flop 13-20 sets, it then, via OR circuit 13-25 enables the Memory timing counter 13-26 to initiate the running of the Memory timing chain comprised of the counter 13-26 and its associated decoder 13-27. As the Memory timing chain runs, it performs a number of successive operations. First of all, it periodically sets the Row Address Strobe flip-flop 13-28. Then, when T4 occurs (13-13) timing pulse out of the deoder 13-7 the Column Address Strobe flip-flop (CAS) 13-29 is set via an output from NAND gates 13-30.

It can be seen, then, that the CAS is selectively gated to the Memory board via the NOR gates 13-31 through 13-36, a first set of inputs to these gates coming from the output of the decoder 12-9 on the Demod board. The output from the last-mentioned NOR gates directly to the Memory board and this is the manner employed to determine which range bank of memory to read from or write into. With respect to the writing function, a Write Cycle flip-flop 13-36 is arranged to be triggered by Write Enable (WE) pulses from the Demodulator board and this flip-flop 13-36 provides an input to OR circuit 13-25 whose output enables the Memory timing chain counter 13-26 in the same fashion that the setting of the Read Cycle flip-flop 13-20 did.

Both the read and the write addresses are developed in separate counters. The Read counters are identified by numerals 13-37 through 13-40 while the Write counters are identified by numerals 13-41 through 13-44. The Read counters are further subdivided into "Column Read" counters which keep track of progress in the horizontal direction and "Line Read" counters which keep track of the vertical direction. The Line Read counters 13-39 and 13-40, while capable of counting to 256, are arranged so that they may only count to a value of 240. This is because even though conventional television contains 262 lines per field, approximately 22 lines are blanked out during the vertical re-trace PROM, bottom to top. The Column Read counter comprised of counter chips 13-37 and 13-38 is used to count across in the horizontal direction for memory addressing purposes, but only counts up to 64 in that the scheme employed in the present invention allows simultaneous reading of 4-bits at a time from the Memory. That is, for every read operation four memory locations are retrieved at once. Hence, it is only necessary to do 64 reads per line.

The Shift Memory Output commands are derived from the T4 timing pulses from the Memory timing chain decoder 13-7. In that four Shift Memory Output pulses are required for every memory read operation, the logic including NAND gates 13-45 and 13-46 along with the NOR gate 13-47 are tied to the T4 output of the Memory timing chain decoder. Hence, for every pass through the timing cycle there will be one "Shift Memory Out" pulse. However, by virtue of the manner in which the RAS and CAS flip-flops 13-28 and 13-29 are intercoupled to the decoder chip 13-27, the counter input to the decoder is advanced upon each pass through the timing chain when the T1 pulse occurs. At time, T1, when the decoder 13-27 changes states from, for example, $Q_0$ to $Q_1$, there will be one Shift Memory Out pulse for that interval. Now, the toggling of the decoder to state $Q_1$ serves to set only the RAS flip-flop 13-28. Then when the T4 occurs, the CAS 13-29 flip-flop will set. The next time through the timing chain, the decoder will change states from $Q_1$ to $Q_2$ which, in turn, enables the loading of the next four columns to be displayed. A further Shift Memory Out pulse is produced during this cycle which actually synchronously loads the next four columns. In effect, then, the system is operating to shift the preceding Memory read data out of the 4-bit Memory shift registers while the address and timing control signals to the Memory board are enabled. Thus, the Memory is addressed once for each four timing chain passes of the main timing chain comprised of counter 13-6 and decoder 13-7. For each pass, a Shift Memory Output pulse emanates from the gate 13-47. In that it takes four passes through the Memory timing chain to complete one Memory cycle, the Memory is effectively controlled by reading once, obtaining 4-bits as the output and then shifting those 4-bits at the video rate. The $Q_2$ output of the decoder 13-27 is applied as an input to gate 13-48 and its output toggles the Column Read counter 13-37. Although 256 passes have been made through the Memory timing chain 13-7, only 64 passes had been made through the timing chain comprised of the counter 13-26 and the decoder 13-27. Hence, the Column Read counter has been advanced only 64 times which is consistent with the 4-bit read-out technique employed. The Column Read counters 13-37 and 13-38 are cleared by the HD (Horizontal Drive) signal from output of inverter 13-8 on FIG. 13c. The Line Read counters 13-39 and 13-40 are both arranged to be cleared by vertical drive (VD) pulses which originate at the Video board and which are applied via inverter 13-39 to those counter chips. The Line Read counter 13-39 is toggled by the output from OR function gate 13-50. This gate receives as a first input the output from NOR gate 13-51 which prodices an output when the Read Cycle flip-flop 13-20 becomes cleared. Thus, it is clearing of this Read Cycle flip-flop which causes the Line Read counter to be advanced. That counter is arranged to count up to 240 and will be cleared by the VD signal emitted by inverter 13-49.

The gating of either the read or write address to the Memory board is dictated by the multiplexers 13-52 through 13-55. These circuits selectively switch either a read address or a write address onto the Memory Address Bus. It can be seen that the switching of the multiplexers 13-52 through 13-55 is under control of the Write Cycle flip-flop whose complement output is coupled through the inverter 13-56 to the selecter of the multiplexer.

The Write Column counter 13-41 is incremented by an output from AND gate 13-57 upon the clearing of the Write Cycle flip-flop 13-36. This counter counts up to decimal 64 and then the Line Full signal goes active, setting the flip-flop on FIG. 13d which inhibits further address stobes until sync on conductor 13-58 clears it and the address counters. It is the receipt of the "sync" from the Demod board which is used to increment the Line Write counters 13-43 and 13-44 and they are allowed to count to a value of 240 before being cleared by the "hold" signal from the Demod board which is applied via conductor 13-60 to these last-mentioned counters. This "hold" signal from the demodulator board is used to indicate that a frame of displayable video has been completed. Hence, when a Write Enable signal is obtained, the write address is shifted out of the multiplexer and onto the Address Bus as previously described.

Most of the remaining circuitry illustrated in FIG. 13b through 13f relates to the quadrant expansion feature. It will be recalled that the arrangement of the quadrants is that "A" is the upper left, "B" is the upper right, "C" is the lower left and "D" is the lower right. To obtain expansion, the various addresses are manipulated in a manner which will now be explained. The incoming lines 13-61 through 13-64 come from the push-button switches on the front panel via certain logic yet to be described on the Switch Interface panel and are applied to a set of NAND gates 13-65 throgh 13-67 whose outputs are individually connected to the D-inputs of flip-flops 13-68, 13-69 and 13-70. These flip-flops set, depending upon which quadrant select button has been activated. If quadrant A is selected, addressing starts at 0 for the horizontal locations but only proceeds up to an address of 32. Following that, the system reads virtically down to an address of 120. The quadrant expansion circuitry functions to hold the address twice as long as normally. Hence, if, for example, address 0 were to be held twice as long, reading will take place from that memory location two times. If quadrant B is selected, rather than beginning addressing at address 0, addressing starts at address 32. Similarly, for quadrant C, horizontal address 0 is still used, but at the start, a truncation operation takes place down to address 120. When selecting quadrant D, the initial starting point is at address 32 in the horizontal direction and address 120 in the vertical direction.

When quadrant expansion is selected, for quadrants B and D an input is provided to OR circuit 13-71 which is associated with the multiplexer 13-53 used to control the entry of column and line addresses onto the Address Bus. When either quadrant B or quadrant D is selected, then, gate 13-72 outputs an active signal which forces that address bit high and causes a start at horizontal location 32. The flip-flop 13-73 is used to cause the expansion circuitry to force a vertical 120 count when quadrant C or quadrant D is selected. Specifically, when that flip-flop is set, the Line Read counters 13-39 and 13-40, which count in the vertical direction down to 240, toggle to a count of 120. When this 120 count is decoded from the Line Read counters via the gate 13-74, a signal is fed back to the clear terminal of the flip-flop 13-73. The flip-flop 13-69 causes the expansion mode to be selected. When set, it causes the data to be clocked out at half the normal rate both horizontally and vertically causing the 4 to 1 zoom appearance of the data on the screen.

The flip-flop 13-75 performs an important function of ensuring that non-selected quadrants will still have their memories refreshed during quadrant expansion operations. It will be recalled that the memory elements utilized in the system of the present invention are dynamic RAM's which must be periodically refreshed to avoid loss of data. If a particular quadrant had been selected, the Memory address locations for the remaining quadrants would not be receiving the necessary refresh pulses. Thus, the flip-flop 13-75 is included to perform a dual function of not only holding the address on the address bus twice as long as that when expansion is not used, i.e., halving of the addressing rate, but it also toggles back and forth and permits "ghost addresses" to be applied to the unselected memory locations at the time when the system is not reading the data from the Memory.

The AND gates 13-76 and 13-77 are connected to receive the individual stage outputs from the line counters 13-21 and 13-22. As such, gate 13-77 becomes enabled when the count in the line counters reach 255 (decimal) and its output toggles the flip-flop 13-78 causing its output to go low to disable the generation of "shift memory out" pulses from gate 13-47. In this fashion the refreshing operation can be achieved during the 22 line vertical blanking also.

For RAS, there is an 7-bit address defining up to 64 discrete locations. For refresh purposes, it is only necessary to keep the RAS strobes active. CAS is not required. So long as the Memory addresses are being strobed within predetermined time intervals, there is no danger of a loss of data.

This completes a description of the detailed logic implementing the Memory Control board. Consideration will now be given to the makeup of the Memory board itself.

MEMORY - FIG. 14

FIG. 14a through 14d illustrates by means of a block diagram the general organization of the Memory board 124 of the general block diagram of FIG. 9. As was indicated, the Memory itself is organized as a 65K×3×4 RAM comprised of a plurality of integrated circuit dynamic memory chips arranged in a matrix format as illustrated in the block labeled 14-1 in FIG. 14. The convention used to interconnect the address inputs, the data inputs, the CAS and RAS inputs and the manner in which the respective outputs are coupled to the individual memory elements in the matrix is set out in legend form on the block 14-1. The second block of memory represented by block 14-2 is identical to that of 14-1. The third block of memory represented by the block labeled 14-3 is substantially identical to the other two but does not include third bit column for the WBRR data storage. Thus, whereas bytes 0 to 1 of the memory represented by the blocks 14-1 and 14-2 include 20 RAM elements arranged in four rows and five columns, the byte 2 block of Memory represented by the block 14-3 includes 16 of the memory elements shown in the block 14-1.

Each byte of memory has associated with it an Input shift register and an Output shift register. Specifically, the byte 0 memory block 14-1 has associated with it an Input shift register 14-4 and an Output shift register 14-5. Similarly, byte 1 of memory includes an Input shift register 14-6 and an Output shift register 14-7. For byte 2 of memory, the Input shift register is identified by numeral 14-8 and the Output shift register is identified by numeral 14-9. The Input shift registers 14-4, 14-6 and 14-8 receive the clocked-in data from the Demod board which is shifted in and clocked four times. The parallel outputs from the Input shift registers 14-4, 14-6 and 14-8 are clocked out 4-bits at a time to the data inputs of the 16K RAM chips in the byte 0, byte 1 and byte 2 modules upon the generation of a Write Enable. The setting of the Write Cycle flip-flop 13-36 strobes, via Write Enable, the parallel outputs of the input shift registers into memory, and causes 4-bits to be stored in memory at the address specified by the address bits coming from the Address multiplexers 13-52 through 13-55. Specifically, Memory Address bits 0 through 13 are applied to inputs to the Address Drivers 14-10 and 14-11 and the resulting outputs are coupled to the row 1-4 inputs as indicated by the legending on the byte 0 memory block 14-1. A RAS driver 14-12 is connected to the various memory chips and is used to strobe each chip on the Memory board.

A further driver 14-13 comprises the CAS driver and, in this instance, the four CAS lines are maintained separate. The five inputs to the CAS driver 14-13 come from the Memory Control board, i.e., from the outputs of the NOR gates 13-31 through 13-35. However, the inputs to those last-mentioned NOR gates come from the Demod board and constitute the CAS enable from the decoder 12-9.

By observing the memory organization as thus far described, it can be seen that in the "write" mode, 12-bits at a time are entered into the Memory, four into byte 0, four into byte 1 and four into byte 2. As far as read-out is concerned, the Output shift registers 14-5, 14-7 and 14-9 serially present four groups of 3-bits each to the Video board via the conductors 14-14, 14-15 and 14-16. The data is read out from the Memory in parallel, 4-bits at a time, and then clocked serially out from the Output shift registers onto the lines leading to the Video board.

SWITCH INTERFACE - FIG. 15

Having completed a general description of the organization and operation of the Memory used in the receiver, consideration will next be given to the details of the Switch Interface board 104 of the general block diagram of FIG. 9. In this respect, the circuits shown in FIGS. 15a through 15f will be explained.

Figure 15A:
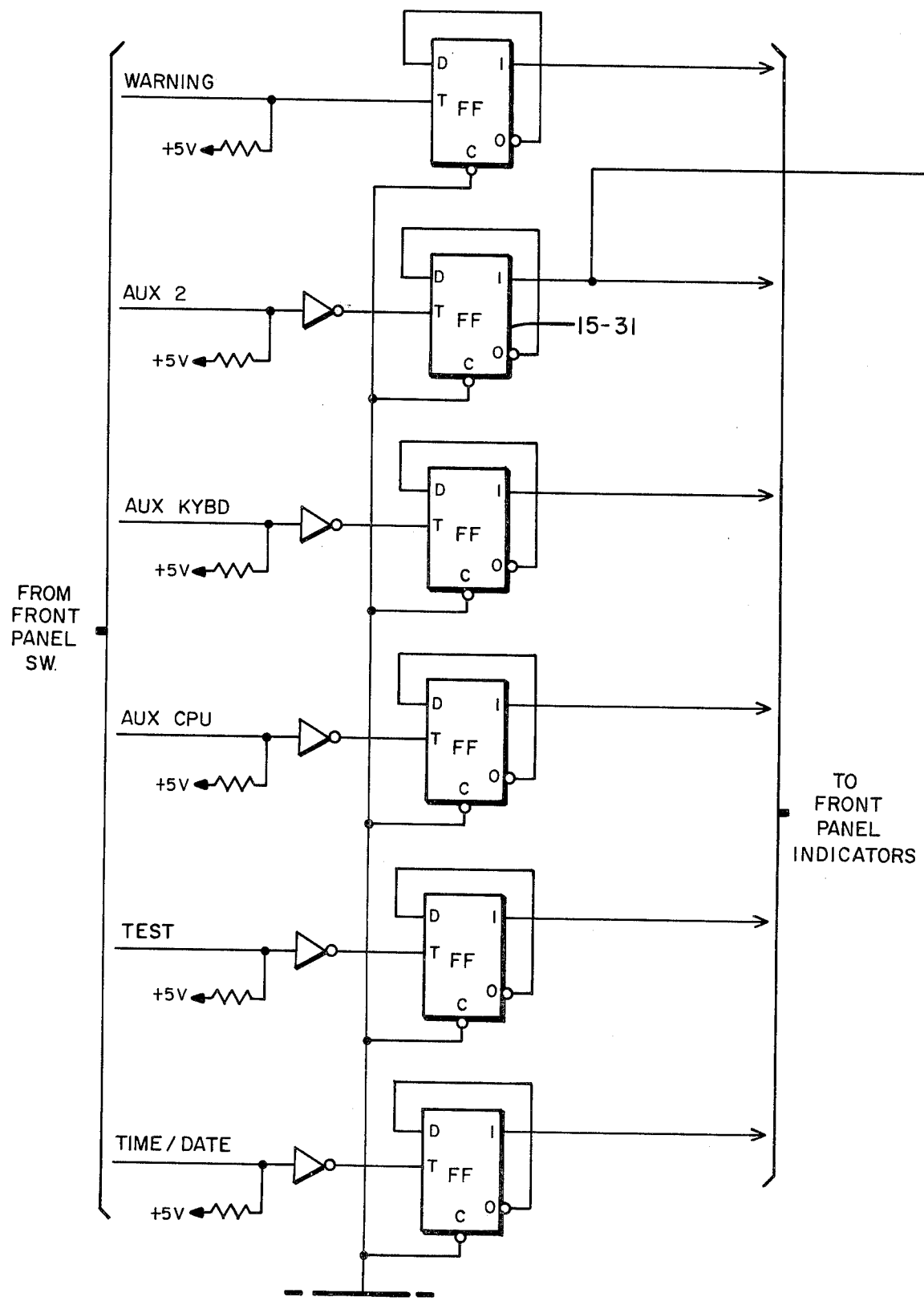
FIGS. 15a through 15f, when arranged as shown in FIG. 15, illustrate the logic for implementing the Switch Interface board of the receiver module.
Figure 15B:
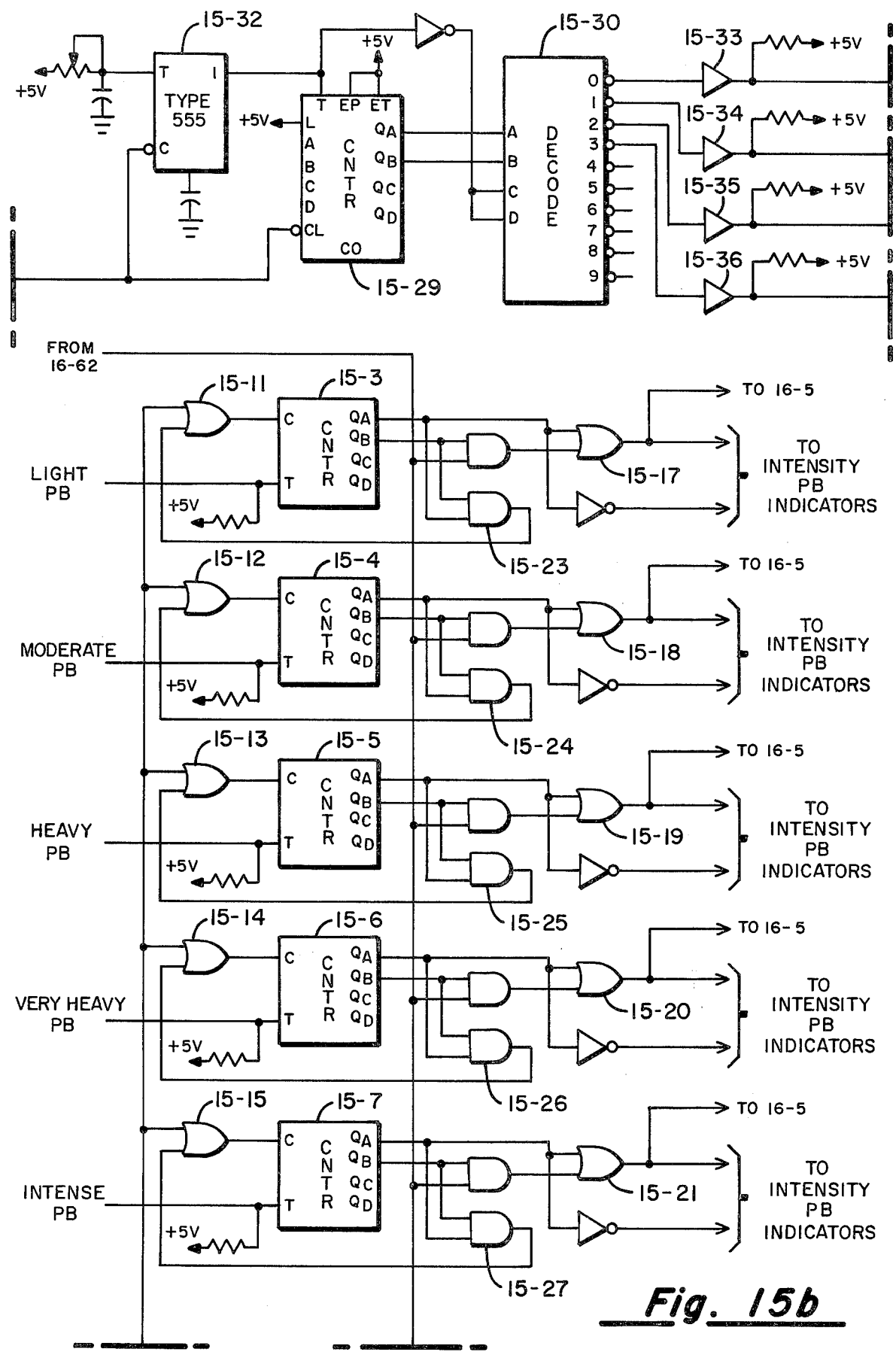
Figure 15C:
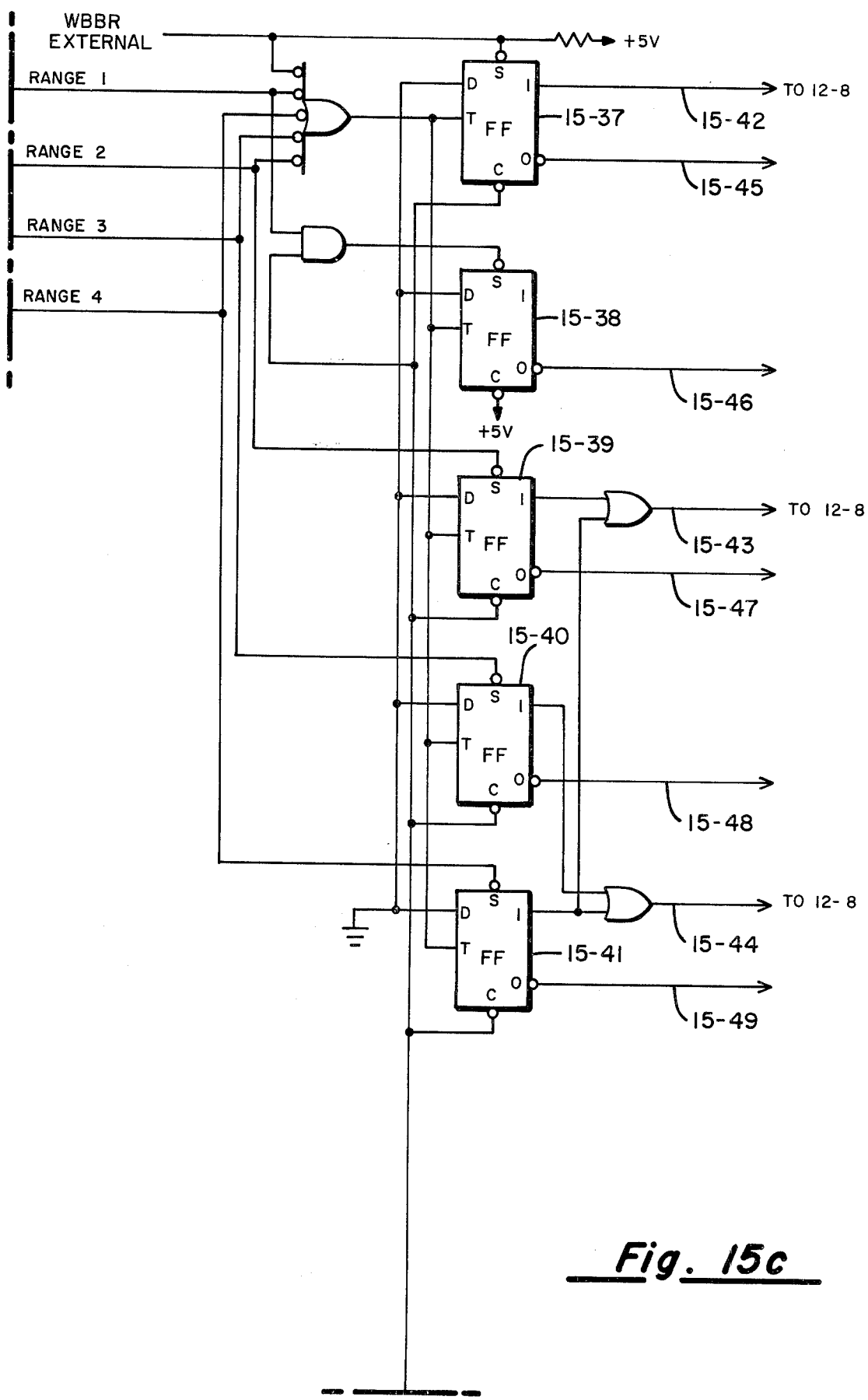
Figure 15D:
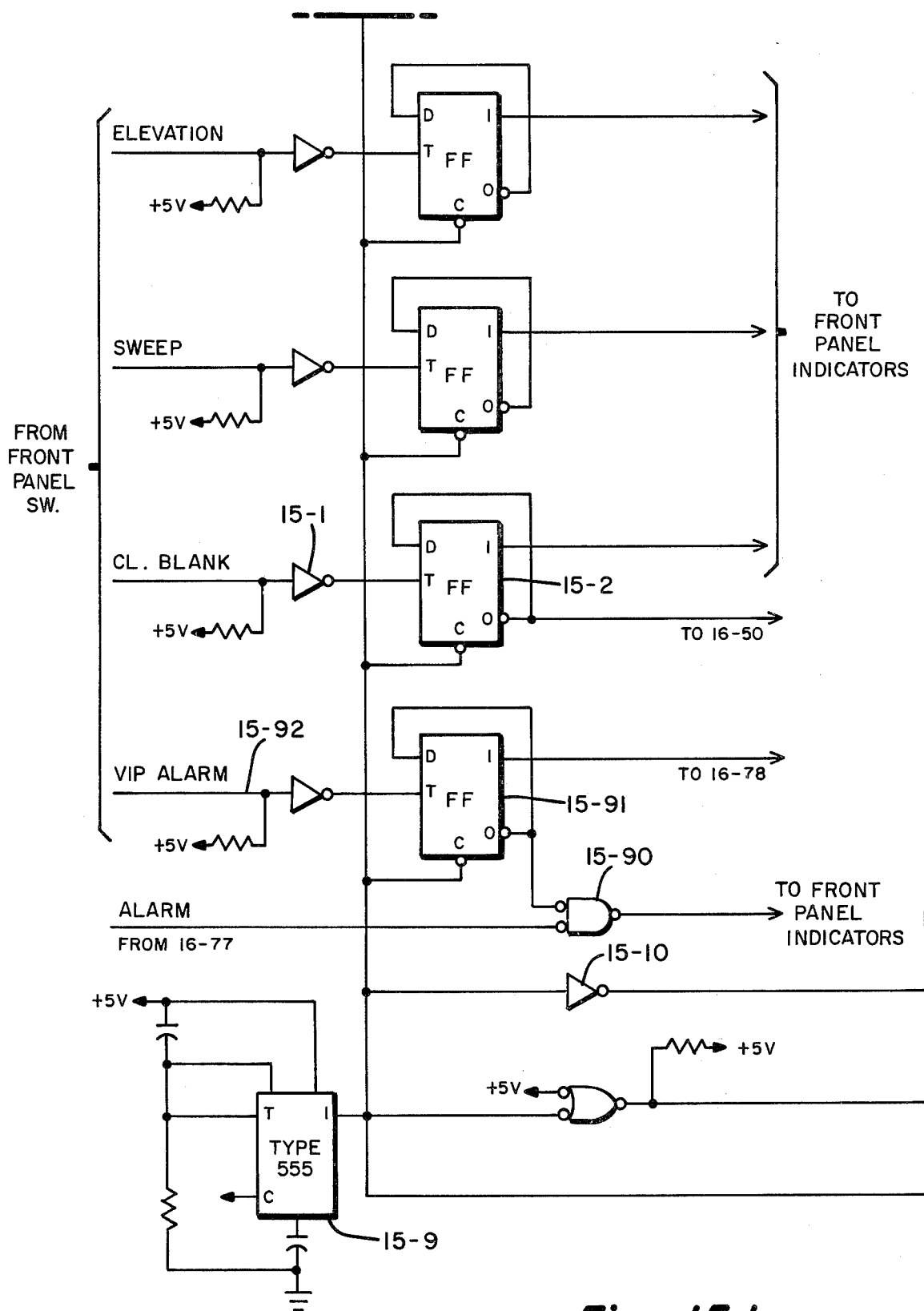
Figure 15E:
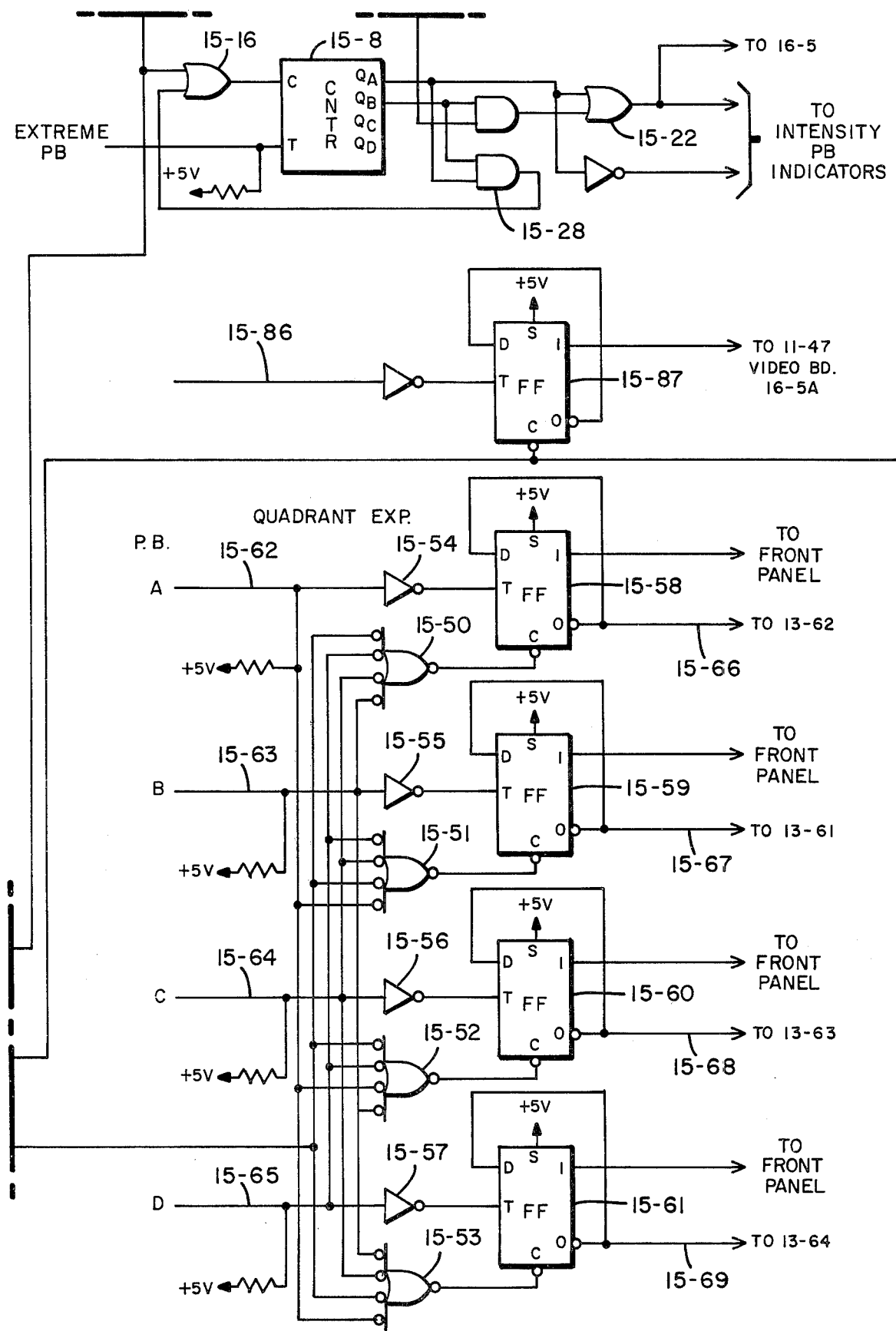

It should be recalled from the explanation of FIG. 8 relating to the front panel that it includes a plurality of push-button switches and indicator lamps which backlight the push-buttons. The lines associated with the various push-buttons in the drawings of FIG. 15 carry corresponding labels and when one or more of the switches is depressed, its output gets stored in a latch or flip-flop where it is held until that latch is cleared. For example, if the push-button labeled CLUTTER BLANK in FIG. 8 is depressed, a signal is applied via the inverter 15-1 to the toggle input of a latch 15-2. The setting of this latch then generates a control signal which is applied to other circuits in the receiver as will be more particularly described hereinbelow. In a similar fashion, each of the push-button switches has an associated inverter and latch as indicated in FIGS. 15a and 15d. The output from the latches go to various places within the receiver which are dependent upon the particular indication called for. For example, signals from the Switch Interface board go to the Demod board, the Memory Control board and the Video board.

Several of the push-button switches on the front panel allow three modes of operation, typically, "blank", "blink" and "display". The counters 15-3 through 15-8 determine which of the three states or conditions will prevail. When power is applied to the receiver module the one-shot timer 15-9 outputs a low active signal which is inverted by circuit 15-10 and is applied via the OR gates 15-11 through 15-16 to the clear terminals of the counters 15-3 through 15-8. This causes the counters to be set to 0 which is the "display" position. If one of the "Reflectivity Display" switches of FIG. 8 is depressed once, its corresponding counter 15-3 through 15-8 will be set to its 1 count. An enable will be produced at the output of one of the OR circuits 15-17 through 15-22, and this enable is applied to circuits on the Video board causing the precip level so selected to be blanked on the display screen. At the same time, a connection is made back to the indicator lamp on the front panel causing a first colored lamp (red) to be illiminated. When the push-button switch is depressed a second time, the associated counter 15-3 through 15-8 will be advanced to a count of 2 so that an enable to the AND gate feeding on function 15-17 through 15-21. The other input to this AND is a blink signal from the Video board 16-62. This blink signal is thus passed through the associated AND gate and OR gate to the Video board causing the associated level on the display to blink. It will also cause the display lamp (white) to blink. Pushing the same push-button a third time causes the associated counter stage 15-3 through 15-8 to advance to a count of 3 which enables the associated AND gate 15-23 through 15-28. The output from these AND gates are fed back as a second input to the associated OR circuit 15-11 through 15-16 and, hence, a count of 3 causes the selected one of the counters 15-3 through 15-8 to be reset to its 0 count condition and cause the display lamp (white) to be steadily lit.

Figure 12B:
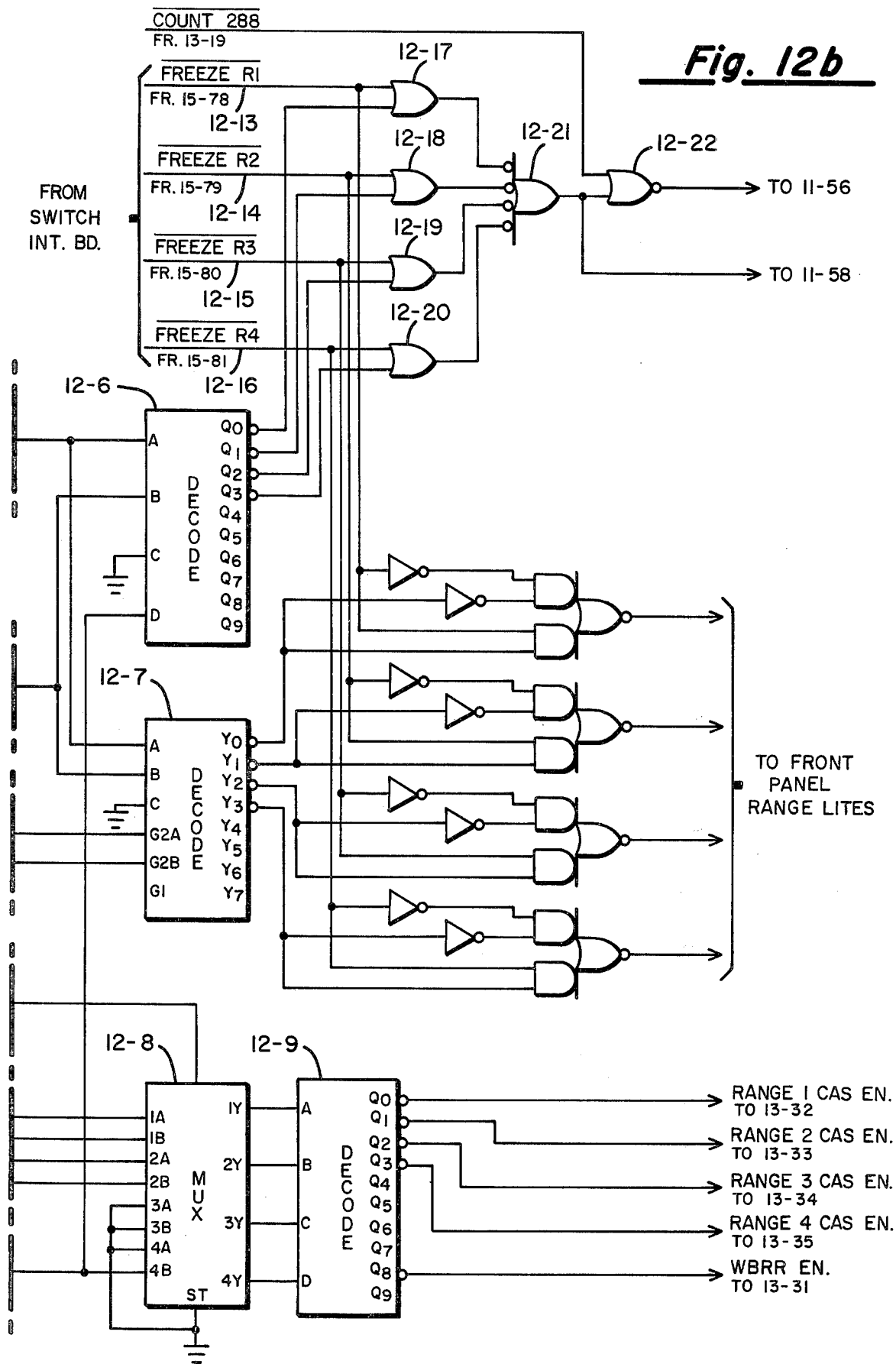
Figure 13A:
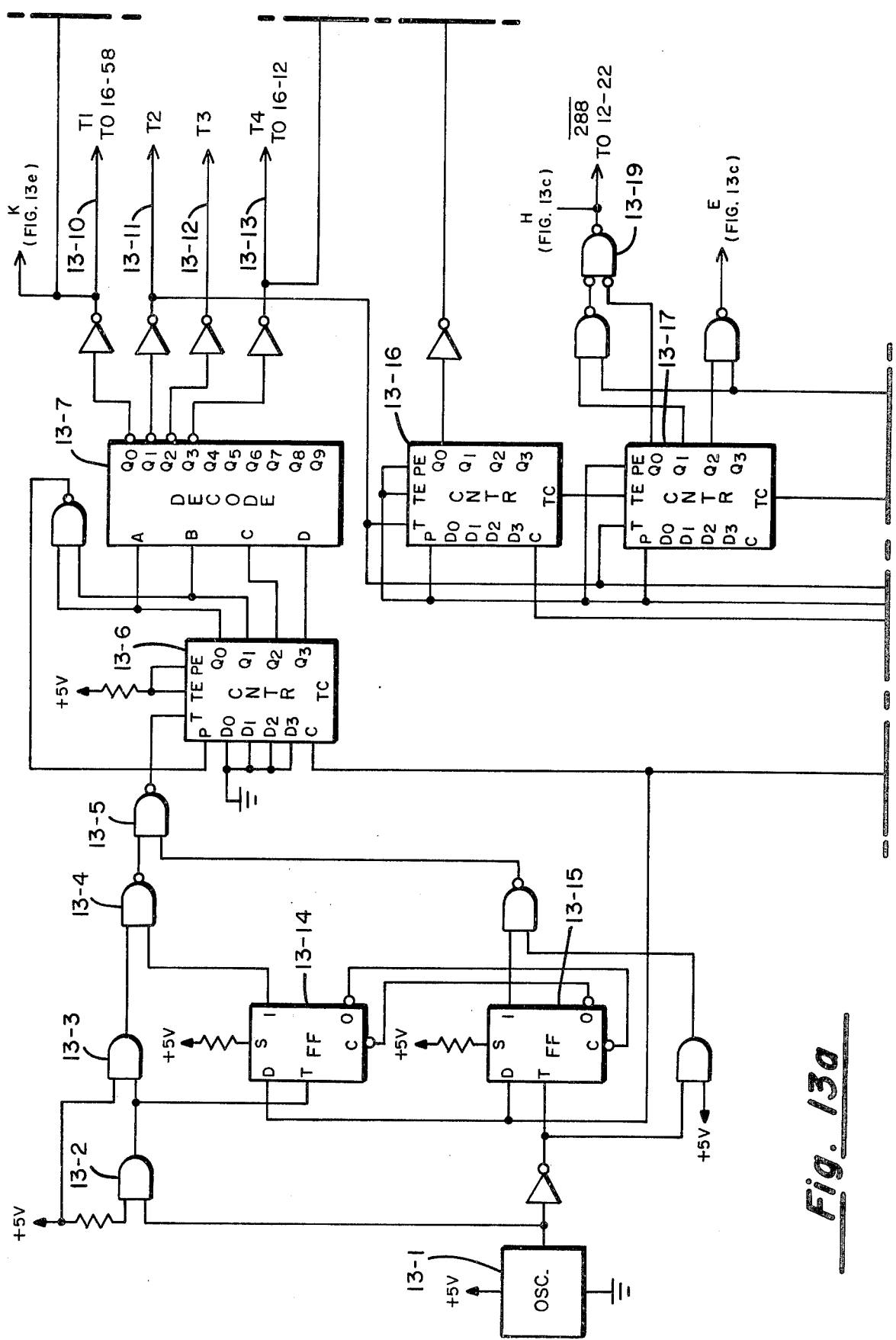
Figure 13C:
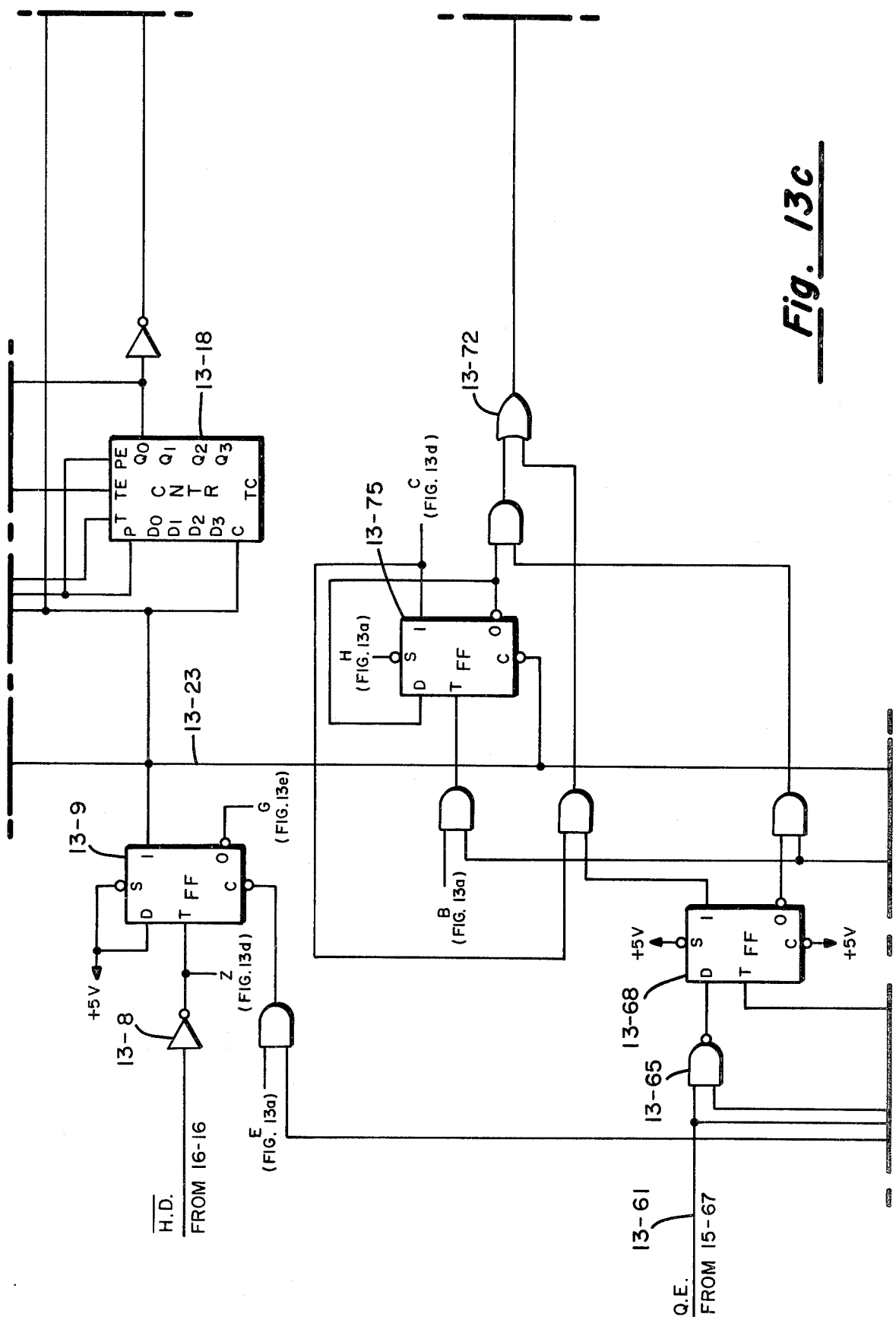
Figure 13D:
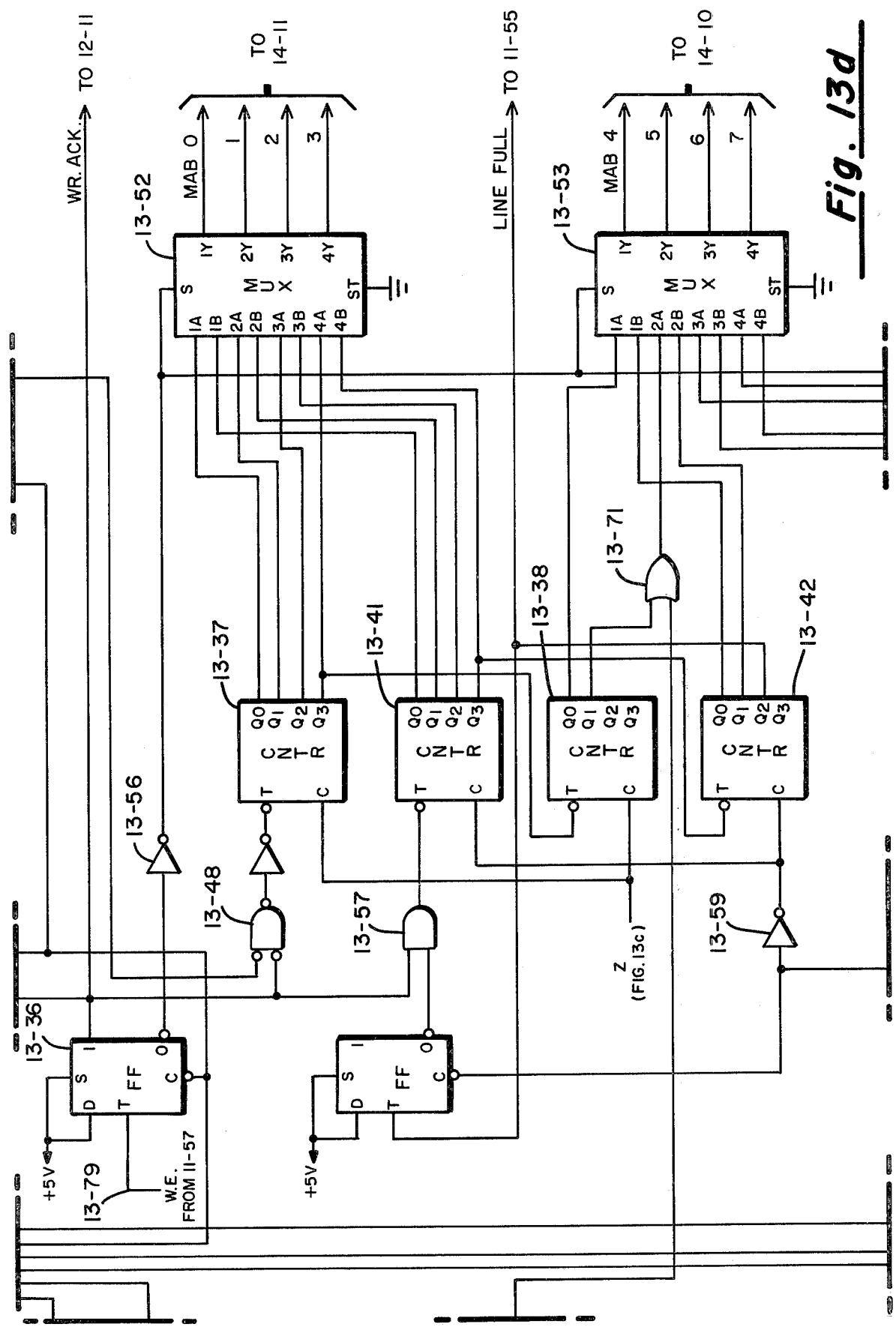
Figure 13E:
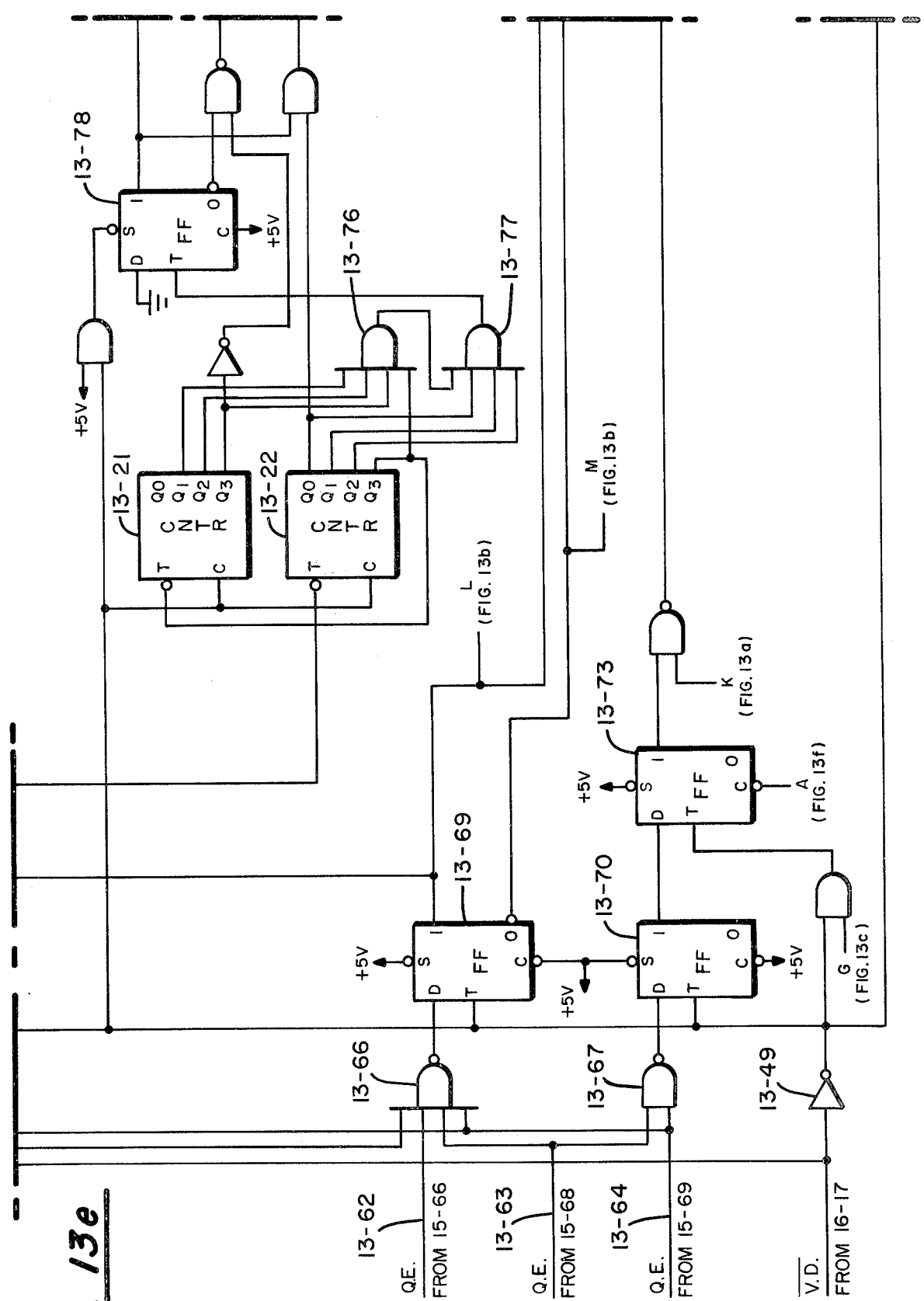
Figure 13F:
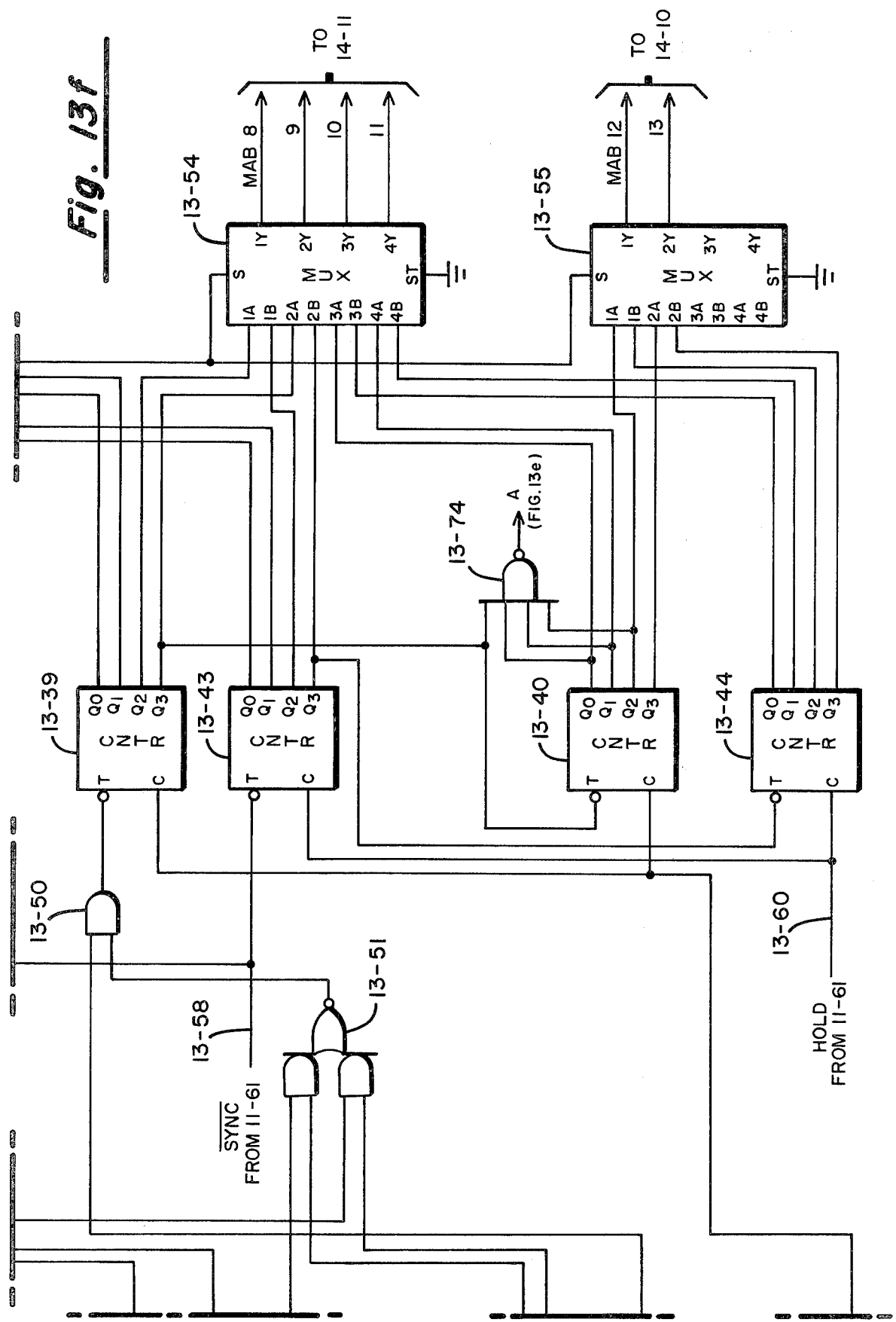
Figure 14A:
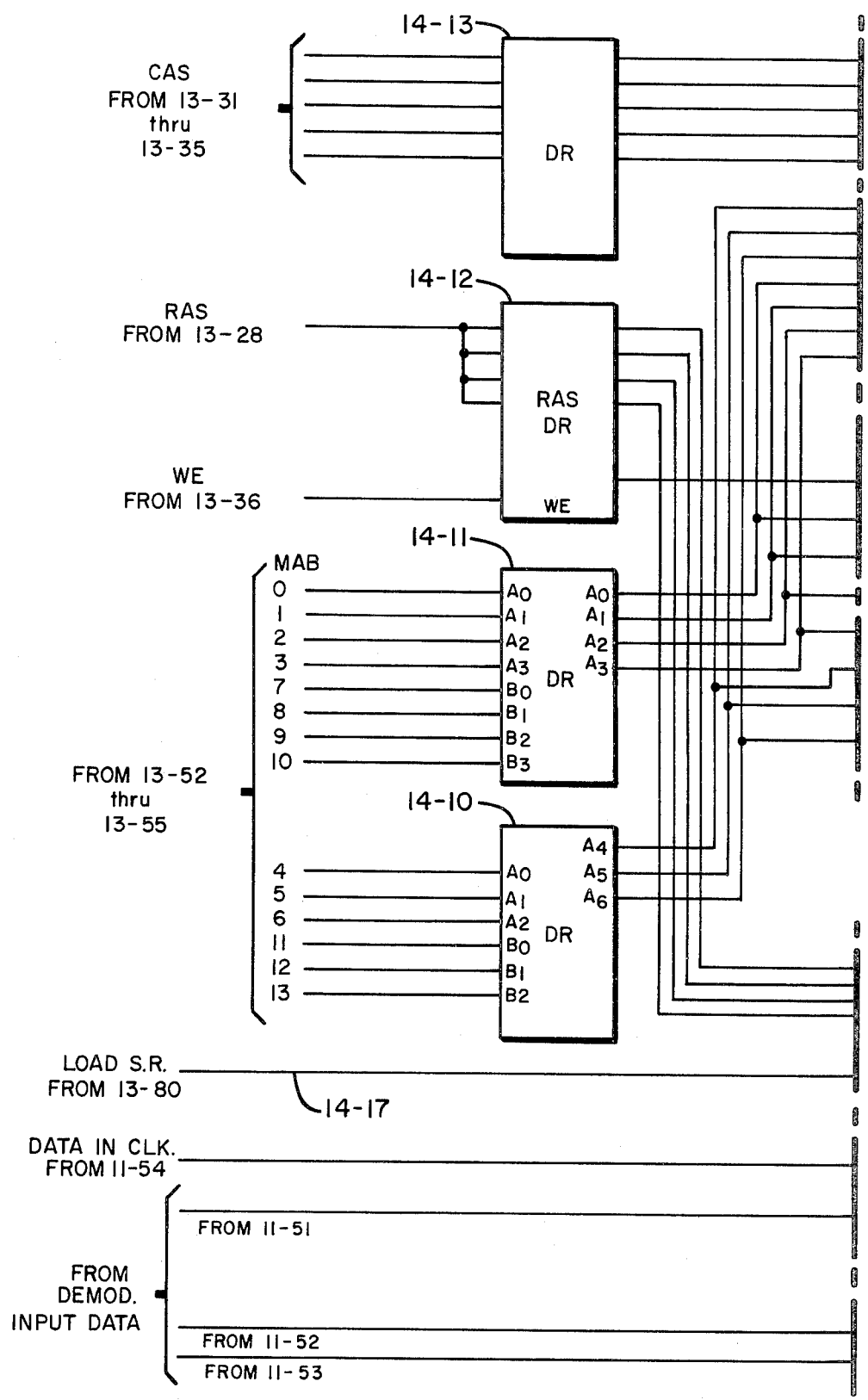
FIGS. 14a through 14d, when arranged as shown in FIG. 14, illustrate the construction and layout of the Memory board of the receiver.
Figure 14B:
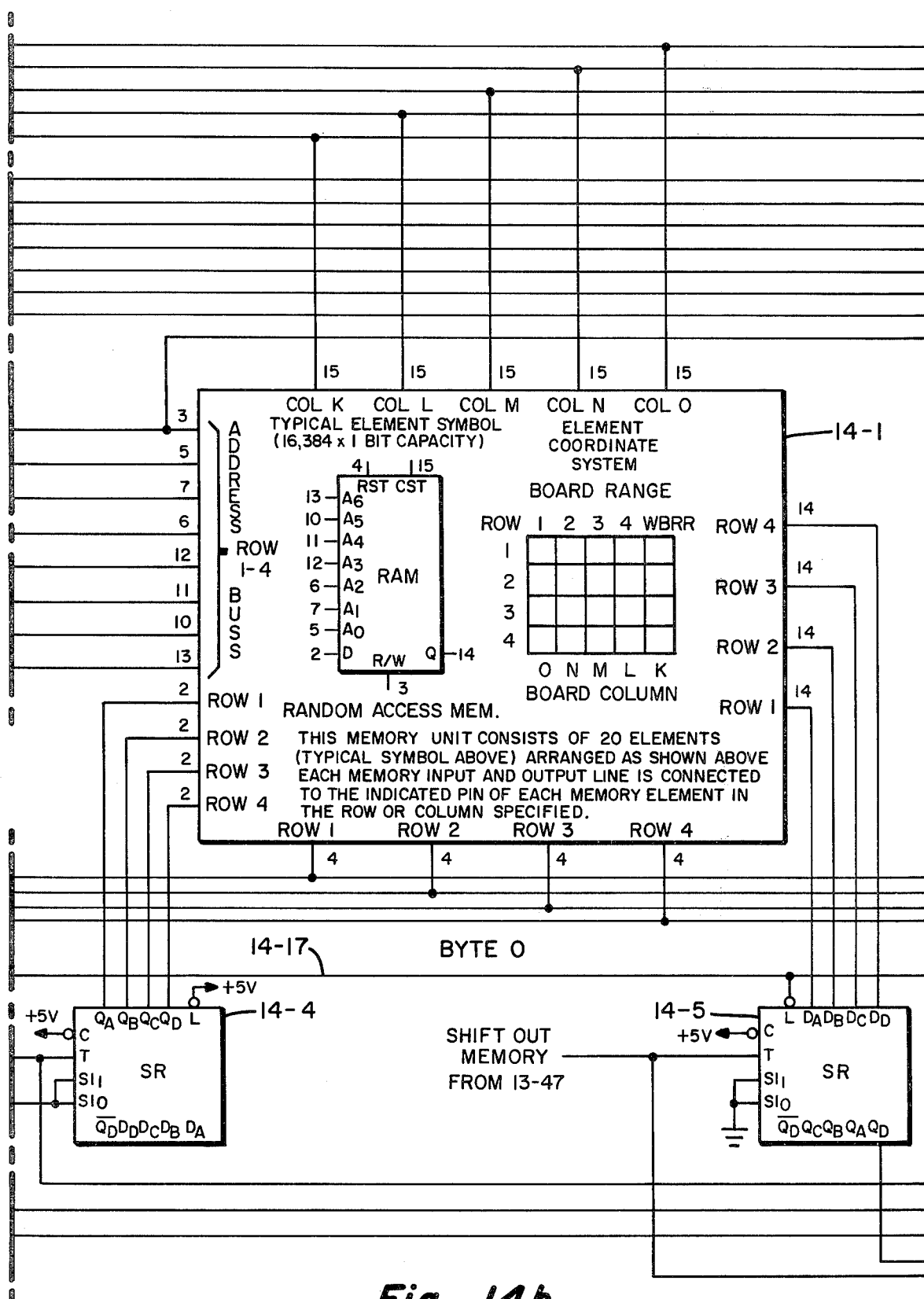
Figure 14C:
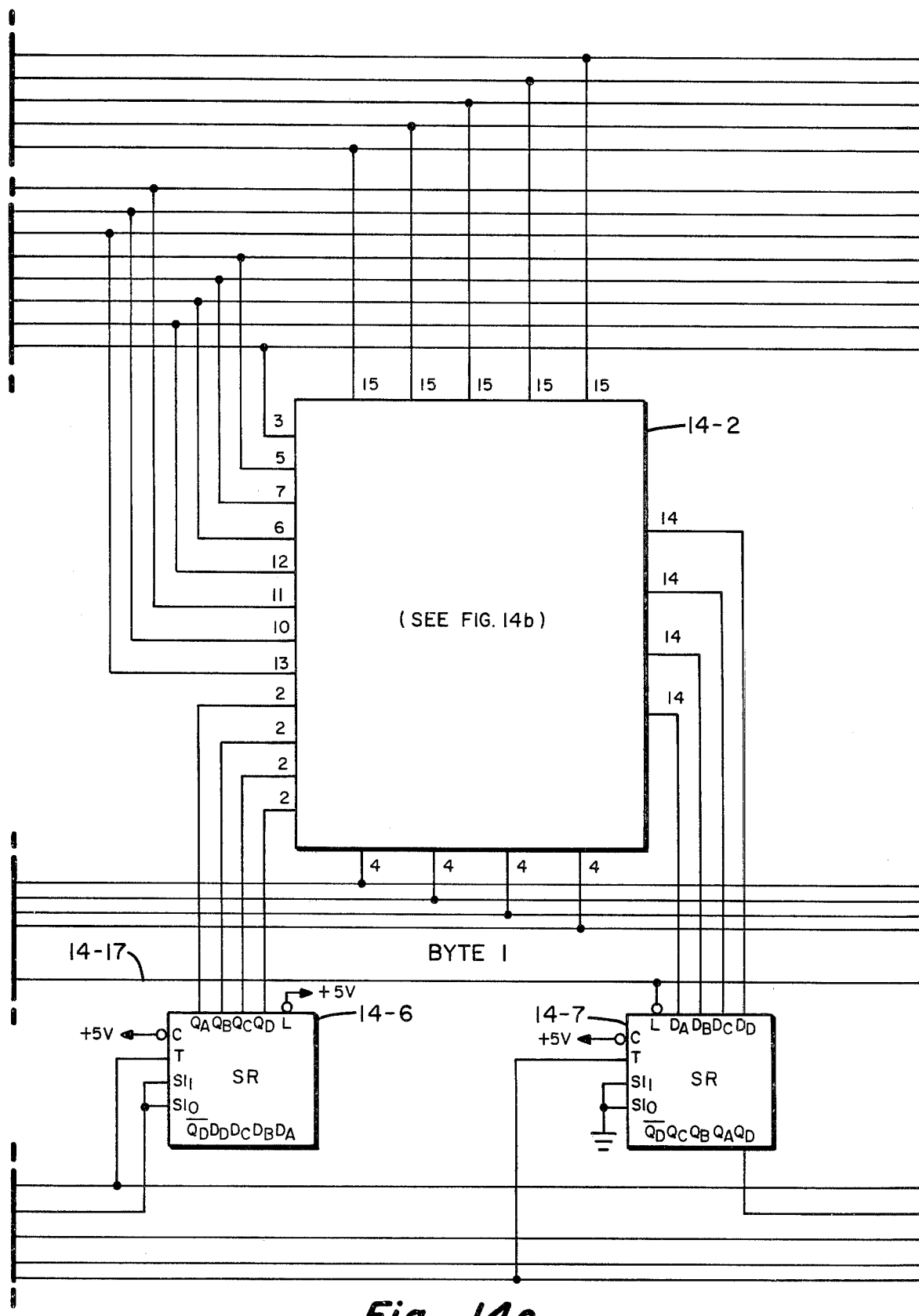
Figure 14D:
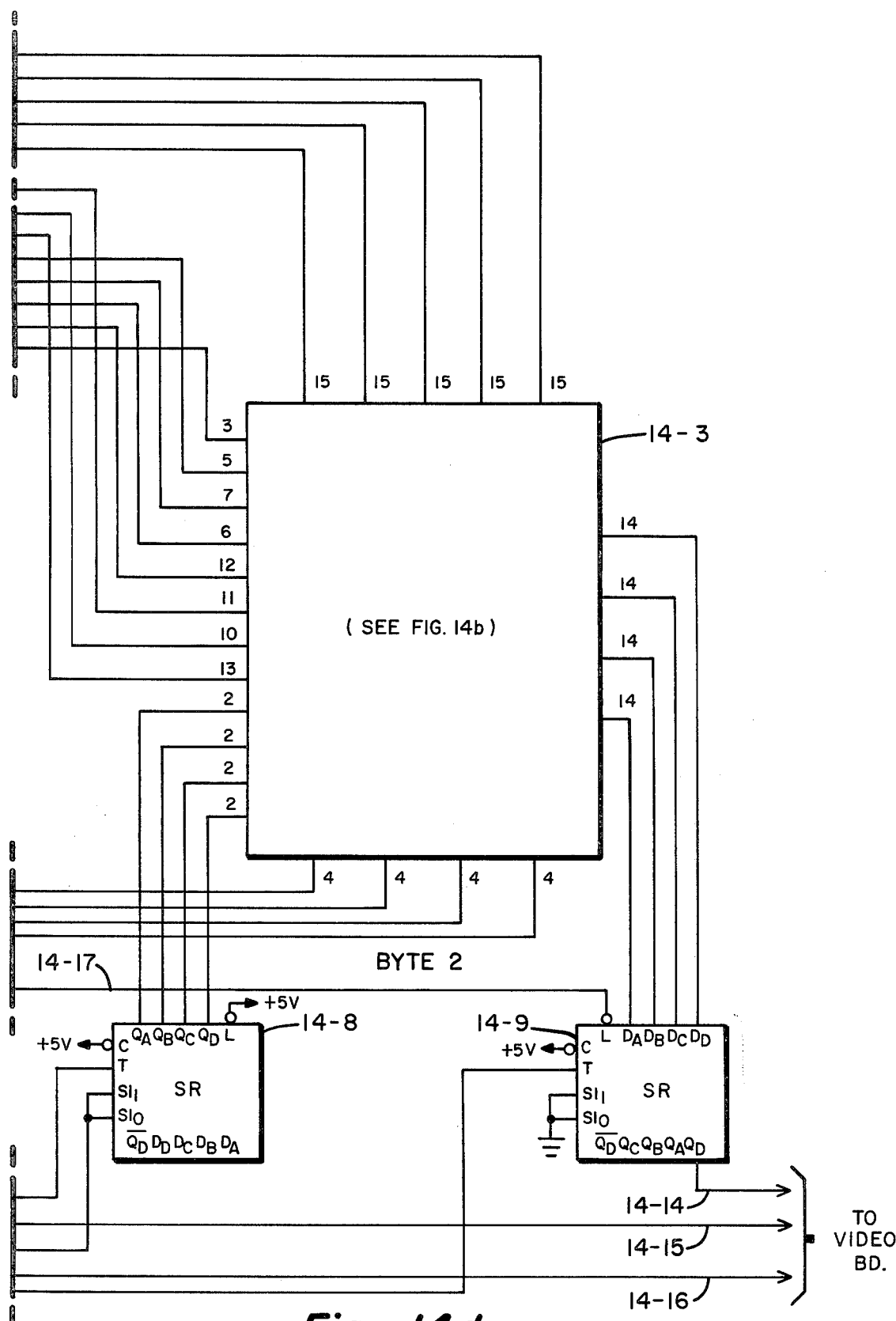

The counter 15-29 and its associated decoder 15-30 provide for an automatic range scanning cycle. When the "Auxiliary" push-button (AUX) on the front panel is depressed, the latch 15-31 will be set and a Type-555 timer 15-32 will be initiated. This toggles the counter 15-29 whose count is decoded by the circuit 15-30. The output from the decoder is applied through the drivers 15-33 through 15-36 to the flip-flops 15-37 through 15-41. Because of the manner in which these flip-flops are interconnected, they will be sequentially switched from one range to another. The resulting output signals on the lines 15-42, 15-43 and 15-44 go to the Demod board of FIG. 12b and are applied to the multiplexer 12-8 whereby the CAS enable signals are generated for effecting memory readout. The outputs from the flip-flops 15-37 through 15-41 appearing on conductors 15-45 are returned to the front panel and used to illuminate the appropriate indicator lamps.

The quadrant expansion logic includes the gates 15-50 through 15-53, the inverters 15-54 through 15-57 and the flip-flops 15-58 through 15-61. The depression of one of the quadrant expansion switches A, B, C or D on the front panel will produce a low signal on one of the input lines 15-62 through 15-65 which, when inverted by the associated inverter 15-54 through 15-57 will toggle the appropriate flip-flop 15-58 through 15-61 to its set state. Because of the manner in which the gates 15-50 through 15-53 are coupled to the clear terminals of these flip-flops, only one of the quadrant expansion flip-flops can be set at any one time. If one of the quadrant expansion switches is depressed once, the quadrant expansion feature associated with that switch will be enabled and if it is again pressed, the system will return to a full screen display. Also, if, for example, the quadrant "A" button had been depressed and it goes active, a signal is provided back to the front panel indicator light to illuminate the "A" button. By depressing the quadrant "B" button, quadrant B will be selected for expansion and that push-button will be illuminated. At the same time, the previously selected quadrant A push-button switch indicator will turn off. The flip-flops 15-58 through 15-61 merely serve as latches for storing the function that has been selected. The output lines 15-66 through 15-69 connect to the input lines 13-61 through 13-64 of the Memory Control board for effecting the expansion function.

Figure 15F:
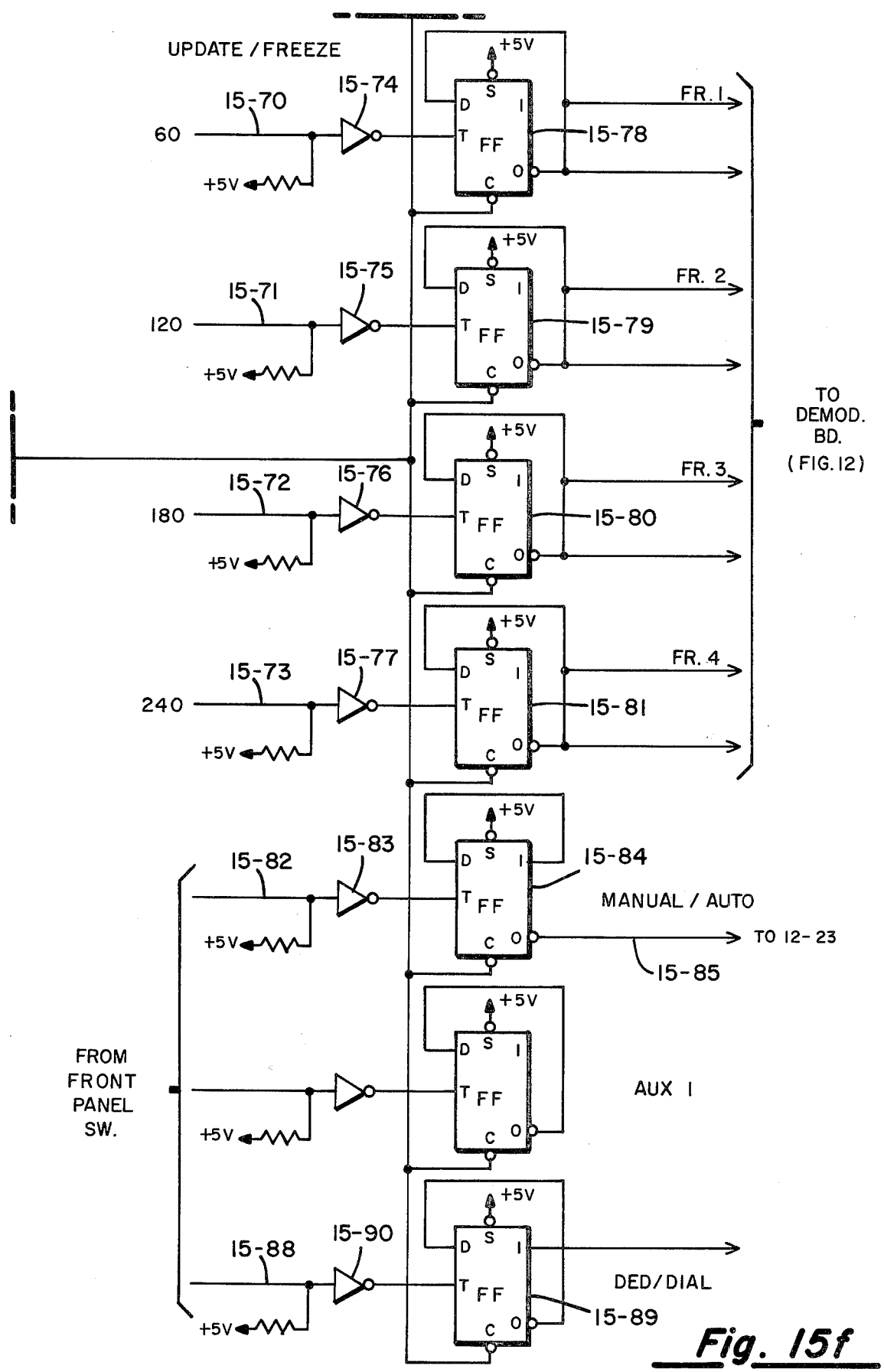

With continued reference to the logic circuits on the Switch Interface board, in FIG. 15f there are shown a series of further input lines 15-70 through 15-73 coming from the front panel UP-DATE/FREEZE switches and they are coupled through inverters 15-74 through 15-77 to the toggle input of associated latches 15-78, 15-79, 15-80 and 15-81. Hence, when any one of the UP-DATE/FREEZE push-buttons is depressed, a signal is produced for toggling its associated flip-flop. The low active output from these flip-flops connect to the lines 12-13 through 12-16 on the Demodulator board and serve as an alternate input to the gates 12-17 through 12-20. As was earlier mentioned, if any one of the four range selections is in a "freeze" condition, the gate 12-21 will output a signal which connects to an input of the NOR gate 11-58 on the Demodulator board for controlling the Write Enable flip-flop 11-57. Without a Write Enable, of course, the data in the selected memory bank cannot be altered.

The line 15-82 orginates at the Manual/Auto push button on the front panel and it is coupled through an inverter 15-83 to the toggle input of a latch or flip-flop 15-84. When this flip-flop is in its cleared state, the low output from the latch 15-84 is applied by way of conductor 15-85 and conductor 12-23 to the multiplexer comprised of the NOR gates 12-4 and 12-5 and their associated AND input circuits. This signal switches the multiplexer such that the range bit configuration coming from the Switch Interface board lines 15-43 and 15-44, i.e., the range decode 0 and range decode 1 signals, control which memory bank will be written into. In other words, the transmitter's range code is disregarded and any selected memory blank can be loaded with the radar data from any desired range. Thus, when in the Manual mode, it is possible to dial-up a transmitter site, say in California, and insert weather radar data from that transmitter into the 60 nmi memory slot in a receiver located in Minneapolis. Next, one could call up Billings, Montana and allow the radar data from that location to be stored in the 120 nmi range memory bank of the receiver in Minneapolis. This process can be continued for other less westerly locations until all four range memories have been loaded. Then, by putting the receiver in a scan mode, it is possible to sequentially display that radar data so that the presentation appears as if a snap-shot had been taken of weather conditions in a progressively easterly moving direction. Various other alternatives are also available, it being understood that the Manual/Automatic control permits the operator to decide what precip level information from a variety of sites may be stored away in preselected memory banks. Also, rather than using the "Manual" feature for geographic separation, it may also be used in a time-lapse mode where weather radar data from the same range at four different times is captured for later replay.

When the Manual/Auto push-button switch is in its auto position, the range latches 12-2 and 12-3 deliver their outputs through the multiplexer gates 12-4 and 12-5 to the decoders 12-6 and 12-7 whereby the automatic addressing of memory during a write cycle takes place.

Line 15-86 on the Switch Interface board is adapted to be connected to the MAP push-button on the front panel and depression of the push-button once serves to set the latch flip-flop 15-87 and pushing it a second time resets it. The output from the latch 15-87 is delivered to the Video board and the Demod board. This signal controls whether map data will be presented on the screen or will be stripped from the message and therefore not displayed.

Line 15-88 comes from the DEDICATED/DIAL-UP push-button on the front panel of FIG. 8 and allows the selective setting and clearing of a corresponding latch 15-89 via the inverter 15-90. The outputs from the flip-flop 15-89 are used to pull in a relay (not shown) on the Demodulator board, the relay having four contacts along with two pairs of wires coming from the dedicated phone line jacks on the back of the receiver and two wires coming from the dial-up jacks. By utilizing the DIAL-UP push-button, it is possible to disconnect the dedicated lines from providing inputs to the transformer 10-1 and permits the operator to couple signals from the dial-up phone line.

This completes a description of the circuits implementing the Switch Interface board and attention will now be directed to the details of the implementation of the Video board.

VIDEO BOARD - FIGS. 16 and 17

It is the principal function of the circuits of the Video board to interface the receiver's memory with the television studio's switchers, the studio switcher being a device that the various cameras, monitors, etc. connect to so that the station operator can selectively call up a variety of sources for transmitting television composite video signals out on the air to the TV receivers. With this general function in mind, and with reference to FIG. 16*a* through 16*e*, the Memory inputs, i.e., the outputs from the Memory board, provide the input to the Video board. The Memory output signals are applied by way of lines 16-1, 16-2 and 16-3 and are applied to a decoder 16-4 which serves to translate the binary code received thereby into an output on one of the plural lines emanating therefrom, the particular line which is active being determined by the bit permutations of the input signals. The output stages of the decoder 16-4 are individually coupled as first inputs to a set of OR gates functioning here as AND gates, indicated generally by numeral 16-5. The other inputs to these OR circuits come from the Blink/Blank OR gates 15-17 through 15-22 on the Switch Interface panel. When the switch is in the blink mode, the video allowed through the OR gate 16-5 will also be intermittent. When in the blank mode, the gates will be inhibited and will, in turn, shut off that particular bit and not permit it to go out as a video signal.

Figure 16A:
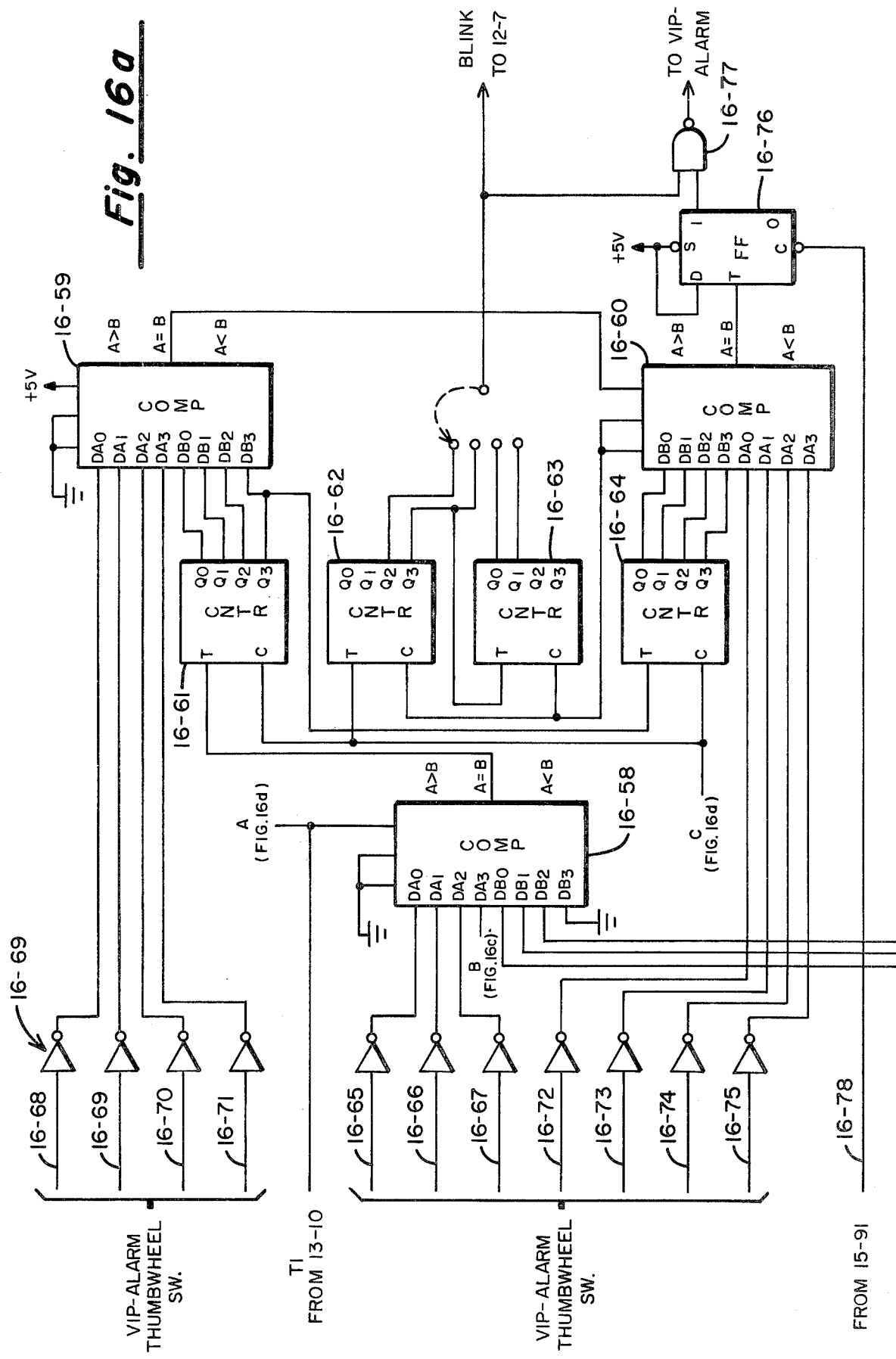
FIGS. 16a through 16e, when arranged as shown in FIG. 16, illustrate the logic for implementing a portion of the Video board.
Figure 16B:
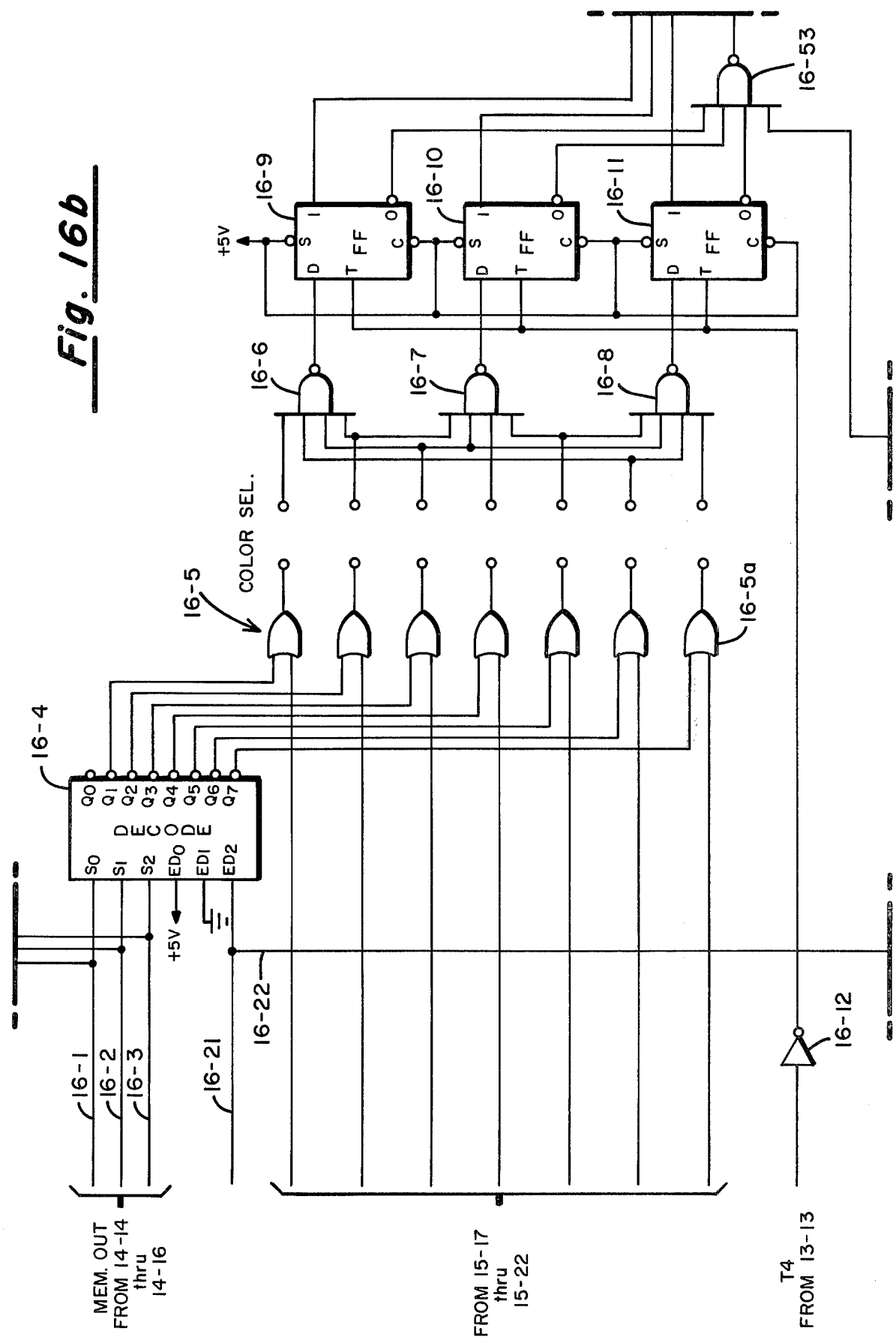
Figure 17A:
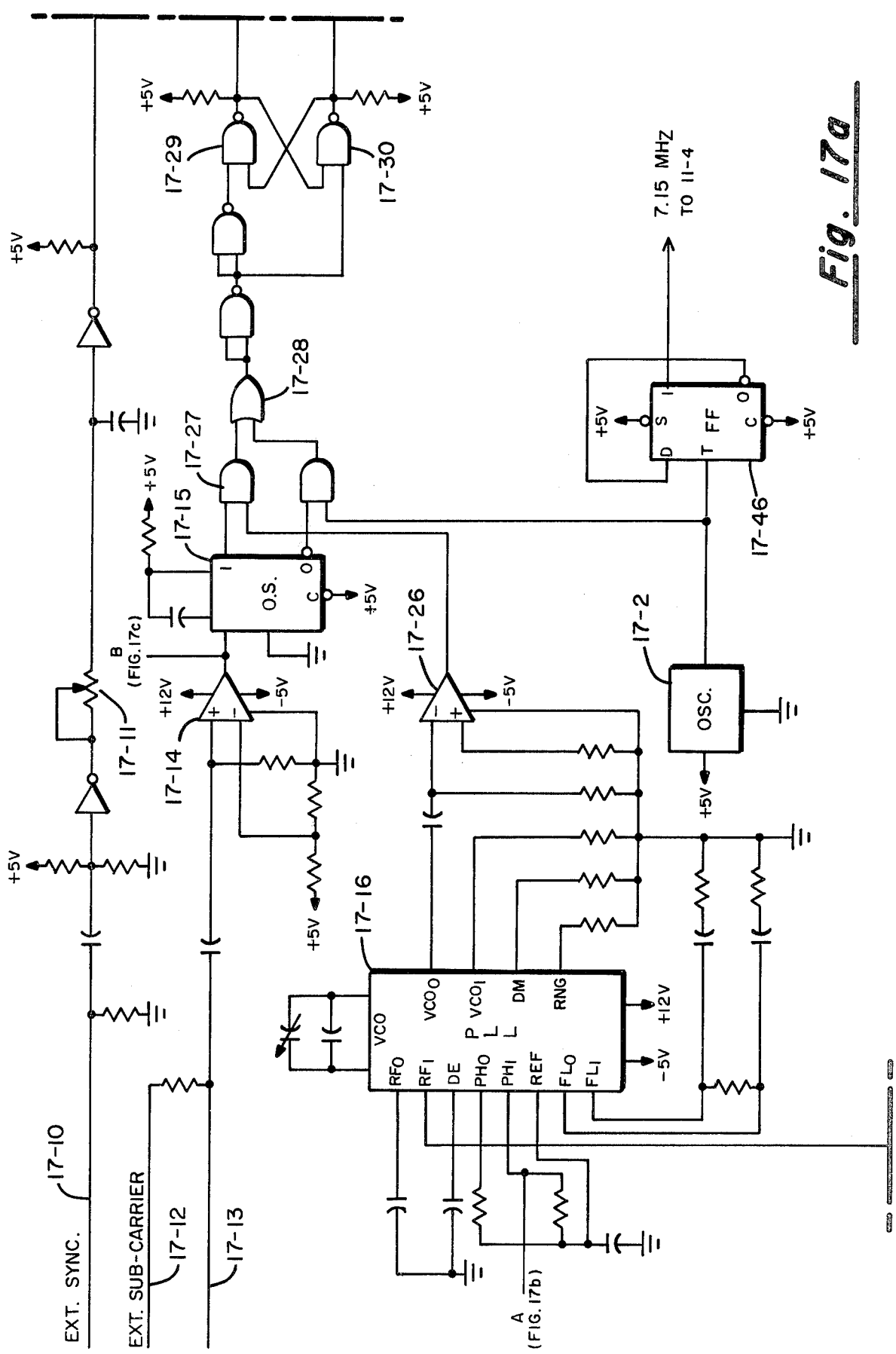

With continued reference to FIG. 16*b*, the outputs from the OR gates 16-5 terminate at jack terminals on the Video board and a matching set of jack terminals are intercoupled with a set of NAND gates 16-6, 16-7 and 16-8. By selectively inserting conductive jumpers or patch cords between the sets of jacks, one can assign any bit combination to be encoded as a certain color. Once selected, the operator usually allows them to remain fixed, but by providing the patch-cord arrangement, a degree of flexibility is provided over color selection.

The outputs from the NAND gates 16-6 through 16-8 are connected as the data inputs to a set of Data Latches including flip-flops 16-9, 16-10 and 16-11. At time T4 determined by the memory timing chain on the Memory Control board, the inverter 16-12 outputs a signal to the toggle inputs of the flip-flops 16-9 through 16-11 to cause the particular binary signals emanating from the NAND gate 16-6 through 16-8 to be latched into the Data Latch flip-flops 16-9 through 16-11.

Next, attention is directed to the one-shot circuits 16-13 and 16-14. The interconnected one-shots 16-13 provide vertical drive, VD, while the one-shots 16-14 provide the horizontal drive, HD. These two signals derived from the one-shot circuits, appear on conductors 16-16 and 16-17 respectively and are the signals which are delivered to the Memory Control board to allow the data to be positioned properly, both horizontally and vertically on the television screen.

Figure 17B:
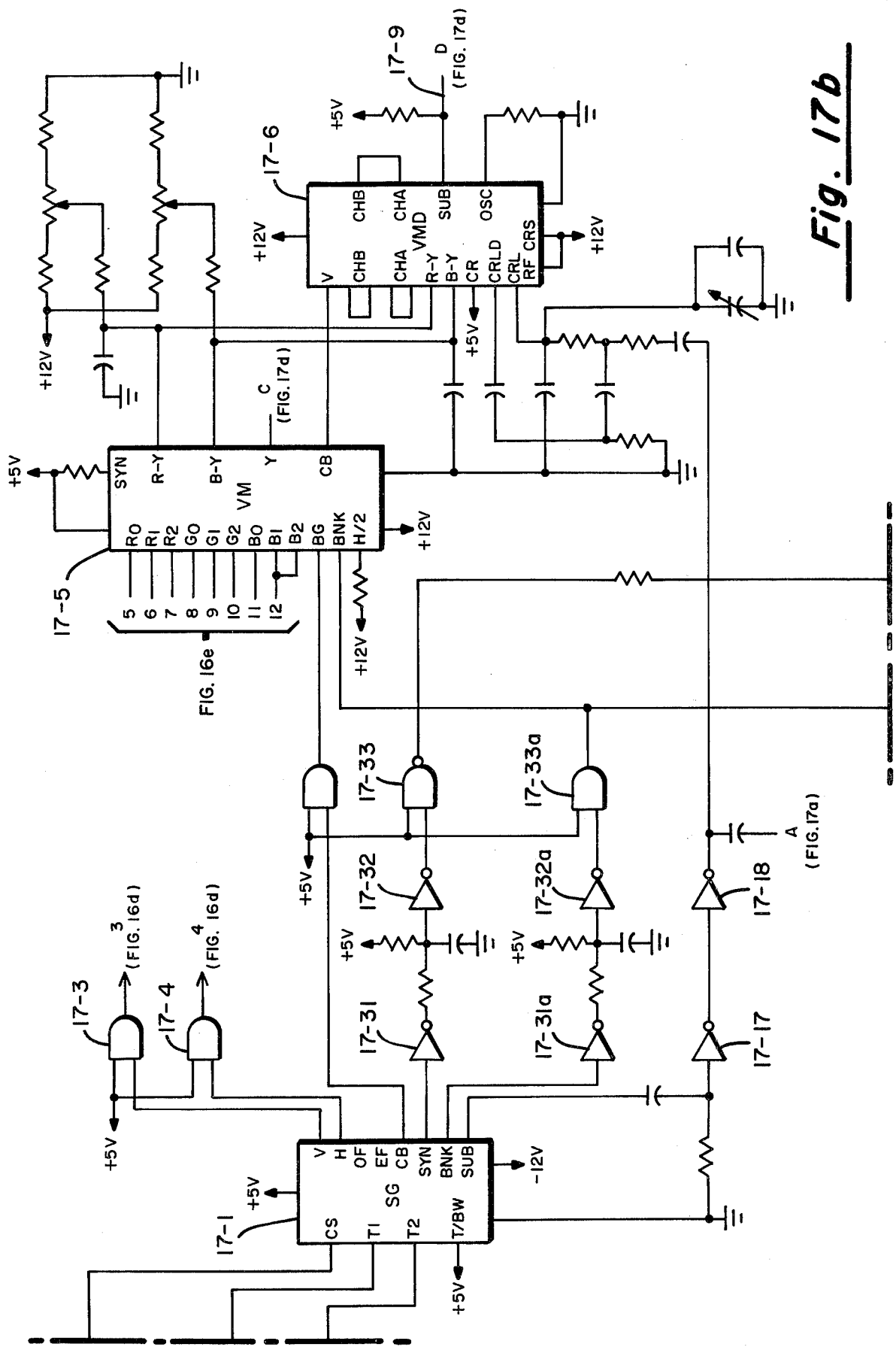

Next, with reference to FIG. 17*b* which is still a portion of the Video board, it will be noted that the one-shots 16-13 and 16-14 are arranged to be fired by signals coming from a Type-3262 Video Sync Generator chip 17-1. This commercially available integrated circuit provides not only the horizontal drive and the vertical drive, but also the composite blanking and synchronization needed for video presentations so that all functions are referenced to the same source. In this regard, the Video Sync Generator chip 17-1 is driven from phase locked loop circuit 17-16 (FIG. 17*a*) or in non-studio application from a 14.31818 MHz crystal oscillator 17-2 which is a standard clock frequency commonly used in the television industry because of the ease with which it may be divided down to provide the conventionally required 3.58 MHz subcarrier chroma signal.

Referring back to FIG. 16*d*, the one-shots 16-13 and 16-14, then, serve to shape AND delay the HD and VD pulses coming from the Sync Generator chip 17-1 via the outputs from the AND gates 17-3 and 17-4 which respectively connect to the VD one-shot 16-18 and the HD one-shot 16-19.

The HD signal is also coupled as a first input to an AND gate 16-20 whose second input comes via conductor 16-21 and 16-22 from the TEST push-button switch on the front panel via a latch on the Switch Interface panel. A low active output from NAND gate 16-20 will set a control flip-flop 16-23 which, in turn, controls a counter comprised of integrated circuit chips 16-24 and 16-25 via AND gate 16-26. This logic is used for color bar generation when the receiver is placed in its "Test" mode. It will enable color bars to be displayed on the monitor screen so that various desired adjustments and calibrations may be made on the Video board with the results being monitorable on the CRT screen or studio waveform monitors. The outputs from the counter are coupled to a first set of inputs of a multiplexer 16-27 whose second inputs come from the outputs of the Data Latch flip-flops 16-9, 16-10 and 16-11. Hence, this multiplexer 16-27 is a means for choosing between the presentation of test color bars on regular radar data. The further multiplexer 16-28 is provided for allowing selection between the color bar pattern or radar data, i.e., the output from the multiplexer 16-27 and data coming from an external unit referred to as the Mapper. The Mapper is a piece of auxiliary equipment adapted to be used with the system of the present invention for allowing an operator at the receiver site to prepare graphics which may then be superimposed on the video screen via the inputs which it provides to the lines 16-29 through 16-32. In that the present invention is not particularly concerned with the manner in which the Mapper data is generated, nothing further need be said concerning its construction and mode of operation herein.

The output from the multiplexer 16-28 permits the selective presentation of an overlay of software controlled maps onto the video picture. Instead of providing the Video board with radar data, it is possible to provide it with map data via the multiplexer 16-28.

The receiver may only display the particular maps that the transmitter relays to it. However, by using the Mapper equipment both the graphics presented and the colors employed may be changed.

Maps are generated on the Video board by decoding (decoder 16-4 output Q7) the map data received from the memory unit. The external mapper unit inputs on line 16-29 through 16-32 are configured in such a way that they will take precedence. As such, whenever data appears on the Mapper inputs, it is immediately displayed instead of data received from a transmitter. As such, both normal radar data and maps overlaid thereon can be displayed.

It should be noted here that the data format from the transmitter and decoded in the demodulator, is such that the map overlay data has its own unique data bit to described it. By sending the map overlay in this way with its own separate bit, it allows the three data bits which determine the radar data levels zero through six to still contain the information which would be in a given area of the display, so that if custom overlays via an external graphics unit are desired instead of the overlays sent by the transmitter, one can shut off the maps before they up-date the picture from the transmitter. Thus, the overlays sent by the transmitter will be stripped off, and the radar data in those areas where the maps would have been inserted will be in those places. This means that there will be no holes in the radar data where the transmitted maps would have been.

The integration of normal radar data with the map overlays sent by the transmitter is done as follows. As mentioned above, the map data is contained in its own separate bit and when decoded by the demodulator the map data is encoded as a 7 or binary 111 in the demodulator before being sent to the 65K×3 bit memory storage for that range. Thus, when the Video board receives a binary 111 from the memory, it detects that code by the use of NAND gate 16-55, FIG. 16*c*. This output from NAND gate 16-55 then goes through a circuit which assures that the map data will not be blanked out when clutter blanking (described later) is being used, and ends up gating a low signal on the output of NAND gate 16-57 on FIG. 16*c*. This signal then clears flip-flop 17-7 on FIG. 17*c* which serves as a switch to switch between the two adjustments 17-37 and 17-37*a* which allow the luminance level or brightness of the map data or the picture background data to be adjusted, respectively. The way in which this is accomplished is as follows.

Figure 16C:
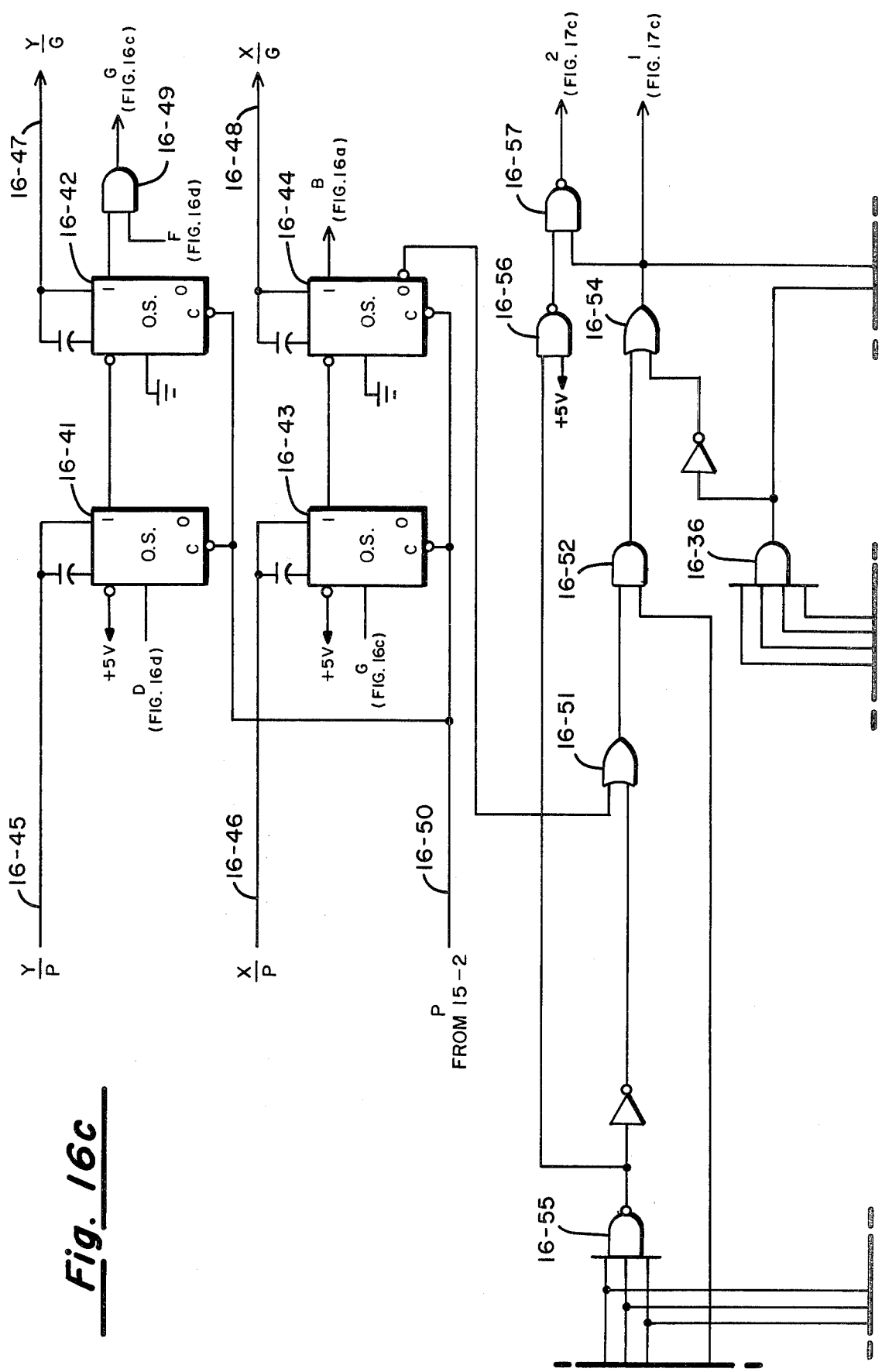
Figure 16D:
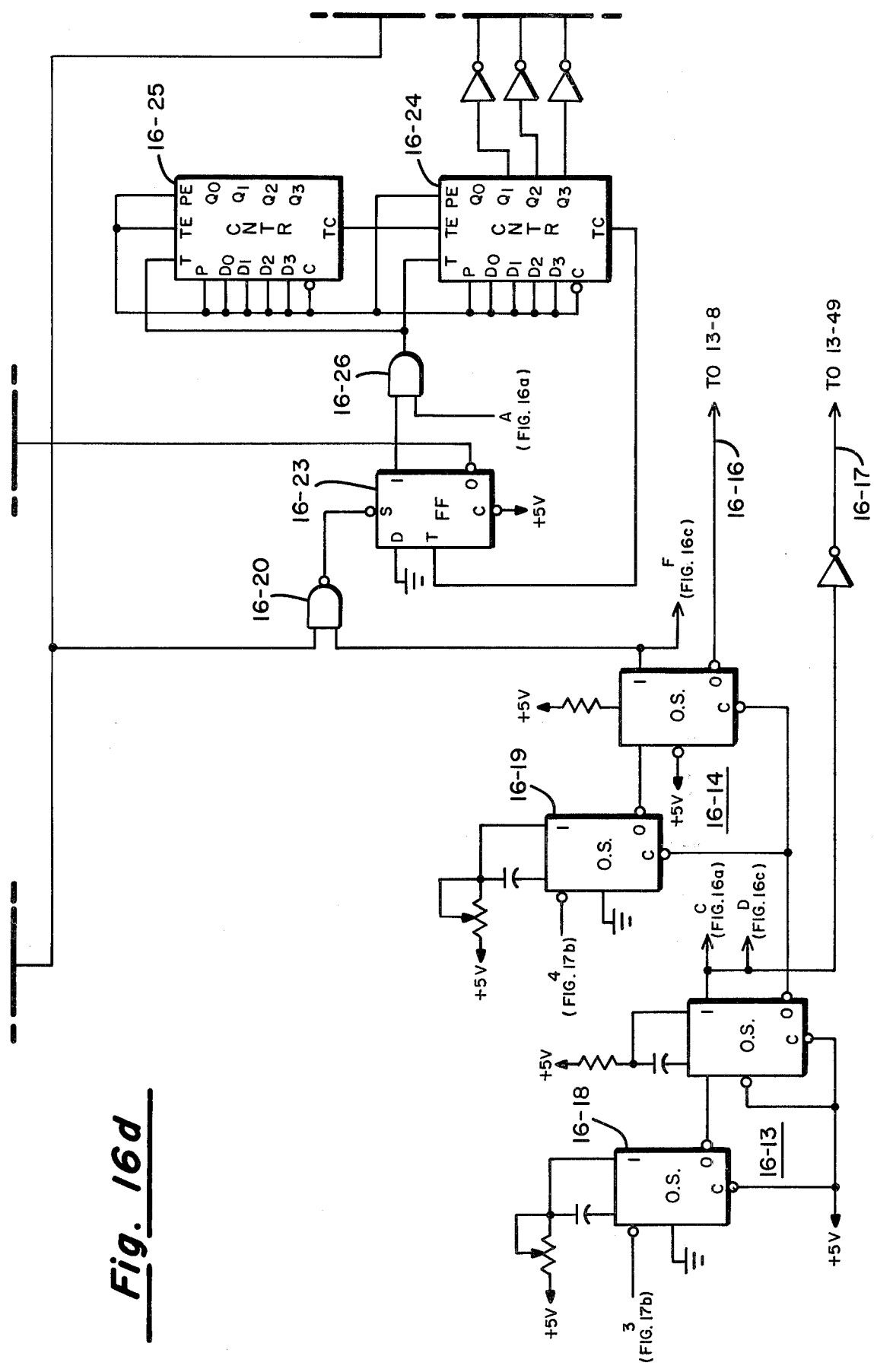
Figure 17C:
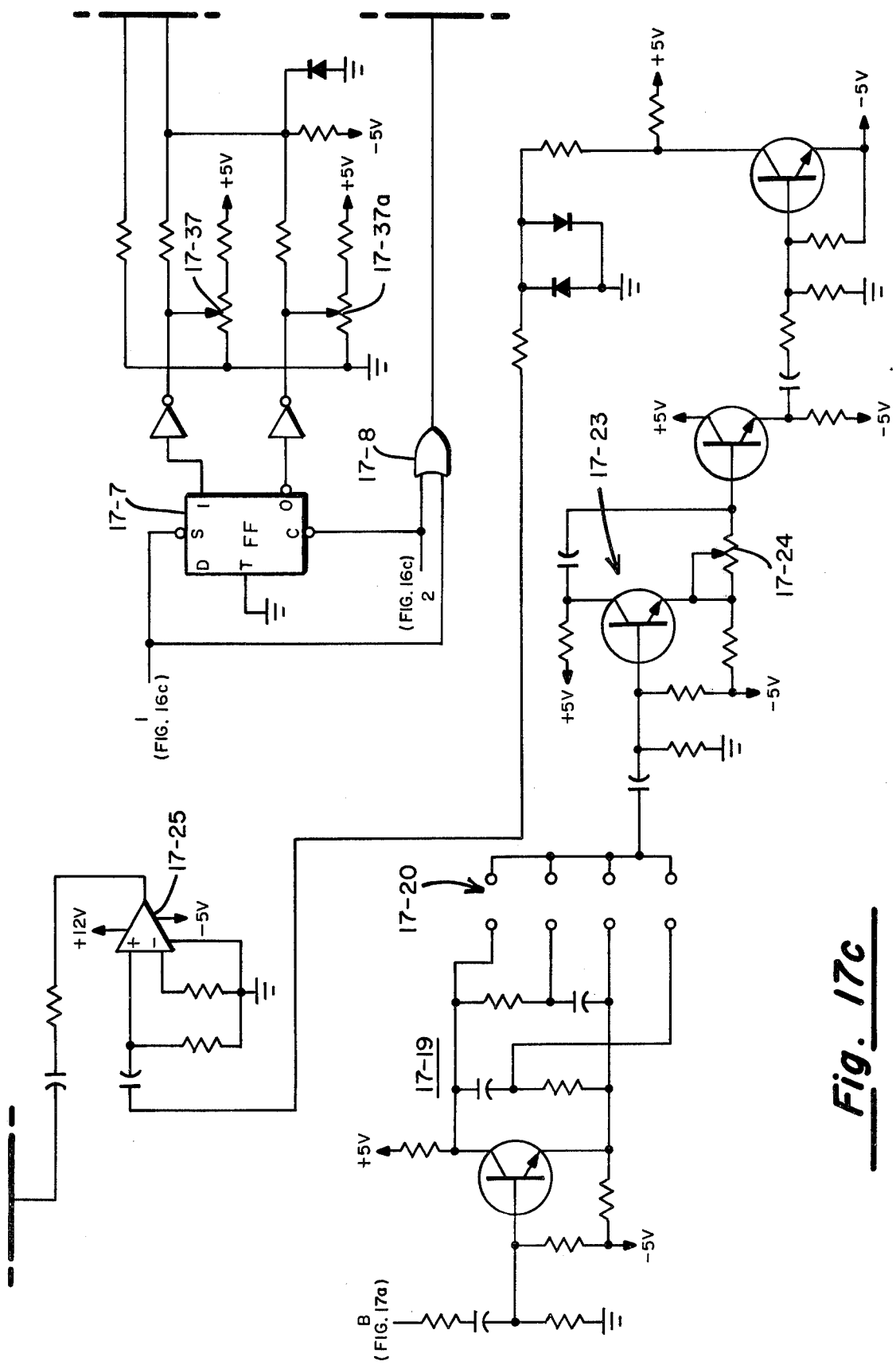

AND gate 17-8 functions here as an OR function meaning that if either the map data signal from the previously mentioned NAND gate 16-57, or the background (no radar data binary 000) data decoded by NAND gate 16-53 (FIG. 16*b*) and arriving as a low signal during background at gate 16-54 (FIG. 16*c*), goes low, then the output of this AND gate 17-8 (FIG. 17*c*) will go low and switch the luminance gate 17-36 on FIG. 17*d*, over to select the differential inputs fed by the background or map luminance adjustments 17-37 and 17-37*a* on FIG. 17*c*. If neither background or map data are present, this means one of the radar levels, one through six, is present and luminance switch 17-36 on FIG. 17*d* is selecting the proper broadcast standard luminance value from the video matrix circuit output Y on circuit 17-5 of FIG. 17*b*, and the color information or color sub-carrier from chip 17-6 of FIG. 17*b*.

These two last-mentioned chips are commercially available and preferably the Video Generator chip 17-5 is a National Semiconductor Type-1886 whereas the chip 17-6 is preferably a National Semiconductor Type-1889. It is the output from the Type-1889 chip which comprises the color sub-carrier signal. It should be further mentioned at this point that the external graphics unit, i.e., the Mapper, has its own memory. An external sync is sent to the Mapper module so that it will be operating in timed relationship with the receiver Video board. If the operator using the external graphics unit has prepared a map and is displaying it independently to check it out for accuracy, it will be on a 256×256 grid matrix. Hence, when overlaid with the received radar data, the maps will be superimposed on the same area on which the radar data falls.

When the data from the Mapper is received on the line 16-29 through 16-32, it is fed to a four input AND gate 16-36 such that any active map data will cause gate 16-36 to output a signal which will change the "select"

input to the multiplexer 16-28 so as to allow the map data to go out as video information rather than the received radar data. The multiplexers 16-33 and 16-34 are employed to permit the selection of a background color which is distinct from the color of the radar or map data. The color selection is again achieved by appropriate jumpering of the jacks 16-39 and 16-40. By choosing appropriate points to be jumpered, any background color such as sky blue, green, tan, etc., can be obtained. While the jumpers 16-39 and 16-40 are utilized to select background color, the jumpers associated with gates 16-5 are employed to select the color for the various intensity levels and these will be in a desired contrast with respect to the background color.

As mentioned, the gate 16-55, then, decodes the presence of the map from the Data Latch flip-flops 16-9 through 16-11, an all one's condition, while the gate 16-53 decodes background (all zero's). These two gates ultimately control the background data multiplexers 16-33 and 16-34. Thus, background will be entered into the multiplexer when all zero's are detected by the gate 16-53. In that a zero condition had been received from memory, it means that background color is to be displayed. The strappable color selection provided by the jumpering on jack 16-40 will then be applied to the inputs of the multiplexer 16-34. The outputs from multiplexer 16-33 and 16-34 are applied to the inputs of a Type-1886 video generator chip which is a standard linear IC manufactured and sold by the National Semiconductor Company. The Type-1886 video generator chip generates the proper R - Y and B - Y ratios required to produce the necessary phase shift and amplitude modulation of the color chrominance signal to yield a proper chrominance phase and amplitude. The R - Y and B - Y information is applied to a further linear IC chip, a Type-1889. By observing the inputs to the 1886 chip, it can be seen that there are 512 different possible combinations because there are 3-bits for each of the red, green and blue inputs labeled R0 through R2, G0 through G2 and B0 through B2, totally 9-bits. Because the current invention uses either 3-bits to define radar data, or 4-bits to define graphics, or 8-bits to define the background color, various combinations effectively tie together combinations of the 3-bits for each red, green, and blue are used. Note the number of bits is first reduced from nine to eight by tying together B1 and B2 of chip 17-5 (FIG. 17b). These are the 8-bits used to select the background color via multiplexers 16-33 and 16-34 (FIG. 16e). If the background jumpers 16-39 and 16-40 are not selected by the multiplexer, the other inputs to the multiplexer have bits tied together such that 4-bits remain, controlled by the output of MUX 16-28. If the external 4-bit graphics inputs to MUX 16-28 are not selected via the external graphics inputs 16-29 through 16-32, then the 4-bits from multiplexer 16-27 will control the color. It can be seen that by tying inputs together on MUX 16-27, the total number of bits used to control the color from either of the selected multiplexer sections is 3-bits, either from the radar data latches 16-9 through 16-11 or color bar generator outputs from 16-25 and 16-24. The R - Y and B - Y factors generated by the 1886 chip is modulated within the 1889 chip with the subcarrier I and Q inputs to the 1889 labeled CRL and CRLD on chip 17-6 (FIG. 17b). As a result, a subcarrier in proper phase relationship and amplitude appears on the output line 17-9 which is the proper phase and amplitude of the subcarrier used to generate the chrominance signal for providing the different colors.

Figure 16E:
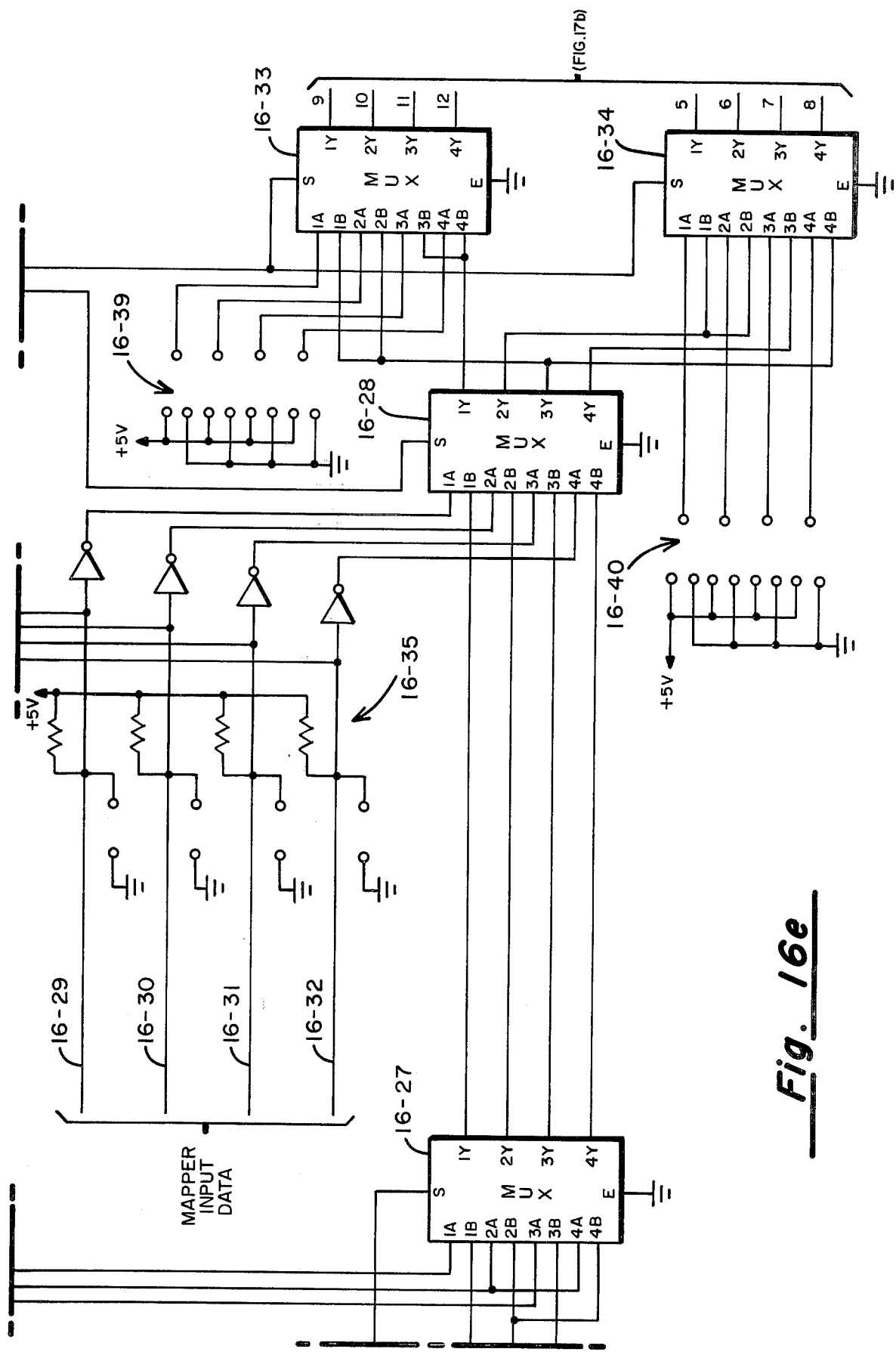

With continued reference to FIG. 16c, four one-shots 16-41 through 16-44 are provided for defining the size of a clutter blank window. As has already been mentioned, the transmitted radar data often includes noise-type echos obtained from objects on the ground proximate the transmitting station. This pattern of so-called ground clutter may often obscure the presentation of the video weather information. Hence, incorporated into the receiver is circuitry for blanking out that ground clutter. This circuits 16-41 through 16-44 provide a means whereby the length and width of a rectangle may be adjusted and all returns falling within that rectangle will be blanked from the display screen. The control inputs to the one-shots come from the front panel directly rather than through the Switch Interface panel. Specifically, these lines are identified by numerals 16-45, 16-46, 16-47 and 16-48. The one-shot 16-43 is fired by the HD pulse by virtue of the output from the one-shot 16-42 which is applied as a first input to the AND gate 16-49, the output of this last-mentioned gate being connected as an input to the one-shot 16-43. The vertical drive, V.D., fires off the one-shot 16-41 and 16-42 in that the output from one-shot 16-13 is connected as an input to the one-shot 16-41. Thus, the four one-shots 16-41 through 16-44 determine the size of the rectangular blank area and the location where it will be painted on the screen. They govern the vertical position, vertical size, horizontal position and horizontal size. The clutter blanking circuitry is cleared or unblanked by a control signal from the front panel arriving via conductor 16-50 which, as can be seen, connects to the clear input of the four one-shot circuits in question. The output from one-shot 16-44 is coupled through an OR gate 16-51 to a first input of AND gate 16-52 which is arranged to be enabled by a decoding of the data in the latches 16-9, 16-10 and 16-11 via the NAND gate 16-53. Thus, when the AND condition for gate 16-52 is satisfied, OR circuit 16-54 produces an output which is coupled to a flip-flop 17-7 which controls the blanking of the video signal by setting it to background video. When the Data Latches 16-9 through 16-11 are each set, the NAND gate 16-55 is satisfied causing NAND gate 16-56 to output a high signal and producing an enable for NAND gate 16-57. It is the output from this last-mentioned gate that is applied to an OR gate 17-8 for controlling the video.

Next to be considered is the construction and mode of operation of the devices used to produce the so-called VIP Alarm. A set of three comparators 16-58, 16-59 and 16-60 and a set of four counters 16-61 through 16-64 are arranged to provide a visual and/or audio indication that received radar data is of an intensity exceeding a preset threshold. It can be seen that the incoming radar data from the Memory arriving on conductors 16-1 through 16-3 are applied to the B-inputs of the comparator 16-58. Connected to the A-inputs of this same comparator are signals coming from the "Level" thumbwheel switches on the front panel by way of conductors 16-65, 16-66 and 16-67. With three such lines, it is, of course, possible to define the six possible levels of precipitation. If the incoming data is of an intensity equal to the threshold established, the comparator 16-58 will output a signal to toggle the counter 16-61. Each incoming data byte whose intensity equals the precip level further advances the counters 16-61 and 16-64. The sensitivity for the alarm condition is entered from the "AREA" thumb-wheel switches on the front panel which may be set to define any number of successive pixels in the range of from one to ninety-nine. These thumb-wheel switches provide inputs on conductors 16-68, 16-69, 16-70 and 16-71 associated with the A-inputs of the comparator 16-59 and to the lines 16-72 through 16-74 associated with the A-inputs of the comparator 16-60. When the PRECIP ALARM push-button switch on the front panel is depressed to enable the alarm circuity and the precipitation reaches the selected intensity level over the selected area, the comparator 16-60 will output a signal setting the alarm flip-flop 16-76 and providing an enable to NAND gate 16-77. The other enable to this gate comes from a preselected stage of one of the counters 16-62 and 16-63 which is advanced by VD pulses from the one-shot complex 16-13. In this fashion, the gate 15-90 will produce an output alarm signal which can be used to light a light or sound a buzzer. The gate 15-90 is, of course, further enabled by the output from the Alarm latch 15-91 which becomes set when the Precip Alarm push-button on the front panel is activated to apply a signal to the input line 15-92 on the Switch Interface board. A second depression of this same push-button will again toggle the latch 15-91 to disable the gate 15-90 and preclude the generation of such an alarm.

For the receiver of the present invention to be compatible with conventional TV studio equipment, two things must prevail. First, the receiver must be able to sync up horizontally with the studio equipment and that sync signal comes into the Video board on line 17-10. As standard studio sync is negative 4 volts, the RC circuits provide the DC level shifting necesary to make it logic compatible and the potentiometer 17-11 allows the horizontal sync signal to be delayed or advanced so that it will match with the studio generated sync after proper adjustments for various cable links have been made.

Secondly, the TV studio subcarrier signal must be properly timed and shaped. This subcarrier signal from the studio equipment comes in on conductors 17-12 and 17-13 and is applied to the true input of a comparator 17-14 which provides a squaring function and the resulting logic compatible pulse is used to trigger a one-shot circuit 17-15 permitting the Phase Lock Loop circuit 17-16 to determine the proper (14.31818 megahertz) clock frequency necessary to obtain an in-phase subcarrier from the Type-3262 Sync Generator chip 17-1. The Phase Lock Loop 17-16 may comprise a Type-562 linear IC and it is used to take the subcarrier generated from the studio and multiply it by 4 to drive the Sync Generator Chip 17-1 with 14.31818 MHz and produce the subcarrier via two serially connected driver stages 17-17 and 17-18. The shaped studio subcarrier from 17-14 also goes to a Coarse Adjust network which allows the phase of the subcarrier coming from the Sync Generator chip 17-1 to be adjusted in 90° increments. This is necessitated by the fact that full 360° control is necessary to accommodate any phase differences which may be encountered due to different cable links in the studio. By selectively jumpering the taps 17-20 to 17-22, the subcarrier can be brought into a desired close phase relationship with respect to the studio. Following the coarse adjustment, the fine adjustment circuit indicated generally by numeral 17-23 can be brought into play via the adjustable potentiometer 17-24 to adjust the subcarrier developed within the receiver so that it is exactly in-phase with the studio subcarrier signal coming in on the lines 17-12 and 17-13.

The adjusted, in-phase subcarrier is applied to a comparator 17-25 which amplifiers and shapes that signal before it is applied to the Phase Lock Loop 17-16. The other subcarrier reference to the Phase Lock Loop comes from the 3262 (17-1) through buffers 17-17 and 17-18. Thus, the PLL operates to generate the clock and to alter its phase in relation to the arriving studio subcarrier signal. The resulting output from the comparator 17-26 is then applied via certain logic circuits yet to be described to the Sync Generator chip 17-1 so that the resulting subcarrier output from that chip will bear a proper phase relationship to the studio equipment.

The output from comparator 17-26 carrying the 14.31818 MHz signal is applied to a first input of AND gate 17-27 whose output, in turn, is coupled through an OR gate 17-28 and ultimately into a flip-flop comprised of cross-coupled NAND gates 17-29 and 17-30. The reason for doing this is that the Type-3262 Sync Generator chip requires two clock inputs which are 180° out of phase with one another as is more particularly described in the Data Sheets provided by Fairchild Co., the manufacturer of that chip. A composite sync output is obtained at the pin labeled SYN of the Sync Generator chip and that signal is fed through a delay network including the drivers 17-31 and 17-32 and their associated RC delay network and through NAND network 17-33 to a potentiometer 17-34 which permits control over the amplitude of the resulting waveform. That signal is applied to the Video Amplifier chip 17-35 such that the sync signal and the video signal are mixed. The Video Amplifier 17-35 is a gated amplifier device permitting selection of either the first input pair or the second input pair depending upon the state of the signal applied to the gating terminal thereof.

The so-called "color-burst" gating signal for the video is generated off of the Type-3262 chip labeled CB and is buffered and fed to the input labeled BG of chip 7-5, which through the subcarrier modulator 17-6, produces the 3.58 MHz color-burst signal.

As was already mentioned, the inputs to the Type-1886 chips 17-5 come from the multiplexers 16-33 and 16-34 and this is the place where the actual digital information is applied. At the time of application to the Type-1886 chip, it is the red, green and blue inputs (RGB). The chip functions to generate the two signals R-Y and B-Y which, in turn, are applied to the Type-1889 video chip 17-6 to yield the proper phase and amplitude of the subcarrier and to generate the proper luminance for a given input.

The manner in which the video intensity signal is developed will now be explained.

It will be recalled that the Type-1889 chip outputs the subcarrier signal on line 17-9 and this signal is applied to the base electrode of a transistor 17-38, configured as a voltage follower and the buffered signal passes through a 3.58 MHz tank circuit 17-39 to remove the harmonic content of the subcarrier inherent in the subcarrier processor 17-6, and is mixed with a voltage level developed across the potentiometer network 17-40. Applied to the upper set of inputs to the gated operational amplifier 17-41, then, is the subcarrier and by means of the potentiometer controls, the overall level can be adjusted. That is to say, the red, green and blue chrominance can be adjusted to a higher or lower intensity level. Because the filtering process described in the above tank circuit also introduces some delay in the subcarrier signal, this delay must also be introduced to the luminance section consisting of a gated amplifier 17-36, and its associated inputs. If the two signals (chrominance and luminance) were not coincident, shadowing of the display would occur. This delay to the luminance channel is accomplished by the delay line shown following the luminance switch 17-36. The potentiometer following the delay line allows overall luminance gain to be adjusted. The 3.58 MHz subcarrier signal buffered by the transistor stage 17-38 is divided at junction 17-42 with a first portion going to the amplifier 17-41 all as previously described. The other portion of this signal is applied to the gated operational amplifier 17-35 and becomes the 3.58 MHz burst signal portion of the composite video. Thus, the upper two inputs of the gated operational amplifier 17-35 receive the displayable video information, i.e., the luminance, chrominance, map, and background information. The lower two inputs of the amplifier 17-35 receive the color burst and sync information. The potentiometer 17-43 controls the amplitude of the blanking level which is the level tha the burst actually is superimposed upon, the potentiometer 17-43 serving to move the pedestal up and down. The blanking signal from the Type-3262 chip 17-1 labeled BNK is delayed by network comprised of elements 17-31a and 17-32a and then buffered by 17-33a and applied to the gating terminal of the switchable operational amplifier 17-35 and controls the switch-over from passing video information to passing the burst flag and sync at the appropriate point in time in the composite video waveform. The composite video is passed through a further driver stage 17-44 to provide the output signal on line 17-45 which connects to the TV station switcher.

Thus, there has been shown and described the details of the construction of a system whereby radar weather data from National Weather Service radar equipment may be processed in a transmitter module for transmission over conventional telephone lines to a receiver module where the incoming data is further processed and a composite video signal generated for direct application to television station display equipment.

The invention has been described herein in considerable detail, in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to equipment details and operating procedures can be effected without departing from the scope of the invention itself.

What is claimed is:

1. A system for relaying weather radar data from a radar apparatus at a transmitting site to a remote receiving site comprising in combination:
   (a) transmitter means coupled to receive radar video signals in a polar coordinate format representative of differing levels of precipitation, elevation, azimuth and range from said radar apparatus, said transmitter means including;
      i. sensitivity time correction means for modifying said radar video signals representative of levels of precipitation as a function of said radar video signals from said radar apparatus representative of range,
      ii. buffering means coupled to said sensitivity time correction means for at least temporarily storing the modified signals representative of levels of precipitation for each of a plurality of ranges at a given azimuth,
      iii. A programmable processor having a central processor unit, and a plurality of memory modules each coupled thereto by a data bus, a control bus and an address bus,
      iv. means coupling said buffering means to one of said plurality of memory modules via said data bus for entering the contents of said buffering means into said one of said plurality of memory modules at addressable locations therein,
      v. means including said programmable processor for converting the data entered into said one of said memory modules from said buffering means from a polar coordinate format to a rectangular coordinate format and for storing the converted results back in one of said plurality of memory modules,
      vi. modulator means coupled to said programmable processor by said data bus, control bus and address bus, said modulator means including means for generating control signals and discrete signals representative of said converted results which are indicative of the levels of precipitation existing at differing ranges and azimuth values,
   (b) a communications link adapted to be connected to said modulator means in said transmitter means for receiving said discrete signals indicative of levels of precipitation and said generated control signals; and
   (c) receiver means coupled to said communications link for receiving said discrete signals indicative of levels of precipitation and said generated control signals, said receiver means including;
      i. demodulation means for re-converting the received discrete signals to digital values indicative of levels of precipitation,
      ii. memory means coupled to said demodulation means for storing said digital values into a plurality of range dependent groupings, and
      iii. means coupled to the output of said memory means for converting the digital values sequentially read from said receiver's memory means to a composite video signal suitable for controlling video display apparatus.

2. The system as in claim 1 wherein one of said plurality of memory modules in said transmitter means stores digital data representative of map information and wherein said modulator means includes means for converting said digital data representative of map information to a further discrete signal, said further discrete signal being integrated with said discrete signals indicative of the levels of precipitation existing at varying ranges and azimuths prior to being transmitted over said communications link.

3. The system as in claim 2 wherein said receiver means includes means for selectively converting said further discrete signals to said composite video signal whereby said map information may selectively be either displayed or not.

4. The system as in claim 1 wherein said modulator means in said transmitter means further includes data compression means coupled to receive said stored results, said data compression means comprising:
   (a) means for producing a control signal when two successive data bytes of said received stored results are equal;

(b) means for tallying said control signals from said comparator means; and (c) means coupled to said counter means for generating compression signals indicative of the value tallied in said counter means.

5. The system as in claim 4 wherein said receiver means includes:

(a) means for receiving said compression signals and converting said compression signals to digital counts;

(b) presettable counter means arranged to receive said digital counts corresponding to the received compression signals;

(c) means for successively changing the contents of said presettable counter in unit increments and repeatedly entering into said memory means in said receiver said digital value indicative of levels of precipitation until the contents of said presettable counter reach a predetermined value.

6. The system as in claim 1 wherein said modulator means comprises:

(a) a random access memory adapted to receive said converted results from said one of said memory modules over said data bus;

(b) a read-only memory adapted to store predetermined count values at addressable locations therein;

(c) presettable counting means coupled to receive the outputs from said read-only memory;

(d) clock means coupled to said presettable counting means for incrementing or decrementing said presettable counting means at a fixed rate;

(e) means associated with said presettable counting means for producing output pulses when the contents of said presettable counting means reaches a predetermined value and for enabling said presettable counting means to again receive predetermined count values from said read-only memory; and (f) means coupling said random access memory to said read-only memory such that said converted results constitute addresses for said read-only memory.

7. Apparatus as in claim 1 wherein said communications link comprises voice grade telephone lines.

8. Receiver apparatus for use in a weather radar transmitting and display system comprising in combination:

(a) means for receiving frequency modulated information defining predetermined levels of precipitation at varying azimuth and ranges, map information and compression counts relating to such information;

(b) logic means for converting said frequency modulated information to binary numbers;

(c) a read-only memory for storing binary words at addressable locations therein, said binary words defining predetermined levels of precipitation and map information, said read-only memory being connected to said logic means so as to be addressed by said binary number;

(d) counter means coupled to said logic means for receiving binary numbers therefrom indicative of the received compression counts;

(e) memory means for storing a plurality of frames of data defining said levels of precipitation at a plurality of rows and columns;

(f) memory control means coupled to said counter means and to said memory means for controlling the entry of said binary words from said read-only memory into said memory means; and (g) video converter means coupled to said memory means to sequentially receive data read out from said memory for converting said data to a composite video signal.

9. The receiver apparatus as in claim 8 and further including manually operable means coupled to said memory control means for selectively inhibiting the entry of said binary words from said read-only memory into said memory means.

10. The receiver apparatus as in claim 8 and further including manually operable means coupled to said memory control means for reading out data from only selected address in said memory means to said video converter means.

11. The receiver apparatus as in claim 8 and further including manually operable means for selectively applying a control signal to said video converter means for selectively inhibiting said map information from forming a component of said composite video signal.

12. A system for relaying weather radar data from radar apparatus at a transmitting site to a remote receiving site comprising, in combination:

(a) scan conversion means adapted to receive digital signals in a polar coordinate format representative of differing levels of precipitation from said radar apparatus for converting said digital signals to a raster scan format;

(b) first memory means coupled to said scan conversion means for storing the converted digital signals representative of precipitation levels in raster scan format;

(c) second memory means pre-programmed to store at addressable storage locations therein further digital signals defining graphic information;

(d) data compression means coupled to receive the digital signals from said first and second memory means for generating a count value indicative of the number of digital signals representative of identical precipitation levels in a continuous sequence; and (e) means coupled to said data compression means for transmitting said count value and the digital signal representative of the precipitation level and graphic information for which said count value pertains to a calling one of a plurality of remote receiver means.

13. The system as in claim 12 wherein said remote receiver means each comprise:

(a) decompression means arranged to receive said count value and said digital signals representative of the precipitation level and graphic information to which said count value pertains for recreating said digital signals a number of times indicated by said count value; and (b) memory means coupled to said decompression means for storing said recreated digital signals at a number of addressable locations therein corresponding to said count value.

14. The system as in claim 13 and further including digital-to-video conversion means coupled to receive digital signals from said memory means for converting said digital signals to composite video signals.

* * * * *